US012794173B2

(12) United States Patent
Yao et al.

(10) Patent No.: US 12,794,173 B2
(45) Date of Patent: Nov. 10, 2026

(54) ELECTRICAL CONNECTORS

(71) Applicant: Apple Inc., Cupertino, CA (US)

(72) Inventors: Stephen E. Yao, Daly City, CA (US); Joshua A. Mendoza, Lancaster, CA (US); Varun K. Sanghvi, San Francisco, CA (US); Josiah Clark, San Jose, CA (US); Hossein Nazari Alikorzani, San Francisco, CA (US); James C. Wu, Menlo Park, CA (US); Daniel C. Wagman, Scotts Valley, CA (US); Tatsuya Sano, San Jose, CA (US); Christopher S. Graham, San Francisco, CA (US); Yufan Liao, San Jose, CA (US)

(73) Assignee: APPLE INC., Cupertino, CA (US)

( * ) Notice: Subject to any disclaimer, the term of this patent is extended or adjusted under 35 U.S.C. 154(b) by 343 days.

(21) Appl. No.: 18/529,169

(22) Filed: Dec. 5, 2023

(65) Prior Publication Data

US 2024/0213712 A1 Jun. 27, 2024

Related U.S. Application Data

(60) Provisional application No. 63/470,439, filed on Jun. 1, 2023, provisional application No. 63/476,528, filed on Dec. 21, 2022.

(51) Int. Cl.
*H01R 13/627* (2006.01)
*G02B 27/01* (2006.01)
(Continued)

(52) U.S. Cl.
CPC ..... *H01R 13/6273* (2013.01); *G02B 27/0176* (2013.01); *H01R 13/2492* (2013.01);
(Continued)

(58) Field of Classification Search
CPC ............ H01R 13/6273; H01R 13/2492; H01R 13/6277; H01R 13/62977; H01R 13/635
(Continued)

(56) References Cited

U.S. PATENT DOCUMENTS 4,481,458 A * 11/1984 Lane .................. H01M 50/213 362/183
7,125,270 B2 * 10/2006 Buck .................. H01M 50/244 439/352
(Continued)

FOREIGN PATENT DOCUMENTS

CN 105244686 B 2/2018
CN 110061386 A 7/2019
(Continued)

*Primary Examiner* — Gary F Paumen
(74) *Attorney, Agent, or Firm* — Dorsey & Whitney LLP

(57) ABSTRACT

An electronic device can include plug connectors and receptacle connectors for providing connections between components of the electronic device. A receptacle connector for an electronic device can include a cavity configured to receive a plug connector; a latch extending at least partially into the cavity; a spring coupled to the latch; and a lever arm coupled to the spring. The latch can be configured to transition between an engaged configuration and an un-engaged configuration. The latch can be configured to retain the plug connector in the cavity when the latch is in the engaged configuration. The spring can be configured to retain the latch in the engaged configuration. The lever arm can be configured to transition the latch to the un-engaged configuration in response to pressure from a tool.

42 Claims, 68 Drawing Sheets

(51) Int. Cl.
*H01R 13/24* (2006.01)
*H01R 13/629* (2006.01)
*H01R 13/635* (2006.01)
*H01R 24/60* (2011.01)

(52) U.S. Cl.
CPC ... *H01R 13/6277* (2013.01); *H01R 13/62977* (2013.01); *H01R 13/635* (2013.01); *H01R 24/60* (2013.01)

(58) Field of Classification Search
USPC ........ 439/352, 374, 677, 678, 152, 159, 271
See application file for complete search history.

(56) References Cited

U.S. PATENT DOCUMENTS

| | | | | |
|---|---|---|---|---|
| 7,824,199 B2 * | 11/2010 | Kikuchi | H01R 12/00 439/157 |
| 8,344,965 B2 * | 1/2013 | Matsumoto | G02B 27/0176 345/5 |
| 8,460,018 B2 * | 6/2013 | Henry | H04B 1/3816 439/159 |
| 8,939,735 B2 * | 1/2015 | Heidecker | H01R 13/6395 439/282 |
| 8,956,168 B2 * | 2/2015 | Al-Anzi | H01R 31/065 439/159 |
| 2012/0196462 A1 * | 8/2012 | Henry | H04B 1/3816 439/159 |
| 2015/0155649 A1 * | 6/2015 | Muro | H01R 13/5202 439/271 |

FOREIGN PATENT DOCUMENTS

| | | |
|---|---|---|
| CN | 110323630 A | 10/2019 |
| CN | 110718810 A | 1/2020 |
| JP | 2002237357 A | 8/2002 |

* cited by examiner

ELECTRICAL CONNECTORS

CROSS-REFERENCE TO RELATED APPLICATION(S)

This claims priority to U.S. Provisional Patent Application No. 63/470,439, filed 1 Jun. 2023, and entitled "ELECTRICAL CONNECTORS," and to U.S. Provisional Patent Application No. 63/476,528 filed 21 Dec. 2022, and entitled "ELECTRICAL CONNECTORS," the entire disclosures of which are hereby incorporated by reference in their entirety.

FIELD

The described embodiments relate generally to interconnecting electronic devices. More particularly, the present embodiments relate to pairing a connector to an electronic device.

BACKGROUND

Electronic devices are increasingly being designed with device portability in mind, for example, to allow users to use these devices in a wide variety of situations and environments. Indeed, power sources, such as lithium batteries, can power an electronic device for a substantial duration of time and in a variety of indoor and outdoor environments. Components within an electronic device, such as, a processor, memory, antennas, and other components, can be disposed within a portable housing to protect the components from damage or failure induced by an environment external to the housing. Improvements and advances to portable electronic devices can be desirable to provide additional functionality in a variety of situations and environments.

SUMMARY

According to some aspects of the present disclosure, an electrical port for receiving a plug connector can include a housing including an internal wall at least partially defining a cavity; a first electrical contact disposed at least partially within the cavity; and a second electrical contact disposed at least partially within the cavity. The cavity can be configured to surround at least a portion of the plug connector. The first electrical contact can be coupled to the housing at a first angle oblique to a vertical axis of the housing. The second electrical contact can be coupled to the housing at a second angle oblique to the first angle and the vertical axis of the housing.

In some examples, the cavity is configured to receive a plug connector including a concave surface and a convex surface opposite the concave surface. In some examples, the first angle and the second angle are normal to the concave surface and the convex surface.

In some examples, the electrical port further includes a compressible bumper coupled to the internal wall of the housing opposite an opening of the cavity.

In some examples, the electrical port further includes a seal coupled to the internal wall of the housing adjacent an opening of the cavity. In some examples, the seal can encircle at least a portion of the cavity. In some examples, the seal can be configured to supply an ejection force to a plug connector inserted into the cavity.

In some examples, the electrical port further includes an engagement feature. In some examples, the engagement feature can include a latch configured to extend through an opening in a lateral portion of the internal wall of the housing when the latch is in an engaged configuration. In some examples, the engagement feature further includes a spring configured to retain the latch in the engaged configuration; and a push block coupled to the spring and the latch. In some examples, the push block can be configured to rotate the latch to an un-engaged configuration in response to a force from a tool. In some examples, a wedge-shaped portion of the latch can be configured to interlock with a groove of the plug connector.

According to some examples, a receptacle connector for a head-mountable display (HMD) includes a cavity configured to receive a plug connector; a latch extending at least partially into the cavity; a spring coupled to the latch; and a lever arm coupled to the spring. In some examples, the latch can be configured to transition between an engaged configuration and an un-engaged configuration. In some examples, the latch can be configured to retain the plug connector in the cavity when the latch is in the engaged configuration. In some examples, the spring can be configured to retain the latch in the engaged configuration. In some examples, the lever arm can be configured to transition the latch to the un-engaged configuration in response to pressure from a tool.

In some examples, the latch can be configured to extend into a groove in a boot of the plug connector. In some examples, the latch can be configured to extend into a groove in a plug of the plug connector.

In some examples, the receptacle connector further includes a seal encircling at least a portion of the cavity. In some examples, the seal can be configured to interface with a boot of the plug connector. In some examples, the receptacle connector further includes a seal encircling at least a portion of the cavity. In some examples, the seal can be configured to interface with a plug of the plug connector. In some examples, the seal can further be configured to supply an ejection force to the plug connector.

In some examples, the receptacle connector further includes a compressible bumper disposed between a back surface of the cavity and the plug connector. In some examples, the bumper can be configured to supply an ejection force to the plug connector.

In some examples, the plug connector can be disposed at a distal end of a support. In some examples, the tool can be configured to interface with the support to align the tool with the lever arm. In some examples, the receptacle connector further includes a seal mounted on the lever arm.

According to some aspects, a head-mountable display (HMD) includes a display portion, an electrical power source, and a cable assembly coupled to the display portion and the electrical power source. The cable assembly can include a first receptacle connector, a first plug connector disposed within a first cavity of the first receptacle connector, a second receptacle connector, and a second plug connector disposed within a second cavity of the second receptacle connector. The first plug connector can be configured to be removed from the first receptacle connector by a pull force. The second plug connector can be configured to be removed from the second receptacle connector by a force of a tool applied to a lever arm of the second receptacle connector.

In some examples, the cable assembly further includes a third receptacle connector; and a third plug connector disposed within a third cavity of the third receptacle connector. The third plug connector can be configured to be removed from the third receptacle connector by a force of a second tool applied to a second lever arm of the third receptacle connector.

In some examples, the HMD further includes a support coupled to the display. The first receptacle connector can be disposed on a first housing of the support. The second receptacle connector can be disposed within a second housing of the display. The third receptacle connector can be disposed within a third housing of the electrical power source.

In some examples, the HMD further includes a support coupled to the display. The first receptacle connector can be disposed on a first housing of the support. The second receptacle connector can be disposed within a second housing of the electrical power source.

In some examples, the HMD further includes a support coupled to the display. The first receptacle connector can be disposed on a first housing of the support. The second receptacle connector can be disposed within a second housing of the display. The second plug connector can be disposed at an end of the support. The second receptacle connector can be configured to receive at least a portion of the support.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
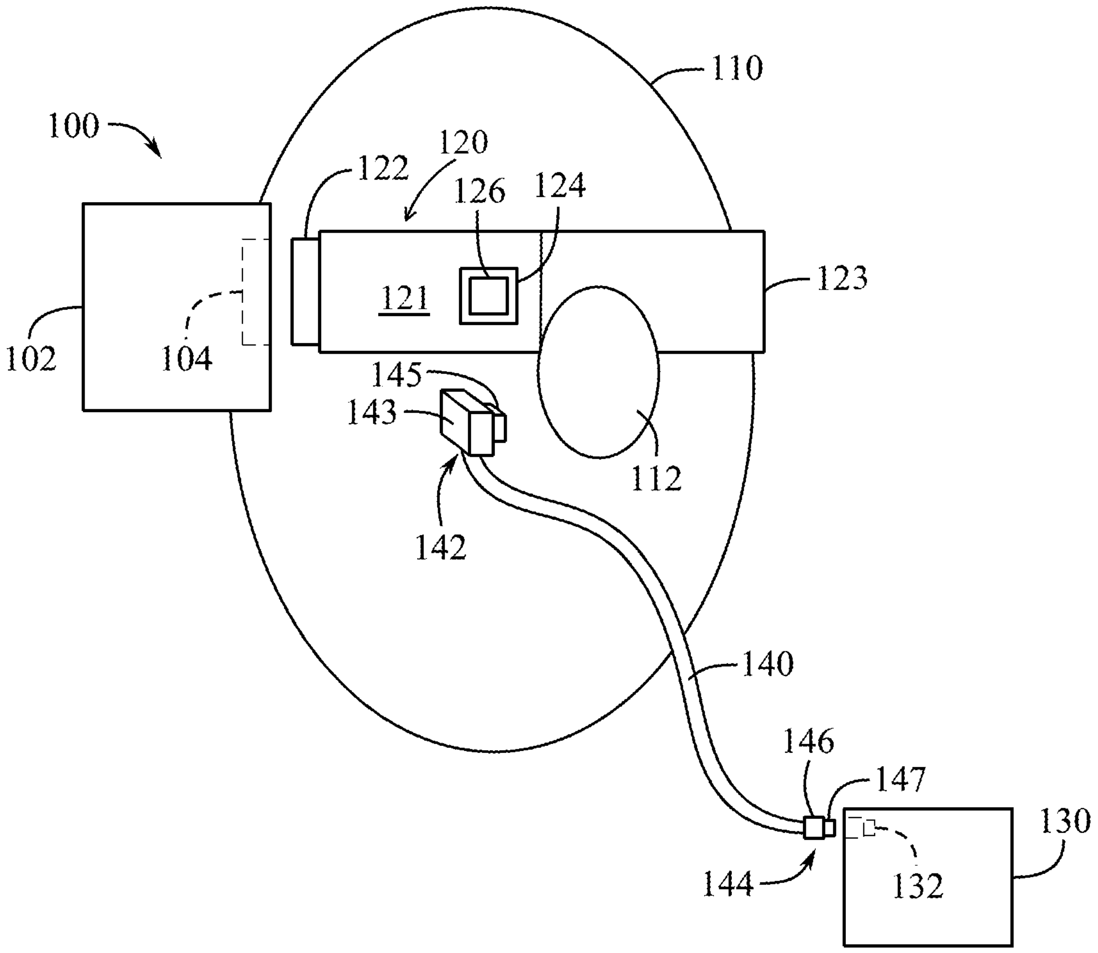
FIG. 1A shows a perspective side view of an electronic device.

The following detailed description makes detailed reference to representative embodiments illustrated in the accompanying drawings. The following descriptions are not intended to limit the embodiments to one preferred embodiment. Rather, the descriptions are intended to cover alternatives, modifications, and equivalents as can be included within the spirit and scope of the described embodiments, as defined by the appended claims.

Portable electronic devices, such as smart phones, laptops, tablet computing devices, smart watches, head-mountable devices (also referred to as head-mountable displays (HMDs)), and headphones, have become commonplace for persons undertaking daily activities (e.g., travel, communication, education, entertainment, employment, and the like).

Indeed, portable electronic devices can provide assistance in completing daily tasks and errands, such as, watching an instructional video or monitoring progress during and after an exercise routine. However, some electronic devices incorporate a temporary or permanent cabled connection to operate (e.g., charging the device, providing electrical power to an electronic component, interconnecting a peripheral input or output device, and the like).

Regarding HMDs, an electronic device can include one or more cabled connections, each of which can have unique and specific requirements. As an example, a temporary or permanent cabled connection can be coupled to a display portion of the HMD. The HMD can include one or more battery packs or electrical power sources that demand regular charging to operate the HMD for an extended period of time. However, a cabled connection to the display portion can inhibit (e.g., snag on a user or objects around the user while in use) or otherwise limit a user from operating the HMD while charging.

In some examples of the present disclosure, a display portion of the HMD can receive electrical power and/or control signals through a support electrically coupled to the display portion. The support can include a plug connector which is connected (structurally and electrically) within a receptacle connector of the display portion. While connected, the support can define an electrical path that enables electrical power and/or control signals to pass between the display portion and another electronic device (e.g., an electrical power source, such as, a battery pack) electrically connected to the support. The support can include a receptacle connector configured to electrically connect an electronic device to the support.

One aspect of the present disclosure relates to an electronic device, (e.g., an HMD) including an enclosure and a receptacle connector coupled or joined to the enclosure. The receptacle connector can include a housing defining an aperture and an internal volume. In some examples, the housing is configured to receive a plug connector of a support within the internal volume. The receptacle connector can include one or more electrical contacts at least partially disposed within the internal volume and contacting one or more correlating electrical contacts on the plug connector. In some examples, the plug connector and the receptacle connector can define respective convex surfaces and respective concave surfaces such that a cross-sectional shape of the plug connector and/or the receptacle connector has a curved longitudinal axis. The electrical contacts of the receptacle connector can be coupled or connected to the housing at angles normal to the concave and convex surfaces of the plug connector, which provides for improved electrical contact between the electrical contacts of the receptacle connector and the plug connector. In some examples, the receptacle connector can include a spring-driven fastener configured to retain the plug connector within the receptacle connector and configured to release the plug connector in response to a tool actuation. Bumpers can be provided in the housing to supply an ejection force to the plug connector, and seals can be provided adjacent an opening of the cavity to provide sealing and/or an ejection force to the plug connector.

In some examples, abruptly or accidentally removing electrical power and/or control signals from an electronic device can damage the components of the electronic device and/or data stored on the electronic device. As such, cabled connections that do not unwantedly or accidentally disconnect can be desirable. In some examples, a cable assembly that reliably interlocks with the electronic device to limit unwanted or accidental extraction of the cable assembly is provided. In some examples, a connection that requires more force to remove the connection than to establish the connection (e.g., disconnecting a cable assembly from a port versus inserting the cable assembly into the port) is provided. In some examples, a cable assembly and a receptacle connector of an electronic device can be configured to prevent damage to the electronic device and loss of data, even in cases in which the cable assembly is accidentally or undesirably extracted from the receptacle connector.

One aspect of the present disclosure relates to an electronic device including an enclosure and a receptacle connector attached to the enclosure. The receptacle connector can form a recess that interlocks or otherwise engages with a plug connector of a cable assembly. In some examples, the plug connector can include a boot, a central member coupled to the boot, and one or more protrusions extending laterally from the central member. The one or more protrusions can extend laterally into a channel, or respective channels, formed within the recess of the receptacle connector.

In some examples, the receptacle connector can include one more detents disposed within the recess. Each of the one or more detents can interlock with a respective protrusion of the central member. The detents can be biased to extend into the recess by one or more leaf springs, canted coil springs, elastic foam, a combination thereof, or another biasing element. Each of the detents can form an angled surface which interfaces with a respective protrusion to retain the plug connector within the receptacle connector. At least one of the spring force of the biasing element and/or the angle of the angled surface can correlate to a force required to extract the plug connector from the receptacle connector. In some examples, each respective angle of the angled surfaces can vary so the plug connector can be more easily extracted by lifting one side of the plug connector (e.g., a non-cable-side) than another side of the plug connector (e.g., a cable-side of the plug connector).

In some examples, the central member can be rotated to interlock (or release) the plug connector and the receptacle connector. In other words, the plug connector can be rotatably received within the receptacle connector. Alternatively, a push-button, a latch, a slide-button, or another actuating mechanism can be used to interlock (or release) the plug connector and the receptacle connector. For example, an actuating mechanism can be incorporated into the boot of the plug connector. Additionally, or alternatively, one or more magnets can be disposed within the plug connector and/or the receptacle connector to orient the plug connector relative to the receptacle connector and/or retain the plug connector to the receptacle connector.

One aspect of the present disclosure relates to an electronic device including a housing that defines an exterior surface of the electronic device. The housing can form an aperture within the exterior surface. An electronic component can be disposed within the housing and can include a receptacle connector coupled to the electronic component. The receptacle connector can be fastened to a trim ring, which can be fastened to the housing. The housing, the trim ring, and the receptacle connector can form an electrical port. The electronic device can further include a first engagement feature and a cable having a plug connector. The plug connector can include a boot, a plug, and a second engagement feature. The boot is receivable within the aperture formed within the exterior surface of the housing and can be receivable within the trim ring. The plug is receivable within the receptacle connector to electrically couple the electronic device with the cable. The second engagement feature can interconnect or otherwise engage the first engagement feature to retain the cable to the electronic device.

In some examples, the first and second engagement features can be one or more: biasing elements, latches, arms, protrusions, recesses, channels, magnets, canted coiled springs, rotating members, sliding members, another type of engagement feature, or a combination thereof. In some examples, the first engagement feature can be included in the trim ring, the second engagement feature can be included in the boot, and the first and second engagement features can latch, interlock, or otherwise secure the boot in the trim ring such that the cable is interconnected with the electronic device. In some examples, the first engagement feature and the second engagement feature can involve a lesser force to connect the cable to the electronic device (e.g., insert the plug connector into the electrical port) and a greater force to disconnect the cable from the electronic device (e.g., remove the plug connector from the electrical port). In other words, a force required to withdraw the plug connector from the electrical port can be sufficiently large to prevent or limit unwanted or accidental removal of the cable from the electronic device. In some examples, the first engagement feature and the second engagement feature can be spring-driven features that are actuated by a tool in order to release the plug connector from the electrical port. In other words, a tool actuation to withdraw the plug connector from the electrical port can prevent or limit unwanted or accidental removal of the cable from the electronic device.

While the electronic devices are described herein as HMDs, the electronic devices can include a smart phone, a laptop, a tablet computing device, a smart watch, headphones, or any other electronic device.

These and other examples are discussed below with reference to FIGS. 1A through 40B. However, those skilled in the art will readily appreciate that the detailed description given herein with respect to these Figures is for explanatory purposes only and should not be construed as limiting. Furthermore, as used herein, a system, a method, an article, a component, a feature, or a sub-feature comprising at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

Figure 1B:
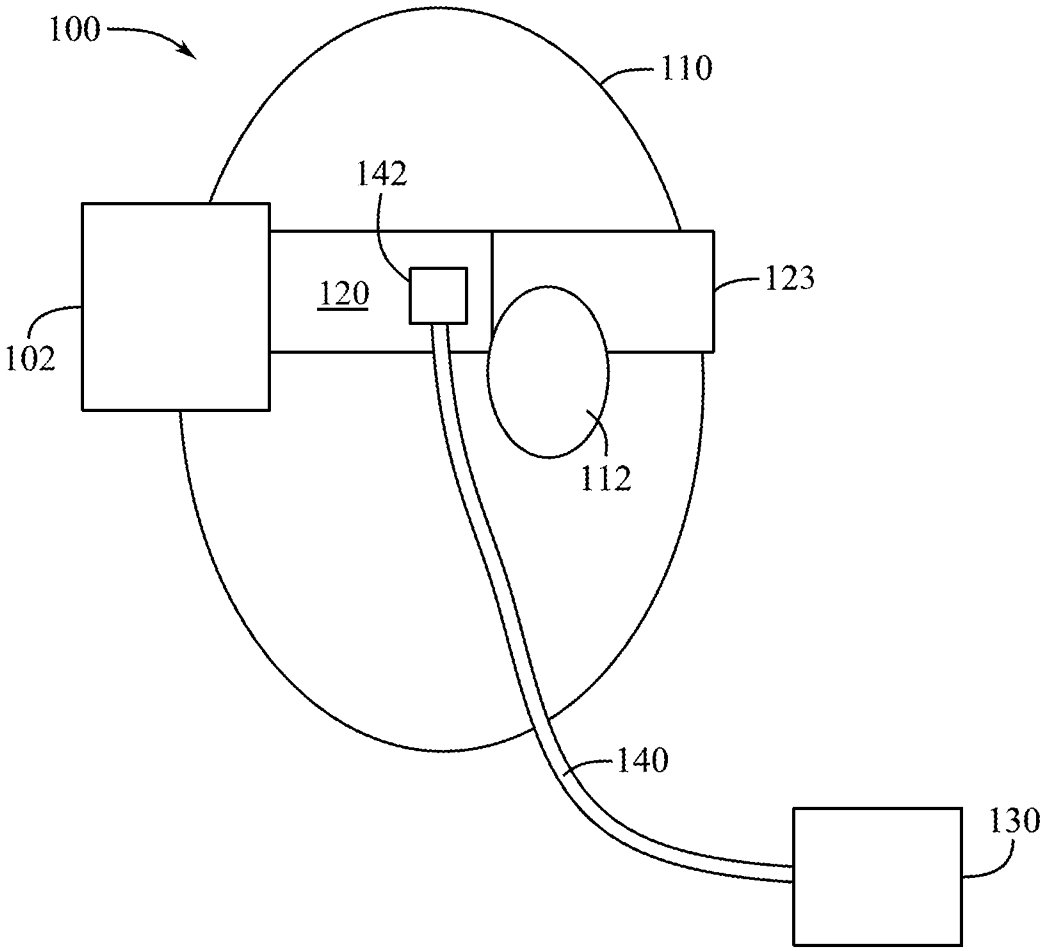
FIG. 1B shows a perspective side view of the electronic device of FIG. 1A.

FIGS. 1A and 1B show a first electronic device 100, a cable assembly 140, and a second electronic device 130. In some examples, the first electronic device 100 can be a head-mountable display (HMD) including a display portion 102 and one or more supports 120. While the first electronic device 100 is illustrated as an HMD, the first electronic device 100 can be a tablet computing device, smart phone, smart watch, or any other electronic device in other examples. The display portion 102 can output visual content viewable by a user of the electronic device 100. For example, the display portion 102 can include a light-emitting diode (LED) display, an organic light-emitting diode (OLED) display, a liquid-crystal display (LCD) display, a micro-LED display, or the like. In some examples, the display portion 102 can be any form of display now known in the art, or as can be developed in the future.

The supports 120 can retain the electronic device 100 relative to a user's head 110. In some examples, the first electronic device 100 can include a first support 120 disposed on a first side of the user's head 110 and illustrated in FIGS. 1A and 1B, and a second support 120 (not separately illustrated) coupled to the display portion 102 and disposed on a second side of the user's head 110 opposite the side of the user's head 110 illustrated in FIGS. 1A and 1B. In some examples, a single support 120 can be included, and can be a band 123 or can include a band portion coupled to the display portion 102. The support 120 can be configured to wrap around or otherwise encircle a portion of the user's head 110 and can be coupled to the display portion 102 at two or more locations. In some examples in which the support 120 includes a band 123 or band portion, the support 120 can be made of an elastomer material which can flex or stretch and thereafter return to an initial state. In other examples, the supports 120 can be separate structural straps including electronics, processors, speakers, plugs, and/or other functional elements. These structural straps can then be connected to a band 123 that flexibly engages a user's head to impart a retention force on the system, in connection with facial engagement points. As used herein, the supports will be described as separate structural straps including wires, electronics, speakers, and/or other functional elements.

The supports 120 can include plug connectors 122, which can be coupled to receptacle connectors 104 of the display portion 120. The receptacle connectors 104 can include recesses that are configured to receive portions of the supports 120, such as the plug connectors 122. As illustrated in FIG. 1A, the plug connectors 122 can be disposed at proximal ends of the supports 120. The plug connectors 122 and the receptacle connectors 104 can each include one or more electrical contacts (not separately illustrated) that electrically couple the plug connectors 122 and the supports 120 to the display portion 102. In other words, as shown in FIG. 1B, the supports 120 can be electrically coupled to the display portion 102 through the plug connectors 122 and the receptacle connectors 104 when the plug connectors 122 are coupled to the receptacle connectors 104 (e.g., the plug connectors 122 are at least partially disposed within recesses of the receptacle connectors 104). Examples of the plug connectors 122 and the receptacle connectors 104 will be discussed in greater detail below with reference to FIGS. 2 through 15. In some examples, the supports 120 can be welded, adhered, fastened, crimped, clipped, mechanically engaged with, or otherwise retained by the display portion 102.

The supports 120 can each include an enclosure 121 (also referred to as a housing) formed from a polymer, metal, ceramic, or combinations thereof. In some examples, the enclosure 121 can form a channel or cavity extending between a receptacle connector 124 of each support 120 and the plug connector 122. The supports 120 can be electrically coupled to the plug connector 122 (and the display portion 102 through the plug connector 122 and the receptacle connector 104) such that electrical signals and/or electrical power received at the receptacle connector 124 can be provided to the plug connector 122 or other electronic components of the first electronic device 100. For example, one or more electronic components (e.g., printed circuit boards, processors, electrical wires, digital logic circuitry, digital processing circuitry, or the like) can be positioned within the cavity formed within the enclosure 121 and extend between the receptacle connector 124 and the plug connector 122 to form an electrical path between the receptacle connector 124 and the plug connector 122.

Each of the supports 120 can include a receptacle connector 124 disposed on or within an enclosure 121. The receptacle connector 124 can form a recess 126 that can receive a portion of the cable assembly 140. The cable assembly 140 can include a plug connector 142 at a distal end of the cable assembly 140. The plug connector 142 can include a boot 143 and a central member 145 at least partially disposed within the boot 143. The central member 145 can include one or more electrical contacts (not separately illustrated) that electrically couple the plug connector 142 to the first electronic device 100. In other words, as shown in FIG. 1B, the first electronic device 100 can be electrically coupled to the second electronic device 130 through the cable assembly 140 when the plug connector 142 is at least coupled to the receptacle connector 124 (e.g., the central member 145 is at least partially disposed within the recess 126). Examples of the receptacle connector 124 and the plug connector 142 will be discussed in greater detail below with reference to FIGS. 16A through 25B.

As illustrated in FIGS. 1A and 1B, each receptacle connector 124 can be positioned on or within the enclosure 121 of a respective support 120. In some examples, the receptacle connector 124 can be positioned on the enclosure 121 and disposed a distance from the display portion 102. The plug connector 142 can be operably coupled to the enclosure 121 (e.g., through the receptacle connector 124 of the enclosure 121) rather than directly coupling the plug connector 142 to the display portion 102. The receptacle connector 124 can be disposed on or within the enclosure 121 such that the display portion 102 and the receptacle connector 124 are disposed on opposing sides of a user's ear 112. In some examples, the display portion 102 can be coupled to a proximal end of the support 120 and the receptacle connector 124 can be positioned on or within a distal end of the support 120 opposite the display portion 102. In some examples, the receptacle connector 124 can be disposed on or within the enclosure 121 between the proximal end and the distal end of the support 120 such that the display portion 102 and the user's ear 112 are disposed on opposing sides of the receptacle connector 124 (as shown in FIGS. 1A and 1B). In some examples, the receptacle connector 124 can be disposed within the enclosure 121 at a location that is closer to the distal end than the proximal end. In some examples, the receptacle connector 124 can be disposed within the enclosure 121 at a location that is closer to the proximal end than the distal end. In some examples, the receptacle connector 124 can be disposed behind the user's ear 112 such that the user's ear 112 is between the display portion 102 and the receptacle connector 124.

Some HMDs utilize a re-chargeable power source (e.g., a battery) affixed to the HMD to provide electrical power to the electronic components (e.g., processors, displays, speakers, and the like). The size or capacity of the re-chargeable power source can be limited by the desired size, shape, and weight of the HMD. After the re-chargeable power source has been substantially depleted of electrical power, the user can be required to discontinue use of the HMD to allow re-charging of the electrical power source.

In some aspects of the present disclosure, rather than solely relying on a power source disposed within the HMD (e.g., the first electronic device 100), at least one power source (e.g., the second electronic device 130) can be additionally, or alternatively, electrically coupled to the HMD by a cabled connection (e.g., the cable assembly 140), which is electrically coupled to the enclosure 121 of the support 120 via the receptacle connector 124. Electrically coupling the power source (e.g., the second electronic device 130) to the receptacle connector 124 of the support 120 can be advantageous. For example, electrical power and/or electrical signals can be provided to the first electronic device 100, while the second electronic device 130 is disposed within a case, pocket, pouch, or otherwise retained by the user. Relocating the electrical power source away from the first electronic device 100 can accommodate a larger electrical power source than can be directly disposed on the first electronic device 100, which can provide for extended use of the first electronic device 100. Positioning the receptacle connector 124 between the proximal end and distal end of the support 120 can be beneficial in at least partially limiting user contact with the cable assembly 140 by positioning the cable assembly 140 at the side of the user rather than dangling or hanging the cable assembly 140 in front of the user near the first electronic device 100.

Electrically coupling a power source (e.g., the second electronic device 130) to the receptacle connector 124 of the support 120, as opposed to disposing the power source directly on the display portion 102 can also enable a reduction in the weight and/or a size of the display portion 102. A reduction in the weight and/or size of the display portion 102 can render the first electronic device 100 more comfortable during use, more convenient to transport, and more convenient to store.

While the receptacle connectors 124 and the plug connectors 142 are shown in FIGS. 1A and 1B as having cubic shape or square cross-sections, the receptacle connectors 124 and the plug connectors 142 can define other shapes and cross-sections in some examples. For example, the cross-sections of the receptacle connectors 124 and the plug connectors 142 can be circular or rounded to enable rotation of the plug connectors 142 relative to the receptacle connectors 124. In other words, the plug connectors 142 can be rotatably received within the receptacle connectors 124.

In some examples, the second electronic device 130 can provide electrical power and/or electrical signals to the first electronic device 100 through the cable assembly 140. For example, the second electronic device 130 can be an external electrical power source, such as, a lithium battery pack or other device capable of supplying electrical power to the first electronic device 100. The cable assembly 140 can include a plug connector 144, which can be coupled to a receptacle connector 132 of the second electronic device 130.

The plug connector 144 can include a boot 146 and a plug 147 at least partially disposed within the boot 146. The receptacle connector 132 of the second electronic device 130 can include a recess configured to receive portions of the plug connector 144. The plug 147 can include one or more electrical contacts (not separately illustrated) that electrically couple the plug connector 144 to the receptacle connector 132 of the second electronic device 130. In other words, as shown in FIG. 1B, the second first electronic device 130 can be electrically coupled to the cable assembly 140 through the plug connector 144 and the receptacle connector 132. The second electronic device 130 can be electrically coupled to the first electronic device 100 through the cable assembly 140 and the supports 120. Examples of the receptacle connector 132 and the plug connector 144 will be discussed in greater detail below with reference to FIGS. 26A through 40B.

As will be discussed in detail below, the various plug connectors and receptacle connectors included in an HMD (e.g., coupling the first electronic device 100 and the second electronic device 130) can be fastened to one another through various fastening mechanisms. In some examples, the fastening mechanisms can require a relatively small force to mate a plug connector and a receptacle connector and can require a relatively large force to un-mate the plug connector and the receptacle connector. In some examples, a tool actuation can be required to un-mate a plug connector and a receptacle connector once the plug connector and the receptacle connector are mated. In some examples, various seals can be provided on plug connectors and/or receptacle connectors to provide sealing between the plug connectors and receptacle connectors. The seals can provide forces between the plug connectors and receptacle connectors, such as ejection forces to aid in the removal of plug connectors from receptacle connectors.

FIGS. 2 through 15 illustrate various examples of receptacle connectors and plug connectors that can be used as the receptacle connectors 104 of the display portion 102 and the plug connectors 122 of the supports 120.

Figure 2:
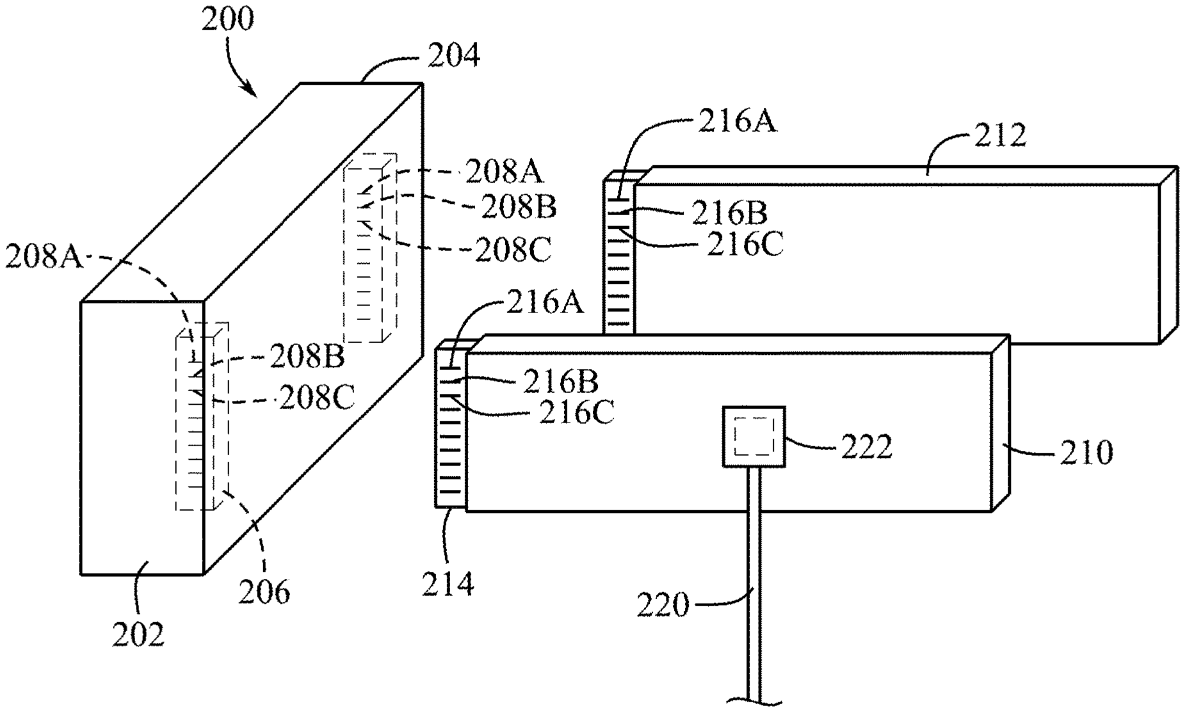
FIG. 2 shows a perspective view of a display, a support, and a plug connector.

FIG. 2 shows a first electronic device 200 including a display portion 202, supports 210, and a cable assembly 220. In some examples, the first electronic device 200 can be a head-mountable device (HMD). While the first electronic device 200 is illustrated as an HMD, the first electronic device 200 can be a tablet computing device, a smart phone, a smart watch, headphones, or any other electronic device. The display portion 202 can output visual content viewable by a user of the first electronic device 200. The first electronic device 200, the display portion 202, the supports 210, and the cable assembly 220 can be similar to or the same as the first electronic device 100, the display portion 102, the supports 120, and the cable assembly 140, respectively, discussed above with respect to FIGS. 1A and 1B.

The supports 210 can retain the first electronic device 200 relative to a user's head. As illustrated in FIG. 2, the first electronic device 200 can include two supports 210 coupled to the display portion 202 and configured to be positioned on either side of the user's head. The supports 210 can be connected to the display portion 202 at two or more locations.

The supports 210 can each include a housing or an enclosure 212 formed from a polymer, metal, ceramic, combination thereof, or the like. In some examples, the enclosure 212 can form a channel or cavity extending between a receptacle connector 222 of the support 210 and a plug connector 214 of the support 210. The support 210 can be electrically coupled to the display portion 202 such that electrical signals and/or electrical power received at the receptacle connector 222 can be provided to the display portion 202 through the plug connector 214. For example, one or more electronic components (e.g., printed circuit boards, processors, electrical wires, digital logic circuitry, digital processing circuitry, or the like) can be positioned within the cavity formed within the enclosure 212 and extend between the receptacle connector 222 and the plug connector 214 to form an electrical path between the receptacle connector 222 and the plug connector 214.

In some examples, the support 210 can be coupled to the display portion 202. For example, the support 210 can be welded, adhered, fastened, crimped, clipped, or otherwise retained within a receptacle connector 206 of the display portion 202. In some examples, a proximal end of the support 210 can be electrically conductive or include the plug connector 214 that enables electrical power and/or electrical signals received by the receptacle connector 222 of the support 210 to be transferred to the display portion 202 through the plug connector 214 and the receptacle connector 206.

As illustrated in FIG. 2, each of the supports 210 can include a plug connector 214 disposed at a proximal end of the support 210. The plug connector 214 can be coupled (e.g., electrically and structurally) to the display portion 202 by disposing the proximal end of the support 210 into a receptacle connector 206 coupled to a housing 204 of the display portion 202. The receptacle connector 206 can be positioned on or within the housing 204 of the display portion 202. In some examples, the receptacle connector 206 of the display portion 202 can be in electrical communication with the receptacle connector 222 of the support 210. That is, the cable assembly 220 can operably couple to the receptacle connector 222 of the support 210 rather than directly coupling to the display portion 202 to electrical power and/or electrical signals can be transferred between the receptacle connector 222 of the support 210 and the receptacle connector 206 of the display portion 202.

The plug connector 214 can include one or more electrical contacts 216A, 216B, 216C which electrically couple to respective electrical contacts 208A, 208B, 208C disposed within the receptacle connector 206 while the plug connector 214 is disposed within the receptacle connector 206. The one or more electrical contacts 216A, 216B, 216C and the correlating one or more electrical contacts 208A, 208B, 208C can provide electrical signals, electrical power, a grounding path, another electrical communication, or a combination thereof between the support 210 and the display portion 202.

Electrically coupling a power source (e.g., the second electronic device 104) to the receptacle connector 222 within the support 210, as opposed to disposing the power source directly on the display portion 202 can also enable a reduction in the weight and/or a size of the display portion 202. A reduction in the weight and/or size of the display portion 202 can render the first electronic device 200 more comfortable during use, more convenient to transport, and more convenient to store. While the receptacle connector 206 and the plug connector 214 are shown in FIG. 2 as having a cubic shape or square cross-section, the receptacle connector 206 and the plug connector 214 can define other shapes and cross-sections in other examples. For example, the cross-section of the receptacle connector 206 and the plug connector 214 can be elongated and/or curved such that the support 210 can only be inserted into the receptacle connector 206 of the display portion 202 in a single orientation.

Figure 3A:
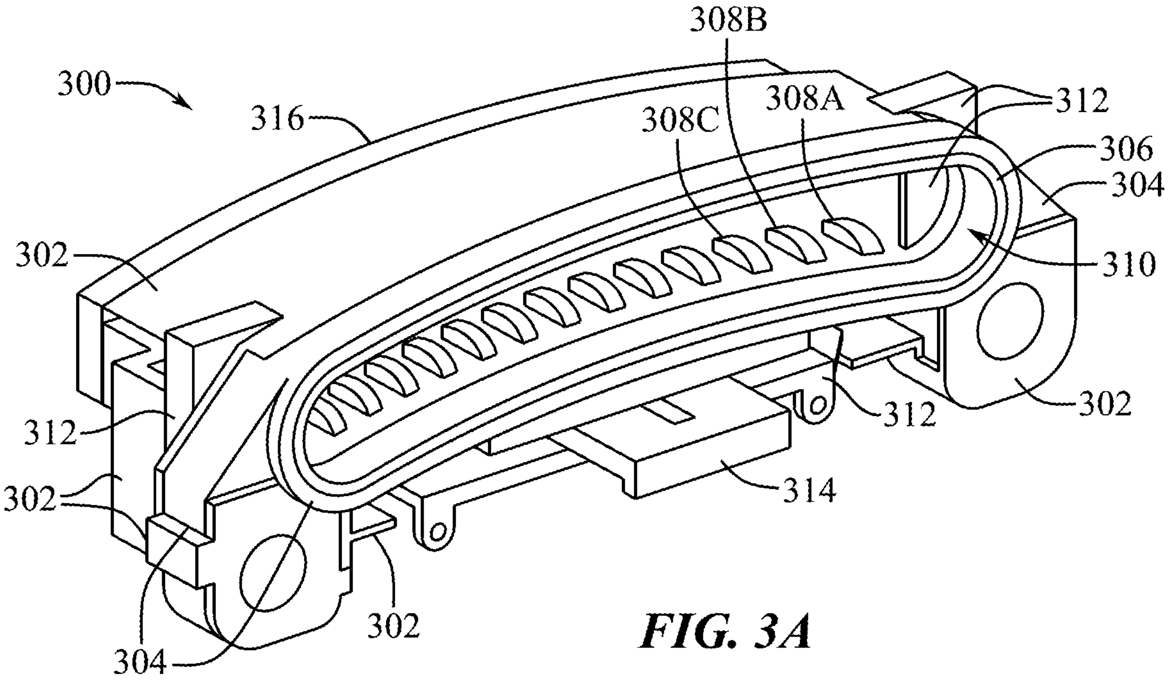
FIG. 3A shows a perspective view of a receptacle connector.
Figure 3B:
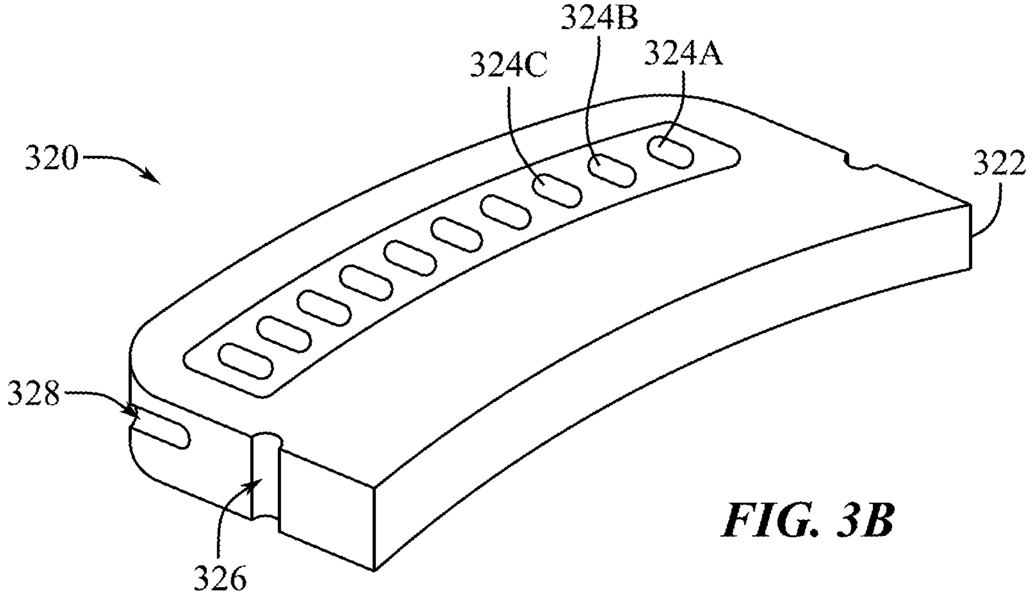
FIG. 3B shows a perspective view of a plug connector.

FIGS. 3A and 3B show perspective views of a receptacle connector 300 and a plug connector 320. The receptacle connector 300 can be used as the receptacle connector 104 or the receptacle connector 206 and the plug connector 320 can be used as the plug connector 122 or the plug connector 214 of the first electronic devices 100/200 of FIGS. 1A through 2. The receptacle connector 300 can include a receptacle housing 304, one or more electrical contacts (e.g., electrical contacts 308A, 308B, and 308C), a cover member 302, and a printed circuit board (PCB) 316.

In some examples, the receptacle housing 304 can be manufactured from an electrically insulating material, such as, a polymer or ceramic and can be molded, machined, cast, stamped, or a combination thereof. The receptacle housing 304 can one include or more sidewalls defining a recess 310. The recess 310 can be configured to accept and retain the plug connector 320. For example, at least a portion of the plug connector 320 can be inserted into and received within the recess 310. The recess 310 can define a cross-sectional shape having a longitudinal axis that curves or bends. For example, the recess 310 can have a cross-sectional shape that substantially conforms to a cross-sectional shape of a plug connector (e.g., the plug connector 320). In other words, the sidewalls of the receptacle housing 304 can define a convex surface and a concave surface that correlate in size, shape, and contour with convex and concave surfaces of the plug connector 320.

The one or more electrical contacts (e.g., the electrical contacts 308A, 308B, and 308C) can extend from a sidewall of the receptacle connector 300 into the recess 310. The electrical contacts can provide electrical signals, electrical power, a grounding path, another electrical communication, or a combination thereof to the PCB 316. In some examples, a first set of electrical contacts, including the electrical contacts 308A, 308B, and 308C, can be disposed on a first side of the recess 310 and a second set of electrical contacts (not separately illustrated) can be disposed on a second, opposite, side of the recess 310. As will be discussed in detail below, the electrical contacts can be attached to the receptacle housing 304 at angles normal to a surface of the plug connector 320, which the electrical contacts are configured to contact. This provides improved contact between the electrical contacts of the receptacle connector 300 and electrical contacts of the plug connector 320.

In FIG. 3B, the plug connector 320 can define a top surface and a bottom surface. The top surface can be a convex external surface or otherwise form a radius of curvature. The bottom surface can be a concave external surface extending parallel or substantially parallel to the top surface. One or more electrical contacts (e.g., electrical contacts 324A, 324B, and 324C) can be disposed on the top surface and/or the bottom surface of the plug connector 320. In some examples, the electrical contacts can be provided on the bottom surface of the plug connector 320, and the top surface of the plug connector 320 can be free from any electrical contacts; or the electrical contacts can be provided on the top surface of the plug connector 320, and the bottom surface of the plug connector 320 can be free from any electrical contacts.

In some examples, the plug connector 320 can include one or more guide channels 328 and one or more retention channels 326. The guide channels 328 and/or the retention channels 326 can be formed within the top surface, the bottom surface, or other surfaces (e.g., side surfaces) of the plug connector 320. The guide channels 328 can receive guide rails (such as guide rails 313, illustrated in FIG. 5A) of a receptacle connector of a display portion to limit or inhibit movement between a support including the plug connector 320 and the display portion. The guide channels 328 can also be beneficial to enable insertion of the plug connector 320 into a receptacle connector in a limited combination of configurations. For example, a guide rail will prevent insertion of the plug connector 320 within a receptacle connector unless the plug connector 320 has a correlating guide channel 328.

The retention channels 326 can receive latches 312 of the receptacle connector 300 in order to retain the plug connector 320 within the recess 310 of the receptacle connector 300. The retention channels 326 and the latches 312 can prevent undesired removal of the plug connector 320 from the recess 310. In some examples, the retention channels 326 and the latches 312 can retain the plug connector 320 in the recess 310 of the receptacle connector 300 in a position in which electrical contacts of the plug connector 320 are aligned with electrical contacts of the receptacle connector 300.

As will be discussed in detail below, the receptacle connector 300 can include a push block 314 operably coupled to the latches 312. The push block 314 can be actuated by a tool and actuating the push block 314 can rotate the latches 312 out of the recess 310 such that the plug connector 320 can be removed from the recess 310. The latches 312 can be configured such that a large force is required to pull the plug connector 320 from the recess 310, but a small force is required to pull the plug connector 320 from the recess 310 when the push block 314 is actuated and the latches 312 release the plug connector 320. This allows for the plug connector 320 to be removed when needed but prevents the plug connector 320 from being accidentally or unintentionally removed from the receptacle connector 300.

The guide channels 328 and the retention channels 326 are illustrated with partial cylindrical shapes. However, any suitable shapes can be used for the guide channels 328 and the retention channels 326, and the guide channels 328 and the retention channels 326 can have square, rectangular, semi-circular, triangular, U-shaped, V-shaped, other geometric-shaped, combinations thereof, or the like cross-sectional shapes. In some examples, the cross-sectional shape of the guide channels 328 and the retention channels 326 can vary along a length of the channels. For example, the guide channels 328 and the retention channels 326 can form rectangular cross-sectional shapes that taper to square cross-section shapes along the length of the respective channels.

The receptacle connector 300 can include a face seal 306 adjacent the recess 310. The face seal 306 can encircle at least a portion of the recess 310, such as a distal portion of the recess 310. The face seal 306 can act as a seal which prevents or limits ingress of contaminants (e.g., liquid, dust, lint, debris, or the like) into the receptacle connector 300 through the recess 310, such as when the plug connector 320 is inserted into the recess 310 of the receptacle connector 300. In some examples, the face seal 306 can be configured to provide an ejection force to the plug connector 320. This can aid a user in removing the plug connector 320 from the receptacle connector 300, such as when the push block 314 is actuated.

The cover member 302 can include an upper portion and a lower portion. The upper portion and the lower portion can be machined, molded, stamped, extruded, or otherwise manufactured from one or more materials, such as a metal, a ceramic, or a polymer. In some examples, the lower portion can at least partially form the holes, which can be used to mount the receptacle connector to a housing or enclosure of a display portion. Each of the upper portion and the lower portion can provide a support structure for the receptacle connector 300. The upper portion and the lower portion can shield the receptacle connector 300 from propagating errant electromagnetic waves out of the receptacle connector 300.

The PCB 316 can be electrically coupled to the electrical contacts of the receptacle connector 300 (e.g., the electrical contacts 308A, 308B, and 308C). For example, the PCB 316 can include one or more electrical traces which carry electrical signals and/or electrical power from the electrical contacts to an electronic component (e.g., a processor, electrical wires, digital logic circuitry, digital processing circuitry, or the like) disposed on the PCB 316. The PCB 316 and/or the one or more electronic components electrically coupled to the PCB 316 can be electrically coupled to one or more electrical wires (not shown) to form at least a portion of an electrical path for electrical signals, electrical power, an electrical ground, another electrical communication, or a combination thereof to transfer between the receptacle connector 300 and a display or other electronic components within the display portion (e.g., the display portion 102/202). Similarly, the PCB 316 can form at least a portion of an electrical path for electrical signals, electrical power, an electrical ground, another electrical communication, or a combination thereof to transfer between the receptacle connector 300 and the plug connector 320.

Figure 4:
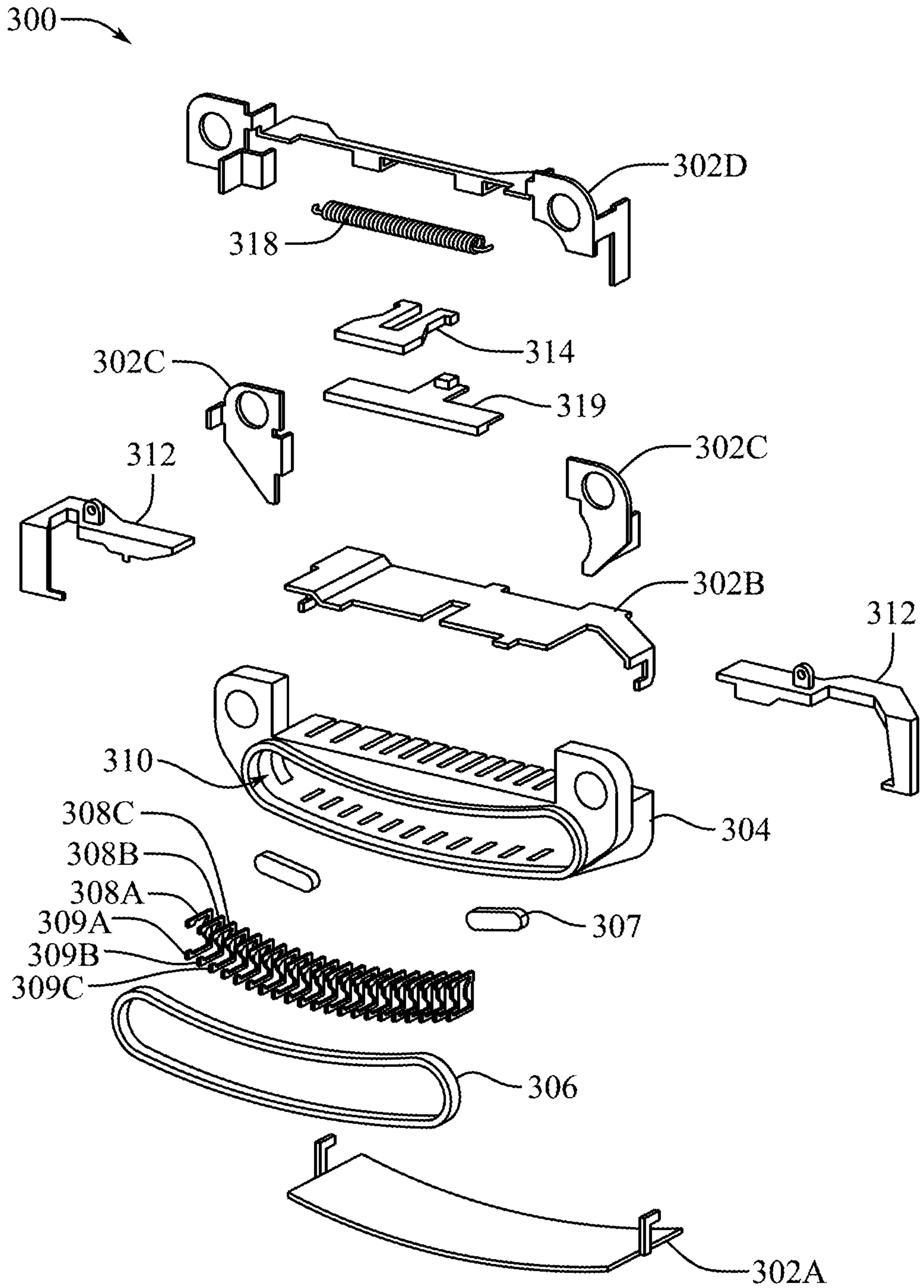
FIG. 4 shows an exploded view of a receptacle connector.

FIG. 4 shows an exploded view of the receptacle connector 300 including the receptacle housing 304. The receptacle housing 304 can form slits or slots within the sidewalls of the receptacle housing 304, which enable a first set of electrical contacts (e.g., the electrical contacts 308A, 308B, and 308C) to extend through the sidewalls and into the recess 310. In some examples, the receptacle housing 304 can further include slits or slots within the sidewalls, which enable a second set of electrical contacts (e.g., electrical contacts 309A, 309B, and 309C) to extend through the sidewalls of the receptacle housing 304 and into the recess 310. The second set of electrical contacts can extend into the recess 310 through a different sidewall of the receptacle housing 304 from the first set of electrical contacts. In some examples, the plug connector 320 can be devoid of electrical contacts that make contact with both the first set of electrical contacts and the second set of electrical contacts. In other words, one example of a support can include electrical contacts that only utilize one of the sets of electrical contacts shown in FIG. 4. Another example of a support can include electrical contacts that utilize both sets of electrical contacts shown in FIG. 4. Thus, a single configuration of the receptacle connector 300 having two sets of electrical contacts can be operable with multiple configurations of supports (e.g., supports having varied electrical contact configurations).

As shown in FIG. 4, in some examples, each of the electrical contacts of the first set of electrical contacts can be provided with a corresponding electrical contact of the second set of electrical contacts. Each set of corresponding electrical contacts can be disposed in and coupled to the receptacle housing 304 at an oblique angle to a longitudinal axis of the recess 310 (e.g., a lateral axis of the receptacle housing 304). Each set of electrical contacts can be coupled to the receptacle housing 304 at an angle normal to a surface of the plug connector 310 that the electrical contacts are configured to contact. This improves the electrical contact between the electrical contacts of the receptacle connector 300 and the plug connector 320. Each set of electrical contacts can also be disposed in and coupled to the receptacle housing 304 at an angle oblique to other sets of the electrical contacts, such as adjacent sets of electrical contacts.

The receptacle connector 300 can include a fastening mechanism for retaining the plug connector 320 in the recess 310. In the example illustrated in FIG. 4, the fastening mechanism includes a push block 314, a spring 318, a guide rail 319, and latches 312. The latches 312 extend through openings in the receptacle housing 304 into the recess 310. The latches 312 are pivotally coupled to the receptacle housing 304. The latches 312 can be in an engaged configuration when the latches 312 are pivoted into the recess 310, and in an un-engaged configuration when the latches are pivoted out of the recess 310.

The push block 314 is coupled to the latches 312, the spring 318, and the guide rail 319. The push block 314 is configured to slide along the guide rail 319 and rotate the latches 312 between the engaged configuration and the un-engaged configuration. The spring 318 is configured to retain the push block 314 in an initial position in which the latches 312 are in the engaged configuration. A user can use a tool or the like to apply force to the push block 314 and push the push block 314 along the guide rail 319. This rotates the latches 312 to the un-engaged configuration. Once the latches are in the un-engaged configuration, a plug connector 320 can be released from the recess 310 and removed from the receptacle connector 300. The spring 318 resists force applied to the push block 314 and movement of the push block 314 and returns the push block 314 to the initial position with the latches 312 in the engaged configuration once the force is no longer applied to the push block 314. As such, the latches 312, the push block 314, the spring 318, and the guide rail 319 are used to retain the plug connector 320 in the recess 310 of the receptacle connector 300 and release the plug connector 320 from the receptacle connector 300.

The face seal 306 can be coupled to a front surface of the receptacle housing 304 and can encircle the recess 310. The face seal 306 can be molded, adhered, welded, fastened, or otherwise secured to a surface of the receptacle housing 304. In some examples, the face seal 306 can include an elastic material that can be stretched around a lip of the receptacle housing 304 and can be secured to the receptacle housing 304 by interference with the receptacle housing 304. Bumpers 307 can be coupled to the receptacle housing 304 at a back surface of the recess 310. The bumpers 307 can be molded, adhered, welded, fastened, or otherwise secured to a surface of the receptacle housing 304. The bumpers 307 and the face seal 306 can provide an ejection force to a plug connector 320 inserted into the recess 310 of the receptacle connector 300. For example, the bumpers 307 and the face seal 306 can provide resistance to the plug connector 320 as the plug connector 320 is inserted into the recess 310 and can help to eject the plug connector 320 from the recess 310 when the latches 312 are rotated to the un-engaged configuration. This can allow the plug connector 320 to be ejected from the recess by actuating the push block 314 with a tool, and without requiring a user to otherwise pull on the plug connector 320 or the like. The bumpers 307 and the face seal 306 can also retain the electrical contacts of the plug connector 320 in a desired position relative to the electrical contacts of the receptacle connector 300.

The cover member 302 can include an upper portion 302A, a lower portion 302B, front portions 302C, and a rear portion 302D. Each of the portions of the cover member 302 can be coupled to the receptacle housing 304. For example, the portions of the cover member 302 can adhered (such as by a polymer-based adhesive tape), fastened, welded, or otherwise affixed to the receptacle housing 304. The cover member 302 can provide shielding and a support structure for the receptacle housing 304.

Figure 5A:
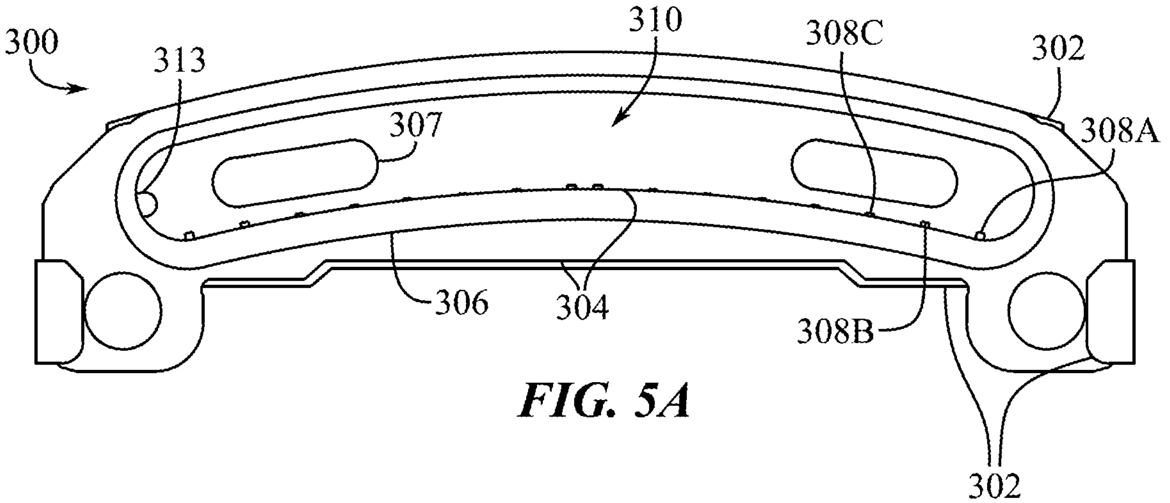
FIG. 5A shows a front view of a receptacle connector.
Figure 5B:
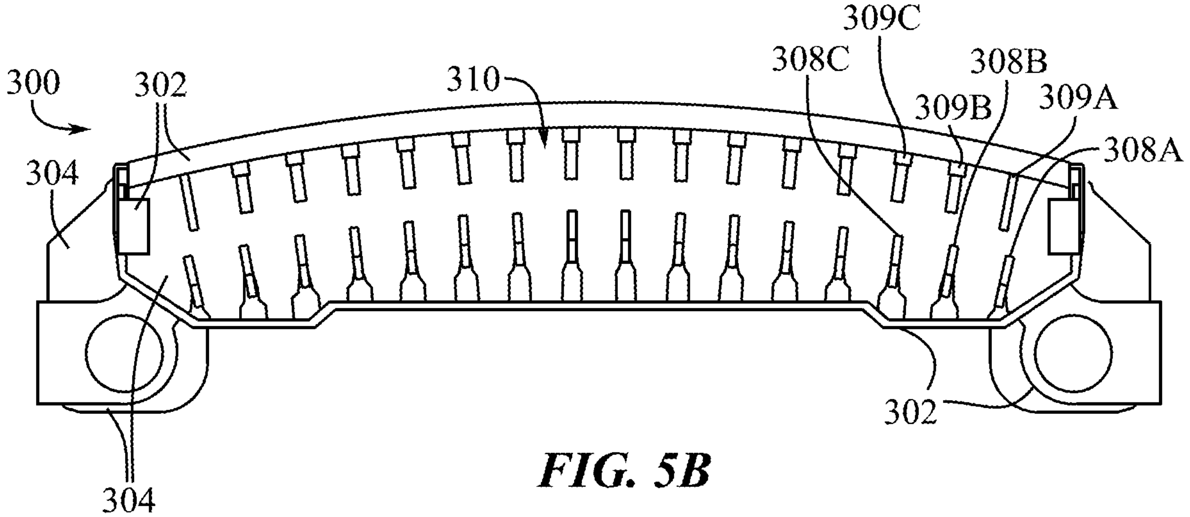
FIG. 5B shows a partial cut-away front view of the receptacle connector of FIG. 5A.

FIGS. 5A and 5B illustrate front views of the receptacle connector 300. As illustrated in FIG. 5A, the face seal 306 can encircle the recess 310 of the receptacle housing 304. The bumpers 307 can be disposed at a rear surface of the receptacle housing 304 adjacent the recess 310. When the plug connector 320 is inserted into the recess 310, the bumpers 307 can be disposed between the plug connector 320 and a rear inner surface of the receptacle housing 304. The bumpers 307 and the face seal 306 can each provide an ejection force to the plug connector 320, as discussed previously.

As illustrated in FIG. 5A, the receptacle housing 304 can include one or more guide rails 313. Each guide rail 313 can be disposed on a respective sidewall of the receptacle housing 304 and can extend into the recess 310. The guide rails 313 can be molded, co-molded, or otherwise formed with the receptacle housing 304 as a singular and unitary structure. The guide rails 313 can be received within guide channels 328 of the plug connector 320 to provide a rigid connection between a support including the plug connector 320 and a display portion including the receptacle connector 300. In other words, the guide rails 313 and the guide channels 328 can limit motion or free play between the support and the display portion. Additionally, or alternatively, the guide rails 313 can limit or prevent the plug connector 320 from being inserted into the receptacle connector 300 in an undesirable orientation and/or configuration.

FIG. 5B illustrates orientations of the electrical contacts (e.g., the electrical contacts 308A, 308B, 308C, 309A, 309B, and 309C) of the receptacle connector 300 relative to the receptacle housing 304. As illustrated in FIG. 5B, each of the electrical contacts can be disposed at an angle oblique to a lateral axis and a vertical axis of the receptacle housing 304. The electrical contacts can be disposed such that surfaces of the electrical contacts configured to contact a plug connector 320 are normal to surfaces of the plug connector 320 those electrical contacts are configured to contact. This provides for improved contact between the electrical contacts of the receptacle connector 300 and electrical contacts of the plug connector 320, as surfaces of the electrical contacts of the receptacle connector 300 rather than just edges or corners are configured to contact the plug connector 320. Each of the electrical contacts of the receptacle connector 300 can also be disposed at an angle oblique to adjacent electrical contacts.

Figure 6A:
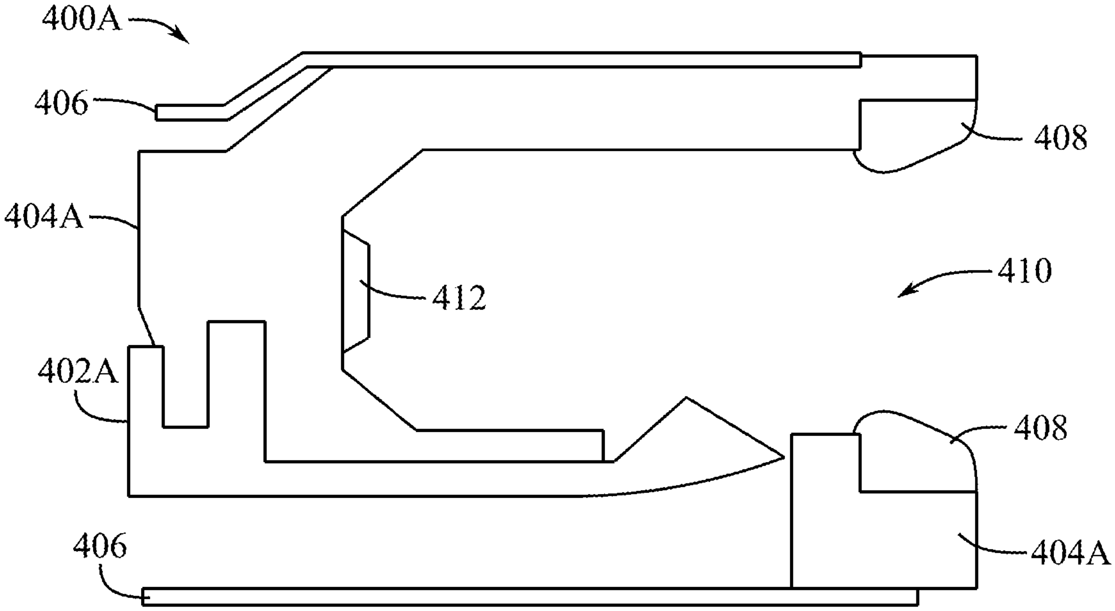
FIG. 6A shows a side sectional view of a receptacle connector.
Figure 6B:
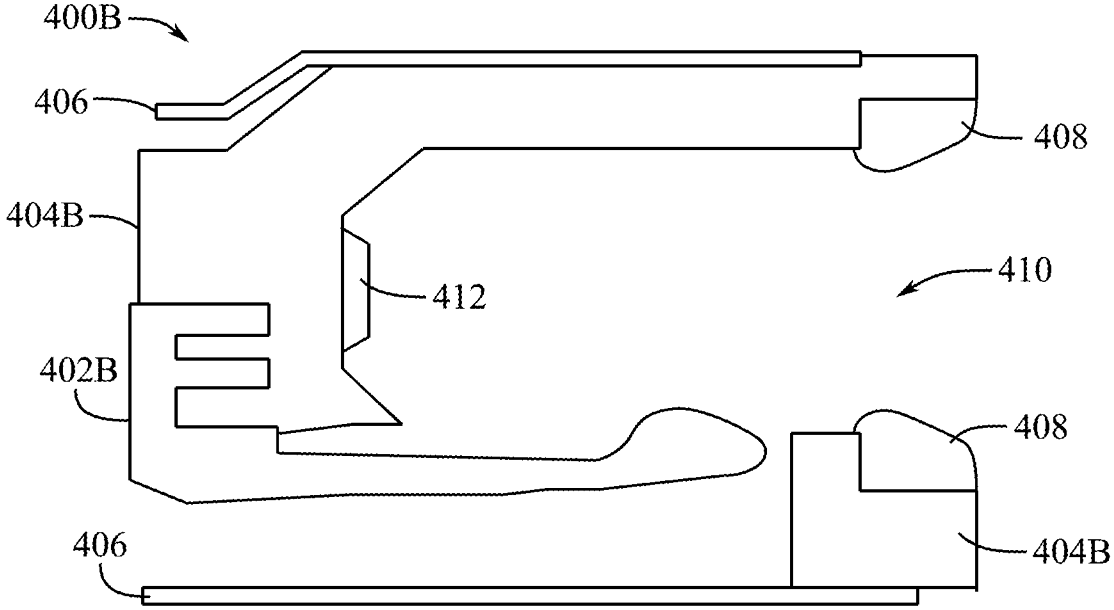
FIG. 6B shows a side sectional view of a receptacle connector.

FIGS. 6A and 6B illustrate side sectional views of receptacle connectors. In FIG. 6A, a receptacle connector 400A includes an electrical contact 402A vertically stitched to a receptacle housing 404A. The electrical contact 402A can have a longitudinal axis extending in a horizontal direction, and the electrical contact 402A can be stitched to the receptacle housing 404A in a vertical direction. The electrical contact 402A can be stitched to the receptacle housing 404A in a direction perpendicular to an insertion direction of a plug connector. The electrical contact 402A is configured to contact the plug connector when the plug connector is inserted into a recess 410 of the receptacle housing 404A.

A cover member 406 can be provided around the receptacle housing 404A to provide support for and shielding of the receptacle housing 404A. A face seal 408 can be provided along an inner surface of the receptacle housing 404A adjacent the recess 410 into which a plug connector is to be inserted. A bumper 412 can be provided along an inner surface of the receptacle housing 404A adjacent the recess 410, at a back surface of the recess 410 relative to an opening of the recess 410 through which the plug connector is to be inserted. The bumper 412 provides a stop when the plug connector is inserted into the recess 410, and the bumper 412 and the face seal 408 can provide ejection forces to the plug connector when the plug connector is un-latched from the receptacle connector 400A. The bumper 412 and the face seal 408 are configured to be disposed between the plug connector and the receptacle housing 404A when the plug connector is inserted into the recess 410.

In FIG. 6B, a receptacle connector 400B includes an electrical contact 402B horizontally stitched to a receptacle housing 404B. The electrical contact 402B can have a longitudinal axis extending in a horizontal direction, and the electrical contact 402B can be stitched to the receptacle housing 404B in the horizontal direction. The electrical contact 402B can be stitched to the receptacle housing 404B in a direction parallel to an insertion direction of a plug connector. The electrical contact 402B is configured to contact the plug connector when the plug connector is inserted into a recess 410 of the receptacle housing 404B.

A cover member 406 can be provided around the receptacle housing 404B to provide support for and shielding of the receptacle housing 404B. A face seal 408 can be provided along an inner surface of the receptacle housing 404B adjacent the recess 410 into which a plug connector is to be inserted. A bumper 412 can be provided along an inner surface of the receptacle housing 404B adjacent the recess 410, at a back surface of the recess 410 relative to an opening of the recess 410 through which the plug connector is to be inserted. The bumper 412 provides a stop when the plug connector is inserted into the recess 410, and the bumper 412 and the face seal 408 can provide ejection forces to the plug connector when the plug connector is un-latched from the receptacle connector 400B. The bumper 412 and the face seal 408 are configured to be disposed between the plug connector and the receptacle housing 404B when the plug connector is inserted into the recess 410.

Figure 7A:
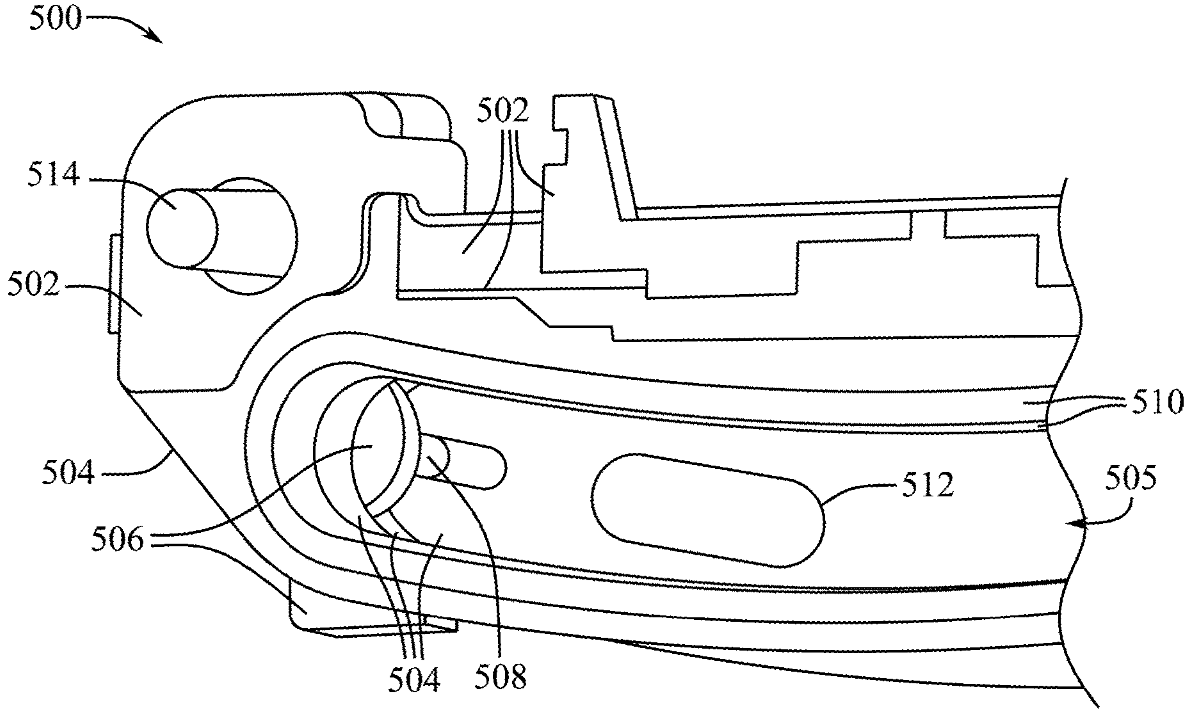
FIG. 7A shows a detail perspective view of a receptacle connector.
Figure 7B:
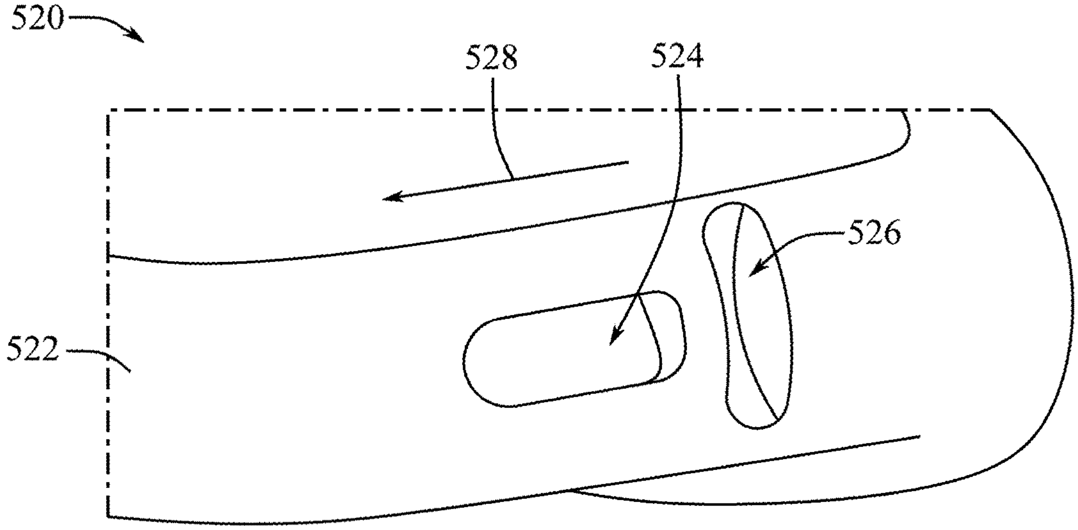
FIG. 7B shows a detail perspective view of a plug connector.

FIGS. 7A and 7B illustrate perspective views of a receptacle connector 500 and a plug connector 520, respectively. The receptacle connector 500 includes a receptacle housing 504 defining a recess 505 and a cover member 502 coupled to the receptacle housing 504. The recess 505 can be configured to receive the plug connector 520. The cover member 502 can be configured to provide support and shielding for the receptacle housing 504.

A face seal 510 can be coupled to the receptacle housing 504, such as adjacent to the recess 505. The face seal 510 can surround or encircle the recess 505 in the receptacle housing 504. The face seal 510 can provide sealing between the receptacle housing 504 and the plug connector 520 when the plug connector is received in the recess 505. A bumper 512 can be coupled to the receptacle housing 504. The bumper 512 can be coupled to a surface of the receptacle housing 504 at a back of the recess 505. The bumper 512 can be configured to be disposed between the receptacle housing 504 and the plug connector 520 when the plug connector 520 is inserted into the recess 505. The bumper 512 and/or the face seal 510 can be configured to provide an ejection force to the plug connector 520. For example, the bumper 512 and/or the face seal 510 can resist movement of the plug connector 520 as the plug connector 520 is inserted into the recess 505. After the plug connector 520 is latched in the recess 505, the bumper 512 and/or the face seal 510 can provide the ejection force to the plug connector 520 such that the plug connector 520 is ejected from the recess 505 when the plug connector is un-latched from the receptacle housing 504.

The receptacle housing 504 can further include a latch 506 rotatably or pivotally coupled to the receptacle housing 504. The latch 506 can correspond to a retention channel 526 formed in a body portion 522 of the plug connector 520. The latch 506 can be pivotable between an engaged configuration and an un-engaged configuration. When the latch 506 is in the engaged configuration, the latch 506 extends into the recess 505 of the receptacle housing 504, as illustrated in FIG. 7A. Although the latch 506 is illustrated as extending into a side portion of the recess 505, the latch 506 can be provided in a top portion, a bottom portion, or the like of the recess 505. When the latch 506 is in the un-engaged configuration, the latch 506 can be disposed outside of the recess 505, or less of the latch 506 can be disposed in the recess 505. The latch 506 can be biased in the engaged configuration by a spring or the like, and can be un-latched by a user, such as with a tool actuation.

The retention channel 526 can be disposed in a sidewall of the plug connector 520. The retention channel 526 can be etched, drilled, molded, co-molded, or otherwise formed with the plug connector 520 as a singular and unitary structure. As illustrated in FIG. 7B, the retention channel 526 can be disposed in the body portion 522 at an angle perpendicular to an insertion direction 528 in which the plug connector 520 is to be inserted into the recess 505 of the receptacle connector 500, which can aid in the retention of the plug connector 520 by the latch 506. The latch 506 can be received within the retention channel 526 of the plug connector 520 to retain the plug connector 520 within the recess 505 of the receptacle connector 500, when the latch 506 is in the engaged configuration. The latch 506 can then be transitioned into the un-engaged configuration to release the plug connector 520 from the recess 505 of the receptacle connector 500.

The receptacle housing 504 can further include a guide rail 508, which can correspond to a guide channel 524 formed in a body portion 522 of the plug connector 520. The guide rail 508 can be disposed on a sidewall of the receptacle housing 504 and can extend into the recess 505. The guide rail 508 can be molded, co-molded, or otherwise formed with the receptacle housing 504 as a singular and unitary structure. The guide channel 524 can be disposed in a sidewall of the plug connector 520. The guide channel 524 can be etched, drilled, molded, co-molded, or otherwise formed with the plug connector 520 as a singular and unitary structure. As illustrated in FIG. 7B, the guide channel 524 can be disposed in the body portion 522 at an angle parallel to an insertion direction 528 in which the plug connector 520 is to be inserted into the recess 505 of the receptacle connector 500. The guide rail 508 can be received within the guide channel 524 of the plug connector 520 to provide a rigid connection between a support including the plug connector 520 and a display portion including the receptacle connector 500. In other words, the guide rail 508 and the guide channel 524 can limit motion or free play between the support and the display portion. Additionally, or alternatively, the guide rail 508 can limit or prevent the plug connector 520 from being inserted into the receptacle connector 500 in an undesirable orientation and/or configuration.

As illustrated in FIG. 7A, a fastener 514 can extend through holes formed in the receptacle housing 504 and the cover member 502. The fastener 514 can be used to attach the receptacle connector to an enclosure or housing of the display portion.

Figure 8A:
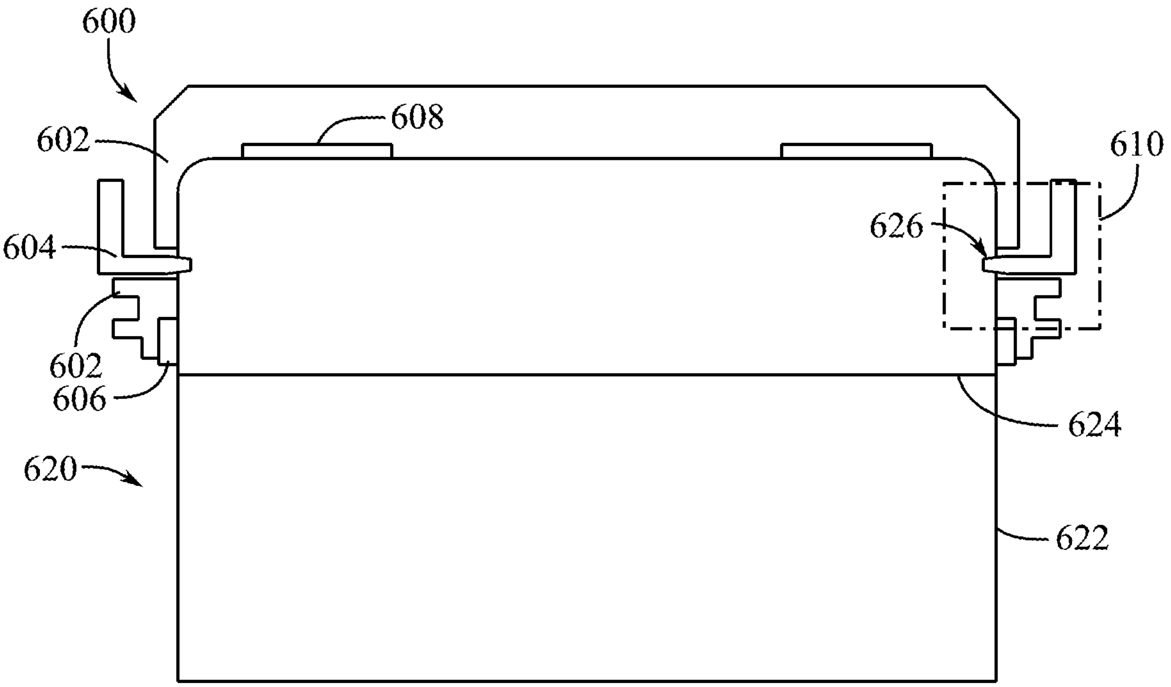
FIG. 8A shows a sectional view of a plug connector inserted into a receptacle connector.
Figure 8B:
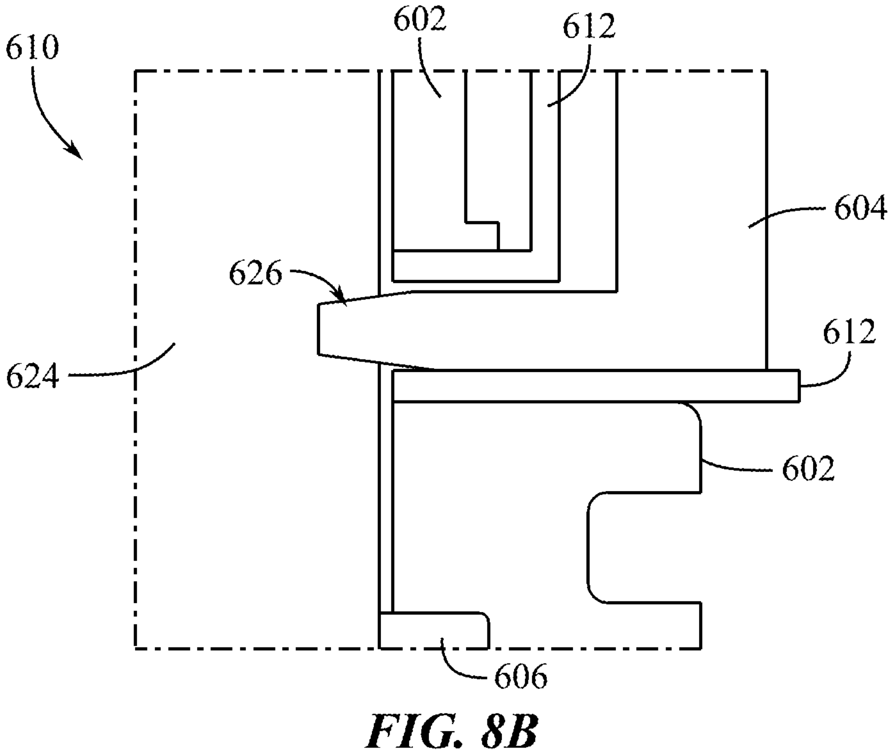
FIG. 8B shows a detail sectional view of the plug connector inserted into the receptacle connector of FIG. 8A.

FIG. 8A illustrates a sectional view of a support 620 including a plug connector 624 retained in a receptacle connector 600. FIG. 8B illustrates a detailed view of a region 610 of FIG. 8A. The receptacle connector 600 can include a receptacle housing 602, latches 604 extending through the receptacle housing 602 and configured to retain the plug connector 622, a face seal 606 coupled to the receptacle housing 602, and bumper seals 608 coupled to the receptacle housing 602. The support 620 can include the plug connector 624, an enclosure 622, and retention channels 626 formed in the plug connector 624.

The latches 604 can be configured to retain the plug connector 624 in a recess of the receptacle connector 600. As illustrated in FIG. 8B, the latches 604 can extend through a cover member 612 or the like, which can be coupled to the receptacle housing 602. The latches 604 can have trapezoidal shapes, and the retention channels 626 in the plug connector 624 can have corresponding trapezoidal shapes. In some examples, the latches 604 and the retention channels can have rounded shapes, U-shapes, V-shapes, triangular shapes, or any other suitable shapes. The latches 604 can have widths less than widths of the retention channels 626, which can provide for deeper engagement of the latches 604 in the retention channels 626. In some examples, the latches 604 can have widths equal to or greater than widths of the retention channels 626, such that only portions of the latches 604 extend into the retention channels 626. This can result in shallower engagement between the latches 604 and the retention channels 626 but can also provide a tighter connection between the latches 604 and the retention channels 626 and can reduce wiggle or other movement between the plug connector 624 and the receptacle connector 600.

The face seal 606 can be coupled to the receptacle housing 602 adjacent the recess configured to accept the plug connector 624. The face seal 606 can provide sealing between the plug connector 624 and the receptacle housing 602. The bumpers 608 can be provided on a surface of the receptacle housing 602 at a back of the recess, such that the bumpers 608 are between the plug connector 624 and the receptacle housing 602 when the plug connector 624 is disposed in the recess. The face seal 606 and the bumpers 608 can each be configured to provide an ejection force to the plug connector 624. For example, when the latches 604 are in an un-engaged configuration, the face seal 606 and/or the bumpers 608 can eject the plug connector 624 from the recess in the receptacle housing 602, or aid in the ejection of the plug connector 624 from the recess in the receptacle housing 602.

Figure 9A:
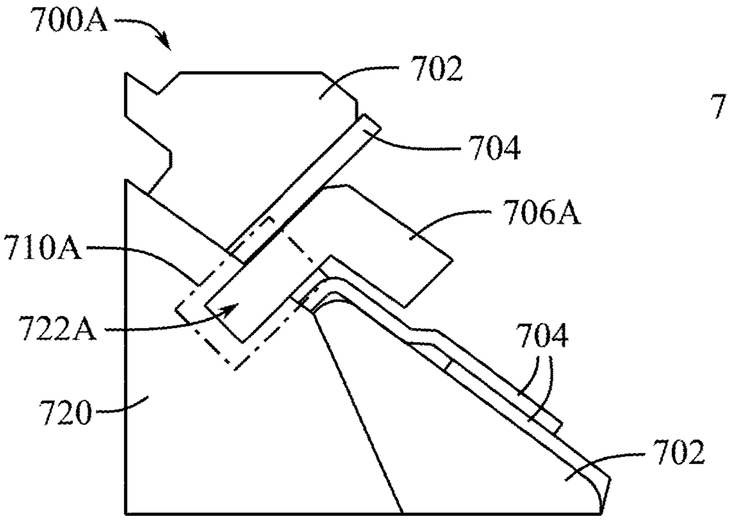
FIG. 9A shows a detail sectional view of a plug connector inserted into a receptacle connector.
Figure 9B:
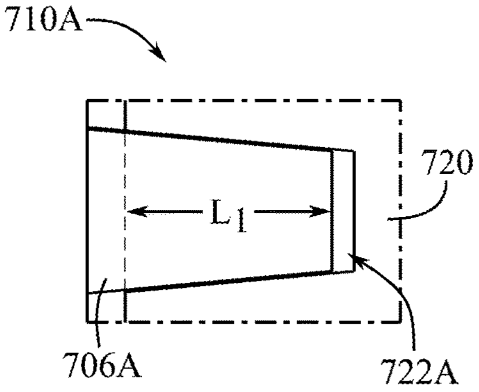
FIG. 9B shows a detail sectional view of the plug connector inserted into the receptacle connector of FIG. 9A.
Figure 9C:
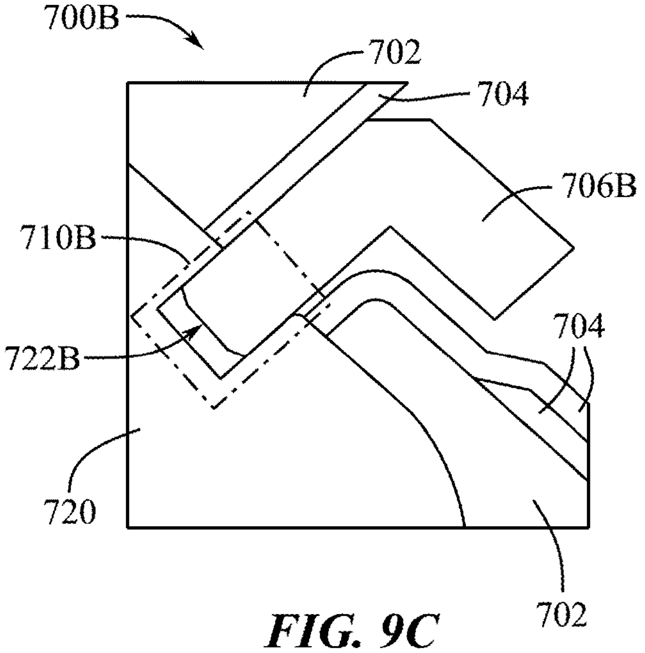
FIG. 9C shows a detail sectional view of a plug connector inserted into a receptacle connector.
Figure 9D:
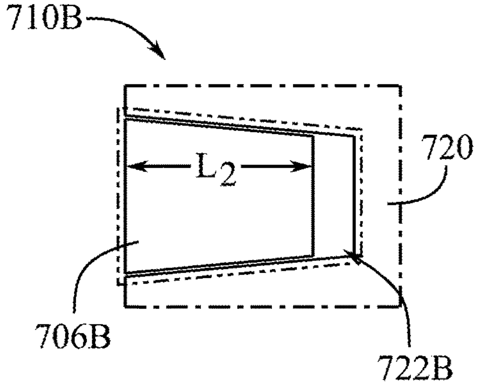
FIG. 9D shows a detail sectional view of the plug connector inserted into the receptacle connector of FIG. 9C.
Figure 9E:
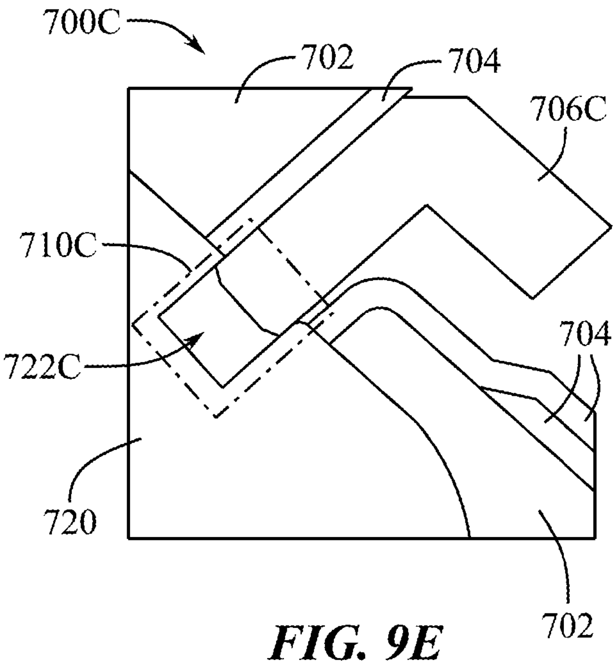
FIG. 9E shows a detail sectional view of a plug connector inserted into a receptacle connector.
Figure 9F:
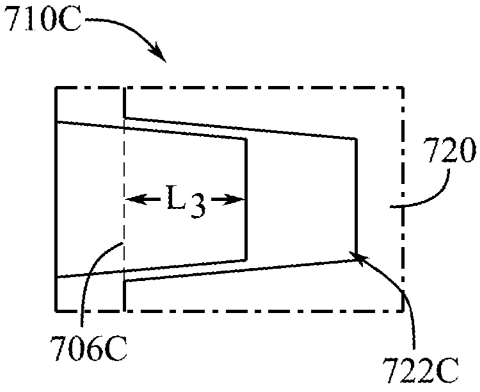
FIG. 9F shows a detail sectional view of the plug connector inserted into the receptacle connector of FIG. 9E.

FIGS. 9A through 9F illustrate various configurations of latches and retention channels that can be included in receptacle connectors and plug connectors. FIGS. 9A, 9C, and 9E illustrate sectional views, and FIGS. 9B, 9D, and 9F illustrate detail views of regions 710A, 710B, and 710C of FIGS. 9A, 9C, and 9E, respectively.

In FIGS. 9A and 9B, a latch 706A of a receptacle connector 700A extends through a receptacle housing 702 and a cover member 704 adjacent a face seal 702. The latch 706A extends into a retention channel 722A formed in a plug connector 720. The retention channel 722A and the latch 706A can have corresponding trapezoidal cross-sectional shapes; however, any suitable corresponding shapes can be used. The latch 706A extends into the retention channel 722A a distance $L_1$, which can be in a range from about 0 mm to about 10 mm, from about 1 mm to about 2 mm, from about 2 mm to about 5 mm, from about 0 mm to about 2 mm, or the like. In some examples, side surfaces of the latch 706A and the retention channel 722A can taper at an angle in a range from about 0° to about 10°. In the example of FIGS. 9A and 9B, tolerances between the latch 706A and the retention channel 722A can be relatively large, which results in the latch 706A extending further into the retention channel 722A. For example, a ratio of a width of the retention channel 722A to a width of the latch 706A can be in a range from about 0.8 to about 1.2, from about 1.0 to about 1.2, from about 0.5 to about 2.0, from about 1.0 to about 1.5, or the like.

In FIGS. 9C and 9D, a latch 706B of a receptacle connector 700B extends through a receptacle housing 702 and a cover member 704 adjacent a face seal 702. The latch 706B extends into a retention channel 722B formed in a plug connector 720. The retention channel 722B and the latch 706B can have corresponding trapezoidal cross-sectional shapes; however, any suitable corresponding shapes can be used. The latch 706B extends into the retention channel 722B a distance $L_2$, which can be in a range from about 0 mm to about 10 mm, from about 1 mm to about 2 mm, from about 2 mm to about 5 mm, from about 0 mm to about 2 mm, or the like. In some examples, side surfaces of the latch 706B and the retention channel 722B can taper at an angle in a range from about 0° to about 10°. In the example of FIGS. 9C and 9D, tolerances between the latch 706B and the retention channel 722B can be intermediate, which results in the latch 706B extending less far into the retention channel 722B than in the example of FIGS. 9A and 9B. For example, a ratio of a width of the retention channel 722B to a width of the latch 706B can be in a range from about 0.8 to about 1.2, from about 1.0 to about 1.2, from about 0.5 to about 2.0, from about 1.0 to about 1.5, or the like.

In FIGS. 9E and 9F, a latch 706C of a receptacle connector 700C extends through a receptacle housing 702 and a cover member 704 adjacent a face seal 702. The latch 706C extends into a retention channel 722C formed in a plug connector 720. The retention channel 722C and the latch 706C can have corresponding trapezoidal cross-sectional shapes; however, any suitable corresponding shapes can be used. The latch 706C extends into the retention channel 722C a distance $L_3$, which can be in a range from about 0 mm to about 10 mm, from about 1 mm to about 2 mm, from about 2 mm to about 5 mm, from about 0 mm to about 2 mm, or the like. In some examples, side surfaces of the latch 706C and the retention channel 722C can taper at an angle in a range from about 0° to about 10°. In the example of FIGS. 9E and 9F, tolerances between the latch 706C and the retention channel 722C can be tight, which results in the latch 706C extending less far into the retention channel 722C than in the examples of FIGS. 9A through 9D. For example, a ratio of a width of the retention channel 722C to a width of the latch 706C can be in a range from about 0.8 to about 1.2, from about 1.0 to about 1.2, from about 0.5 to about 2.0, from about 1.0 to about 1.5, or the like.

Examples with larger tolerances between the latch and the retention channel can result in the latch extending deeper into the retention channel, but can result in wiggle or other movement between the latch and the retention channel, and between the plug connector and the receptacle connector. On the other hand, examples with tighter tolerances can result in the latch extending a shallow distance into the retention channel, but can result in less wiggle or other movement between the latch and the retention channel, and between the plug connector and the receptacle connector. Forming the latch and the retention channel with too tight of tolerances, or with the latch having too great a width relative to a width of the retention channel can result in the latch not being capable of engaging with the retention channel.

Figure 10:
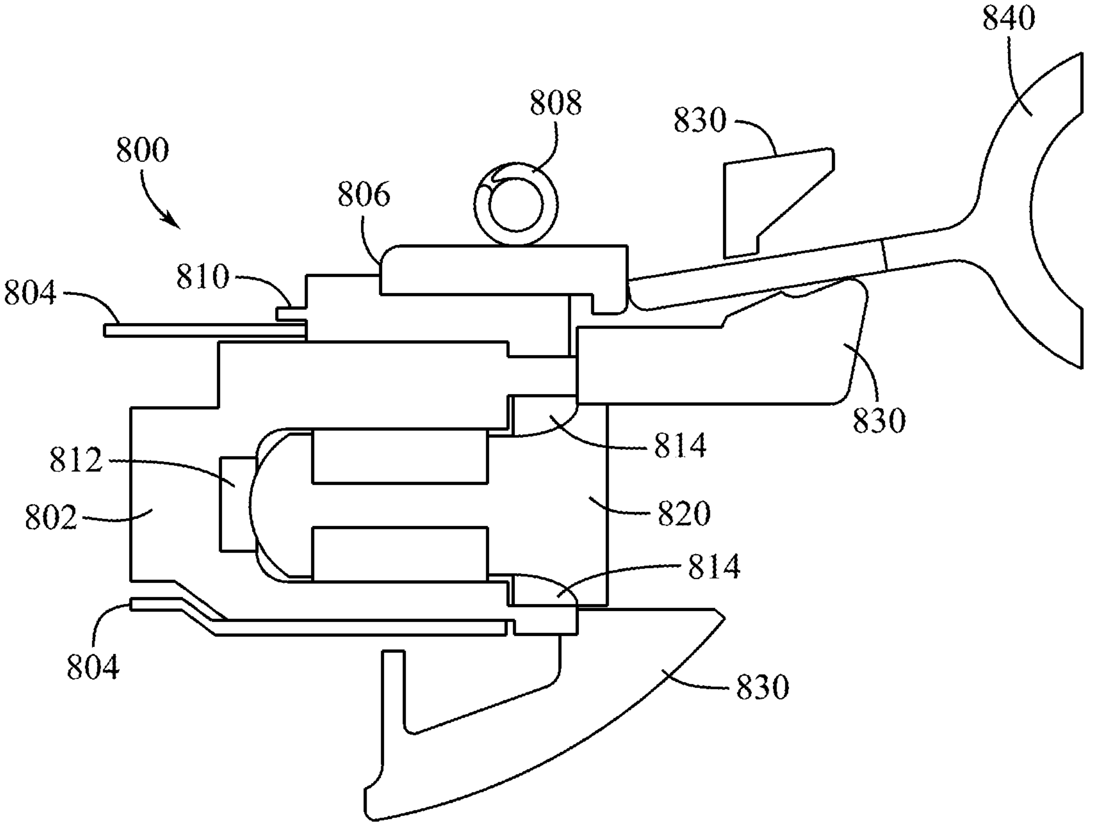
FIG. 10 shows a sectional view of a tool ejecting a plug connector from a receptacle connector.

FIG. 10 illustrates actuation of a push block 806 of a receptacle connector 800 with a tool 840, which can be used to release a plug connector 820 from the receptacle connector 800. The receptacle connector 800 can include a receptacle housing 802 and a cover member 804 coupled to the receptacle housing 802. A fastening mechanism of the receptacle connector 800 can include the push block 806, a spring 808, and a guide rail 810. Although not separately illustrated in FIG. 10, the push block 806 can be coupled to latches that interact with retention channels of the plug connector 820 to retain the plug connector 820 within the receptacle connector 800. The spring 808 retains the push block 806 in an initial position in which the latches are in an engaged configuration. The spring 808 also resists a force supplied to the push block 806 by the tool 840. When the push block 806 is pushed by the force of the tool 840, the push block 806 slides or translates along the guide rail 810. As the push block 806 moves along the guide rail 810, the push block 806 pivots the latches from the engaged configuration to an un-engaged configuration in which the plug connector 820 can be removed from the receptacle connector 800. Once the force is no longer supplied by the tool 840, the spring 808 returns the push block 806 to the initial position and the latches pivot from the un-engaged configuration back to the engaged configuration.

The receptacle connector 800 further includes a face seal 814 and bumpers 812. The face seal 814 and the bumpers 812 can be disposed between the plug connector 820 and the receptacle housing 802 in a direction parallel to an insertion/extraction direction of the plug connector 820. This helps the face seal 814 and/or the bumpers 812 to provide an ejection force to the plug connector 820. For example, when the latches are in the un-engaged configuration, the face seal 814 and/or the bumpers 812 can provide the ejection force to the plug connector 820 to push the plug connector 820 out of the receptacle connector 800. This allows a user to remove the plug connector 820 by actuating the push block 806 with the tool 840, without having to apply a separate force to the plug connector 820. In some examples, the ejection force of the face seal 814 and the bumpers 812 can be relatively small, and a pull force on the plug connector 820 can be used in addition to the ejection force to eject the plug connector 820 from the receptacle connector 800. In some examples, the bumpers 812 and the face seal 814 do not provide the ejection force. For example, the bumpers 812 can be provided to ensure proper alignment of electrical contacts of the plug connector 820 with electrical contacts of the receptacle connector 800. The face seal 814 can provide sealing between the plug connector 820 and the receptacle connector 800.

The receptacle connector 800 can be mounted to an enclosure 830 (also referred to as a housing) of a display. In some examples, the receptacle connector 800 can be mounted to the enclosure 830 using fasteners; however, any suitable mounting means can be used. The enclosure 830 can include an opening through which the plug connector 820 can be inserted into a recess of the receptacle connector 800. The enclosure 830 can further include an opening through which the tool 840 is inserted to interact with the push block 806.

Figure 11A:
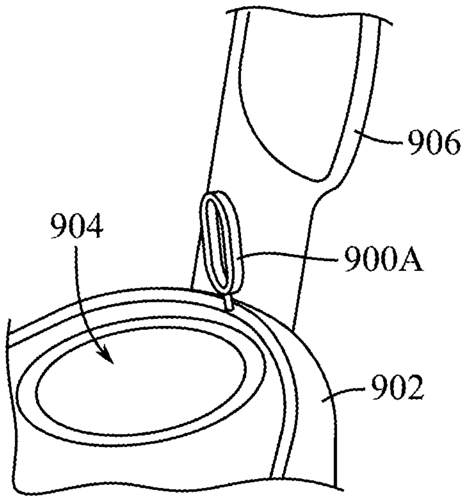
FIGS. 11A through 11D show perspective views of tools for ejecting plug connectors from receptacle connectors.

FIGS. 11A through 11D illustrate various configurations of tools that can be used to release a plug connector from a receptacle connector. In FIGS. 11A through 11D, a display 904 is provided in an enclosure 902 (also referred to as a housing), and a support 906 is coupled to the enclosure 902. The support 906 can include a plug connector, which can be retained in a receptacle connector provided in the enclosure 902. In FIG. 11A, a tool 900A can include a stadium-shaped handle with a stadium-shaped cutout therein, and a cylindrical-shaped protrusion. The cylinder-shaped protrusion of the tool 900A can be inserted into a hole in the enclosure 902 and can actuate a push block or the like to release the plug connector of the support 906 from the receptacle connector of the enclosure 902.

Figure 11B:
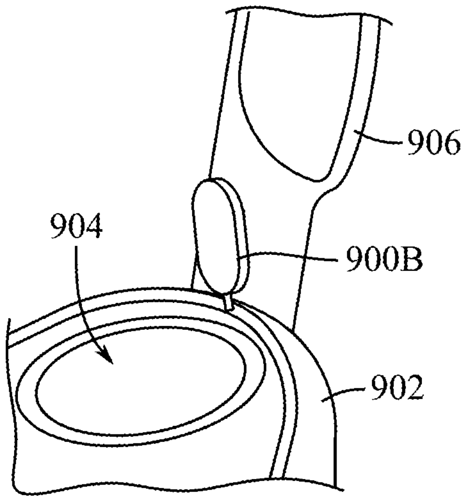

In FIG. 11B, a tool 900B can include a stadium-shaped handle and a cylindrical-shaped protrusion. The cylinder-shaped protrusion of the tool 900B can be inserted into a hole in the enclosure 902 and can actuate a push block or the like to release the plug connector of the support 906 from the receptacle connector of the enclosure 902.

Figure 11C:
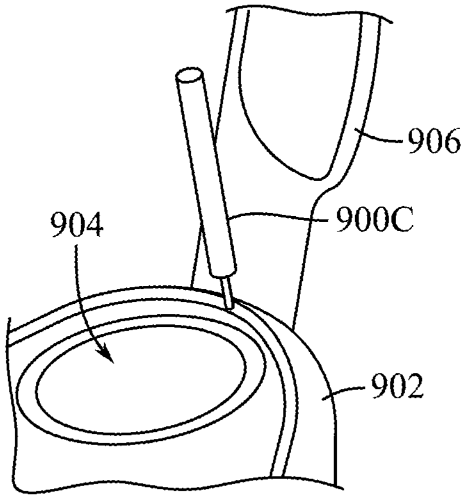

In FIG. 11C, a tool 900C can include a cylinder-shaped handle and a cylindrical-shaped protrusion. The cylinder-shaped protrusion of the tool 900C can be inserted into a hole in the enclosure 902 and can actuate a push block or the like to release the plug connector of the support 906 from the receptacle connector of the enclosure 902.

Figure 11D:
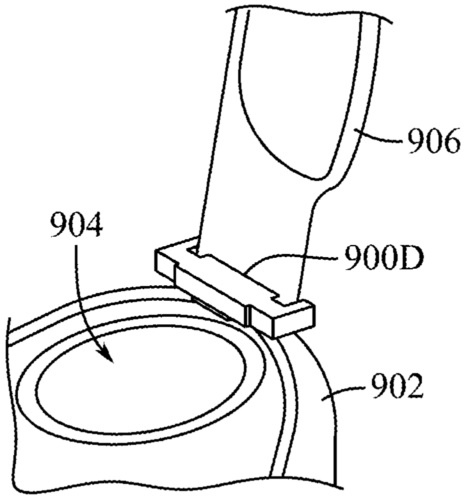

In FIG. 11D, a tool 900D can include a handle that interfaces with the support 906 and a cylindrical-shaped protrusion. The handle of the tool 900D can be slidably attached to the support 906 and can be used to align the cylinder-shaped protrusion with a hole in the enclosure. The cylinder-shaped protrusion of the tool 900D can be inserted into the hole in the enclosure 902 and can actuate a push block or the like to release the plug connector of the support 906 from the receptacle connector of the enclosure 902.

Figure 12A:
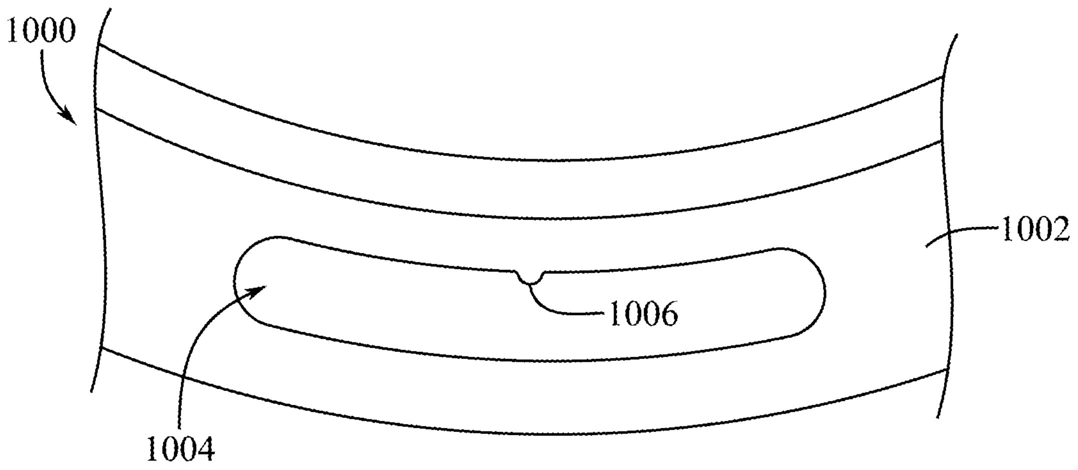
FIG. 12A shows a front view of a receptacle connector.
Figure 12B:
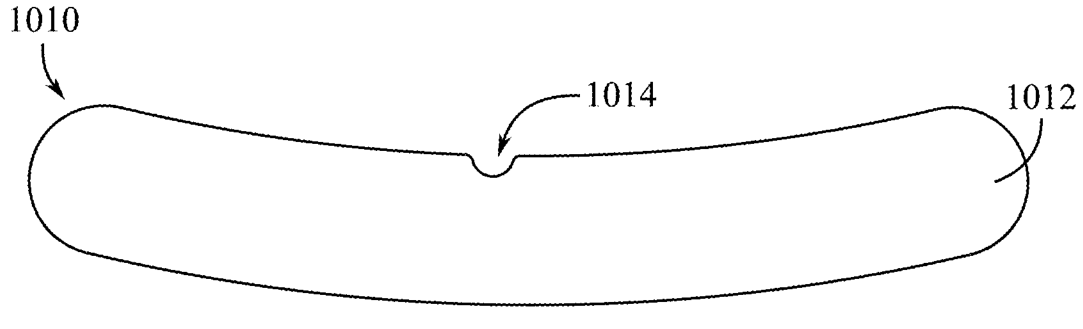
FIG. 12B shows a front view of a plug connector.

FIGS. 12A and 12B illustrate a configuration of a guide rail 1006 of a receptacle connector 1000 and a guide channel 1014 of a plug connector 1010. The receptacle connector 1000 can include a receptacle housing 1002 having a recess 1004 formed therein. The recess 1004 can be configured to receive and retain the plug connector 1010. The guide rail 1006 can be formed in the receptacle housing 1002 and can extend into a portion of the recess 1004. The plug connector 1012 can include a main body portion 1012 having the guide channel 1014 formed therein. As illustrated in FIGS. 12A and 12B, the guide rail 1006 and the guide channel 1014 can be formed in longitudinally central portions of the receptacle housing 1002 and the main body 1012 of the plug connector 1010, respectively. The guide rail 1006 and the guide channel 1014 can be disposed on corresponding portions of the receptacle housing 1002 and the main body 1012 and can have shapes corresponding to one another. The guide rail 1006 can be received within the guide channel 1014 of the plug connector 1010 to provide a rigid connection between a support including the plug connector 1010 and a display portion including the receptacle connector 1000. In other words, the guide rail 1006 and the guide channel 1014 can limit motion or free play between the support and the display portion. Additionally, or alternatively, the guide rail 1006 can limit or prevent the plug connector 1010 from being inserted into the receptacle connector 1000 in an undesirable orientation and/or configuration.

Figure 13A:
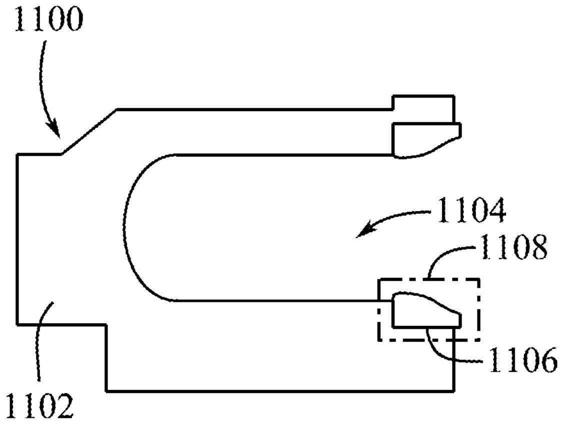
FIG. 13A shows a sectional view of a receptacle connector.
Figure 13B:
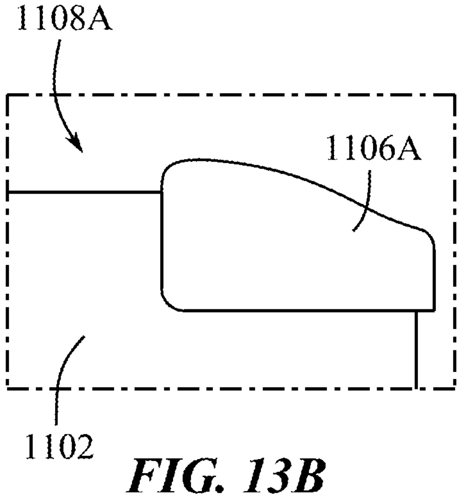
FIGS. 13B through 13D show detail sectional views of seals of the receptacle connector of FIG. 13A.
Figure 13C:
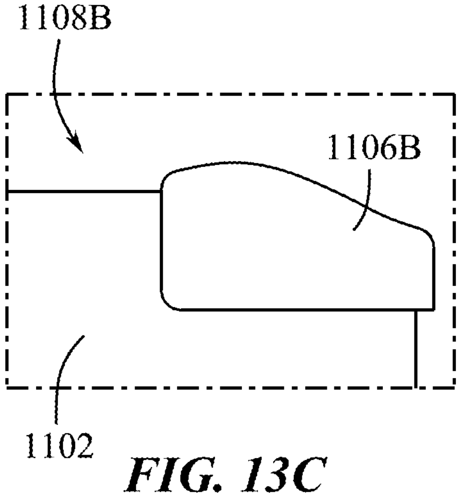
Figure 13D:
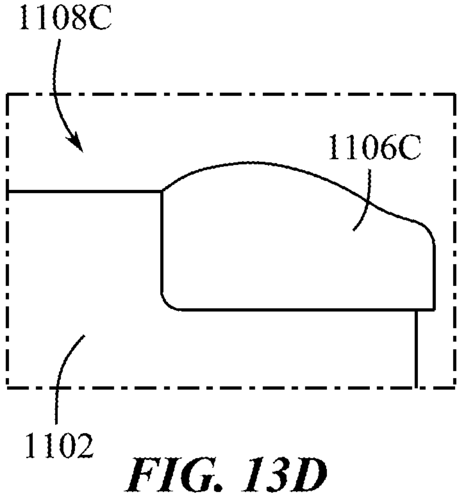
Figure 13E:
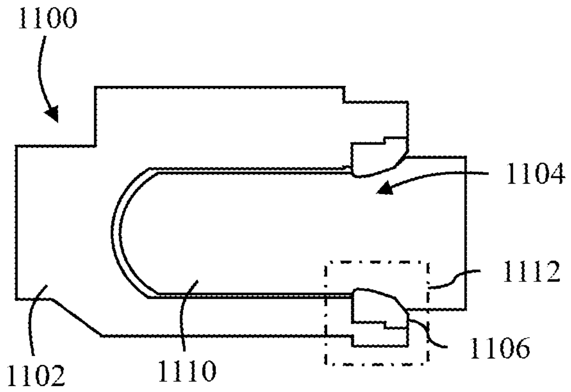
FIG. 13E shows a sectional view of a receptacle connector.
Figure 13F:
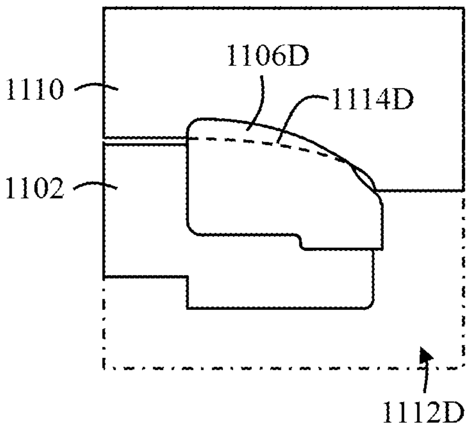
FIGS. 13F and 13G show detail sectional views of seals of the receptacle connector of FIG. 13E.
Figure 13G:
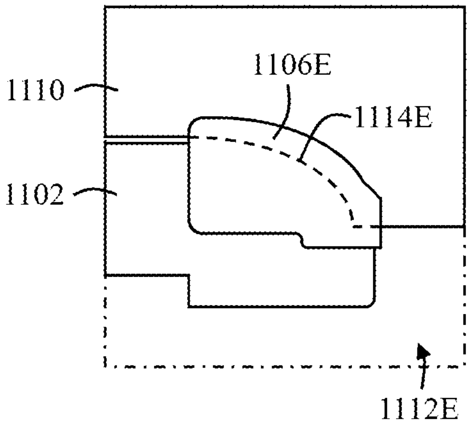
Figure 13H:
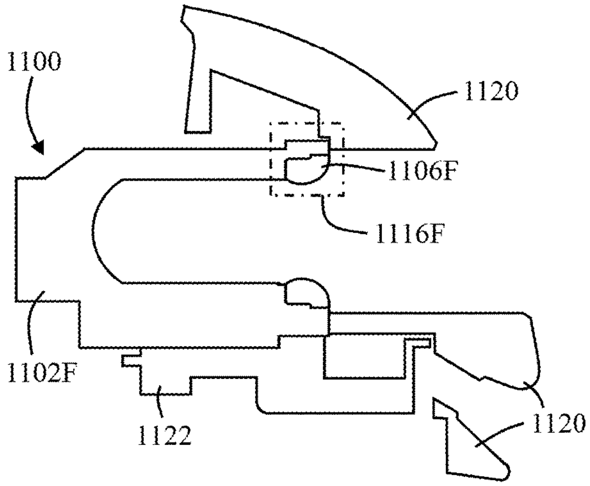
FIG. 13H shows a sectional view of a receptacle connector.
Figure 13I:
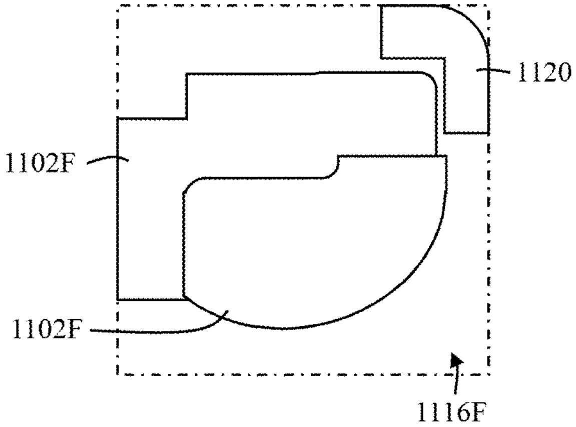
FIG. 13I shows a detail sectional view of a seal of the receptacle connector of FIG. 13H.
Figure 13J:
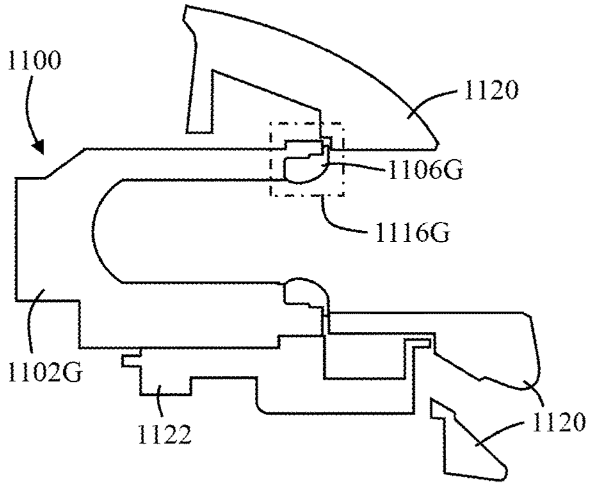
FIG. 13J shows a sectional view of a receptacle connector.
Figure 13K:
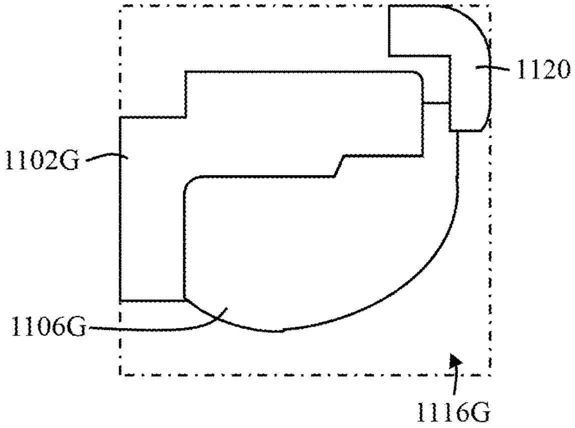
FIG. 13K shows a detail sectional view of a seal of the receptacle connector of FIG. 13J.
Figure 13L:
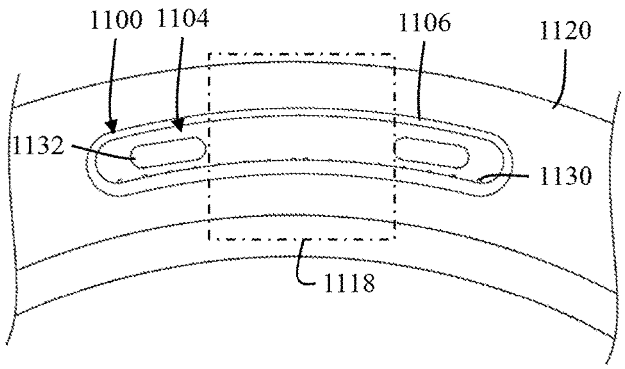
FIG. 13L shows a front view of a receptacle connector.
Figure 13M:
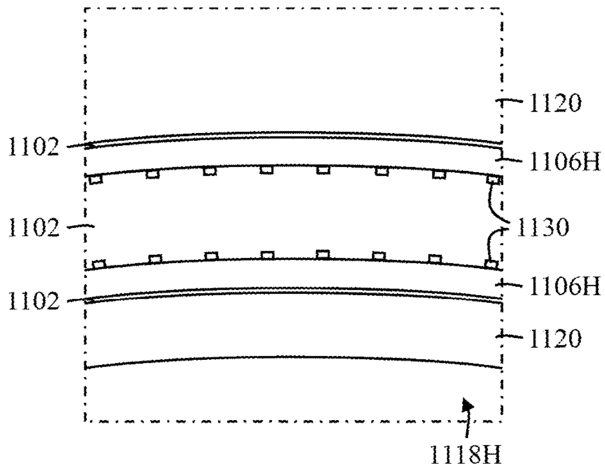
FIGS. 13M and 13N show detail front views of seals of the receptacle connector of FIG. 13L.
Figure 13N:
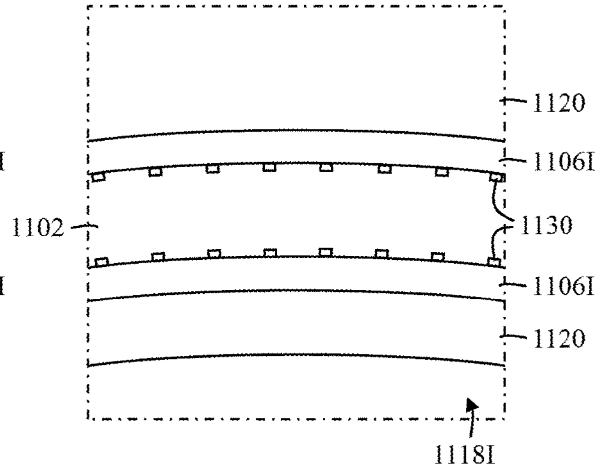

FIGS. 13A through 13N illustrate various configurations of face seals that can be included in a receptacle connector 1100. FIGS. 13A, 13E, 13H, and 13J illustrate sectional views of the receptacle connector 1100. FIGS. 13B through 13D illustrate detail views of region 1108 illustrated in FIG. 13A. FIGS. 13F and 13G illustrate detail views of region 1112 illustrated in FIG. 13E. FIG. 13I illustrates a detail view of region 1116F illustrated in FIG. 13H. FIG. 13K illustrates a detail view of region 1116G illustrated in FIG. 13J. FIGS. 13M and 13N illustrate detail views of region 1118 illustrated in FIG. 13L.

As illustrated in FIG. 13A, the receptacle connector 1100 can include a receptacle housing 1102, which defines a recess 1104. A plug connector can be received in the recess 1104. A face seal 1106 can be coupled to the receptacle housing 1102 adjacent the recess 1104 and can be used to provide sealing between the receptacle housing 1102 and the plug connector. The face seal 1106 can further provide an ejection force to the plug connector to assist in the removal of the plug connector from the recess 1104 of the receptacle connector 1100.

In FIG. 13B, a face seal 1106A coupled to the receptacle housing 1102 in a region 1108A extends from the receptacle housing 1102 at an angle perpendicular to an insertion/extraction direction of the plug connector with respect to the recess 1104. The face seal 1106A is then ramped down and extends distally past the receptacle housing 1102.

In FIG. 13C, a face seal 1106B coupled to the receptacle housing 1102 in a region 1108B extends from the receptacle housing 1102 at an angle perpendicular to an insertion/extraction direction of the plug connector with respect to the recess 1104. The face seal 1106B is then ramped down and extends distally past the receptacle housing 1102. The face seal 1106B can extend a smaller distance from the receptacle housing 1102 relative to the face seal 1106A and can be ramped from a proximal edge to a distal edge to a lesser degree relative to the face seal 1106A. This provides less resistance to insertion and extraction of the plug connector, while still providing good sealing between the plug connector and the receptacle housing 1102.

In FIG. 13D, a face seal 1106C coupled to the receptacle housing 1102 in a region 1108C extends from flush with the receptacle housing 1102, ramps out from the receptacle housing 1102, and then ramps back towards the receptacle housing 1102. The face seal 1106C extends distally past the receptacle housing 1102. The face seal 1106C can extend a smaller distance from the receptacle housing 1102 relative to the face seals 1106A and 1106B and can be ramped to lesser degrees relative to the face seals 1106A and 1106B. This provides less resistance to insertion and extraction of the plug connector, while still providing good sealing between the plug connector and the receptacle housing 1102.

As illustrated in FIG. 13E, a plug connector 1110 can be received in the recess 1104 of the receptacle connector 1100 such that the face seal 1106 interfaces with the plug connector 1110. The face seal 1106 can provide sealing between the receptacle housing 1102 of the receptacle connector 1100 and the plug connector 1110. FIGS. 13F and 13G illustrate different profiles of face seals 1106 (e.g., face seal 1106D and face seal 1106E) that can provide varying levels of interference between the face seals 1106 and the plug connector 1110, and can provide varying levels of sealing between the plug connector 1110 and the receptacle connector 1100.

In FIG. 13F, a face seal 1106D coupled to the receptacle housing 1102 in a region 1112D extends from the receptacle housing 1102 at an angle perpendicular to an insertion/extraction direction of the plug connector 1110 with respect to the recess 1104. The face seal 1106D is then ramped down, has a scalloped portion, and extends distally past the receptacle housing 1102. The scalloped portion of the face seal 1106D can have a mismatch to a profile of the plug connector 1110, which results in interference 1114D between the face seal 1106D and the plug connector 1110 extending only partially along the length of the face seal 1106D. This provides less resistance to insertion and extraction of the plug connector 1110, while still providing good sealing between the plug connector 1110 and the receptacle housing 1102.

In FIG. 13G, a face seal 1106E coupled to the receptacle housing 1102 in a region 1112E extends from the receptacle housing 1102 at an angle perpendicular to an insertion/extraction direction of the plug connector 1110 with respect to the recess 1104. The face seal 1106E is then ramped down, has a scalloped portion, and extends distally past the receptacle housing 1102. The face seal 1106E can have a relatively less scalloped portion, or no scalloped portion, as compared to the face seal 1106D. The face seal 1106E can have a profile matching the plug connector 1110 (e.g., matching a curved or scalloped portion of the plug connector 1110), which results in interference 1114E between the face seal 1106E and the plug connector 1110 extending along the length of the face seal 1106E. This provides greater resistance to insertion and extraction of the plug connector 1110, while providing improved sealing between the plug connector 1110 and the receptacle housing 1102.

FIGS. 13H through 13K illustrate different interfaces between the receptacle housing 1102 of the receptacle connector 1100 and an enclosure 1120 (also referred to as a housing) of a display. In some examples, the receptacle connector 1100 can be mounted to the enclosure 1120 using fasteners. However, any suitable mounting systems or methods can be used. The enclosure 1120 can include a push block 1122 that is movable relative to the enclosure 1120, and can be used to eject the plug connector from the recess 1104 of the receptacle connector 1100. In the example illustrated in FIGS. 13H and 13I, a receptacle housing 1102F datums to or directly contacts the enclosure 1120. In the example illustrated in FIGS. 13J and 13K, a face seal 1106G coupled to a receptacle housing 1102G datums to or directly contacts the enclosure 1120.

In FIGS. 13H and 13I, a face seal 1106F is coupled to the receptacle housing 1102F in a region 1116F. The face seal 1106F extends from the receptacle housing 1102F at an angle perpendicular to an insertion/extraction direction of the plug connector with respect to the receptacle connector 1100. The face seal 1106F is ramped up, then ramped down, and extends distally past the receptacle housing 1102F. The face seal 1106F can be proud of the receptacle housing 1102F by about 0.05 mm, 0.1 mm, 0.025 mm, in a range from about 0.01 to about 0.1 mm, or the like. The receptacle housing 1102F datums to or directly contacts the enclosure 1120, and the face seal 1106F can be separated from the enclosure 1120. The receptacle housing 1102F can encircle the face seal 1106F in certain views, such as a front view of the enclosure 1120.

In FIGS. 13J and 13K, the face seal 1106G is coupled to the receptacle housing 1102G in a region 1116G. The face seal 1106G extends from the receptacle housing 1102G at an angle perpendicular to an insertion/extraction direction of the plug connector with respect to the receptacle connector 1100. The face seal 1106G is ramped up, then ramped down, and extends distally past the receptacle housing 1102G. The face seal 1106G extends a distance along a distal end of the receptacle housing 1102G such that the face seal 1106G datums to or directly contacts the enclosure 1120. The face seal 1106G can datum to or directly contact the enclosure 1120 between the enclosure 1120 and the receptacle housing 1102G. The face seal 1106G can be proud of the receptacle housing 1102G by about 0.15 mm, 0.1 mm, 0.25 mm, in a range from about 0.05 to about 0.5 mm, or the like. The face seal 1106G can encircle the receptacle housing 1102G in certain views, such as a front view of the enclosure 1120. Providing the face seal 1106G between the receptacle housing 1102G and the enclosure 1120 can improve sealing between the receptacle connector 1100 and the enclosure 1120.

FIGS. 13L through 13N illustrate front views of the different interfaces between the receptacle housing 1102 of the receptacle connector 1100 and the enclosure 1120, which may be the same as or similar to the examples illustrated in FIGS. 13H through 13K. Specifically, FIGS. 13L and 13N illustrate an example in which a face seal 1106I encircles the receptacle housing 1102 and is provided between the receptacle housing 1102 and the enclosure 1120. This example can be the same as or similar to the example of FIGS. 13J and 13K. FIG. 13M illustrates an example in which a receptacle housing 1102 encircles a face seal 1106H and the receptacle housing 1102 datums to or directly contacts the enclosure 1120. This example can be the same as or similar to the example of FIGS. 13H and 13I.

As illustrated in FIGS. 13L through 13N, the receptacle housing 1102 can include electrical contacts 1130 and bumpers 1132. The bumpers 1132 can provide an ejection force to a plug connector inserted into the recess 1104 of the receptacle connector 1100. The electrical contacts 1130 can provide electrical signals, electrical power, a grounding path, another electrical communication, or a combination thereof between the receptacle connector 1100 and the plug connector.

The face seal 1106H of FIG. 13M allows for the receptacle housing 1102 to be visible in the recess 1104 and around the face seal 1106H. In other words, the receptacle housing 1102 encircles the face seal 1106H and the face seal 1106H encircles the receptacle housing 1102 disposed in the recess 1104. The recess 1104 in this example can have a relatively larger opening width and lead-in radius. The face seal 1106I of FIG. 13N covers the outer portions of the receptacle housing 1102 such that the receptacle housing 1102 is visible in the recess 1104. The face seal 1106I encircles the receptacle housing 1102 disposed in the recess 1104. The recess 1104 in this example can have a relatively smaller opening width and tighter lead-in radius. The face seal 1106I can be extended by about 0.25 mm, about 0.1 mm, about 0.5 mm, in a range from about 0.05 mm to about 0.5 mm, or the like all the way around the recess 1104 relative to the face seal 1106H. The face seal 1106I can provide improved sealing between the receptacle housing 1102 and the enclosure 1120 relative to the face seal 1106H.

Figure 14A:
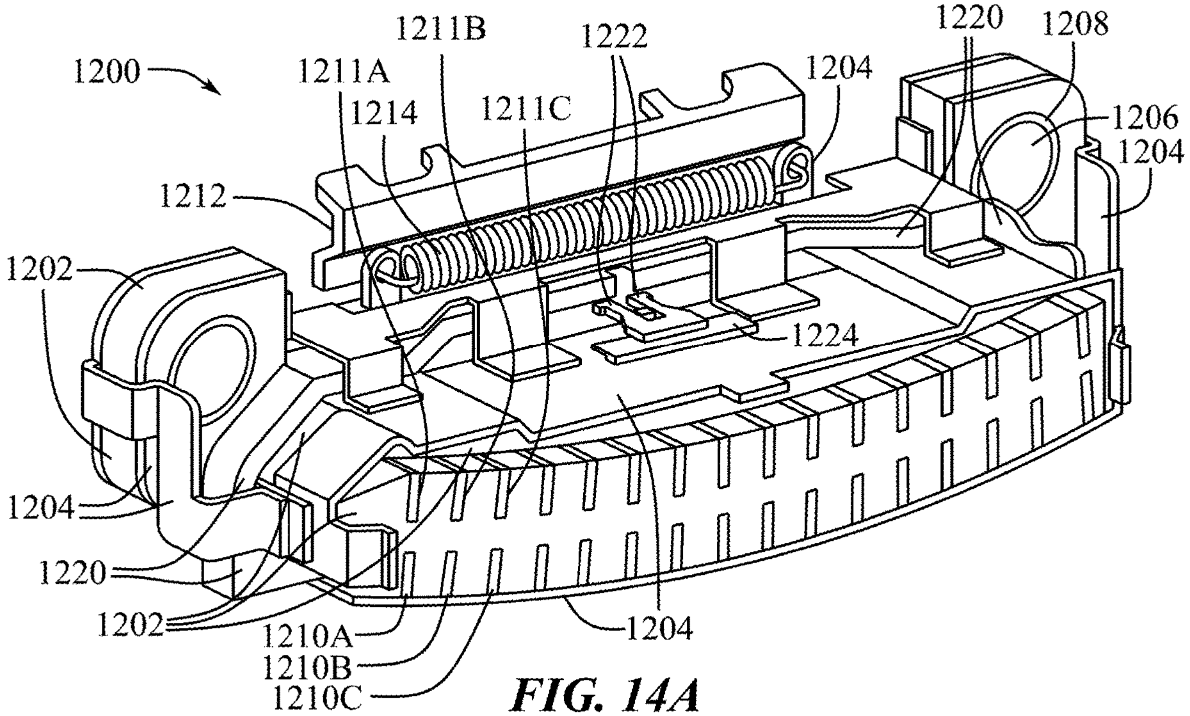
FIG. 14A shows a perspective view of a receptacle connector.
Figure 14B:
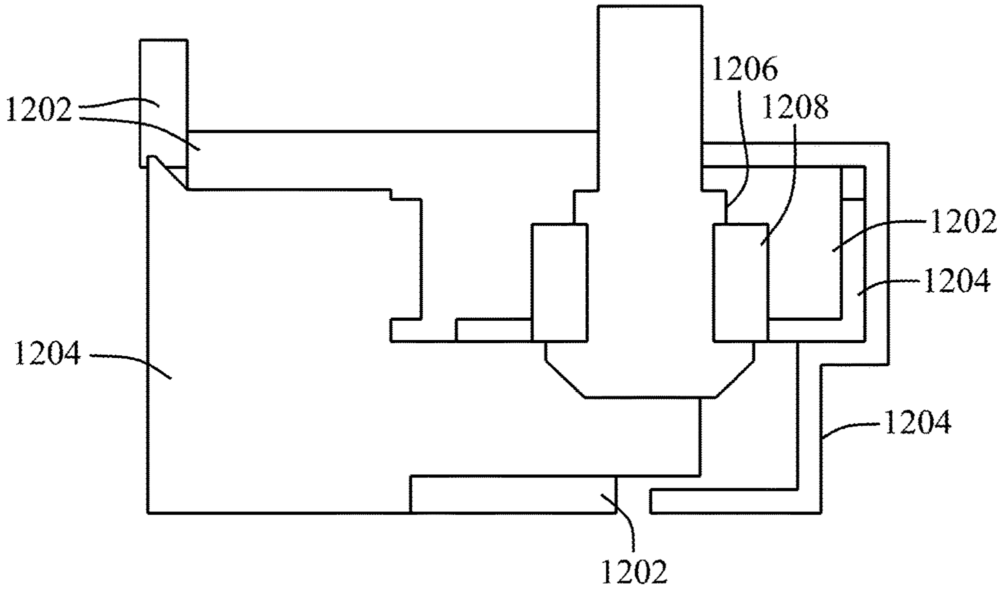
FIG. 14B shows a detail sectional view of a fastener of the receptacle connector of FIG. 14A.

FIGS. 14A and 14B illustrate a perspective view and a sectional view of a receptacle connector 1200. FIGS. 14A and 14B illustrate gaskets 1208 that can be provided with fasteners 1206 to fasten a receptacle housing 1202 of the receptacle connector 1200 to an enclosure or housing of a display portion or the like. The receptacle housing 1202 can include a cover member 1204 coupled thereto, which provides structural support and shielding for the receptacle housing 1202. Holes can be provided in the receptacle housing 1202 and the cover member 1204, and the gaskets 1208 and the fasteners 1206 can be provided in the holes extending through the receptacle housing 1202 and the cover member 1204. The fasteners 1206 can be used to fasten the receptacle housing 1202 and the cover member 1204 to the enclosure of the display portion. The gaskets 1208 can be provided between the fasteners 1206 and the cover member 1204/receptacle housing 1202 to provide give or flexibility between the receptacle connector 1200 and the enclosure. The gaskets 1208 can be formed of a relatively soft material, such as a rubber, a polymer, an elastomer, or the like. Providing the gaskets 1208 allows the receptacle connector 1200 and a plug connector inserted into the receptacle connector 1200 to move together, and to move relative to the enclosure. Large forces can be transferred between the plug connector and the receptacle connector 1200 and providing the gaskets 1208 limits any negative impacts of these forces from being transferred between the receptacle connector 1200 and the enclosure.

A plurality of electrical contacts 1210A, 1210B, 1210C, 1211A, 1211B, and 1211B can be coupled to the receptacle housing 1202. As illustrated in FIG. 14A, the electrical contacts can be coupled to the receptacle housing 1202 along a radius of curvature, with each electrical contact being provided at an oblique angle relative to other electrical contacts, such as adjacent electrical contacts. This allows for surfaces of the electrical contacts that are to be in contact with a plug connector inserted into the receptacle connector to be disposed at angles normal to surfaces of the plug connector that the electrical contacts are to contact. This provides for improved electrical contact between the electrical contacts of the receptacle connector 1200 and electrical contacts of the plug connector.

A fastening mechanism can be provided on the receptacle connector 1200. The fastening mechanism can include a primary push block 1212, a spring 1214, latches 1220, a secondary push block 1222, and a guide rail 1224. The fastening mechanism can be provided to transition the latches 1220 between an engaged configuration and an un-engaged configuration, which can be used to retain and release the plug connector in the receptacle connector 1200. The spring 1214 can be coupled to the cover member 1204 and/or the receptacle housing 1202. The primary push block 1212 can be pivotally coupled to the spring 1214 and the cover member 1204 and/or the receptacle housing 1202. The primary push block 1212 can be configured to interact with a tool in order to transition the latches 1220 between the engaged configuration and the un-engaged configuration. The spring 1214 retains the primary push block 1212 in an initial position in which the latches 1220 are in the engaged configuration. The spring 1214 also resists a force supplied to the primary push block 1212 by the tool.

The secondary push block 1222 transfers movement between the primary push block 1212 and the latches 1220. The secondary push block 1222 can be configured to translate along the guide rail 1224, such that the secondary push block 1222 moves back and forth in a single direction. Using the tool to actuate the primary push block 1212 moves the secondary push block 1222 along the guide rail 1224, and the secondary push block 1222 pivots the latches 1220 from the engaged configuration to the un-engaged configuration. After force from the tool is removed from the primary push block 1212, the secondary push block 1222 returns to its initial position and the latches 1220 return to the engaged configuration. Thus, the fastening mechanism is used to retain and release a plug connector with respect to the receptacle connector 1200.

Figure 15:
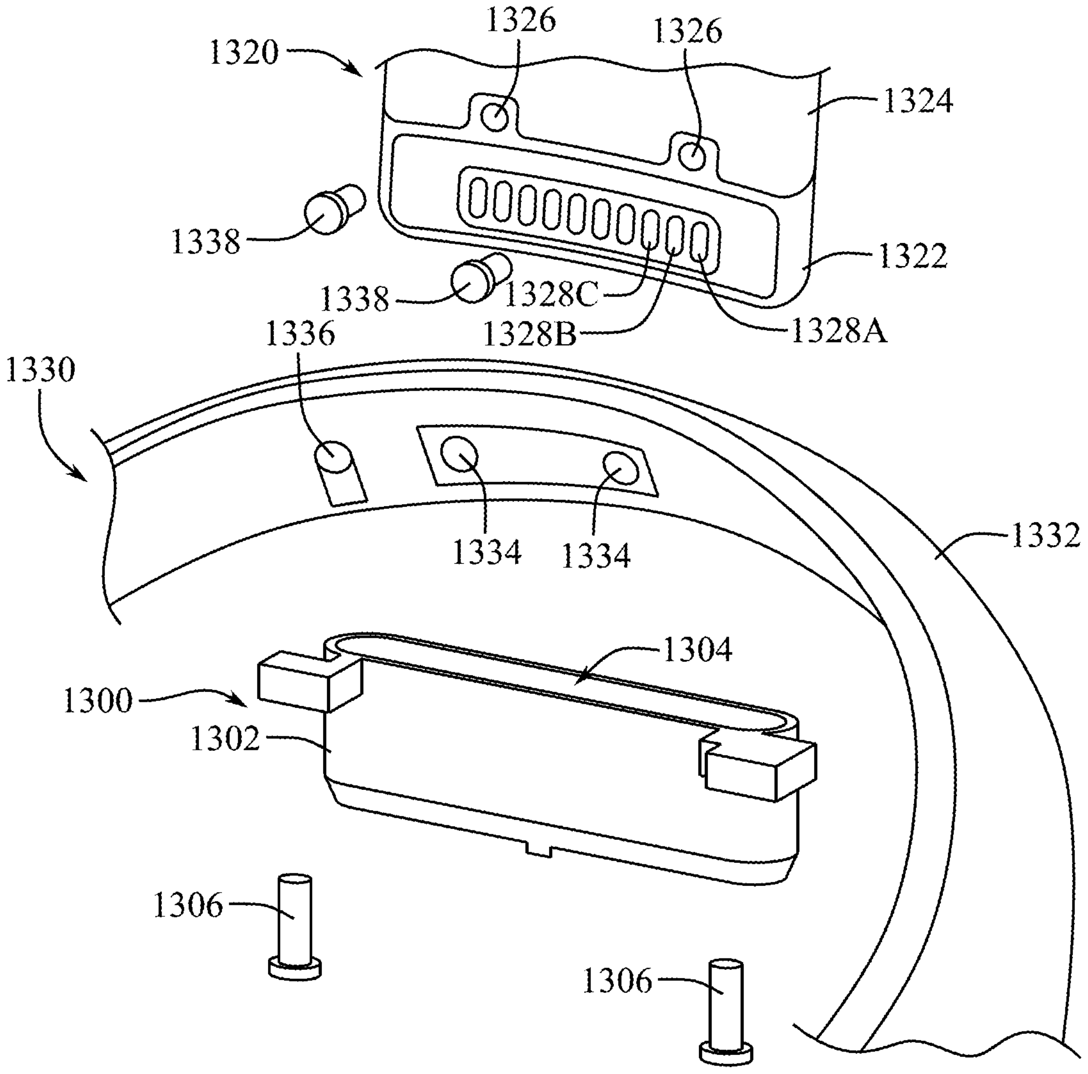
FIG. 15 shows a perspective view of a receptacle connector, a plug connector, and a housing.

FIG. 15 illustrates an example in which a support 1320 is fastened to a receptacle connector 1300 and/or an enclosure 1330 using fasteners 1338. The fastening mechanism of FIG. 15 can be used in addition to or alternative to the fastening mechanisms of FIGS. 3A through 14B. The receptacle connector 1300 can include a receptacle housing 1302 having a recess 1304 formed therein. The recess 1304 can be configured to receive and retain the support 1320. Fasteners 1306 can extend through holes in the receptacle housing 1302 and can be used to fasten the receptacle connector 1300 to the enclosure 1330.

The enclosure 1330 (also referred to as a housing) can be an enclosure of a display portion or the like. The enclosure 1330 can include a housing body 1332, openings 1334, and openings 1336. The openings 1336 can be configured to receive the fasteners 1306 and can be used to mount the receptacle connector 1300 to the enclosure 1330. As will be discussed in greater detail below, the support 1320 can be fastened to the enclosure 1330 through the openings 1334.

The support 1320 includes a plug connector 1322 and an enclosure 1324. Openings 1326 can be included in the plug connector 1322 and/or the enclosure 1324. The plug connector 1322 can include electrical contacts 1328A, 1328B, and 1328C. Fasteners 1338 can be provided and can extend through the openings 1326 in the support 1320 and into the openings 1334 in the enclosure 1330. In some examples, the openings 1334 can be provided on the receptacle connector 1300 rather than the enclosure 1330. Fastening the support 1320 to the enclosure 1330 and/or the receptacle connector 1300 prevents unwanted disconnects of the support 1320 from the receptacle connector 1300 and/or the enclosure 1330. The fasteners 1338 can be contained within the enclosure 1330, unseen to a user, and thus accidental removal by a user can be avoided. Fastening the support 1320 directly to the enclosure 1330 with the fasteners 1338 further ensures the support 1320 does not move relative to the chassis 1330.

FIGS. 16A through 25B illustrate various examples of receptacle connectors and plug connectors that can be used as the receptacle connectors 124 of the supports 120 and the plug connectors 142 of the cable assembly 140 illustrated in FIGS. 1A and 1B.

Figure 16A:
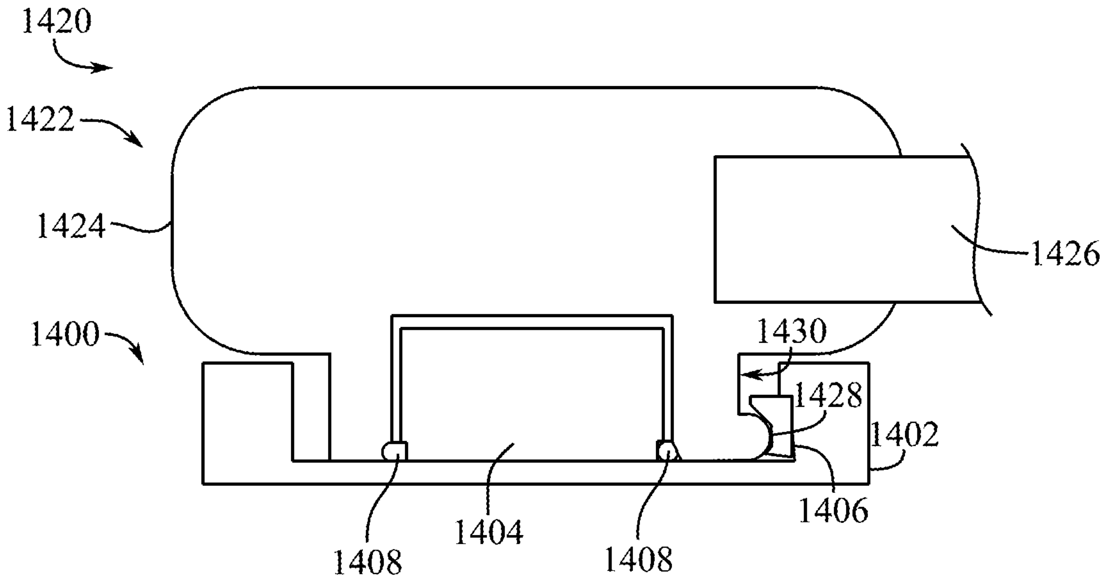
FIG. 16A shows a side sectional view of a receptacle connector and a plug connector.
Figure 16B:
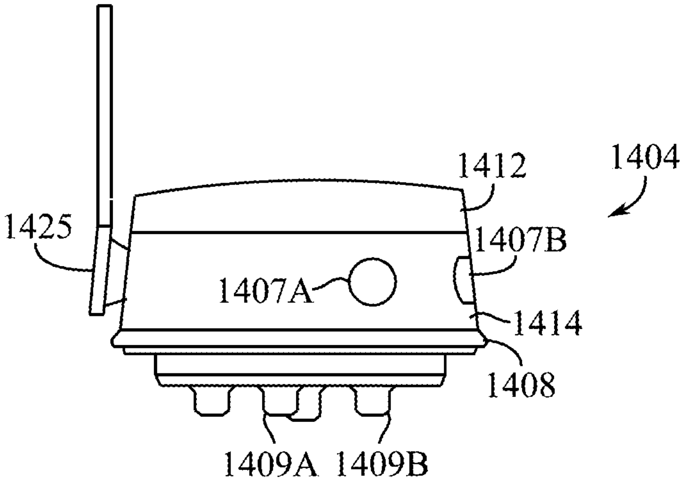
FIG. 16B shows a side view of the plug connector of FIG. 16A.

FIG. 16A illustrates a side section view of a receptacle connector 1400 and a cable assembly 1420 including a plug connector 1422 inserted into and retained by the receptacle connector 1400. FIG. 16B illustrates an electrical contact of the plug connector 1422 and a raised portion of the receptacle connector 1400. The cable assembly 1420 includes a shielded cable 1426 coupled to the plug connector 1422. The plug connector 1422 can include a boot 1424 and a central member 1430. In some examples, the boot 1424 can have a circular or semi-circular cross-sectional shape. The plug connector 1422 can be centered or substantially centered about a central axis of the circular cross-sectional shape of the boot 1424. The boot 1424 can form a cavity or volume and at least a portion of the central member 1430 and/or a portion of the shielded cable 1426 can be disposed within the volume.

The central member 1430 can extend from the boot 1424. In some examples, the central member 1430 can have a cylindrical shape that enables rotation of the central member 1430 within the receptacle connector 1400. The central member 1430 can form an external surface and an internal surface. In some examples, the central member 1430 can include one or more protrusions 1428 extending laterally from, or substantially perpendicular to, the external surface. In some examples, the central member 1430 can form a cavity or volume. For example, the internal surface can form a cavity or volume. One or more electrical contacts can be disposed on the internal surface, such as an electrical contact 1425 illustrated in FIG. 16B. The one or more electrical contacts can extend into the volume of the central member 1430 from the internal surface. The one or more electrical contacts can define an electrical grounding path, provide electrical power, and/or provide one or more control signals to the receptacle connector 1400.

The shielded cable 1426 can be one or more wires (e.g., metallic wires capable of transferring electrical signals and/or electrical power). The one or more wires can be individually shielded or collectively shielded. The shielding can prevent each of the one or more wires from contacting one another. Additionally, or alternatively, the shielding can prevent or limit the influence of electromagnetic waves on each of the one or more wires.

The receptacle connector 1400 can be disposed on an enclosure of an electronic device (e.g., the supports 120 of the first electronic device 100). In some examples, the receptacle connector 1400 can be disposed on or within the enclosure, such that a trim ring 1402 of the receptacle connector 1400 is at least partially disposed within the enclosure. In some examples, the trim ring 1402 can be disposed on or within the enclosure such that the trim ring 1402 is flush with an exterior surface of the enclosure.

In some examples, the receptacle connector 1400 can include the trim ring 1402, a base, one or more detents 1406, and a raised portion 1404. The trim ring 1402 can be coupled to the base to form a recess and one or more undercut regions at a periphery of the recess. Each of the undercut regions can house or retain a respective detent 1406. When the central member 1430 of the cable assembly 1420 is disposed within the recess, the protrusion 1428 can extend into a channel defined by a respective detent 1406. In some examples, each of the detents 1406 can be biased toward the raised portion 1404 by a biasing element. In other words, each detent 1406 can radially translate within their respective undercut regions toward and away from the raised portion 1404.

In some examples, the raised portion 1404 can be disposed in the center of the recess, such that the recess forms a ring within the receptacle connector 1400. The raised portion 1404 can be a distinct component of the receptacle connector 1400. For example, the raised portion 1404 can be adhered, fastened, interlocked, welded, or otherwise coupled to the base. In some examples, one or more electrical contacts 1407A and 1407B can be disposed on the raised portion 1404 and can be used to provide connections between the raised portion 1404 and the plug connector 1422, such as the electrical contact 1425 of the plug connector 1422. Each of the one or more electrical contacts 1407A and 1407B can physically contact one or more electrical contacts of the plug connector 1422 (e.g., the electrical contact 1425) when the plug connector 1422 is coupled to the receptacle connector 1400. The raised portion 1404 can further include one or more electrical contacts 1409A and 1409B that provide connections between the raised portion 1404 and electronic components contained within the enclosure (e.g., processors, electrical wires, digital logic circuitry, digital processing circuitry, or the like).

In some examples, the raised portion 1404 can include a body 1414 and a cap 1412. In some examples, the body 1414 can be manufactured from a material that electrically insulates the one or more electrical contacts 1407A, 1407B, 1409A, and 1409B, such that each of the one or more electrical contacts are electrically isolated from one another. For example, each of the one or more electrical contacts can be at least partially disposed within a respective through-hole defined within the body 1414. The cap 1412 can be coupled to the body 1414.

The raised portion 1404 can include a seal 1408 extending around a periphery of the body 1414. As illustrate in FIG. 16B, the seal 1408 can encircle the body 1414 of the raised portion 1404. The seal 1408 can act as a seal which prevents or limits ingress of contaminants (e.g., liquid, dust, lint, debris, or the like) into the receptacle connector 1400 through the recess, such as when the plug connector 1422 is inserted into the recess of the receptacle connector 1400.

Figure 17A:
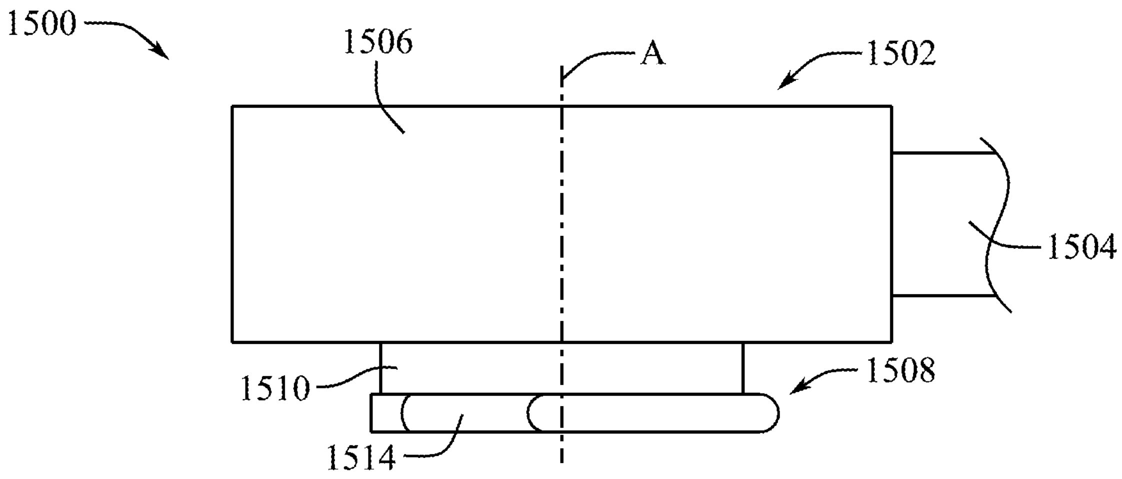
FIG. 17A shows a side view of a plug connector.
Figure 17B:
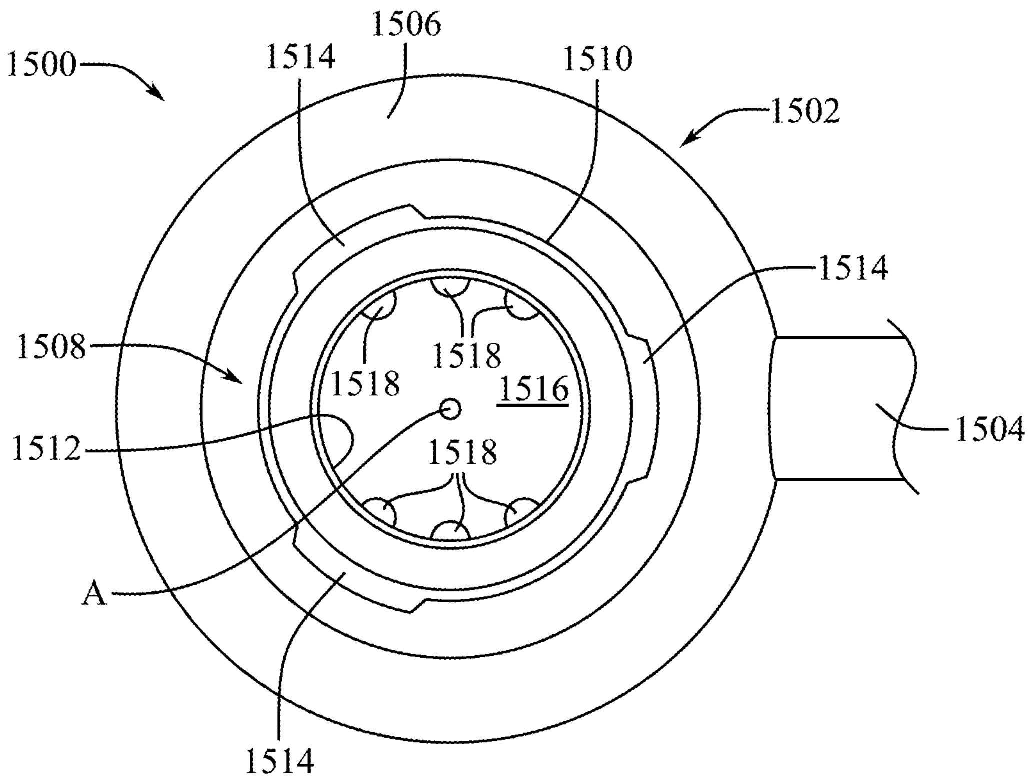
FIG. 17B shows a bottom-up view of the plug connector of FIG. 17A.

FIGS. 17A and 17B show respective side and bottom views of a cable assembly 1500 including a plug connector 1502 and a shielded cable 1504. The plug connector 1502 can include a boot 1506 and a central member 1508. In some examples, the boot 1506 can have a circular or semi-circular cross-sectional shape. The plug connector 1502 can be centered or substantially centered about a central axis of the circular cross-sectional shape of the boot 1506. For example, as shown in FIG. 17A, the central member 1508 can be centered about an axis A that extends through a center of the boot 1506. The boot 1506 can form a cavity or volume and at least a portion of the central member 1508 and/or a portion of the shielded cable 1504 can be disposed within the volume.

The central member 1508 can extend from the boot 1506. In some examples, the central member 1508 can have a cylindrical shape that enables rotation of the central member 1508 within a receptacle connector (e.g., the receptacle connector 1400 of FIG. 16A). The central member 1508 can form an external surface 1510 and an internal surface 1512. In some examples, the central member 1508 can include one or more protrusions 1514 extending laterally from, or substantially perpendicular to, the external surface 1510. In some examples, the central member 1508 can form a cavity or volume, for example, the internal surface 1512 can form a cavity or volume 1516. One or more electrical contacts 1518 can be disposed on the internal surface 1512, such that the one or more electrical contacts 1518 extend into the volume 1516 from the internal surface 1512. The one or more electrical contacts 1518 can define an electrical grounding path, provide electrical power, and/or provide one or more control signals to a receptacle connector.

The shielded cable 1504 can be one or more wires (e.g., metallic wires capable of transferring electrical signals and/or electrical power). The one or more wires can be individually shielded or collectively shielded. The shielding can prevent each of the one or more wires from contacting one another. Additionally, or alternatively, the shielding can prevent or limit the influence of electromagnetic waves on each of the one or more wires.

Figure 18A:
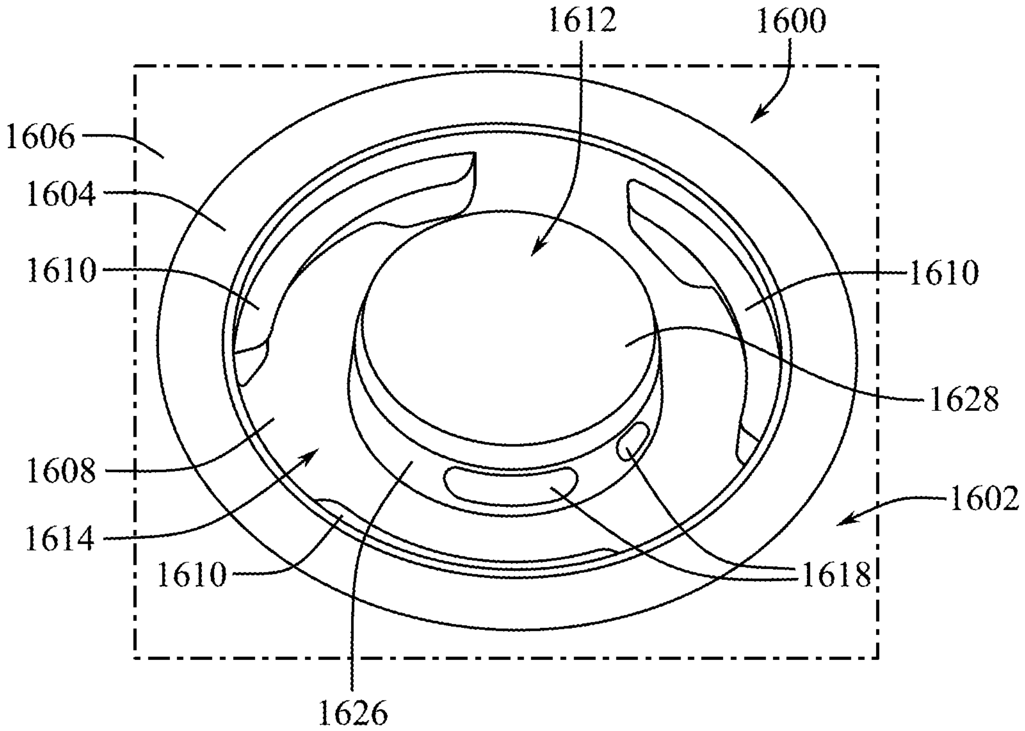
FIG. 18A shows a perspective view of a receptacle connector.
Figure 18B:
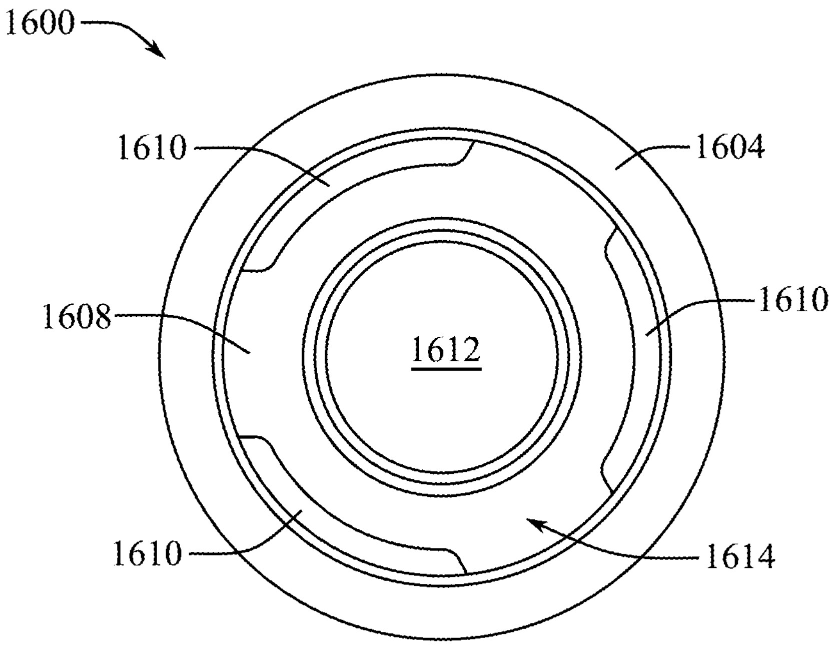
FIG. 18B shows a top-down view of the receptacle connector of FIG. 18A.

FIGS. 18A and 18B show a perspective view and a top view of a receptacle connector 1600 disposed on an enclosure 1602 of an electronic device (e.g., the supports 120 of the first electronic device 100 of FIGS. 1A and 1B). In some examples, the receptacle connector 1600 can be disposed on or within the enclosure 1602, such that a trim ring 1604 of the receptacle connector 1600 is at least partially disposed within the enclosure 1602. Alternatively, the trim ring 1604 can be disposed on or within the enclosure 1602 such that the trim ring 1604 is flush with an exterior surface 1606 of the enclosure 1602.

In some examples, the receptacle connector 1600 can include the trim ring 1604, a base 1608, one or more detents 1610, and a raised portion 1612. The trim ring 1604 can couple to the base 1608 to form a recess 1614 and one or more undercut regions at a periphery of the recess 1614. Each of the one or more undercut regions can house or retain a respective detent 1610. While a central member (e.g., the central member 1508 of FIGS. 17A and 17B) is disposed within the recess 1614, a protrusion (e.g., the protrusions 1514 of FIGS. 17A and 17B) can extend into a channel defined by each of the detents 1610. In some examples, each of the detents 1610 can be biased toward the raised portion 1612 by a biasing element. In other words, each detent 1610 can radially translate within their respective undercut regions toward and away from the raised portion 1612.

In some examples, the raised portion 1612 can be disposed in the center of the recess 1614, such that the recess 1614 forms a ring within the receptacle connector 1600. The raised portion 1612 can be a distinct component of the receptacle connector 1600. For example, the raised portion 1612 can be adhered, fastened, interlocked, welded, or otherwise coupled to the base 1608. In some examples, one or more electrical contacts 1618 can be disposed on the raised portion 1612. Each of the one or more electrical contacts 1618 can physically contact one or more electrical contacts of the plug connector (e.g., the electrical contacts 1518 of FIGS. 17A and 17B) when the plug connector is coupled to the receptacle connector 1600.

Figure 18C:
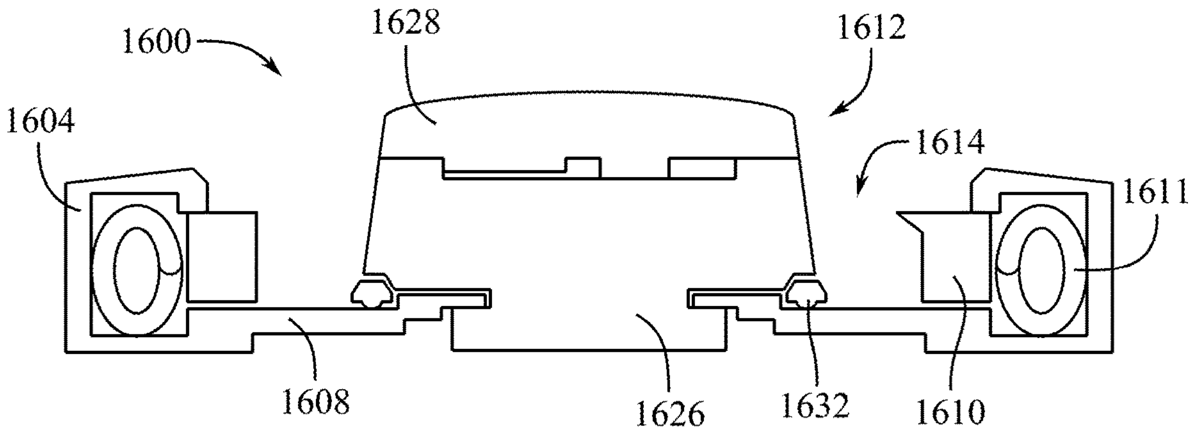
FIG. 18C shows a side sectional view of the receptacle connector of FIG. 18A.

FIG. 18C illustrates a sectional view of the receptacle connector of FIGS. 18A and 18B. As illustrated in FIG. 18C, biasing elements 1611 can be housed within the trim ring 1604 between the detents 1610 and the trim ring 1604. The biasing elements 1611 can be configured to bias the detents 1610 radially towards protrusions of the plug connector when the plug connector is inserted into and retained in the recess 1614 of the receptacle connector 1600. In other words, each of the detents 1610 can radially translate within their respective undercut regions toward and away from the raised portion 1612 to engage and disengage with respective protrusions of the plug connector. The biasing elements 1611 can provide forces to the detents 1610 to retain the detents 1610 in the radially extended position to engage the protrusions of the plug connector, and to resist the detents being disengages from the protrusions of the plug connector. The biasing elements 1611 are illustrated as a canted coil; however various biasing elements 1611 can be included, such as a coiled spring, an elastic foam, leaf springs, or the like.

The raised portion 1612 can include a body 1626 and a cap 1628. In some examples, the body 1626 can be manufactured from a material that electrically insulates one or more electrical contacts of the raised portion 1612, such that each of the one or more electrical contacts are electrically isolated from one another. For example, each of the one or more electrical contacts can be at least partially disposed within a respective through-hole defined within the body 1626. The cap 1628 can be coupled to the body 1626.

The raised portion 1612 can include a seal 1632 extending around a periphery of the body 1626. As illustrate in FIG. 18C, the seal 1632 can encircle the body 1626 of the raised portion 1612. The seal 1632 can act as a seal which prevents or limits ingress of contaminants (e.g., liquid, dust, lint, debris, or the like) into the receptacle connector 1600 through the recess 1614, such as when the plug connector is inserted into the recess 1614 of the receptacle connector 1600. In the example of FIG. 18C, the seal 1632 is disposed between the body 1626 of the raised portion 1612 and the base 1608. The seal 1632 can further prevent the ingress of contaminants between the raised portion 1612 and the base 1608.

Figure 18D:
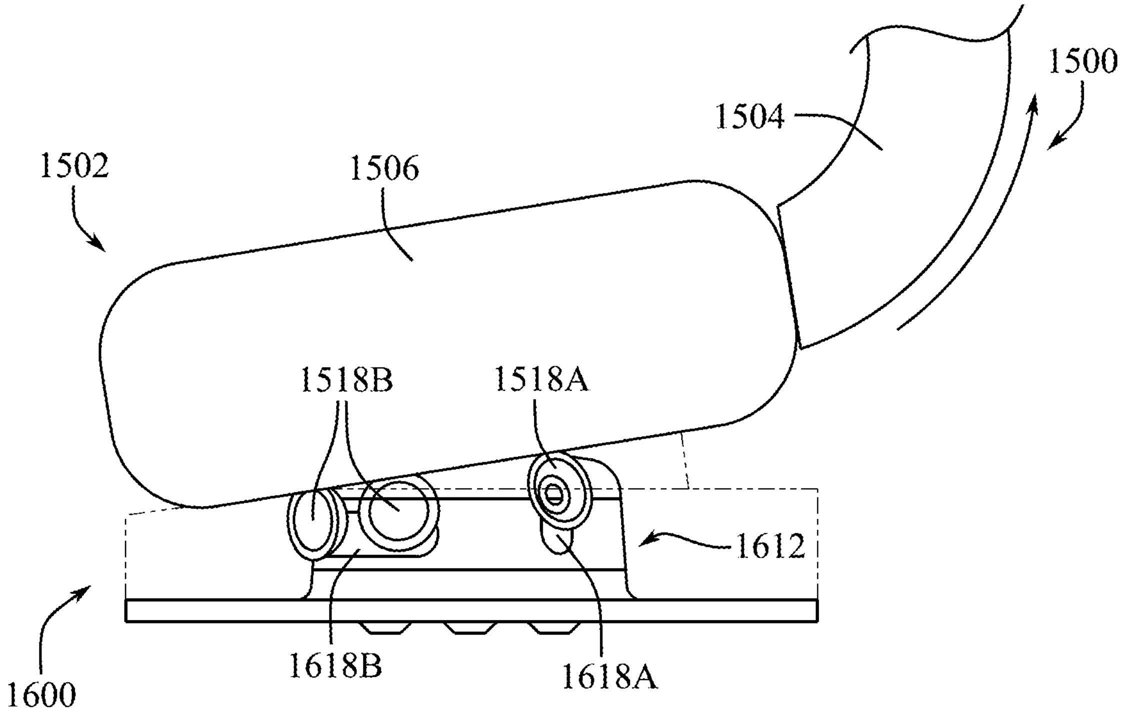
FIG. 18D shows a side sectional view of the receptacle connector of FIG. 18A and a plug connector.

FIG. 18D shows the cable assembly 1500, including the plug connector 1502 and the shielded cable 1504 of FIGS. 17A and 17B, being pulled away from the receptacle connector 1600 of FIGS. 18A through 18C. The plug connector 1502 can be unintentionally and abruptly extracted from the receptacle connector 1600, for example, when the shielded cable 1504 snags on an object and pulls the plug connector 1502 in a direction away from the receptacle connector 1600 (as represented by the arrow shown in FIG. 18D). When the plug connector 1502 is abruptly and/or undesirably extracted from the receptacle connector 1600, the electrical contacts 1518A and 1518B of the plug connector 1502 can be pulled out of contact with the correlating electrical contacts 1618A and 1618B of the receptacle connector 1600 causing a loss of: electrical power, control signals, an electrical ground, or a combination thereof. An abrupt loss of electrical power, electrical ground, or one or more control signals can damage the electronic device and/or compromise or corrupt information stored on the electronic device.

In some examples, at least one of the electrical contacts (e.g., electrical contact 1618A) within the receptacle connector 1600 can detect when the plug connector 1502 is being removed from the receptacle connector 1600. For example, the electronic device can detect an undesirable extraction of the plug connector 1502 from the receptacle connector 1600 when the electrical contact 1518A of the plug connector 1502 is pulled out of contact with the electrical contact 1618A of the receptacle connector 1600. An undesirable extraction of the plug connector 1502 from the receptacle connector 1600 can occur when the plug connector 1502 is pulled away from the receptacle connector 1600 from the side of the plug connector 1502 where the shielded cable 1504 enters the boot 1506. This undesirable extraction scenario can be most probable as the shielded cable 1504 can get snagged on an object and can pull the plug connector 1502 away from the receptacle connector 1600 (as illustrated by the arrow).

In some examples, the electrical contacts 1618 can be disposed about the raised portion 1612 such that the electrical contact 1518A moves out of contact from the electrical contact 1518A before the electrical contacts 1518B of the plug connector 1502 move out of contact with the electrical contact 1618B of the receptacle connector 1600. While the electrical contact 1518A is out of contact from the electrical contact 1618A but before the electrical contacts 1518B of the plug connector 1502 move out of contact with the electrical contact 1618B of the receptacle connector 1600, a duration of time can pass. The duration of time can be sufficient to enable the electronic device to mitigate any destructive effects of unintentionally extracting the plug connector 1502 from the receptacle connector 1600. The size, shape, and position of each of the electrical contacts 1518, 1618 can impact the duration of time when the electrical contact 1518A is out of contact from the electrical contact 1618A but before the electrical contacts 1518B move out of contact with the electrical contact 1618B.

In some examples, a contact area defined by the electrical contact 1618A (e.g., a surface area of the electrical contact 1618 that can be engaged by one or more of the electrical contacts 1518) can be different from a contact area defined by the electrical contact 1618B. In other words, each electrical contact 1618A, 1618B can be sized or shaped such that one or more correlating electrical contacts 1518 can physically contact the contact area defined by each respective electrical contact 1618. As shown in FIG. 18D, the contact area of the electrical contact 1618B can be larger than the contact area of the electrical contact 1618A. As such, the electrical contact 1618B can interface with more than one corresponding electrical contacts 1518B while the plug connector 1502 is inserted into the receptacle connector 1600. The size, shape, and position of the contact area of each electrical contact 1518, 1618 can impact the duration of time when the electrical contact 1518A is out of contact from the electrical contact 1618A but before the electrical contacts 1518B move out of contact with the electrical contact 1618B.

A loss of the electrical signal passed between the electrical contacts 1518A, 1618A can alert the electronic device (e.g., a processor of the electronic device) that an unexpected or undesirable extraction of the plug connector 1502 is occurring. Accordingly, the electronic device can react to the loss of signal by implementing one or more actions to safeguard the electrical components and information of the electronic device. For example, a processor within the electronic device can: withdraw electrical power from one or more electronic components, cause data to be saved, or perform another preventative task or action. While FIG. 18D shows the plug connector 1502 being extracted from the receptacle connector 1600 from the side of the plug connector 1502 adjacent the shielded cable 1504 (e.g., rocking out of the receptacle connector 1600 starting from the side of the plug connector 1502 adjacent the shielded cable 1504), the plug connector 1502 can be undesirably detached from another side of the plug connector 1502 in some examples.

Figure 18E:
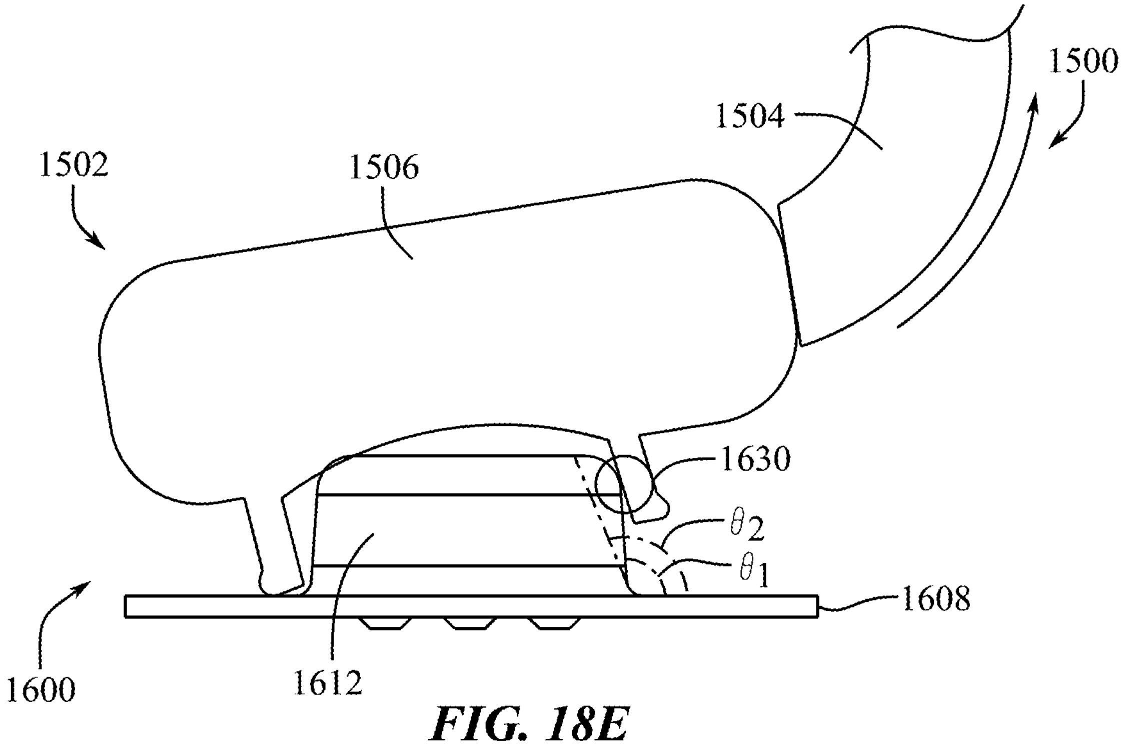
FIG. 18E shows a side sectional view of the receptacle connector of FIG. 18A and the plug connector of FIG. 18D.

FIG. 18E illustrates various configurations of the raised portion 1612 that can be used to alter the force required to insert and extract the plug connector 1502 into and out of the receptacle connector 1600. As illustrated in FIG. 18E, side surfaces of the raised portion 1612 can be disposed at different angles with respect to the base 1608. In some examples, an angle $\theta_1$ between side surfaces of the raised portion 1612 and the base 1608 can be in a range from about 95° to about 105°, from about 90° to about 180°, from about 90° to about 120°, from about 95° to about 135°, from about 92° to about 110°, or the like. In some examples, an angle $\theta_2$ between side surfaces of the raised portion 1612 and the base 1608 can be relatively larger than the angle $\theta_1$ and can be in a range from about 95° to about 105°, from about 90° to about 180°, from about 90° to about 120°, from about 95° to about 135°, from about 92° to about 110°, or the like. Providing the angle $\theta_2$ between the raised portion 1612 and the base 1608 allows the plug connector 1502 to be inserted into and extracted from the receptacle connector 1600 with a relatively small force. Providing the angle $\theta_1$ between the raised portion 1612 and the base 1608 allows the plug connector 1502 to be inserted into and extracted from the receptacle connector 1600 with a relatively large force. Thus, the angle between the raised portion 1612 and the base 1608 can be selected based on the forces desired to insert the plug connector 1502 into the receptacle connector 1600 and to extract the plug connector 1502 from the receptacle connector 1600.

FIGS. 19A through 19M illustrate various configurations of detents 1710 that can be included in a receptacle connector 1700. The receptacle connector 1700 can include a trim ring 1704, a base 1708, a raised portion 1712, and a recess between the trim ring 1704 and the raised portion 1712. The detents 1710 can be disposed within a cavity formed in the trim ring 1704.

Figure 19A:
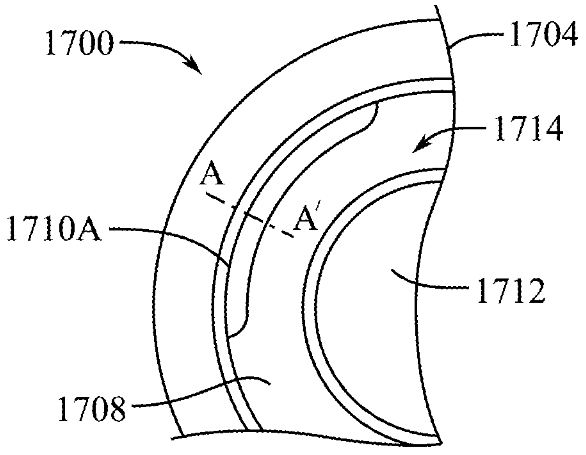
FIG. 19A shows a detail top-down view of a receptacle connector.
Figure 19B:
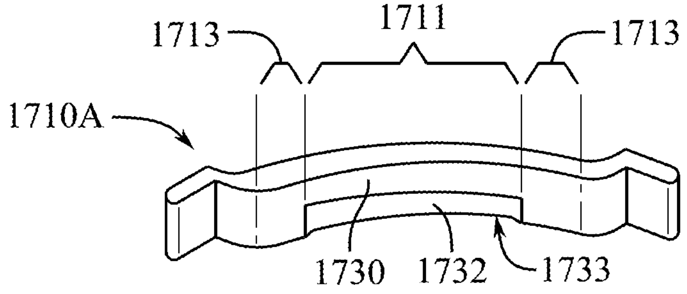
FIG. 19B shows a perspective view of a detent of the receptacle connector of FIG. 19A.
Figure 19C:
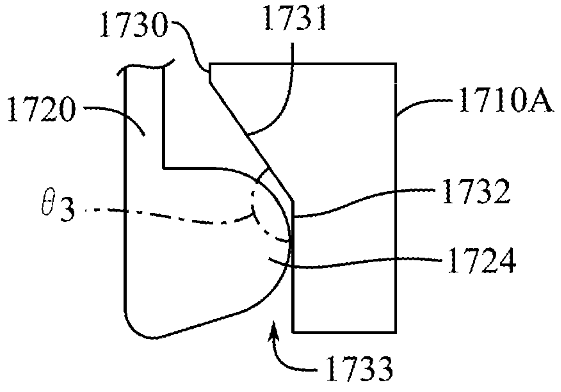
FIG. 19C shows a sectional view of the detent of FIG. 19B and a plug connector.

FIGS. 19A through 19C illustrate a detent 1710A that includes a central region 1711 and peripheral regions 1713 on either side of the central region 1711. The central region 1711 can be notched to form a channel 1733 that can receive a protrusion 1724 of a plug connector 1720. For example, a lower portion of the central region 1711 can be notched to form an undercut portion of the detent 1710A in the central region 1711. The notches can be omitted from the peripheral regions 1713, which can prevent, limit, or reduce rotation of the plug connector 1720. Including the un-notched peripheral regions 1713 can also increase mating forces and un-mating forces between the plug connector 1720 and the receptacle connector 1700.

FIG. 19C shows a cross-sectional view of the protrusion 1724 of the plug connector 1720 disposed within the channel 1733 and interfacing the detent 1710A taken along reference line A-A' of FIG. 19A. In some examples, the detent 1710A can define the channel 1733 such that a first surface 1731 of the channel 1733 is angled relative to a second surface 1732 of the channel 1733 to form an angle $\theta_3$. The protrusion 1714 can engage or contact the first surface 1730 while disposed within the channel 1733. The angle $\theta_3$ can directly correlate to a force required to overcome a biasing element coupled to the detent 1710A to cause the detent 1710A to move away from the central member 1712 and enable extraction of the protrusion 1724 from the channel 1733 (e.g., enabling extraction of the plug connector 1720 from the receptacle connector 1700). For example, a relatively smaller angle $\theta_3$ can require a relatively greater force to extract the plug connector 1720 from the receptacle connector 1700. Alternatively, a relatively larger angle $\theta_3$ can require relatively smaller force to extract the plug connector 1720 from the receptacle connector 1700. The angle $\theta_3$ can be about 30 degrees, between about 30 degrees and about 60 degrees, between about 60 degrees and about 90 degrees, between about 90 degrees and about 120 degrees, between about 120 degrees and about 150 degrees, between about 150 degrees and about 180 degrees, or less than 180 degrees. A third surface 1730 adjacent the first surface 1731 can extend in a direction parallel to the second surface 1732.

Figure 19D:
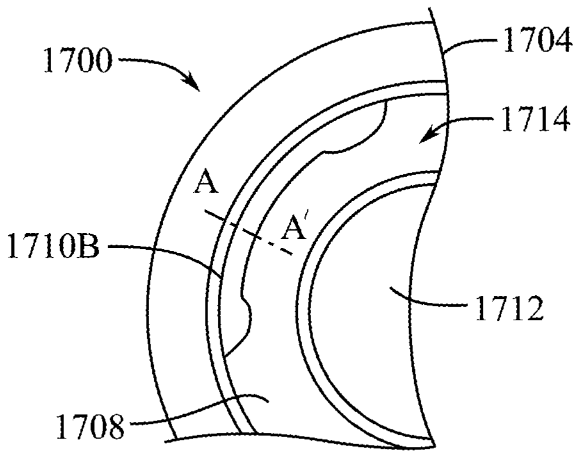
FIG. 19D shows a detail top-down view of a receptacle connector.
Figure 19E:
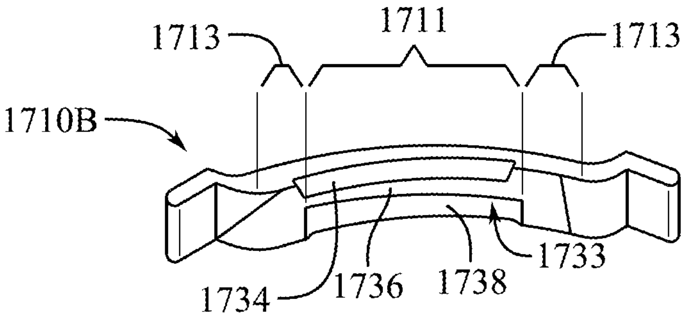
FIG. 19E shows a perspective view of a detent of the receptacle connector of FIG. 19D.
Figure 19F:
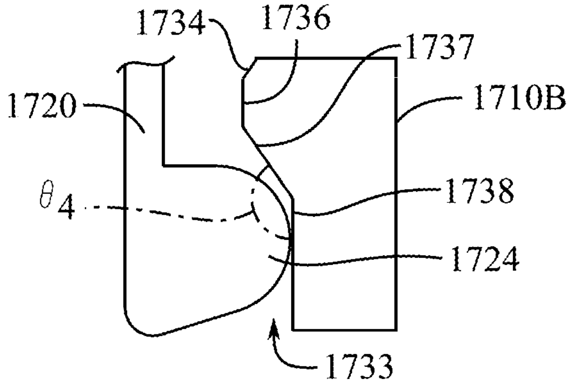
FIG. 19F shows a sectional view of the detent of FIG. 19E and a plug connector.

FIGS. 19D through 19F illustrate a detent 1710B that includes a central region 1711 and peripheral regions 1713 on either side of the central region 1711. The central region 1711 can be notched to form a channel 1733 that can receive a protrusion 1724 of a plug connector 1720. For example, a lower portion of the central region 1711 can be notched to form an undercut portion of the detent 1710B in the central region 1711. Further, an upper portion of the central region 1711 can be notched to form a sloped upper surface of the detent 1710B in the central region 1711. The notches can be omitted from the peripheral regions 1713, which can prevent, limit, or reduce rotation of the plug connector 1720. Including the un-notched peripheral regions 1713 can also increase mating forces and un-mating forces between the plug connector 1720 and the receptacle connector 1700. In the example of FIGS. 19D through 19F, one of the peripheral regions 1713 can be un-notched, and the other peripheral region 1713 can be notched, which reduces breakaway forces (e.g., reduces un-mating forces). The notched upper surface of the detent 1710B can reduce a mating force for mating the plug connector 1720 in the receptacle connector 1700. In other words the notched upper surface of the detent 1710B can reduce the force require to move the protrusions 1724 past the detent 1710B into the channel 1733. Further, the peripheral regions 1713 can extend radially inward relative to the central region 1711 and can include protuberances or the like. In the example of FIGS. 19D through 19F, protuberances can be included in both of the peripheral regions 1713. This can increase mating and/or un-mating forces of the plug connector 1720 relative to the receptacle connector 1700.

FIG. 19F shows a cross-sectional view of the protrusion 1724 of the plug connector 1720 disposed within the channel 1733 and interfacing the detent 1710B taken along reference line A-A' of FIG. 19D. In some examples, the detent 1710B can define the channel 1733 such that a first surface 1737 of the channel 1733 is angled relative to a second surface 1738 of the channel 1733 to form an angle $\theta_4$. The protrusion 1714 can engage or contact the first surface 1737 while disposed within the channel 1733. The angle $\theta_4$ can directly correlate to a force required to overcome a biasing element coupled to the detent 1710B to cause the detent 1710B to move away from the central member 1712 and enable extraction of the protrusion 1724 from the channel 1733 (e.g., enabling extraction of the plug connector 1720 from the receptacle connector 1700). For example, a relatively smaller angle $\theta_4$ can require a relatively greater force to extract the plug connector 1720 from the receptacle connector 1700. Alternatively, a relatively larger angle $\theta_4$ can require relatively smaller force to extract the plug connector 1720 from the receptacle connector 1700. The angle $\theta_4$ can be about 30 degrees, between about 30 degrees and about 60 degrees, between about 60 degrees and about 90 degrees, between about 90 degrees and about 120 degrees, between about 120 degrees and about 150 degrees, between about 150 degrees and about 180 degrees, or less than 180 degrees. A third surface 1736 adjacent the first surface 1737 can extend in a direction parallel to the second surface 1738.

In some examples, a top surface of the detent 1710B is also notched. As such, a fourth surface 1734 of the detent 1710B is angled relative to the third surface 1736 of the detent 1710B to form an angle. The protrusion 1714 can engage or contact the fourth surface 1734 as the protrusion 1714 is inserted into the channel 1733. The angle can directly correlate to a force required to overcome a biasing element coupled to the detent 1710B to cause the detent 1710B to move away from the central member 1712 and enable insertion of the protrusion 1724 into the channel 1733 (e.g., enabling insertion of the plug connector 1720 from the receptacle connector 1700). For example, a relatively smaller angle can require a relatively greater force to extract the plug connector 1720 from the receptacle connector 1700. Alternatively, a relatively larger angle can require relatively smaller force to extract the plug connector 1720 from the receptacle connector 1700. The angle can be about 30 degrees, between about 30 degrees and about 60 degrees, between about 60 degrees and about 90 degrees, between about 90 degrees and about 120 degrees, between about 120 degrees and about 150 degrees, between about 150 degrees and about 180 degrees, or less than 180 degrees.

Figure 19G:
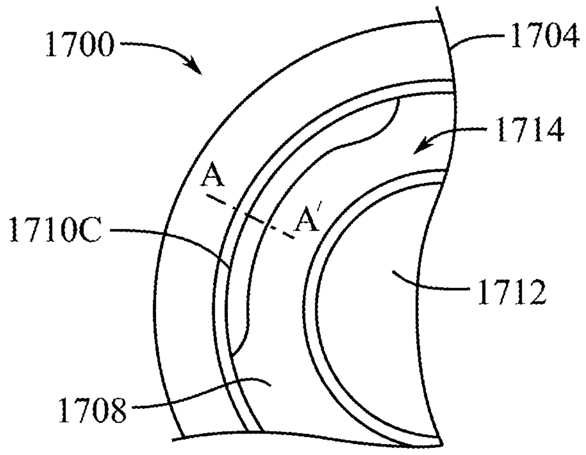
FIG. 19G shows a detail top-down view of a receptacle connector.
Figure 19H:
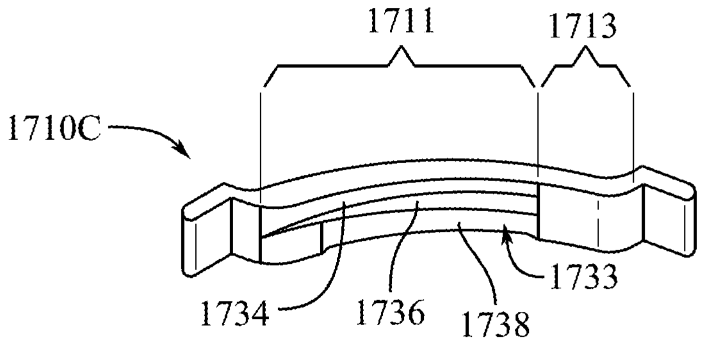
FIG. 19H shows a perspective view of a detent of the receptacle connector of FIG. 19G.

FIGS. 19G and 19H illustrate a detent 1710C that includes a central region 1711 and a peripheral region 1713 on one side of the central region 1711. The central region 1711 can be notched to form a channel 1733 that can receive a protrusion 1724 of a plug connector 1720. The central region 1711 can also be notched to form a notched top surface. For example, a lower portion of the central region 1711 can be notched to form an undercut portion of the detent 1710C in the central region 1711. Further, an upper portion of the central region 1711 can be notched to form a sloped upper surface of the detent 1710C in the central region 1711. The notches can be omitted from the peripheral region 1713, which can prevent, limit, or reduce rotation of the plug connector 1720. Including the un-notched peripheral region 1713 can also increase mating forces and un-mating forces between the plug connector 1720 and the receptacle connector 1700. In the example of FIGS. 19G and 19H, the peripheral region 1713 can be un-notched, which can increase mating and/or un-mating forces between the plug connector 1720 and the receptacle connector 1700. The notched upper surface of the detent 1710C can reduce a mating force for mating the plug connector 1720 in the receptacle connector 1700. In other words, the notched upper surface of the detent 1710C can reduce the force require to move the protrusions 1724 past the detent 1710C into the channel 1733. Further, the peripheral region 1713 can extend radially inward relative to the central region 1711 and can include a protuberance or the like. In the example of FIGS. 19G and 19H, a protuberance can be included in the un-notched peripheral region 1713 of the detent 1710C. This can increase mating and/or un-mating forces of the plug connector 1720 relative to the receptacle connector 1700. A cross-sectional view of the detent 1710C taken along cross-section A-A' of FIG. 19G can be the same as or similar to the cross-sectional view of FIG. 19F, discussed above.

Figure 19I:
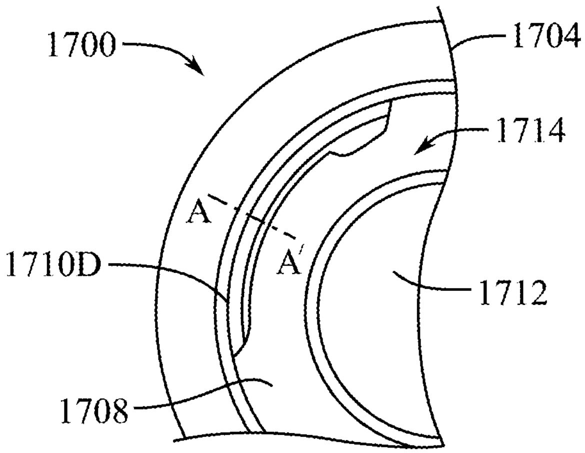
FIG. 19I shows a detail top-down view of a receptacle connector.
Figure 19J:
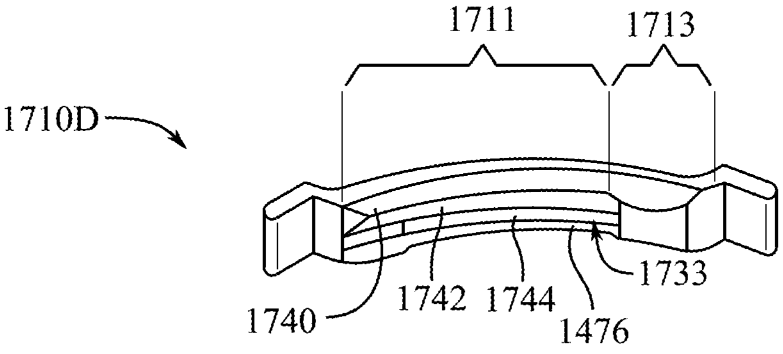
FIG. 19J shows a perspective view of a detent of the receptacle connector of FIG. 19I.
Figure 19K:
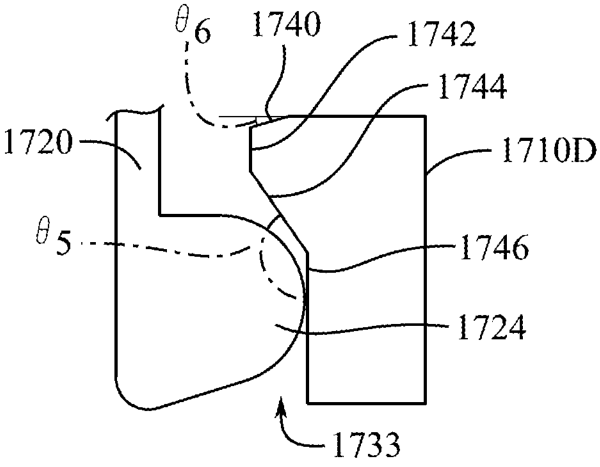
FIG. 19K shows a sectional view of the detent of FIG. 19J and a plug connector.

FIGS. 19I through 19K illustrate a detent 1710D that includes a central region 1711 and a peripheral region 1713 on one side of the central region 1711. The central region 1711 can be notched to form a channel 1733 that can receive a protrusion 1724 of a plug connector 1720. For example, a lower portion of the central region 1711 can be notched to form an undercut portion of the detent 1710D in the central region 1711. Further, an upper portion of the central region 1711 and the peripheral region 1713 can be notched to form a sloped upper surface of the detent 1710D in the central region 1711 and the peripheral region 1713. In the example of FIGS. 19I through 19K, the notched portions of the detent 1710D can reduce mating and/or un-mating forces of the plug connector 1720 relative to the receptacle connector 1700. The peripheral region 1713 can extend radially inward relative to the central region 1711 and can include a protuberance or the like. In the example of FIGS. 19I through 19K, a protuberance can be included in the peripheral region 1713 with the un-notched lower portion and the notched upper portion. This can increase mating and/or un-mating forces of the plug connector 1720 relative to the receptacle connector 1700.

FIG. 19K shows a cross-sectional view of the protrusion 1724 of the plug connector 1720 disposed within the channel 1733 and interfacing the detent 1710D taken along reference line A-A' of FIG. 19I. In some examples, the detent 1710D can define the channel 1733 such that a first surface 1744 of the channel 1733 is angled relative to a second surface 1746 of the channel 1733 to form an angle $\theta_5$. The protrusion 1714 can engage or contact the first surface 1744 while disposed within the channel 1733. The angle $\theta_5$ can directly correlate to a force required to overcome a biasing element coupled to the detent 1710D to cause the detent 1710D to move away from the central member 1712 and enable extraction of the protrusion 1724 from the channel 1733 (e.g., enabling extraction of the plug connector 1720 from the receptacle connector 1700). For example, a relatively smaller angle $\theta_5$ can require a relatively greater force to extract the plug connector 1720 from the receptacle connector 1700. Alternatively, a relatively larger angle $\theta_5$ can require relatively smaller force to extract the plug connector 1720 from the receptacle connector 1700. The angle $\theta_5$ can be about 30 degrees, between about 30 degrees and about 60 degrees, between about 60 degrees and about 90 degrees, between about 90 degrees and about 120 degrees, between about 120 degrees and about 150 degrees, between about 150 degrees and about 180 degrees, or less than 180 degrees. A third surface 1742 adjacent the first surface 1744 can extend in a direction parallel to the second surface 1746.

In some examples, a top surface of the detent 1710D is also notched. As such, a fourth surface 1740 of the detent 1710D is angled relative to the third surface 1742 of the detent 1710D to form an angle $\theta_6$. The protrusion 1714 can engage or contact the fourth surface 1740 as the protrusion 1714 is inserted into the channel 1733. The angle $\theta_6$ can directly correlate to a force required to overcome a biasing element coupled to the detent 1710D to cause the detent 1710D to move away from the central member 1712 and enable insertion of the protrusion 1724 into the channel 1733 (e.g., enabling insertion of the plug connector 1720 from the receptacle connector 1700). For example, a relatively smaller angle $\theta_6$ can require a relatively greater force to extract the plug connector 1720 from the receptacle connector 1700. Alternatively, a relatively larger angle $\theta_6$ can require relatively smaller force to extract the plug connector 1720 from the receptacle connector 1700. The angle $\theta_6$ can be about 30 degrees, between about 30 degrees and about 60 degrees, between about 60 degrees and about 90 degrees, between about 90 degrees and about 120 degrees, between about 120 degrees and about 150 degrees, between about 150 degrees and about 180 degrees, or less than 180 degrees.

Figure 19L:
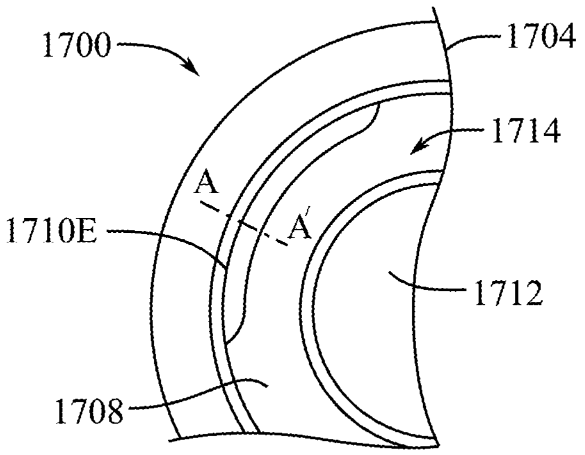
FIG. 19L shows a detail top-down view of a receptacle connector.
Figure 19M:
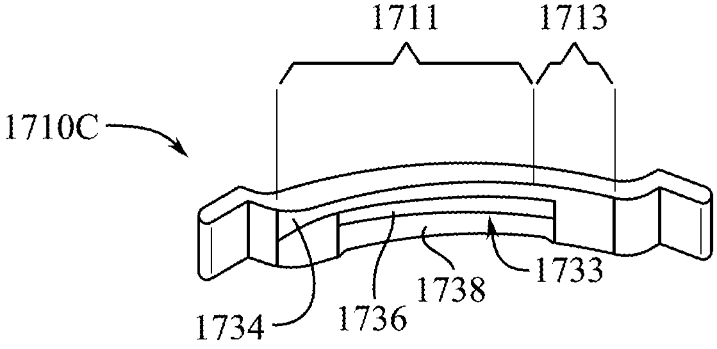
FIG. 19M shows a perspective view of a detent of the receptacle connector of FIG. 19L.

FIGS. 19L and 19M illustrate a detent 1710E that includes a central region 1711 and a peripheral region 1713 on one side of the central region 1711. The central region 1711 can be notched to form a channel 1733 that can receive a protrusion 1724 of a plug connector 1720. For example, a lower portion of the central region 1711 can be notched to form an undercut portion of the detent 1710E in the central region 1711. The notches can be omitted from lower portion of the peripheral regions 1713, which can prevent, limit, or reduce rotation of the plug connector 1720. Including the un-notched peripheral regions 1713 can also increase mating forces and un-mating forces between the plug connector 1720 and the receptacle connector 1700. The central region 1711 and the peripheral region 1713 can be notched to form a notched top surface. The notched upper surface of the detent 1710E can reduce a mating force for mating the plug connector 1720 in the receptacle connector 1700. In other words, the notched upper surface of the detent 1710E can reduce the force require to move the protrusions 1724 past the detent 1710E into the channel 1733. A cross-sectional view of the detent 1710E taken along cross-section A-A' of FIG. 19L can be the same as or similar to the cross-sectional view of FIG. 19F, discussed above.

Figure 20A:
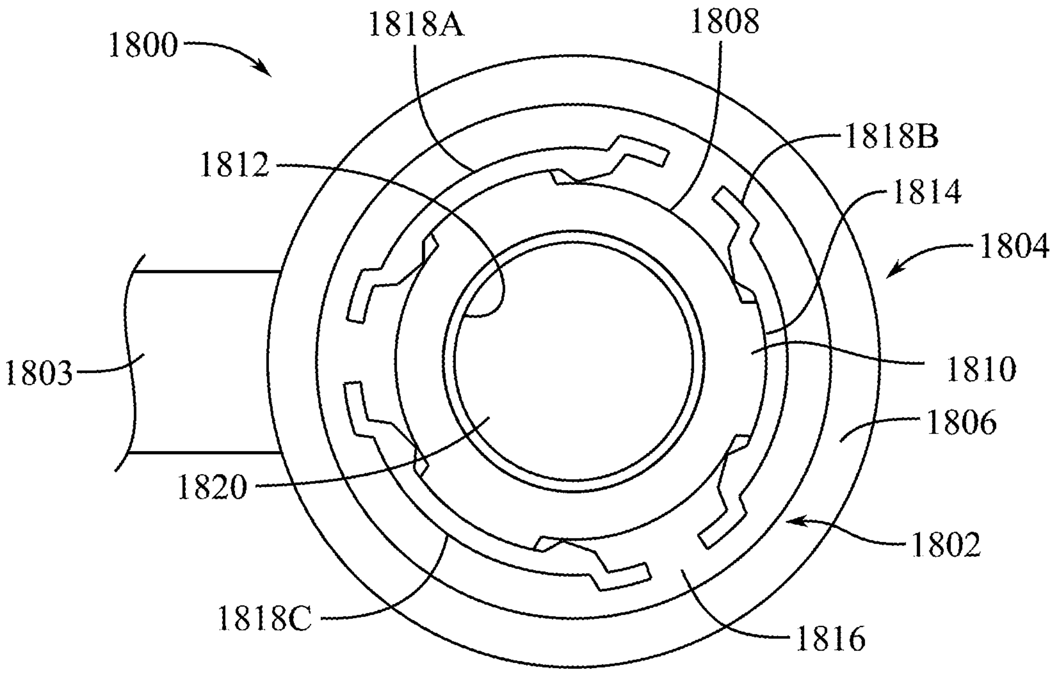
FIG. 20A shows a bottom view of a receptacle connector and a plug connector.
Figure 20B:
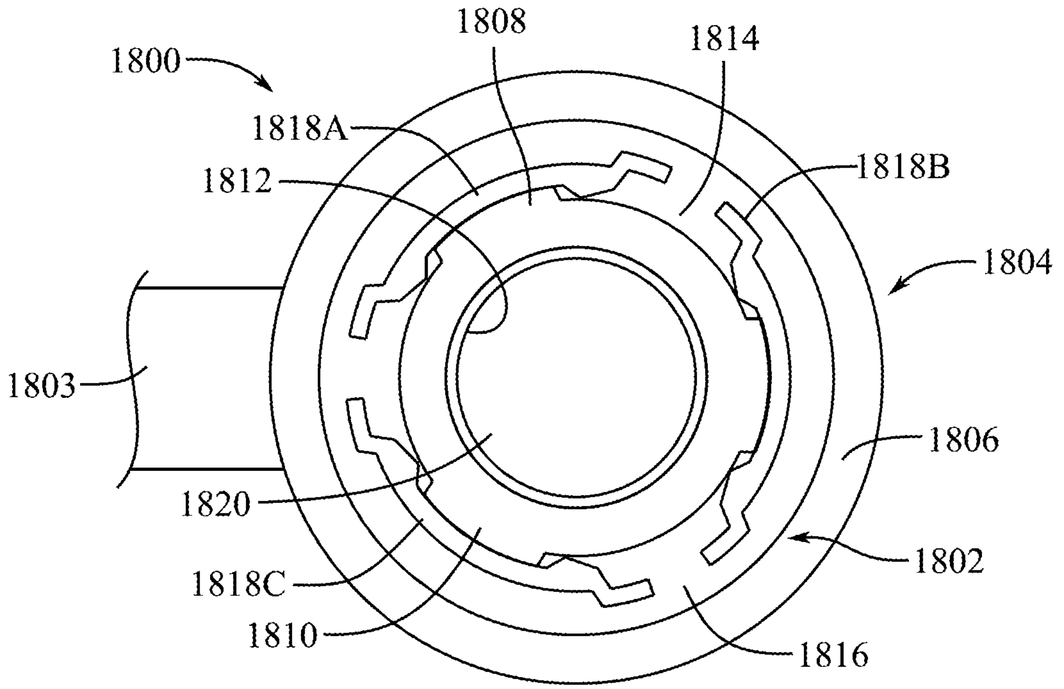
FIG. 20B shows a bottom view of a receptacle connector and a plug connector.

FIGS. 20A and 20B illustrate different configurations of a cable assembly 1800 relative to a receptacle connector 1802. FIGS. 20A and 20B show a portion of the cable assembly 1800 inserted into the receptacle connector 1802. The cable assembly 1800 can be substantially similar to, and can include some or all of, the features of any of the previously described cable assemblies. For example, the cable assembly 1800 can include a shielded cable 1803 and a plug connector 1804 having a boot 1806 and a central member 1808A/1808B. The central member 1808 can form an external surface 1810 and an internal surface 1812. In some examples, the central member 1808 can include one or more protrusions 1814 extending laterally from, or substantially perpendicular to, the external surface 1810. In some examples, the central member 1808 can form a cavity or volume, for example, the internal surface 1812 can form a cavity or volume.

The receptacle connector 1802 can be substantially similar to, and can include some or all of, the features of the previously described receptacle connectors. For example, the receptacle connector 1802 can include a trim ring 1816, one or more detents 1818A/1818B/1818C (collectively referred to as detents 1818), and a raised portion 1820. The trim ring 1816 can form one or more undercut regions which house or retain the detents 1818. While a central member 1808 is disposed within the receptacle connector 1802, the protrusions 1814 can extend into respective channels defined by the detents 1818. In some examples, each detent 1818 can be biased toward the raised portion 1820 by a biasing element. In other words, each detent 1818 can radially translate within their respective undercut regions toward and away from the raised portion 1820 to engage and disengage respective protrusions 1814.

Each of the detents 1818 can include different configurations and different biasing elements to customize mating and un-mating forces for each of the detents 1818. Specific configurations of the detents 1818 and the shielded cable 1803 relative to the detents 1818 can be used to provide different mating an un-mating forces, and to provide different breakaway forces. In the example of FIG. 20A, the detents 1818A and 1818C are offset from the shielded cable 1803 (e.g., the shielded cable 1803 splits the detents 1818A and 1818B) distal the shielded cable 1803, and the detent 1818B is aligned with the shielded cable 1803 proximal the shielded cable 1803. Protrusions 1814 distal the shielded cable 1803 are offset from the shielded cable 1803 (e.g., the shielded cable 1803 splits the protrusions 1814), and the protrusion 1814 proximal the shielded cable 1803 is aligned with the shielded cable 1803. In the example of FIG. 20B, the detents 1818A and 1818C are offset from the shielded cable 1803 (e.g., the shielded cable 1803 splits the detents 1818A and 1818B) proximal the shielded cable 1803, and the detent 1818B is aligned with the shielded cable 1803 distal the shielded cable 1803. Protrusions 1814 proximal the shielded cable 1803 are offset from the shielded cable 1803 (e.g., the shielded cable 1803 splits the protrusions 1814), and the protrusion 1814 distal the shielded cable 1803 is aligned with the shielded cable 1803. The detents 1818 can include any of the previously described detents, such as the detents described with respect to FIGS. 19A through 19M, and the biasing elements can include any of the previously described biasing elements. Any combination of detents 1818 and biasing elements can be provided.

Figure 21A:
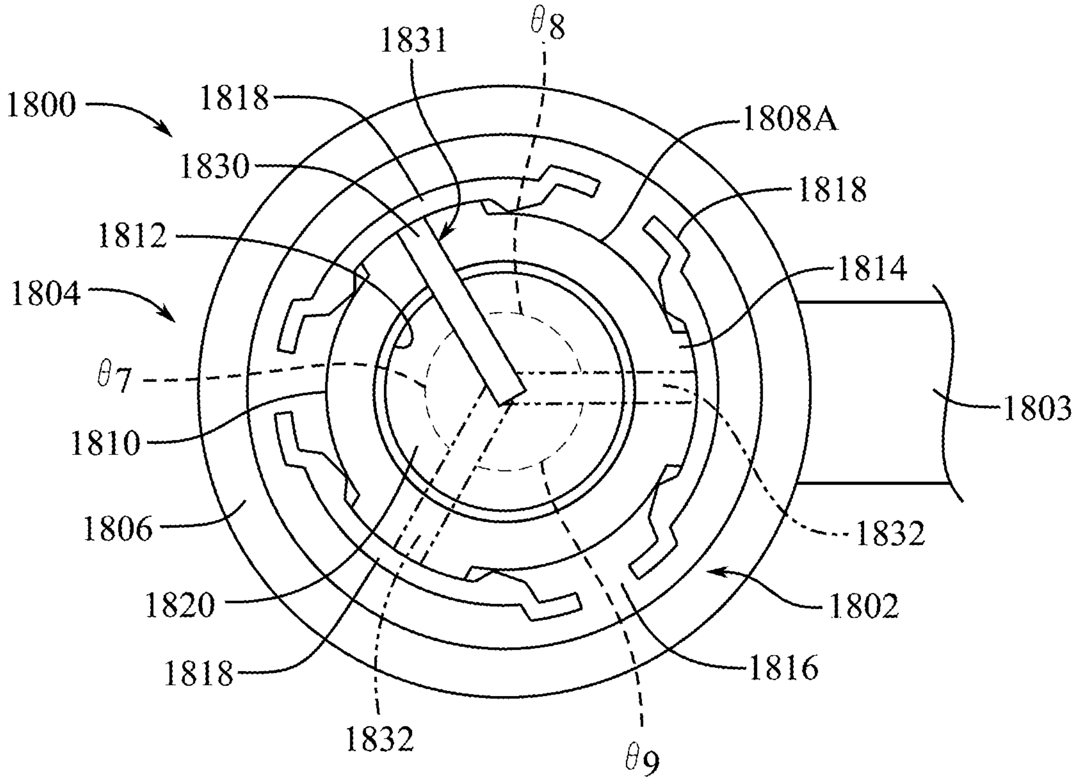
FIG. 21A shows a bottom view of a receptacle connector and a plug connector.
Figure 21B:
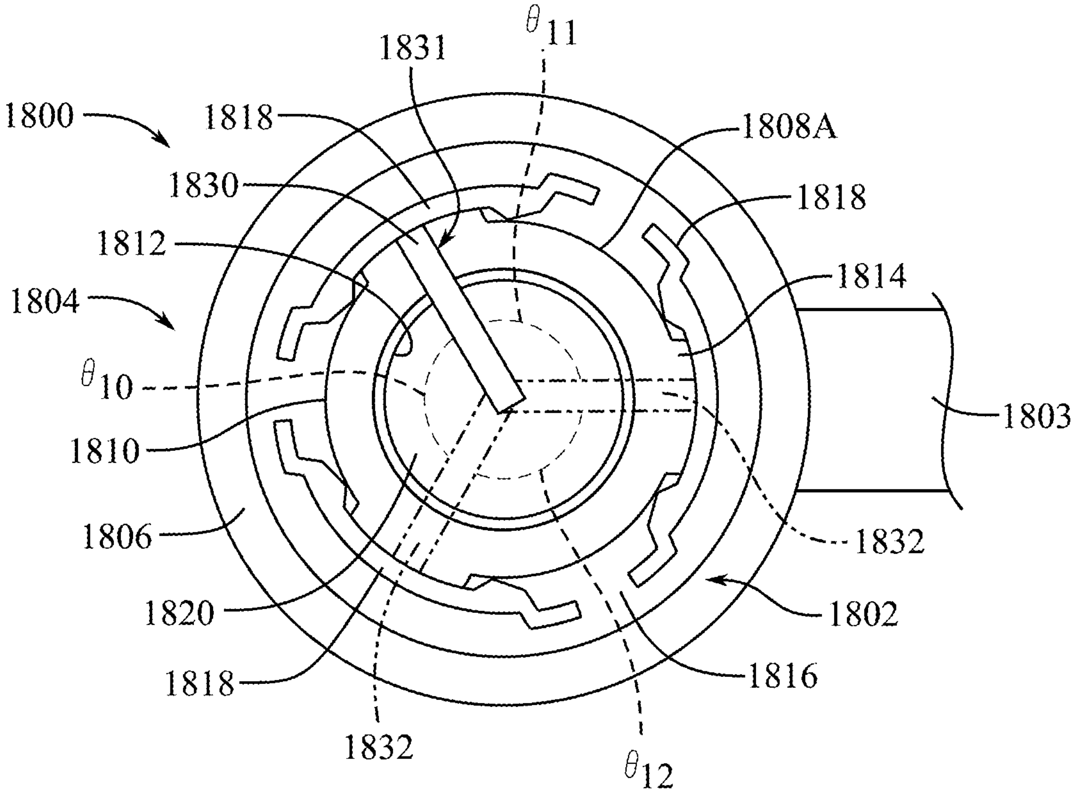
FIG. 21B shows a bottom view of a receptacle connector and a plug connector.

FIGS. 21A and 21B illustrate examples in which the receptacle connector 1802 includes protrusions 1830 and the plug connector 1804 includes openings 1831 configured to receive the protrusions. The protrusions 1830 and the openings 1831 can be configured to ensure that the plug connector 1804 is properly aligned with and installed in a proper orientation relative to the receptacle connector 1802. FIGS. 21A and 21B further illustrate protrusions 1832 in dashed lines. In some examples, the receptacle connector 1802 includes a single protrusion 1830; however, the receptacle connector 1802 can include the protrusions 1832 in addition to or in place of the protrusion 1830, and the plug connector 1804 can include any number of the openings 1831 configured to receive the protrusion 1830 and/or the protrusions 1832. In some examples, the receptacle connector 1802 can include one protrusion 1830; one protrusion 1830 and one protrusion 1832; one protrusion 1830 and two protrusions 1832; or a greater number of protrusions.

FIGS. 21 and 21B illustrate alternative angular spacings of the protrusions 1830/1832 of the receptacle connector 1802. In FIG. 21A, the protrusions 1830/1832 are evenly spaced relative to one another, with angles $\theta_7$, $\theta_8$, and $\theta_9$ being about 60°. A protrusion 1830 and a protrusion 1832 distal the shielded cable 1803 can be offset from the shielded cable 1803 (e.g., the shielded cable 1803 splits the protrusion 1830 and the protrusion 1832), and a protrusion 1832 proximal the shielded cable 1803 can be aligned with the shielded cable 1803. Any rotational configuration of the protrusions 1830/1832 relative to the shielded cable 1803 can be provided. In FIG. 21B, the protrusions 1830/1832 are spaced at different intervals relative to one another. Angles $\theta_{10}$, $\theta_{11}$, and $\theta_{12}$ between adjacent protrusions 1830/1832 can be about 30 degrees, between about 30 degrees and about 60 degrees, between about 60 degrees and about 90 degrees, between about 90 degrees and about 120 degrees, between about 120 degrees and about 150 degrees, between about 150 degrees and about 180 degrees, or less than 180 degrees. A protrusion 1830 and a protrusion 1832 distal the shielded cable 1803 can be offset from the shielded cable 1803 (e.g., the shielded cable 1803 splits the protrusion 1830 and the protrusion 1832), and a protrusion 1832 proximal the shielded cable 1803 can also be offset from the shielded cable 1803. Any rotational configuration of the protrusions 1830/1832 relative to the shielded cable 1803 can be provided. Various configurations of the protrusions 1830/1832 can be used to ensure proper alignment of the plug connector 1804 with the receptacle connector 1802 and can also be used to ensure that incompatible plug connectors are not inadvertently installed in the receptacle connector 1802.

FIGS. 22A through 22E show cross-sectional side views of a plug connector 1904 of a cable assembly 1900 disposed within a receptacle connector 1902. The plug connector 1904 includes a central member 1908 with a protrusion 1914. The protrusion 1914 engages a channel of a detent 1918. The detent 1918 is biased towards a raised portion 1920 of the receptacle connector 1902 by a biasing element 1924. The biasing element 1924 and the detent 1918 are disposed within a trim ring 1916, which is coupled to a base 1930 of the receptacle connector 1902. An external surface 1910 of the central member 1908 includes the protrusion 1914 and is configured to engage the detent 1918. An internal surface 1912 of the central member 1908 includes an electrical contact 1919 and is electrically coupled to the raised portion 1920 of the receptacle connector 1902.

FIGS. 22A through 22E show various seals 1932 disposed between the central member 1908 and the receptacle connector 1902 at various locations to prevent ingress of contaminants into the receptacle connector 1902, such as, fluids, dust, liquids, and other materials that can degrade or impede the functionality of the plug connector 1904 and the receptacle connector 1902. The seal 1932 can be affixed to any surface of the plug connector 1904 and/or the receptacle connector 1902. For example, the seal 1932 can be molded, adhered, welded, fastened, or otherwise secured to a surface of the plug connector 1904 and/or the receptacle connector 1902.

Figure 22A:
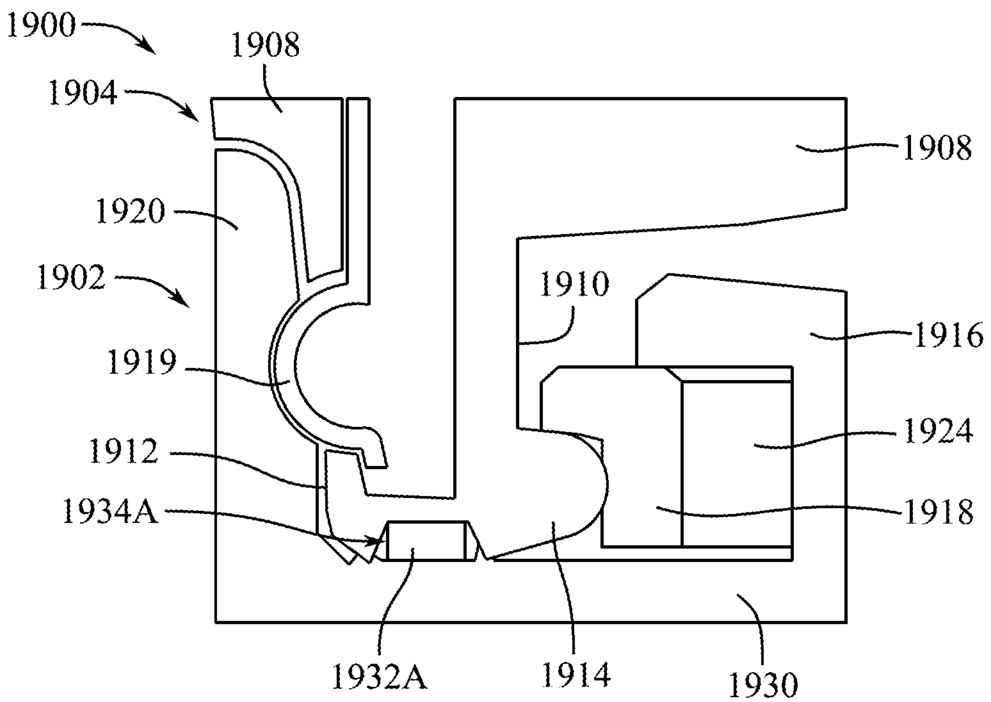
FIGS. 22A through 22E show sectional side views of a receptacle connector, a plug connector, and seals between the receptacle connector and the plug connector.
Figure 22B:
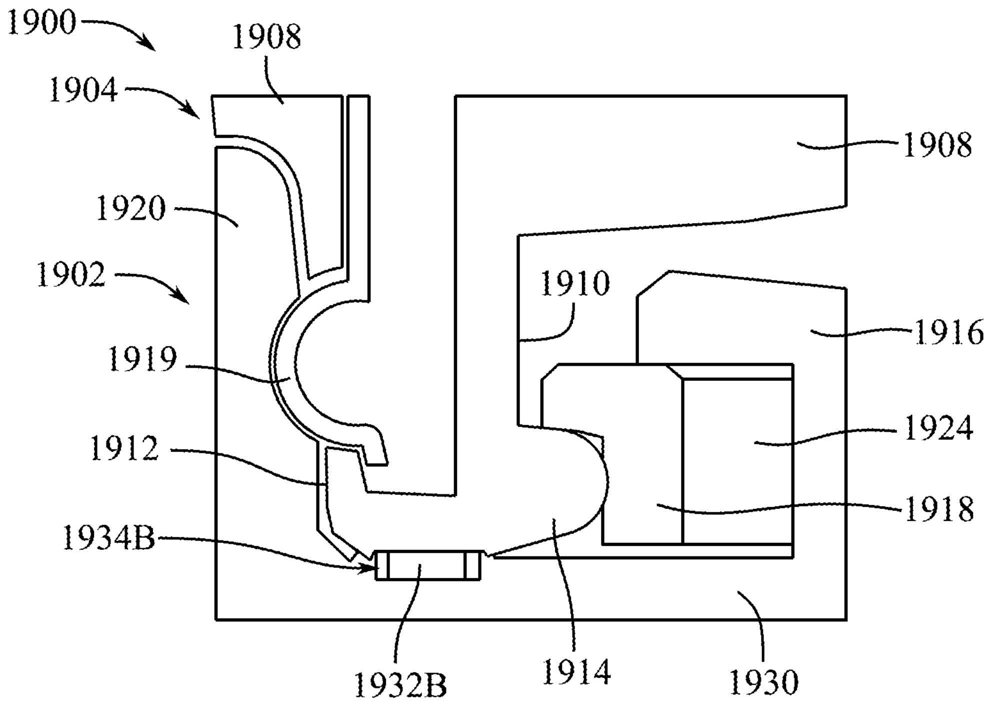
Figure 22C:
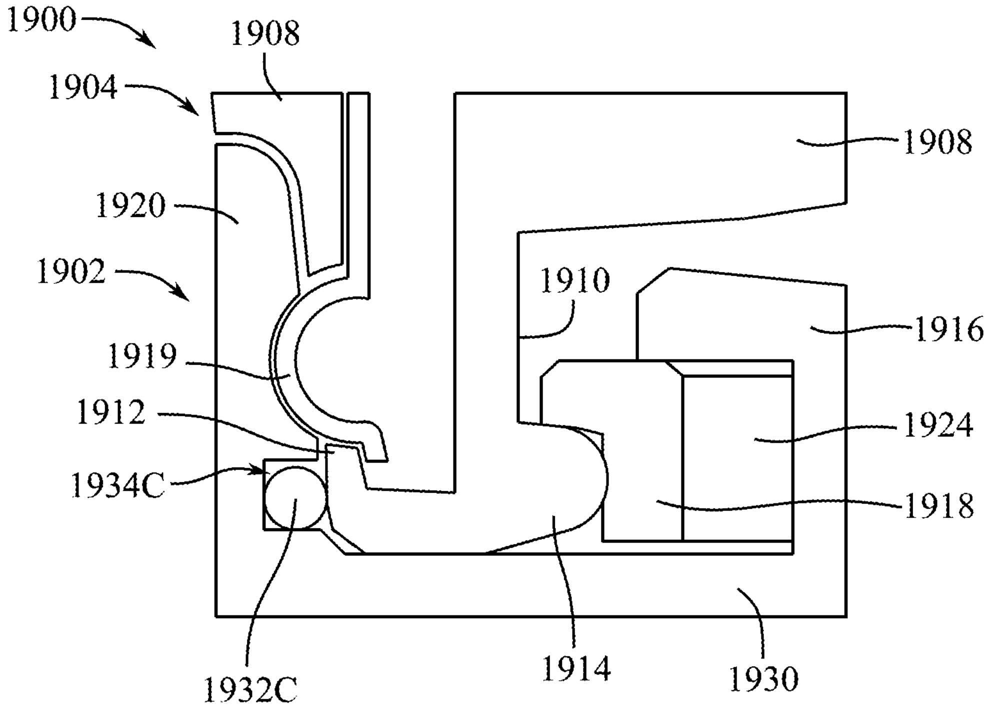
Figure 22D:
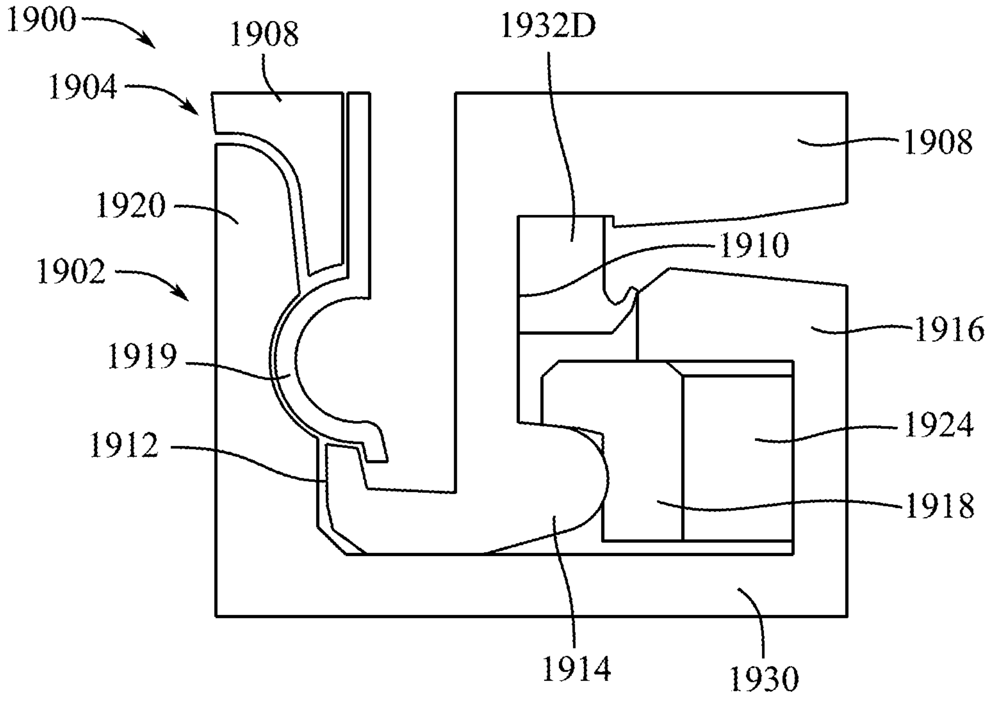
Figure 22E:
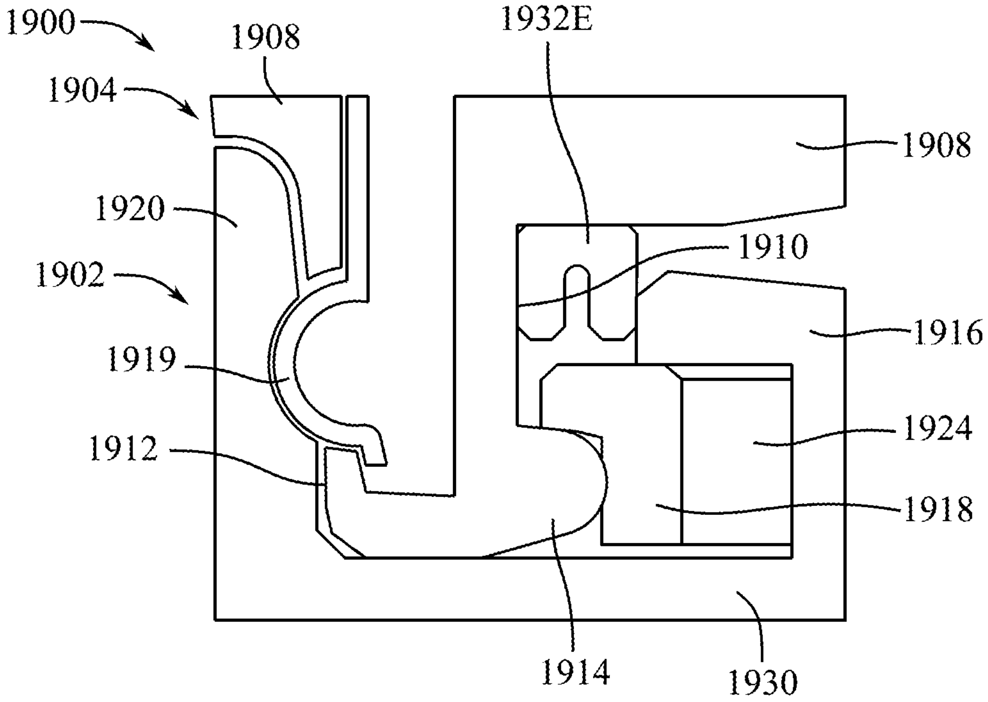

FIG. 22A shows a seal 1932A disposed between the base 1930 and the central member 1908. As illustrated in FIG. 22A, an opening 1934A can be provided in a bottom portion of the central member 1908, and the seal 1932A can be disposed in the opening 1934A in the central member 1908. FIG. 22B shows a seal 1932B disposed between the base 1930 and the central member 1908. As illustrated in FIG. 22B, an opening 1934B can be provided in a portion of the base 1930 adjacent a bottom portion of the central member 1908, and the seal 1932B can be disposed in the opening 1934B in the base 1930. FIG. 22C shows a seal 1932C disposed between the raised portion 1920 and the central member 1908. As illustrated in FIG. 22C, an opening 1934C can be provided in a portion of the raised portion 1920 adjacent a bottom portion of the central member 1908, and the seal 1932C can be disposed in the opening 1934C in the raised portion 1920. FIG. 22D shows a seal 1932D disposed between the trim ring 1916 and the central member 1908. As illustrated in FIG. 22D, the seal 1932D can be coupled to the central member 1908 between the central member 1908 and the trim ring 1916. The seal 1932D can include a protrusion that interacts with the trim ring 1916 to provide sealing between the central member 1908 and the trim ring 1916. FIG. 22E shows a seal 1932E disposed between the trim ring 1916 and the central member 1908. As illustrated in FIG. 22E, the seal 1932E can be coupled to the central member 1908 between the central member 1908 and the trim ring 1916. The seal 1932E can include an opening, which gives flexibility to the seal 1932E as the seal 1932E interacts with the trim ring 1916 to provide sealing between the central member 1908 and the trim ring 1916. While FIGS. 22A through 22E only depict a single seal 1932 in each example disposed between the central member 1908 and the receptacle connector 1902, other examples can include multiple seals 1932, each disposed at one of a plurality of positions within the receptacle connector 1902 and/or the central member 1908.

FIGS. 23A through 23G illustrate various configurations of seals 2002 that can be included between a raised portion 2000 and a base 2006 of a receptacle connector and a central member 2008 of a plug connector. The seals 2002 can be disposed at various locations and can include different sizes and shapes to prevent ingress of contaminants into the receptacle connector, such as, fluids, dust, liquids, and other materials that can degrade or impede the functionality of the plug connector and the receptacle connector. The seals 2002 can be affixed to any surface of the plug connector and/or the receptacle connector. For example, the seals 2002 can be molded, adhered, welded, fastened, or otherwise secured to a surface of the plug connector and/or the receptacle connector.

Figure 23A:
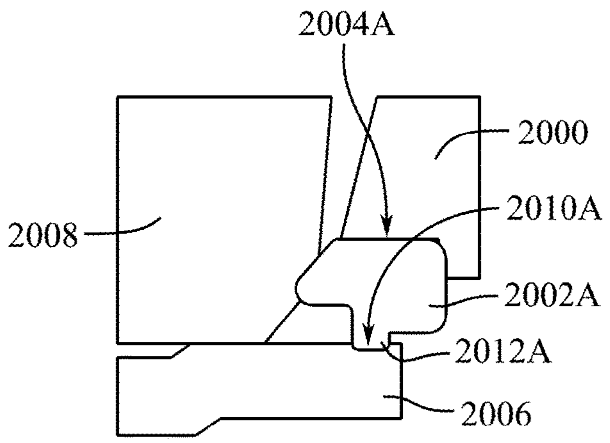
FIGS. 23A through 23G show sectional side views of a receptacle connector, a plug connector, and seals between the receptacle connector and the plug connector.

FIG. 23A shows a seal 2002A disposed vertically between the base 2006 and the raised portion 2000 and horizontally between the raised portion 2000 and the central member 2008. The seal 2002A can include a triangular portion that interfaces with the central member 2008. An opening 2004A can be provided in the raised portion 2000 and the seal 2002A can be disposed in the opening 2004A. The seal 2002A can include a protrusion 2012A that interfaces with an opening 2010A of the base 2006. The protrusion 2012A can be generally rectangular. The seal 2002A can be attached to the raised portion 2000. The seal 2002A can further be attached to the base 2006 through the protrusion 2012A.

Figure 23B:
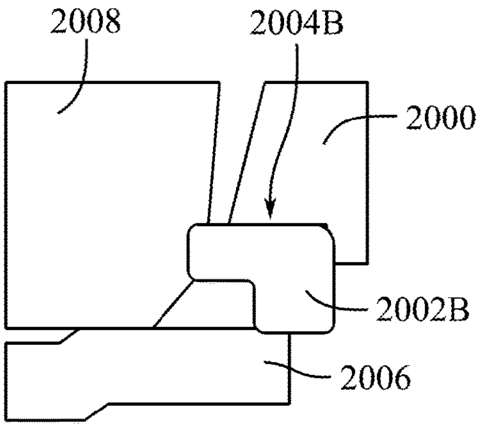

FIG. 23B shows a seal 2002B disposed vertically between the base 2006 and the raised portion 2000 and horizontally between the raised portion 2000 and the central member 2008. The seal 2002B can be generally L-shaped, with a rectangular portion interfacing with the central member 2008. An opening 2004B can be provided in the raised portion 2000 and the seal 2002B can be disposed in the opening 2004B. The seal 2002B can be attached to the raised portion 2000.

Figure 23C:
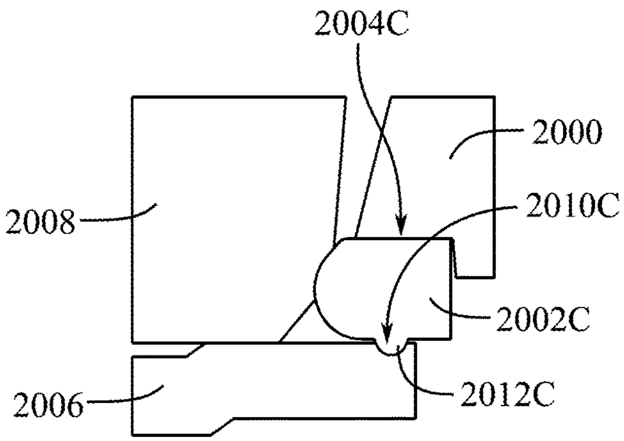

FIG. 23C shows a seal 2002C disposed vertically between the base 2006 and the raised portion 2000 and horizontally between the raised portion 2000 and the central member 2008. The seal 2002C can include a rounded portion that interfaces with the central member 2008. An opening 2004C can be provided in the raised portion 2000 and the seal 2002C can be disposed in the opening 2004C. The seal 2002C can include a protrusion 2012C that interfaces with an opening 2010C of the base 2006. The protrusion 2012C can be generally rounded. The seal 2002C can be generally D-shaped. The seal 2002C can be attached to the raised portion 2000. The seal 2002C can further be attached to the base 2006 through the protrusion 2012C.

Figure 23D:
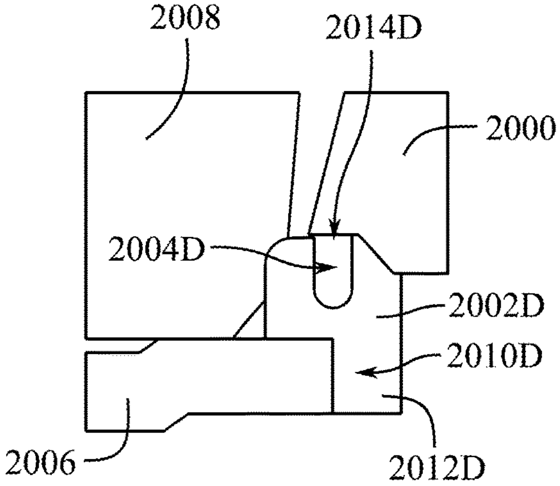

FIG. 23D shows a seal 2002D disposed vertically between the base 2006 and the raised portion 2000 and horizontally between the raised portion 2000 and the central member 2008. The seal 2002D can further extend vertically below a top surface of the base 2006 and laterally adjacent the base 2006 in a direction opposite the central member 2008. The seal 2002D can include a rounded/generally rectangular portion that interfaces with the central member 2008. An opening 2004D can be provided in the raised portion 2000 and the seal 2002D can be disposed in the opening 2004A. The seal 2002A can include a protrusion 2012D that interfaces with an opening 2010D of the base 2006. The opening 2010D of the base can be laterally opposite the central member 2008. The seal 2002D can further include an opening 2014D disposed therein, which can be generally U-shaped. The opening 2014D can provide additional flexibility to the seal 2002D and can improve sealing between the central member 2008 and the receptacle connector. The seal 2002D can be attached to the base 2006 through the protrusion 2012D in the opening 2010D. The seal 2002D can further be attached to the raised portion 2000.

Figure 23E:
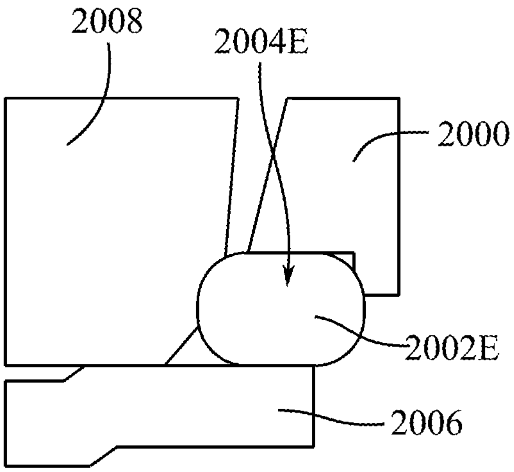

FIG. 23E shows a seal 2002E disposed vertically between the base 2006 and the raised portion 2000 and horizontally between the raised portion 2000 and the central member 2008. The seal 2002E can include a rounded portion that interfaces with the central member 2008. An opening 2004E can be provided in the raised portion 2000 and the seal 2002E can be disposed in the opening 2004E. The seal 2002E can be generally stadium-shaped, or rectangular with rounded corners. The seal 2002E can be attached to the raised portion 2000. The seal 2002E can further be attached to the base 2006.

Figure 23F:
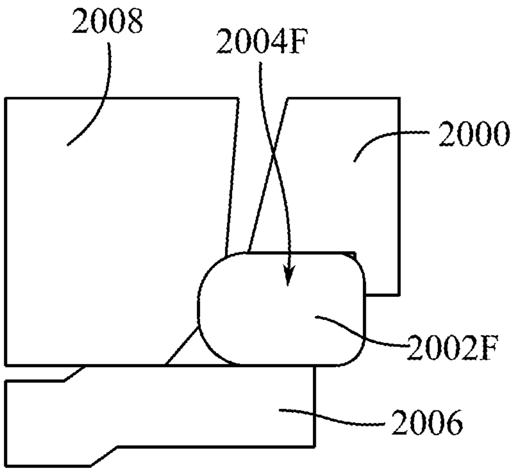

FIG. 23F shows a seal 2002F disposed vertically between the base 2006 and the raised portion 2000 and horizontally between the raised portion 2000 and the central member 2008. The seal 2002F can include a rounded portion that interfaces with the central member 2008. An opening 2004F can be provided in the raised portion 2000 and the seal 2002F can be disposed in the opening 2004F. The seal 2002F can be generally stadium-shaped, or rectangular with rounded corners. In the example of FIG. 23F, corners of the seal 2002F proximal the central member 2008 are more rounded relative to corners of the seal 2002F distal the central member 2008. The seal 2002F can be attached to the raised portion 2000. The seal 2002F can further be attached to the base 2006.

Figure 23G:
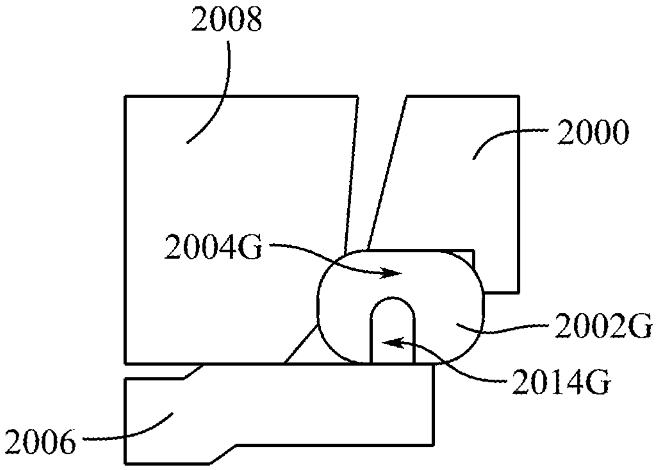

FIG. 23G shows a seal 2002G disposed vertically between the base 2006 and the raised portion 2000 and horizontally between the raised portion 2000 and the central member 2008. The seal 2002G can include a rounded portion that interfaces with the central member 2008. An opening 2004G can be provided in the raised portion 2000 and the seal 2002G can be disposed in the opening 2004G. The seal 2002G can be generally stadium-shaped, or rectangular with rounded corners. In the example of FIG. 23G, the seal 2002E further includes an opening 2014G in a bottom surface thereof, adjacent to the base 2006. The opening 2014G can provide improved flexibility to the seal 2002G. The seal 2002G can be attached to the raised portion 2000. The seal 2002G can further be attached to the base 2006.

While FIGS. 23A through 23G only depict a single seal 2002 in each example disposed between the central member 2008 and the raised portion 2000 and the base 2006 of a receptacle connector, other examples can include multiple seals, each disposed at one of a plurality of positions within the receptacle connector and/or the central member. The seals 2002 of FIGS. 23A through 23G can be used in addition to or in place of any of the seals discussed above, such as the seals discussed with respect to FIGS. 22A through 22E.

Figure 24A:
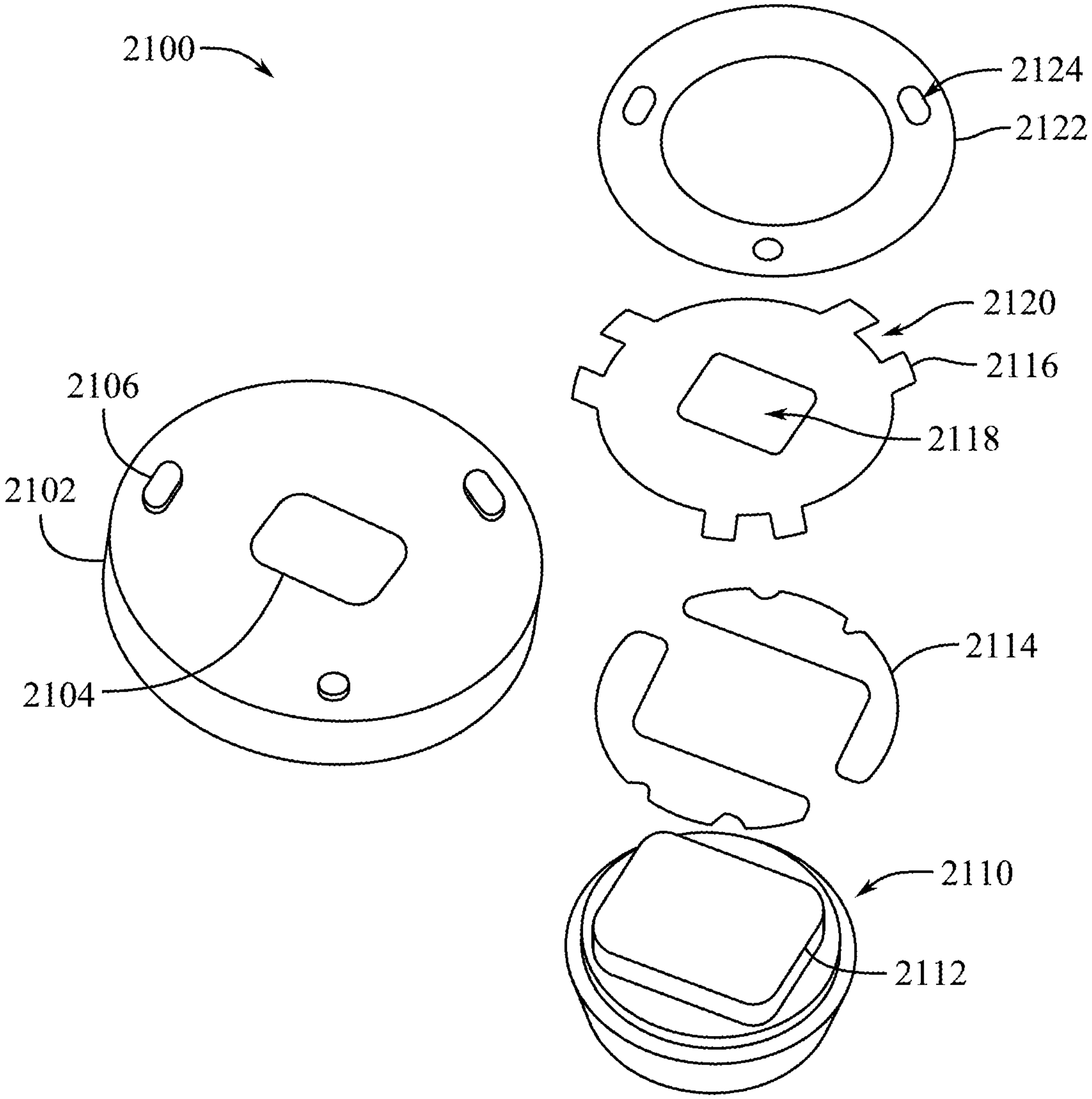
FIGS. 24A and 24B show exploded views of receptacle connectors.
Figure 24B:
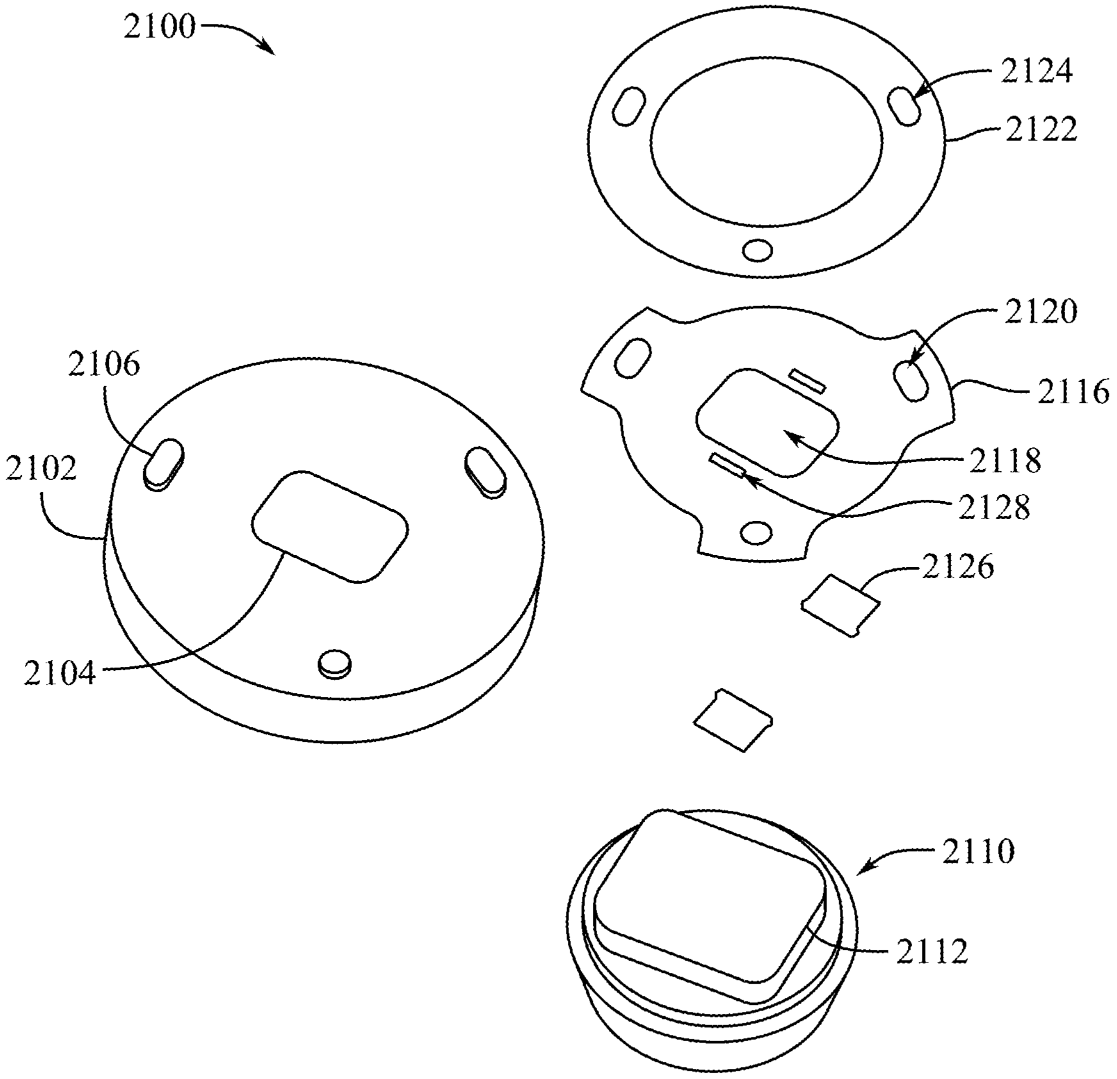

FIGS. 24A and 24B show exploded views of a receptacle connector 2100. The receptacle connector 2100 includes a base 2102, a raised portion 2110, mounting clips 2114, a lower mounting ring 2116, and an upper mounting ring 2122. The mounting clips 2114, the lower mounting ring 2116, and the upper mounting ring 2122 can affix the raised portion 2110 to the base 2102. For example, the upper mounting ring 2122 and the lower mounting ring 2116 can be coupled to the base 2102. The base 2102 can include protrusions 2106 and a raised electronic component 2104. The upper mounting ring 2122 can include openings 2124 configured to receive the protrusions 2106 of the base 2102. The lower mounting ring 2116 can include openings 2120 configured to receive the protrusions 2106 of the base 2102. The openings 2124 and the openings 2120 can have shapes corresponding to shapes of the protrusions 2106 (e.g., capsule shapes, rounded shapes, rectangular shapes, or the like). The lower mounting ring can further include an opening 2118 configured to receive the raised electronic component 2104 of the base 2102. The opening 2118 can have a shape corresponding to a shape of the raised electronic component 2104 (e.g., a capsule shape, a rounded shape, a rectangular shape, or the like).

The mounting clips 2114 can be configured to receive a raised component 2112 of the raised portion 2110. Each of the mounting clips 2114 can be generally L-shaped, with an outer surface of the mounting clips 2114 being rounded. Central portions of the mounting clips 2114 can receive the raised component 2112. The lower mounting ring 2116 and the upper mounting ring 2122 can be affixed to the base 2102, and the mounting clips 2114 can affix the raised component 2112 of the raised portion 2110 to the lower mounting ring 2116, the upper mounting ring 2122, and the base 2102. The upper mounting ring 2122 and the lower mounting ring 2116 can be affixed to the base 2102, the mounting clips 2114 can be affixed to the raised component 2112, and the raised portion 2110 can be affixed to the base 2102 by adhesives, adhesive tapes, fasteners, welding, a combination thereof, or any other mechanism from permanently or temporarily securing the various components to one another.

In the example of FIG. 24B, the mounting clips 2114 are replaced by mounting clips 2126. The mounting clips 2126 interface with openings 2128 in the lower mounting ring 2116 to attach the raised portion 2110 to the base 2102 through the lower mounting ring 2116.

Figure 25A:
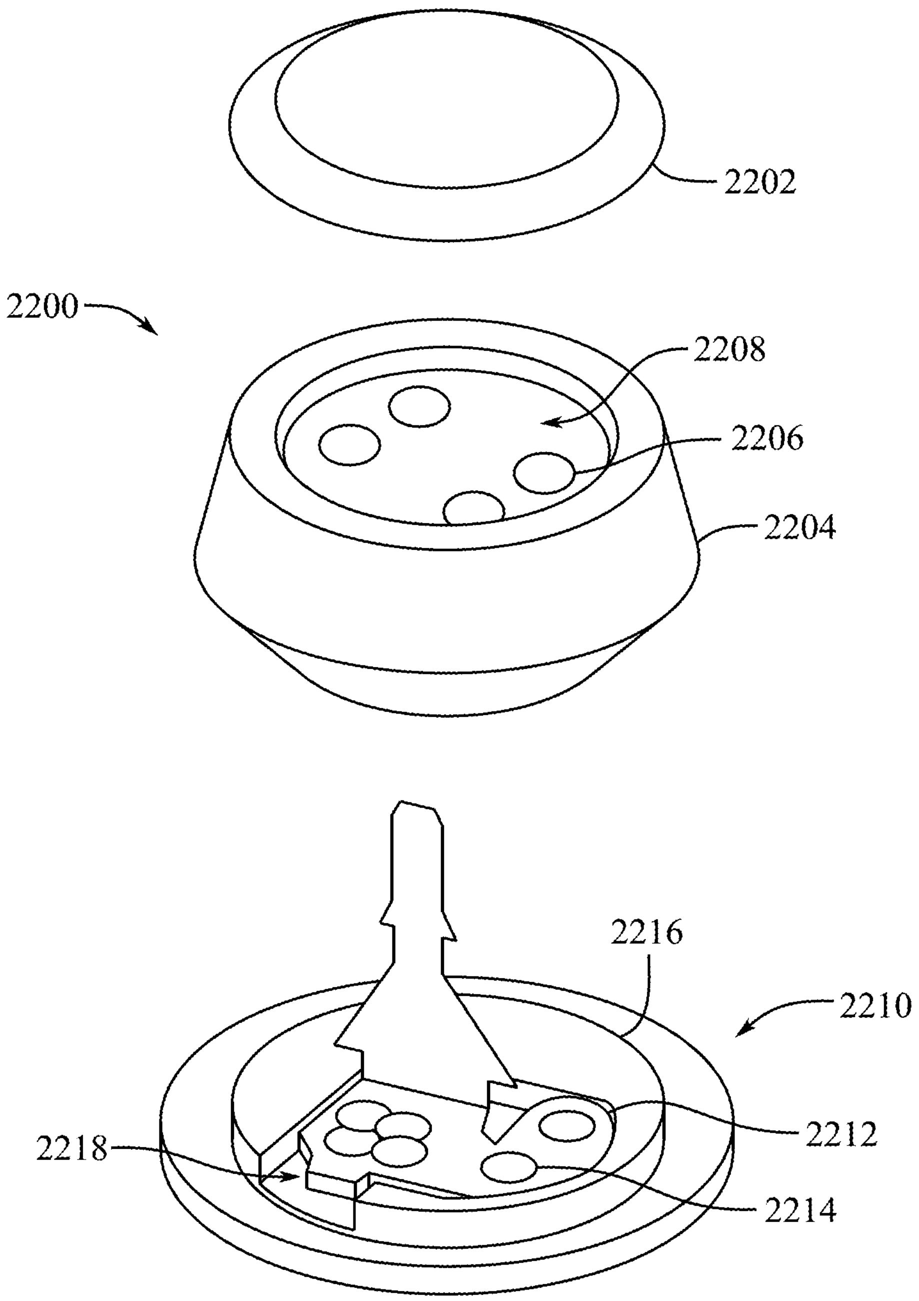
FIGS. 25A and 25B show exploded views of receptacle connectors.
Figure 25B:
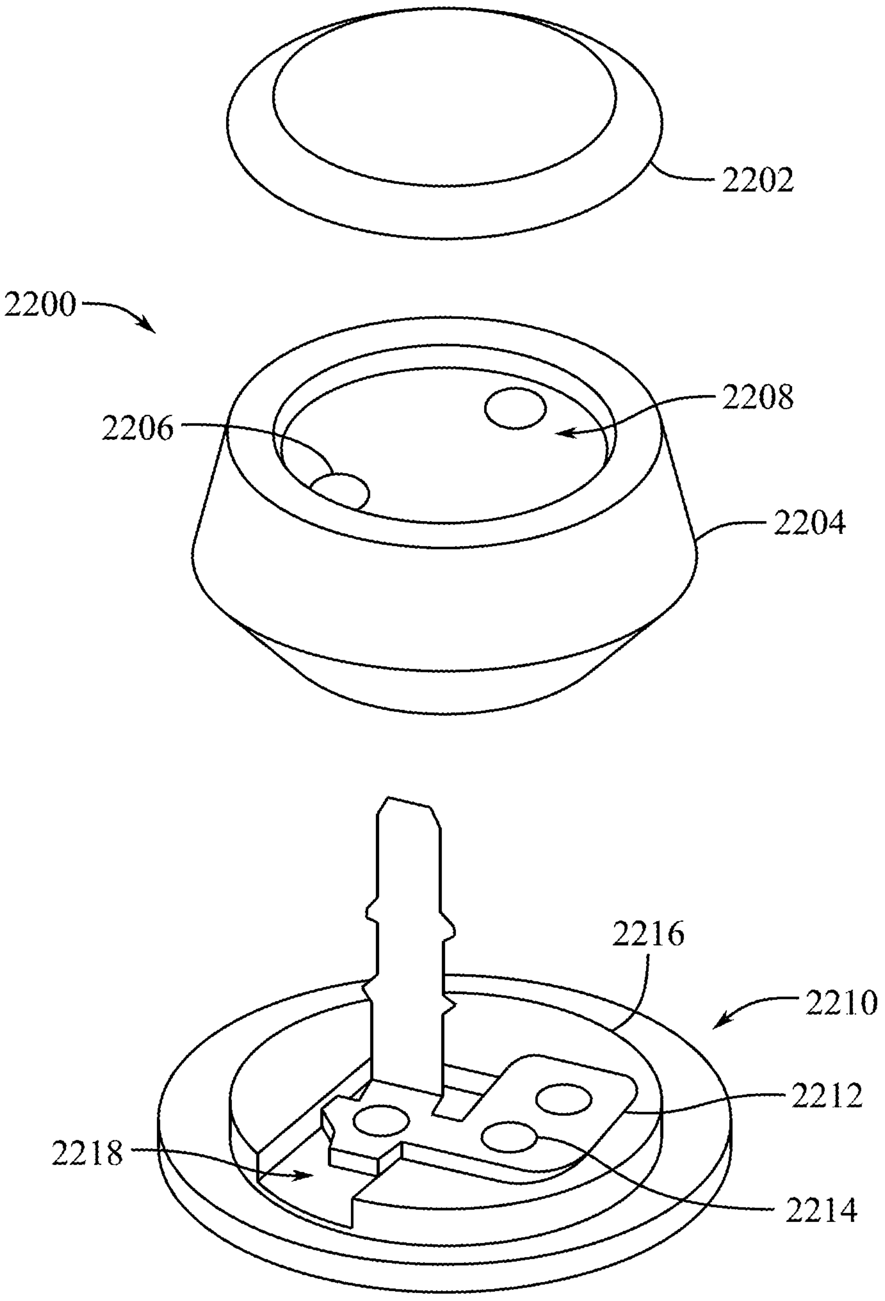

FIGS. 25A and 25B show exploded views of a receptacle connector 2200. The receptacle connector 2200 includes a base 2210 and a raised portion that includes a body 2204 and a cap 2202. The base includes a contact tab 2212 with contacts 2214 disposed in an opening 2218 in a raised portion 2216 of the base 2210. In the example of FIG. 25A, the contact tab 2212 is relatively wider and includes a greater number of contacts, such as six contacts. In the example of FIG. 25B, the contact tab 2212 is relatively narrower and includes a lower number of contacts, such as three contacts. Any number of contacts and appropriate width of the contact tab 2212 can be provided. Providing the contact tab 2212 with a greater width and a greater number of contacts improves the strength of the connection between the body 2204 and the base 2210 and provides for more electrical connections between the receptacle connector 2200 and other electronic components, such as a plug connector.

FIGS. 25A and 25B further illustrate different configurations of contacts 2206 included in an opening 2208 in the body 2204. In the example of FIG. 25A, four contacts 2206 are included in the opening 2208 in the body 2204. In the example of FIG. 25B, two contacts 2206 are included in the opening 2208 in the body 2204. Any number of contacts 2206 can be provided. Providing a greater number of the contacts 2206 in the body 2204 provides for more electrical connections between the receptacle connector 2200 and other electronic components, such as a plug connector.

FIGS. 26A through 40B illustrate various examples of receptacle connectors and plug connectors that can be used as the plug connectors 144 of the cable assembly 140 and the receptacle connectors 132 of the second electronic device 130 illustrated in FIGS. 1A and 1B.

Figure 26A:
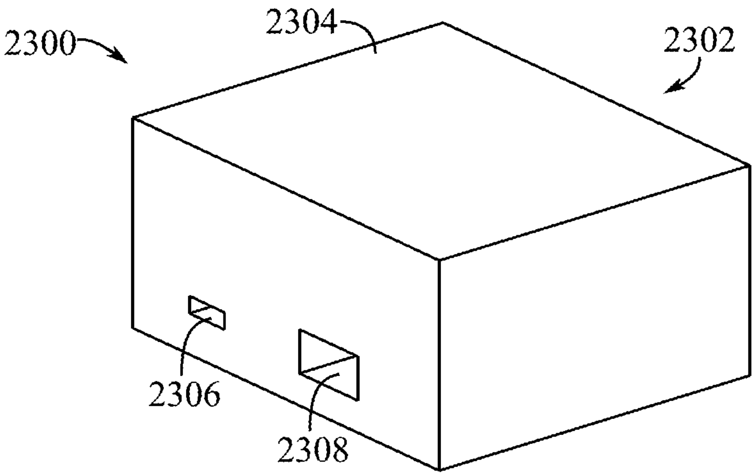
FIG. 26A shows a perspective view of an electronic device.

FIG. 26A shows an electronic device 2300 having a housing 2302 forming an external surface 2304 of the electronic device 2300. The housing 2302 can form or define one or more apertures 2306, 2308. Each of the one or more apertures 2306, 2308 can receive a connector of an electrical cord or cable (see cable 2310 of FIG. 26B) to electrically couple the electronic device 2300 to another electronic device (not shown) and/or a power source (e.g., a wall-mounted electrical outlet).

The electronic device 2300 can be a smart phone, a laptop, a tablet computing device, a smart watch, a head-mounted display (HMD), a pair of headphones, a combination thereof, or any other electronic device. Alternatively, or additionally, the electronic device 2300 can be a sub-component or an accessory to one or more of the electronic devices previously listed above, such as, an external power supply or electrical power source, a display, a user interface, an audio component or speaker, or a combination thereof. As such, the electronic device 2300 can be electrically and/or communicatively coupled to one or more other electronic devices (not shown) via electrical receptacle connectors or ports disposed within the one or more apertures 2306, 2308.

The housing 2302 can define a cavity or volume wherein one or more electronic components can be disposed. For example, the one or more electrical components disposed within the housing 2302 can be a battery (e.g., a lithium battery pack), a processor, a wireless communication module, one or more antennas, or any other component or assembly housed within portable electronic devices. In some examples, the one or more electronic components can be electrically coupled to a receptacle connector (see receptacle connector 2424 in FIG. 27A) accessible by a cable or cord inserted into one of the apertures 2306, 2308. For example, the one or more electronic components can provide electrical power to the receptacle connector and the cable or cord can transfer the electrical power to another electronic device (i.e., the electronic device 2300 can be a power source or external battery electrically coupled to a portable electronic device). The housing 2302 can be molded, machined, cast, stamped, or otherwise assembled from a metal, polymer, ceramic, or combination thereof.

The aperture 2306 can be formed within or defined by the external surface 2304 of the housing 2302. The aperture 2306 can be sized and shaped to receive and retain a plug connector of a cable (see cable 2310 in FIG. 26B). In some examples, a cable operably coupled to a receptacle connector within the aperture 2306 can transfer electrical power to the electronic device 2300 while the plug connector is disposed within the aperture 2306. In other words, a receptacle connector within the aperture 2306 can be configured to receive electrical power (e.g., from a wall-mounted electrical outlet) and deliver the electrical power to the one or more components within the housing 2302 (e.g., charging a battery disposed within the housing 2302).

The aperture 2308 can be formed within or defined by the external surface 2304 of the housing 2302. The aperture 2308 can be sized and shaped to receive a plug connector of a cable. In some examples, a cable operably coupled to a receptacle connector within the aperture 2308 can transfer electrical power from the electronic device 2300 while the plug connector is disposed within the aperture 2308. In other words, the receptacle connector within the aperture 2308 can be configured to deliver or provide electrical power from the one or more components within the housing 2302 to a portable electronic device electrically coupled to the cable.

Figure 26B:
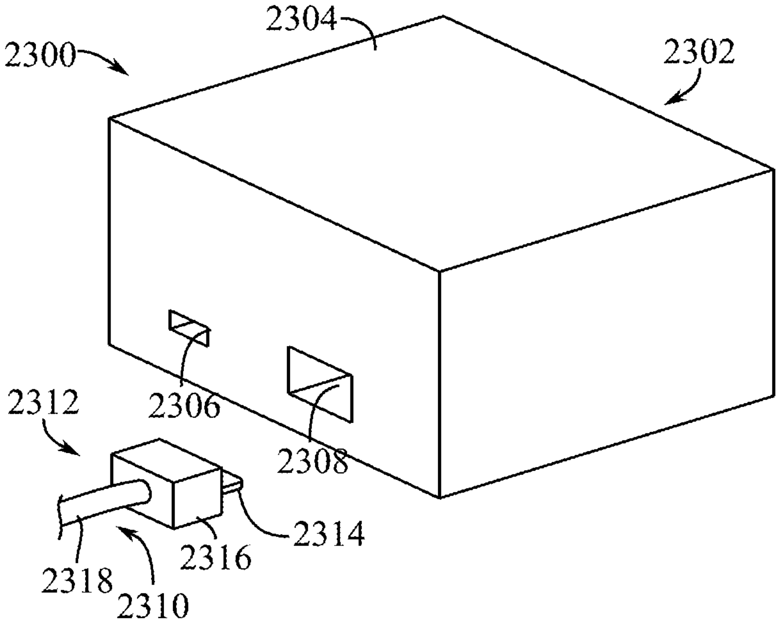
FIG. 26B shows a perspective view of the electronic device of FIG. 26A and a plug connector.

While the apertures 2306, 2308 are shown as being positioned on a particular side of the housing 2302, the apertures 2306, 2308 can be formed or otherwise positioned at any location on the external surface 2304 of the housing 2302. Similarly, while the apertures 2306, 2308 are shown as being disposed adjacent or substantially adjacent to one another, in some examples, the apertures 2306, 2308 can be formed or otherwise positioned at nonadjacent locations on the external surface 2304 of the housing 2302 (e.g., on opposite sides of the housing 2302). While the apertures 2306, 2308 are depicted as having different dimensions (i.e., the aperture 2306 is illustrated as being relatively smaller than the aperture 2308), the apertures 2306, 2308 can have the same dimensions or substantially similar dimensions to one another in some examples. While two apertures (e.g., apertures 2306, 2308) are shown in FIGS. 26A and 26B, some examples can have more or fewer apertures. For example, the housing 2302 can form a single aperture which is operable to provide electrical power and/or signals to a portable electronic device and also operable to receive electrical power and/or signals (e.g., from a portable electronic device and/or a wall-mounted electrical outlet). In some examples, the housing 2302 can form two apertures, such as a first aperture operable to provide electrical power and/or signals to a portable electronic device and also operable to receive electrical power and/or signals (e.g., from a portable electronic device and/or a wall-mounted electrical outlet), and a second aperture operable to receive a tool that can be used to remove a cable from the first aperture.

FIG. 26B shows the electronic device 2300 and a cable 2310 receivable within one or more of the apertures 2306, 2308. The cable 2310 can have a plug connector 2312 having a plug 2314 and a boot 2316. The plug connector 2312 can be electrically coupled to a length of shielded wire 2318. The shielded wire 2318 can be one or more wires (e.g., metallic wires capable of transferring electrical signals and/or electrical power). The one or more wires can be individually shielded or collectively shielded. The shielding can prevent each of the one or more wires from contacting one another. Additionally, or alternatively, the shielding can prevent or limit the influence of electromagnetic waves on each of the one or more wires. The plug connector 2312 can be received within one of the apertures 2306, 2308 to electrically couple the cable 2310 with the electronic device 2300. For example, the plug 2314 can be inserted within a receptacle connector (e.g., receptacle connector 2424 of FIG. 27A) disposed within the housing 2302 of the electronic device 2300 to enable transfer of electrical power and/or signals relative to the electronic device 2300. The boot 2316 can be inserted within a trim ring (e.g., trim ring 2422 of FIG. 27A) disposed within the housing 2302 of the electronic device 2300, between the receptacle connector and the housing 2302. One or more of the plug 2314, the boot 2316, the apertures 2306, 2308, the receptacle connector, and the trim ring can include one or more engagement features that retain the plug connector 2312 to the electronic device 2300. The mechanisms and components capable of inter coupling the cable 2310 and the electronic device 2300 will be discussed in greater detail below with reference to FIGS. 27A through 40B.

Figure 27A:
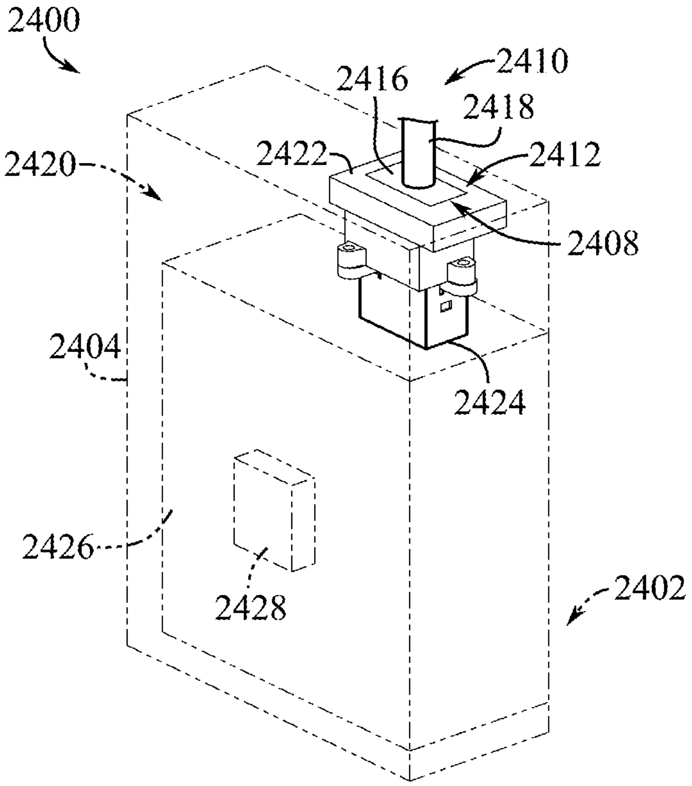
FIG. 27A shows a perspective view of a plug connector inserted into an electronic device.

FIG. 27A shows an electronic device 2400 and a cable 2410. The electronic device 2400 can be substantially similar to, and can include some or all of, the features of the electronic device 2300. For example, the electronic device 2400 can include a housing 2402 forming a cavity or volume 2420. One or more electronic components can be disposed within the volume 2420. For example, the one or more electronic components disposed within the volume 2420 can include a trim ring 2422 and a receptacle connector 2424 operably coupled to a battery 2426, a processor 2428, a combination thereof, or any other electronic component. The trim ring 2422 and the receptacle connector 2424 can form an electrical port disposed within the volume 2420. In some examples, an external surface 2404 of the housing 2402 can form an aperture 2408 capable of receiving a plug connector 2412 of the cable 2410. The trim ring 2422 can be positioned adjacent the aperture 2408 such that a boot 2416 of the plug connector 2412 is disposed within the trim ring 2422. The receptacle connector 2424 can be positioned adjacent the trim ring 2422 such that a plug of the plug connector 2412 is disposed within the receptacle connector 2424. The trim ring 2422 and the receptacle connector 2424 will be discussed in detail below with reference to FIG. 27B.

Figure 27B:
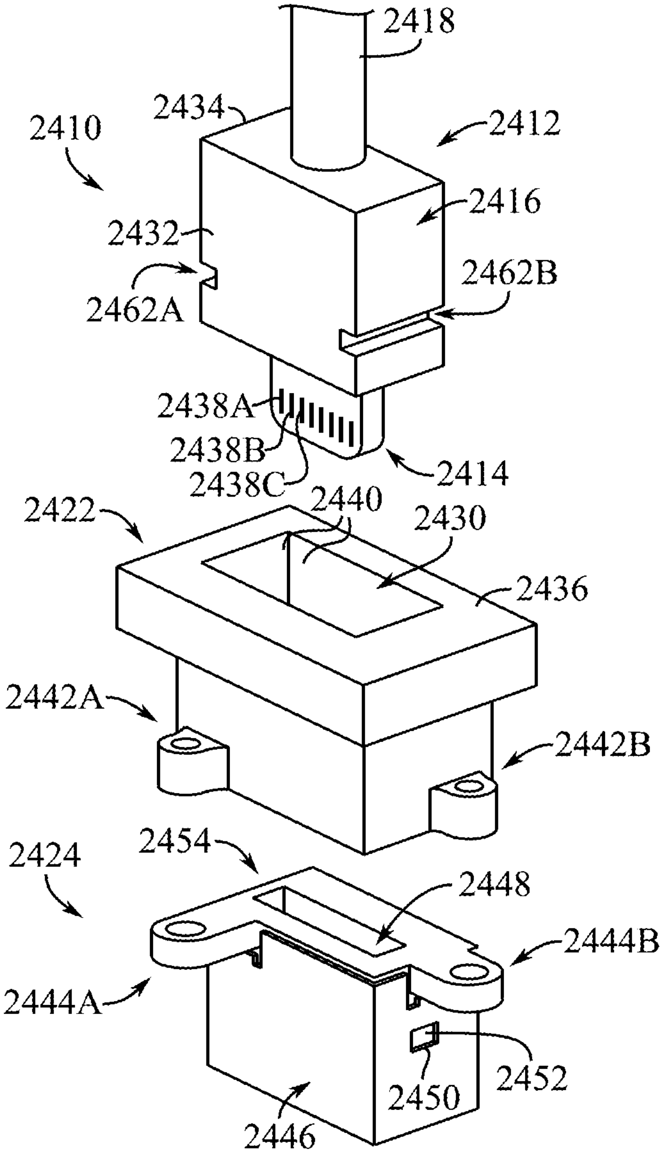
FIG. 27B shows a partially exploded view of the plug connector of FIG. 27A, a trim ring, and a receptacle connector.

FIG. 27B shows a partially exploded view of the cable 2410, the trim ring 2422, and the receptacle connector 2424. The cable 2410 can be substantially similar to, and can include some or all of, the features of the cable 2310. For example, the cable 2410 can include the plug connector 2412 having a plug 2414 and a boot 2416. The plug connector 2412 can be electrically coupled to a length of shielded wire 2418.

In some examples, the boot 2416 can be sized or otherwise shaped to be at least partially receivable within a cavity 2430 formed within the trim ring 2422. In some examples, the boot 2416 can be sized or otherwise shaped to be at least partially receivable within the cavity 2430 of the trim ring 2422 and partially receivable within the aperture 2408 of the housing 2402. The cavity 2430 can be shaped as cubic, cylindrical, triangular, or any other geometric shape. The boot 2416 can form a corresponding geometric shape, which can be inserted or otherwise positioned within the cavity 2430. In some examples, the boot 2416 can be partially disposed within the cavity 2430 such that a portion of the boot 2416 protrudes from the cavity 2430. In some examples, the boot 2416 can be entirely surrounded or substantially surrounded by the trim ring 2422 and within the cavity 2430, such that a wire-side surface 2434 of the boot 2416 adjacent the shielded wire 2418 is flush or substantially flush with a surface 2436 of the trim ring 2422 adjacent the cavity 2430. In some examples, the surface 2432 of the boot 2416 can be disposed within the cavity 2430 of the trim ring 2422 such that the wire-side surface 2434 is flush or substantially flush with the external surface 2404 of the housing 2402 and the boot 2416 is substantially concealed or hidden within the cavity 2430 of the trim ring 2422. In some examples, while the boot 2416 is disposed within the cavity 2430, the boot 2416 can be substantially covered by the trim ring 2422. This prevents the boot 2416 from being gripped (e.g., by a user) and pulled from the trim ring 2416. In other words, a substantial portion of the boot 2416 can be disposed within the cavity 2430 such that the boot 2416 is inaccessible to grasp to pull the plug connector 2412 from the trim ring 2422 and the receptacle connector 2424.

The plug 2414 can include one or more electrical contacts 2438A, 2438B, and 2438C, which can provide electrical signals, electrical power, a grounding path, another electrical communication, or a combination thereof between the shielded wire 2418 and the receptacle connector 2424.

The trim ring 2422 can be molded, machined, cast, stamped, or otherwise manufactured from a metal, polymer, ceramic, or combination thereof. For example, the trim ring 2422 can be molded or co-molded from a thermoplastic or other polymer. The cavity 2430 formed within the trim ring 2422 can be at least partially defined by internal walls 2440. In some examples, the boot 2416 can contact one or more of the internal walls 2440 while the boot 2416 is positioned within the cavity 2430 such that the boot 2416 is at least partially retained within the cavity 2430 by a frictional engagement between the boot 2416 and the internal walls 2440.

In some examples, the receptacle connector 2424 can be adhered, molded, welded, fastened, or otherwise affixed to the trim ring 2422. For example, the receptacle connector 2424 can define one or more receptacle apertures 2444A, 2444B, which correspond to and align with respective trim ring apertures 2442A, 2442B of the trim ring 2422. A respective fastener (not shown) can be disposed within the receptacle aperture 2444A and the trim ring aperture 2442A to couple the receptacle connector 2424 to the trim ring 2422. Similarly, a respective fastener (not shown) can be disposed within the receptacle aperture 2444B and the trim ring aperture 2442B to couple the receptacle connector 2424 to the trim ring 2422. The fastener can be a pin, rivet, screw, bolt, a combination thereof, or any other fastener.

The boot 2416 can be molded, machined, cast, stamped, or otherwise manufactured from a metal, polymer, ceramic, or combination thereof. As illustrated in FIG. 27B, the boot 2416 can include recesses 2462A and 2462B formed in opposite sides of the boot 2416. The recesses 2462A and 2462B can be machined, molded, etched, or otherwise recessed into an exterior surface of the boot 2416. In the example of FIG. 27B, the recesses 2462A and 2462B extend along only a portion of the periphery of the boot 2416. For example, the recesses 2462A and 2462B can extend along one or more sides of the boot 2416 (e.g., two sides in the example of FIG. 27B). In some examples, recesses can extend along an entire periphery of the boot 2416. In other words, the recesses can form a channel encircling the boot 2416. The recesses 2462A and 2462B can be formed between a plug-side surface and a wire-side surface of the boot 2416. In some examples, the recesses 2462A and 2462B can extend parallel to and between the plug-side surface and the wire-side surface of the boot 2416. The recesses 2462A and 2462B can be included to interface with structures of the trim ring 2422 in order to retain the boot 2416 and the plug connector 2412 within the channel 2430. The trim ring 2422 and the boot 2416 will be discussed in greater detail below with reference to FIGS. 28A through 28F.

In some examples, the receptacle connector 2424 can include an exterior portion 2446 and an interior portion 2448. For example, the exterior portion 2446 can at least partially encompass the interior portion 2448. In other words, the exterior portion 2446 can act as a sleeve or shell that at least partially surrounds the interior portion 2448. The exterior portion 2446 and interior portion 2448 can be interlocked or affixed to one another. For example, the exterior portion 2446 can include a through-hole 2450 that receives a protrusion 2452 of the interior portion 2448 when the interior portion 2448 is affixed within the exterior portion 2446. In some examples, the receptacle connector 2424 can be formed from a singular or monolithic structure instead of the external portion 2446 and the internal portion 2448. The receptacle connector 2424 can form a slot 2454 capable of receiving and retaining the plug 2414.

Figure 28A:
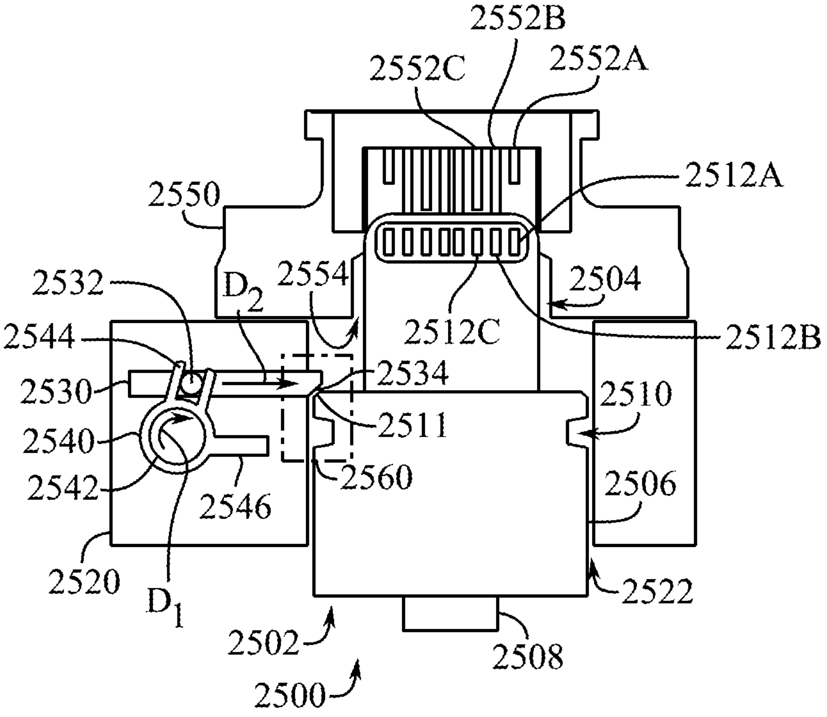
FIG. 28A shows a sectional view of a plug connector being inserted into a trim ring and a receptacle connector.

FIG. 28A shows sectional views of a cable assembly 2500 including a plug connector 2502 received within an opening 2522 of a trim ring 2520 and a slot 2554 of a receptacle connector 2550. In some examples, one or more internal contacts 2512A, 2512B, 2512C are disposed within the slot 2554 of the receptacle connector 2550 such that the contacts 2512A, 2512B, 2512C of the plug connector 2502 touch or otherwise engage internal contacts 2552A, 2552B, 2552C positioned within the slot 2554. In some examples, the internal contacts 2552A, 2552B, 2552C disposed within the slot 2554 can be one or more metal prongs biased to engage the contacts 2512A, 2512B, 2512C while the plug connector 2502 is disposed within the slot 2554. The internal contacts 2552A, 2552B, 2552C can be electrically connected to a printed circuit board (PCB), a processor, one or more wires, a combination thereof, or another component positioned within the housing (e.g., the housing 2302, 2402, discussed above with respect to FIGS. 26A through 27B).

The cable assembly 2500 includes the plug connector 2502 and a shielded cable 2508. The plug connector 2502 includes a boot 2506 having openings 2510 formed in the side surfaces thereof and a plug 2504 including the contacts 2512A, 2512B, 2512C.

In the example of FIGS. 28A through 28F, the trim ring 2520 includes a detent element 2530 that can be configured to interface the recesses 2510 of the boot 2506 in order to retain the plug connector 2502 within the cavity 2522. Although a single detent element 2530 is illustrated in FIGS. 28A through 28F, some examples can include multiple detent elements 2530. For example, in some examples, the trim ring 2520 can include two detent elements 2530 disposed on opposite sides of the plug connector 2502 when the plug connector 2502 is inserted into the cavity 2522. While the plug connector 2502 is disposed within the cavity 2522, the detent element 2530 can be inserted into the recesses 2510 defined in the boot 2506.

FIG. 28A illustrates the plug connector 2502 and the detent element 2530 as the plug connector 2502 is inserted into the cavity 2522. The detent element 2530 includes a protrusion 2532, which is used couple the detent element 2530 to a lever arm 2540. The lever arm 2540 can be included in the trim ring 2520 to apply a force, such as a spring force, to the detent element 2530. The lever arm 2540 can be rotatable around a pivot 2542. A spring (not illustrated in FIG. 28A) can be wrapped around the pivot 2542 to apply a force to the lever arm 2540 in a direction $D_1$. The lever arm 2540 includes protrusions 2544, which interface with the protrusion 2532 of the detent element 2530. The detent element 2530 is physically coupled to the lever arm 2540 through the protrusion 2532 and the protrusions 2544. The lever arm 2540 can apply the force to the detent element 2530 through the protrusions 2544 and the protrusion 2532 in a direction $D_2$ in order to retain the detent element 2530 in an initial position (illustrated in FIG. 28A) prior to the plug connector 2502 being inserted into the cavity 2522. When the plug connector 2502 is further inserted into the cavity 2522 (illustrated in FIG. 28C), the force applied by the lever arm 2540 can cause friction between the detent element 2530 and the boot 2506. Once the plug connector 2502 is fully inserted into the cavity 2522, the force applied by the lever arm 2540 causes the detent element 2530 to slide into one of the recesses 2510 (illustrated in FIG. 28D).

The lever arm 2540 can be rotatable around the pivot 2542 in the direction $D_1$ and a direction $D_3$ (illustrated in FIGS. 28C and 28E) opposite the direction $D_1$. The lever arm 2540 can include the spring, which exerts a force on the lever arm 2540 in the direction $D_1$. The lever arm 2540 can include a protrusion 2546, which can be used to rotate the lever arm 2540 in the direction $D_3$. The detent element 2530 can translate or slide in the direction $D_2$ and a direction $D_4$ (illustrated in FIGS. 28C and 28E) opposite the direction $D_2$.

The detent element 2530 and the boot 2506 of the plug connector 2502 can include sloped portions 2534 and 2511, respectively. The sloped portions 2534 and 2511 are provided in the detent element 2530 and the boot 2506 to allow the boot 2506 and the detent element 2530 to slide over one another as the plug connector 2502 is inserted into the cavity 2522. This reduces the amount of force required to translate the detent element 2530 in the direction $D_4$ as the plug connector 2502 is inserted into the cavity 2522 and reduces the force required to insert the plug connector 2502 into the cavity 2522. The sloped portions 2534 and 2511 of the detent element 2530 and the boot 2506 will be described in detail below with reference to FIG. 28B.

Figure 28B:
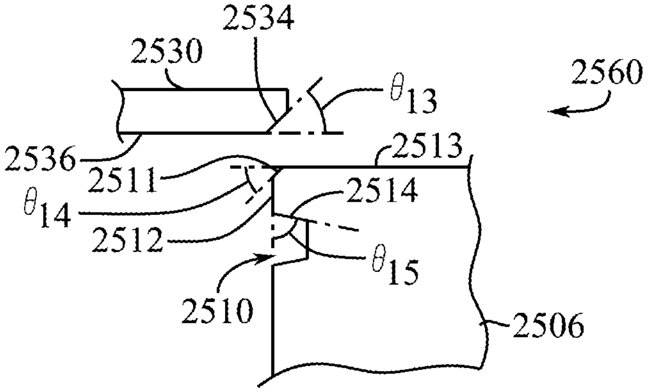
FIG. 28B shows a detail sectional view of the plug connector and a latch of the trim ring of FIG. 28A.

FIG. 28B shows a detail view of the detent element 2530 and the boot 2506. Specifically, FIG. 28B illustrates details of the sloped portions 2534 and 2511 of the detent element 2530 and the boot 2506. FIG. 28B also illustrates details of a sloped portion 2514 of the boot 2506 adjacent the recess 2510.

In the example of FIG. 28B, the detent element 2530 includes the sloped portion 2534 adjacent a linear portion 2536. In some examples, the sloped portion 2534 can be curved, rather than sloped. The linear portion 2536 and the sloped portion 2534 can form a first angle $\theta_{13}$. The first angle $\theta_{13}$ can be less than 90 degrees, such as, between about 89 degrees and about 60 degrees, between about 60 degrees and about 30 degrees, between about 30 degrees and about 5 degrees, or greater than about 5 degrees.

The boot 2506 includes the sloped portion 2511 adjacent a linear portion 2513. In some examples, the sloped portion 2511 can be curved, rather than sloped. The linear portion 2513 and the sloped portion 2511 can form a second angle $\theta_{14}$. The second angle $\theta_{14}$ can be less than 90 degrees, such as, between about 89 degrees and about 60 degrees, between about 60 degrees and about 30 degrees, between about 30 degrees and about 5 degrees, or greater than about 5 degrees. In some examples, the second angle $\theta_{14}$ can be the same as the first angle $\theta_{13}$, or the second angle $\theta_{14}$ can be different from the first angle $\theta_{13}$.

In some examples, a force required to insert the plug connector 2502 into the cavity 2522 can correlate to the first angle $\theta_{13}$ and/or the second angle $\theta_{14}$. For example, a relatively smaller first angle $\theta_{13}$ (e.g., between about 5 degrees and 45 degrees) can cause the force required to insert the plug connector 2502 into the cavity 2522 to be relatively greater. Similarly, a relatively smaller second angle $\theta_{14}$ (e.g., between about 5 degrees and 45 degrees) can cause the force required to insert the plug connector 2502 into the cavity 2522 to be relatively greater. Alternatively, a relatively larger first angle $\theta_{13}$ (e.g., between about 45 degrees and 89 degrees) can cause the force required to insert the plug connector 2502 into the cavity 2522 to be relatively smaller. A relatively larger second angle $\theta_{14}$ (e.g., between about 45 degrees and 89 degrees) can cause the force required to insert the plug connector 2502 into the cavity 2522 to be relatively smaller. In other words, sizes of the first angle $\theta_{13}$ and the second angle $\theta_{14}$ can be chosen to generate a desired force required to insert the plug connector 2502 into the cavity 2522 (i.e., move the detent element 2530 out of the path of the boot 2506 as the plug connector 2502 is inserted into the cavity 2522). The force required to insert the plug connector 2502 into the cavity 2522 can be in a range from about 1 kgf to about 1.2 kgf, in a range from about 1 kgf to about 2 kgf, in a range from about 0.5 kgf to about 5 kgf, in a range from about 0 kgf to about 1 kgf, in a range from about 1 kgf to about 10 kgf, or the like.

In the example of FIG. 28B, the boot 2506 includes the sloped portion 2514 adjacent a linear portion 2512. The sloped portion 2514 defines a side surface of the recess 2510. In some examples, the sloped portion 2514 can be curved, rather than sloped. The linear portion 2512 and the sloped portion 2514 can form a third angle $\theta_{15}$. The third angle $\theta_{15}$ can be less than 90 degrees, such as, between about 89 degrees and about 60 degrees, between about 60 degrees and about 30 degrees, between about 30 degrees and about 5 degrees, or greater than about 5 degrees.

In some examples, a force required to remove the plug connector 2502 from the cavity 2522 can correlate to the third angle $\theta_{15}$. For example, a relatively smaller third angle $\theta_{15}$ (e.g., between about 5 degrees and 45 degrees) can cause the force required to remove the plug connector 2502 from the cavity 2522 to be relatively smaller. Alternatively, a relatively larger third angle $\theta_{15}$ (e.g., between about 45 degrees and 89 degrees) can cause the force required to remove the plug connector 2502 from the cavity 2522 to be relatively greater. In other words, a size of the third angle $\theta_{15}$ can be chosen to generate a desired force required to remove the plug connector 2502 from the cavity 2522 (i.e., move the detent element 2530 out of the path of the boot 2506 as the plug connector 2502 is removed from the cavity 2522). The force required to remove the plug connector 2502 from the cavity 2522 can be in a range from about 5 kgf to about 7 kgf, in a range from about 1 kgf to about 12 kgf, in a range from about 10 kgf to about 20 kgf, in a range from about 5 kgf to about 50 kgf, in a range from about 1 kgf to about 10 kgf, in a range from about 10 kgf to about 100 kgf, or the like.

Figure 28C:
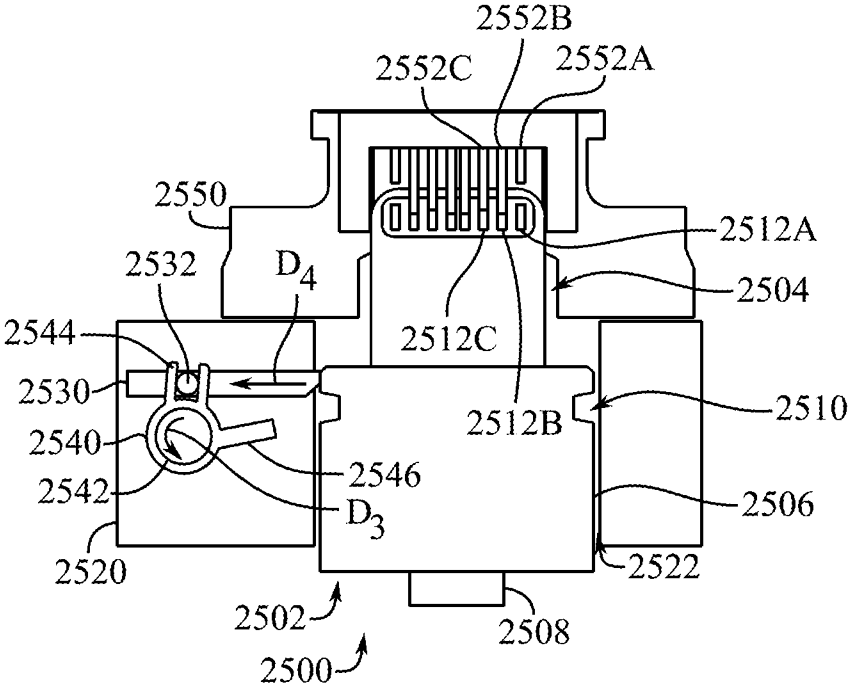
FIG. 28C shows a sectional view of the plug connector being inserted into the trim ring and the receptacle connector of FIG. 28A.

FIG. 28C illustrates the plug connector 2502 and the detent element 2530 as the plug connector 2502 is being inserted into the cavity 2522. As illustrated in FIG. 28C, inserting the boot 2506 into the cavity 2522 causes the detent element 2470 to slide/translate in the direction $D_4$. The movement of the detent element 2530 causes the lever arm 2540 to rotate around the pivot 2542 in the direction $D_3$ through the protrusions 2544 and the protrusion 2532. The spring of the lever arm 2540 causes a force to be applied to the detent element 2530 in the direction $D_2$, which results in friction between the detent element 2530 and the boot 2506 as the plug connector 2502 is inserted into the cavity 2522. The force required to insert the plug connector 2502 into the cavity 2522 can be in a range from about 1 kgf to about 1.2 kgf, in a range from about 1 kgf to about 2 kgf, in a range from about 0.5 kgf to about 5 kgf, in a range from about 0 kgf to about 1 kgf, in a range from about 1 kgf to about 10 kgf, or the like.

Figure 28D:
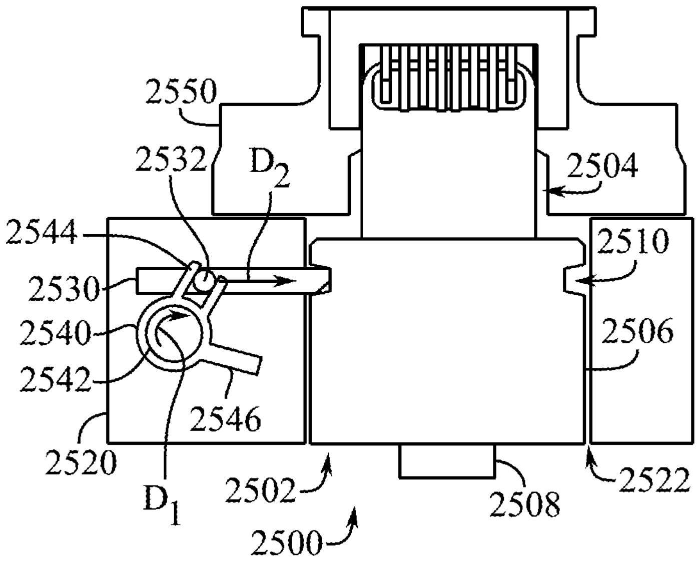
FIG. 28D shows a sectional view of the plug connector inserted into the trim ring and the receptacle connector of FIG. 28A.

FIG. 28D illustrates the plug connector 2502 and the detent element 2530 after the plug connector 2502 has been fully inserted into the cavity 2522. As illustrated in FIG. 28D, the spring of the lever arm 2540 causes a force to be applied to the detent element 2530. This rotates the lever arm 2540 in the direction $D_1$ and translates the detent element 2530 in the direction $D_2$ such that the detent element 2530 slides into the recess 2510. The detent element 2530 can contact a side surface of the boot 2506 when the plug connector 2502 is fully inserted into the cavity 2522 (e.g., the detent element 2530 is fully inserted into the recess 2510). For example, the detent element 2530 can contact a side surface of the boot 2506 adjacent the recess 2510 and the sloped portion 2514.

As described previously, the sloped portion 2514 of the boot 2506 can be configured such that a force required to remove the plug connector 2502 from the cavity 2522 can be in a range from about 5 kgf to about 7 kgf, in a range from about 1 kgf to about 12 kgf, in a range from about 10 kgf to about 20 kgf, in a range from about 5 kgf to about 50 kgf, in a range from about 1 kgf to about 10 kgf, in a range from about 10 kgf to about 100 kgf, or the like. A ratio of the force required to remove the plug connector 2502 from the cavity 2522 to the force required to insert the plug connector 2502 into the cavity 2522 can be in a range from about 1 to about 10, from about 1.5 to about 3, from about 2 to about 4, from about 3 to about 5, from about 1.5 to about 5, or the like. In some examples, the detent element 2530 can also include a sloped portion, which can be configured to interface with the sloped portion 2514 and can reduce the force required to remove the plug connector 2502 from the cavity 2522. As illustrated in FIG. 28D, in some examples, the boot 2506 can be flush with the trim ring 2520 (i.e., an external-facing surface of the boot 2506 can be flush with an external-facing surface of the trim ring 2520) when the plug connector 2502 is disposed within the trim ring 2520.

Figure 28E:
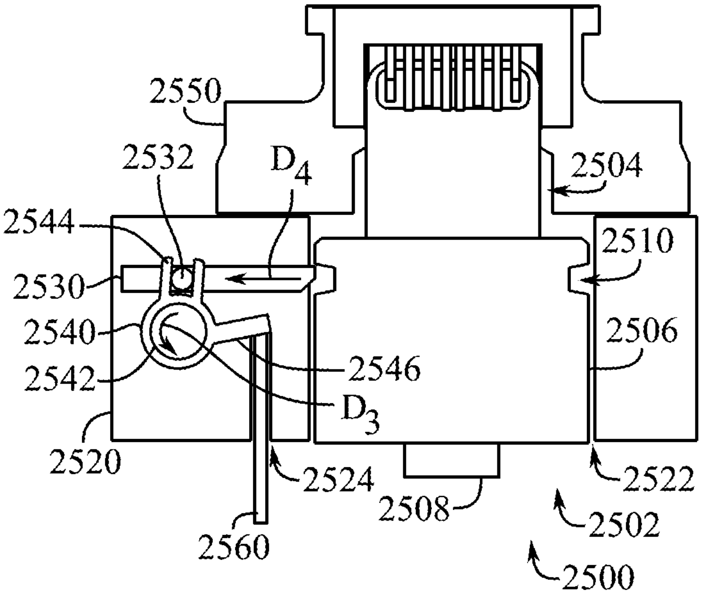
FIG. 28E shows a sectional view of the plug connector being un-latched from the trim ring and the receptacle connector of FIG. 28A.

FIG. 28E illustrates the detent element 2530 and the lever arm 2540 after a tool 2560 is used to release the plug connector 2502. In some examples, the trim ring 2520 can include an aperture 2524 that can receive the tool 2560. The tool 2560 can be shaped as cubic, cylindrical, triangular, or any other geometric shape. The aperture 2524 can form a corresponding geometric shape, into which the tool 2560 can be inserted or otherwise positioned. A user can use the tool 2560 to rotate the lever arm 2540 in the direction $D_3$, which moves the detent element 2530 in the direction $D_4$. This slides the detent element 2530 out of the recess 2510 and allows the plug connector 2502 to be removed from the cavity 2522. Once the detent element 2530 is moved out of the recess 2510, a force required to remove the plug connector 2502 from the cavity 2522 can be in a range from about 1 kgf to about 1.2 kgf, in a range from about 1 kgf to about 2 kgf, in a range from about 0.5 kgf to about 5 kgf, in a range from about 0 kgf to about 1 kgf, in a range from about 1 kgf to about 10 kgf, or the like. A force required to use the tool 2560 to remove the detent element 2530 from the recess 2519 can be in a range from about 1 kgf to about 1.2 kgf, in a range from about 1 kgf to about 2 kgf, in a range from about 0.5 kgf to about 5 kgf, in a range from about 0 kgf to about 1 kgf, in a range from about 1 kgf to about 10 kgf, or the like.

Figure 28F:
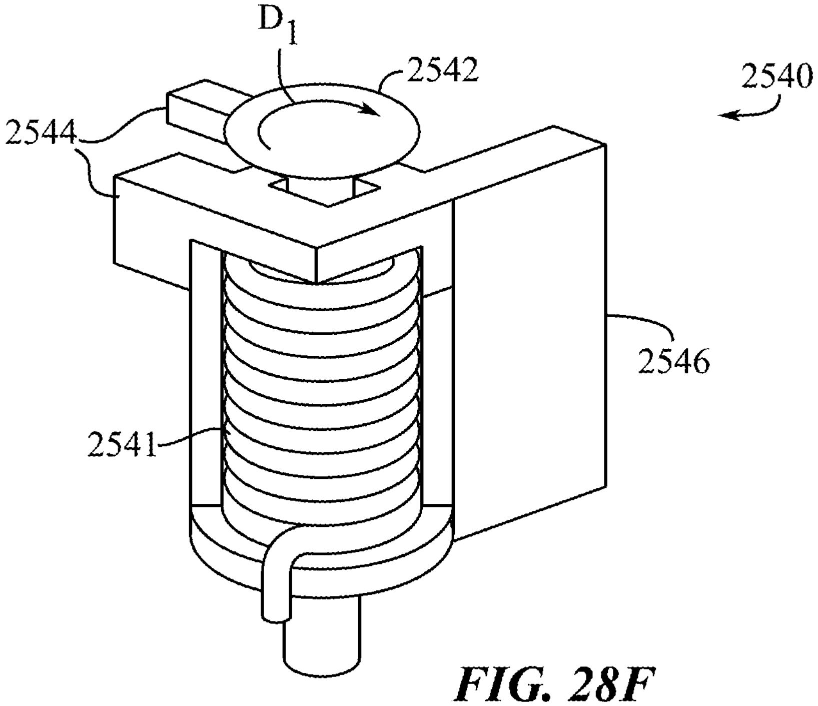
FIG. 28F shows a perspective view of a lever arm of the trim ring of FIG. 28A.

FIG. 28F illustrates a perspective view of the lever arm 2540. As illustrated in FIG. 28F, the lever arm 2540 includes a body portion that is rotatable around a pivot 2542. The pivot 2542 can be a pin, rivet, screw, bolt, a combination thereof, or any other fastener. A spring 2541 is disposed in the body portion and wrapped around the pivot 2542. The spring 2541 is configured to apply a spring force to the body portion of the lever arm 2540 in a direction $D_1$. The body portion of the lever arm 2540 includes protrusions 2544 and a protrusion 2546. The protrusions 2544 can be used to physically interact with a detent element, as discussed previously. The protrusion 2546 can be used to interact with a tool, as discussed previously, and can be used to aid in removing a plug connector from a trim ring.

Providing the detent element 2530 and the lever arm 2540 to retain the plug connector 2502 in the cavity 2522 allows the plug connector 2502 to be inserted into the cavity 2522 with a relatively small force and requires a relatively large force to remove the plug connector 2502 from the cavity 2522. This prevents the plug connector 2502 from unwantedly or accidentally being disconnected from an electronic device. Moreover, by providing the aperture 2524 and the tool 2560, the plug connector 2502 can be easily removed when desired.

FIGS. 29A through 29E illustrate seals 2626 that can be included in a trim ring 2620 for providing sealing between the trim ring 2620 and a boot 2606 of a plug connector 2602 of a cable assembly 2600. The cable assembly 2600 includes the plug connector 2602 and a shielded cable 2608 coupled to the plug connector 2602. The plug connector 2602 includes a plug 2604 and the boot 2606 coupled to the plug 2604 and the shielded cable 2608.

The plug connector 2602 can be received in a cavity 2622 of an enclosure 2610 and the trim ring 2620. The trim ring 2620 can be coupled to the enclosure 2610, and a receptacle connector 2650 can be coupled to the trim ring 2620. The trim ring 2620 can include a detent element 2630 and a lever arm 2640. The detent element 2630 can include a protrusion 2632 configured to interface with the lever arm 2640. The detent element 2630 can be configured to interface with openings 2609 in the boot 2606 to fasten the plug connector 2602 in the cavity 2622. The lever arm 2640 can be rotatable around a pivot 2642 and can include protrusions 2644 configured to interface with the protrusion 2632 of the detent element 2632. The lever arm 2640 can further include a protrusion 2646 configured to interface with a tool 2660 in order to un-fasten the plug connector 2602 from the cavity 2622. An aperture 2624 can be provided in the trim ring 2620 and the enclosure 2610 in order to provide access to the tool 2660. As such, the tool 2660 can extend through the enclosure 2610 and the trim ring 2620 to interface with the protrusion 2646.

Figure 29A:
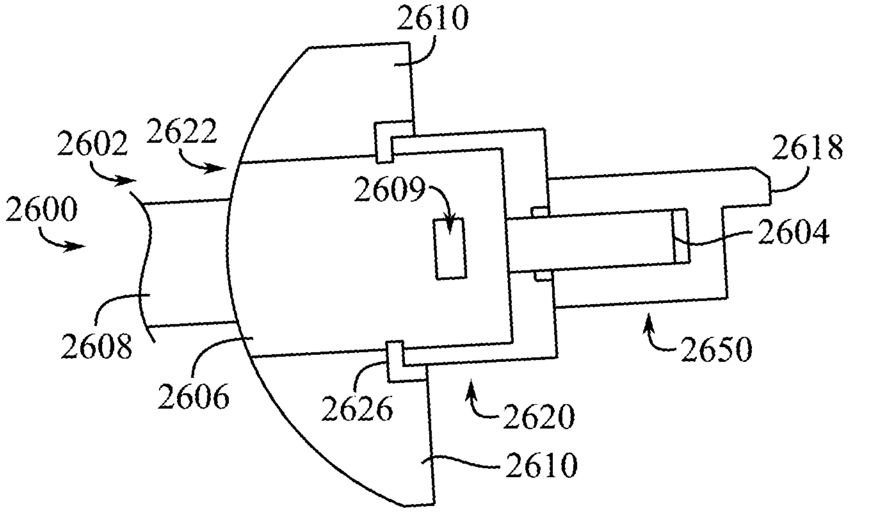
FIG. 29A shows a sectional view of a plug connector in a trim ring and a receptacle connector.

FIG. 29A shows a sectional view of the cable assembly 2600, the enclosure 2610, the trim ring 2620, and the receptacle connector 2650. As shown in FIG. 29A, the seal 2626 can be L-shaped in a cross-sectional view. The seal 2626 can be provided on the trim ring 2620, between the trim ring 2620 and the enclosure 2610. This provides sealing between the trim ring 2620 and the enclosure 2610. The seal 2626 is also provided between a body of the trim ring 2620 and the cavity 2622 of the trim ring 2620. This provides sealing between the trim ring 2620 and the boot 2606 of the plug connector 2602. Placing the seal 2626 in this configuration provides sealing between the trim ring 2620 and both the boot 2606 and the enclosure 2610. The seal 2626 can include an elastic material that can be stretched around a lip of the trim ring 2620 and can be secured to the trim ring 2620 by interference with the lip of the trim ring 2620.

Figure 29B:
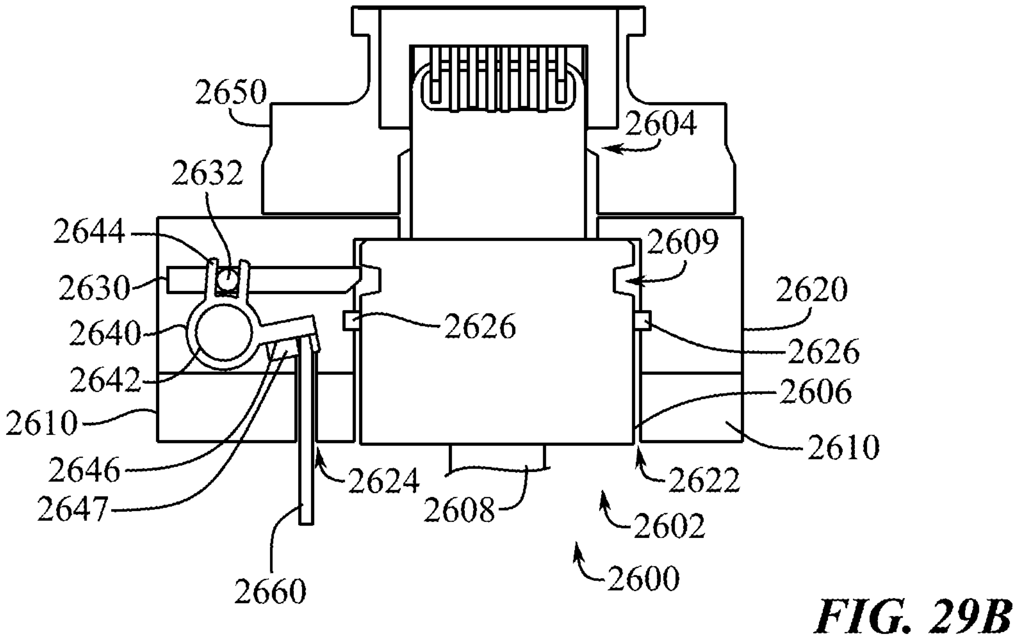
FIG. 29B shows a sectional view of a tool used to un-latch the plug connector from the trim ring and the receptacle connector of FIG. 29A.

FIG. 29B shows a sectional view of the cable assembly 2600, the enclosure 2610, the trim ring 2620, and the receptacle connector 2650. FIG. 29E shows a perspective view of the lever arm 2640. The lever arm 2640 includes a spring 2641 wrapped around the pivot 2642 and configured to apply a spring force to a body portion of the lever arm 2640. A seal 2647 is coupled to the protrusion 2646 of the lever arm 2640. The spring 2641 can apply a spring force to the lever arm 2640 that presses the seal 2647 against the enclosure 2610. This provides sealing between the trim ring 2620 and an exterior of an electronic device. The tool 2660 can be configured to pass through an opening 2643 in the seal 2647 when the tool 2660 is used to actuate the protrusion 2646. The seal 2647 can be a soft gasket or the like.

Figure 29C:
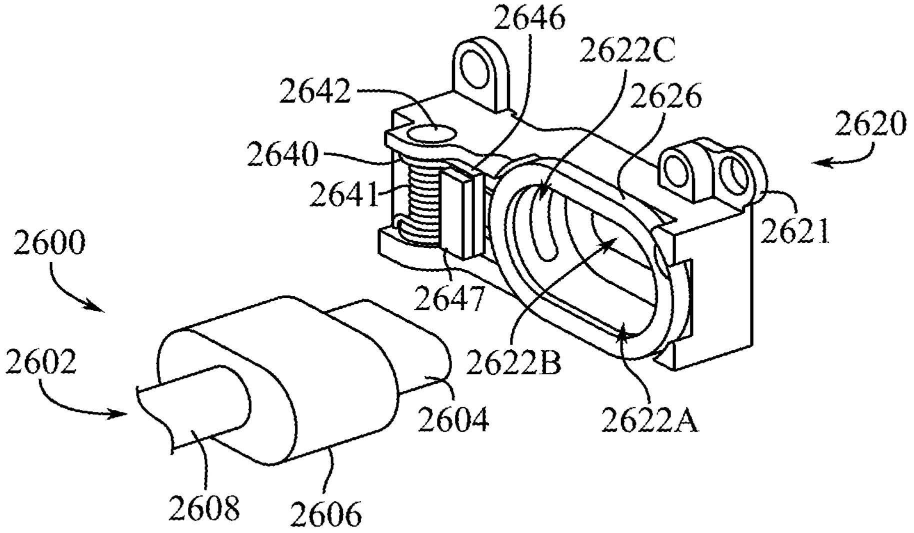
FIG. 29C shows a perspective view of the plug connector and the trim ring of FIG. 29A.
Figure 29D:
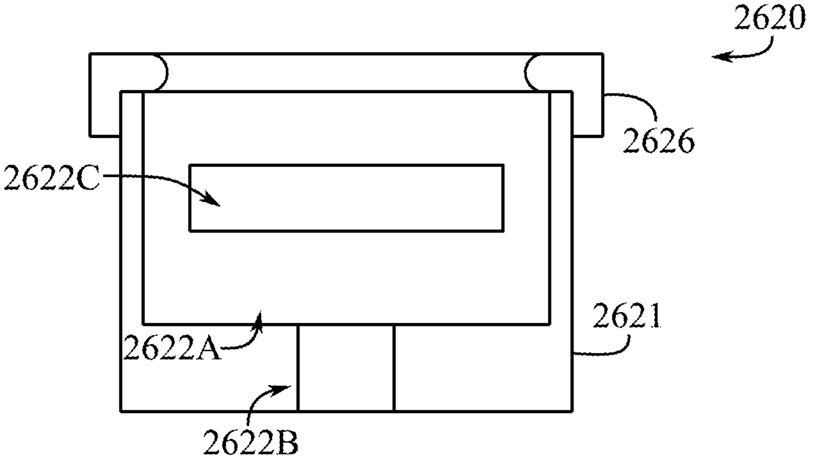
FIG. 29D shows a sectional view of the trim ring of FIG. 29A.
Figure 29E:
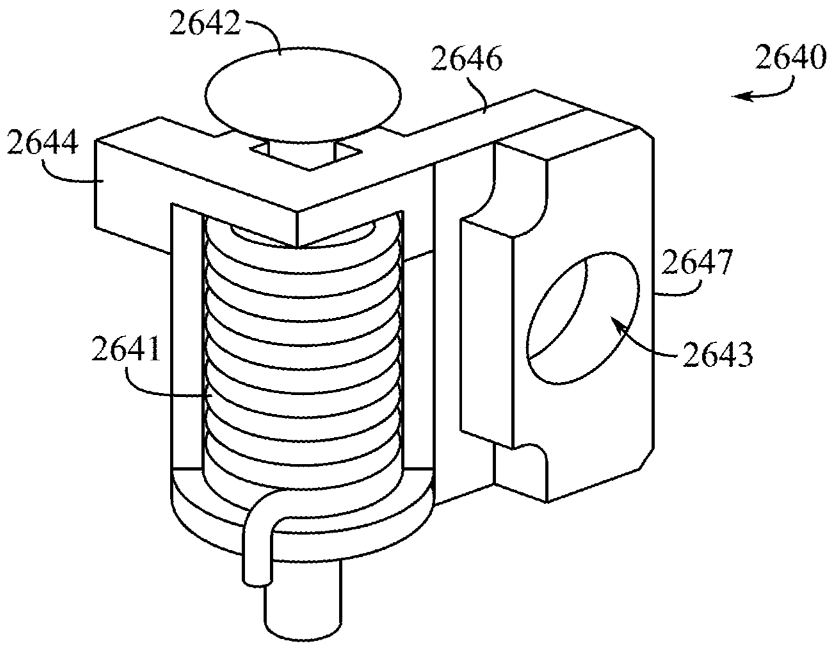
FIG. 29E shows a perspective view of a lever arm of the trim ring of FIG. 29A.

FIG. 29C shows a perspective view of the plug connector 2602 and the trim ring 2620 and FIG. 29D illustrates a partial sectional view of the trim ring 2620. In some examples, the boot 2606, the plug 2604, and the cavity 2622 can be stadium-shaped in a cross-sectional view. In some examples, the boot 2606, the plug 2604, and the cavity 2622 can be rectangular, triangular, rounded, or can have any other shape in a cross-sectional view. The trim ring 2620 can include a first cavity portion 2622A configured to receive the boot 2606 and a second cavity portion 2622B configured to receive the plug 2604. The trim ring 2620 can include a third cavity portion 2622C configured to receive the detent element 2630. The third cavity portion 2622C can be adjacent the first cavity portion 2622A, and can align the 2630 with openings 2609 in the side surfaces of the boot 2606.

FIGS. 29C and 29D further illustrate details of the seal 2626. As illustrated in FIG. 29D, the seal 2626 can have an L-shape in a cross-sectional view. The seal 2626 can be wrapped around at least a portion of a body of the trim ring 2620, such as a lip of the trim ring 2620. The seal 2626 can be formed of an elastic material, and an elastic force of the elastic material can retain the seal 2626 on the lip of the trim ring 2620. In some examples, an adhesive or the like can be provided between the seal 2626 and the body of the trim ring 2620 to secure the seal 2626 to the trim ring 2620.

The seal 2626 can act as a seal which prevents or limits ingress of contaminants (e.g., liquid, dust, lint, debris, or the like) into the trim ring 2620 and the receptacle connector 2650 through the cavity 2622, such as when the plug connector 2602 is inserted into the cavity 2622. The seal 2626 can provided sealing between the trim ring 2620 and the plug connector 2602 and between the trim ring 2620 and the enclosure 2610. The seal 2647 can act as a seal which prevents or limits ingress of contaminants (e.g., liquid, dust, lint, debris, or the like) into the trim ring 2620 and the through the aperture 2624.

Figure 30A:
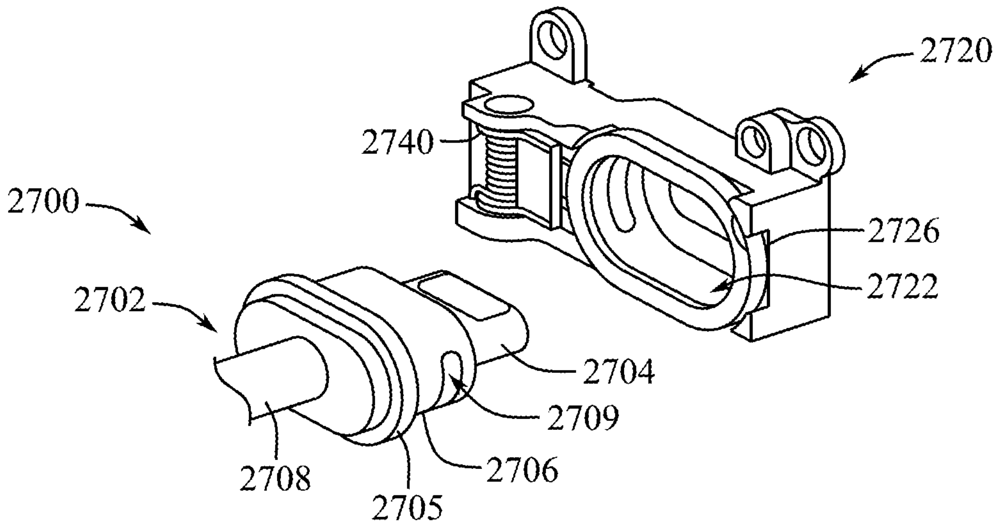
FIG. 30A shows a perspective view of a plug connector and a trim ring.
Figure 30B:
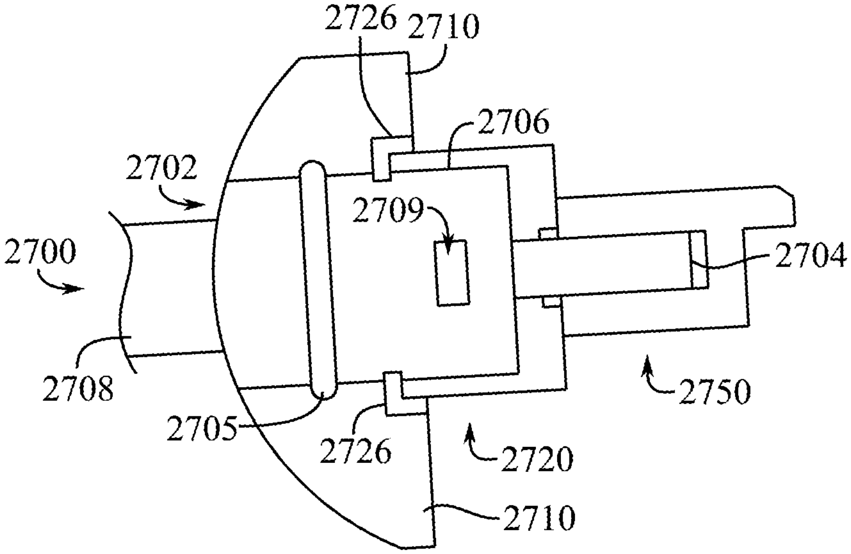
FIG. 30B shows a sectional view of the plug connector inserted in the trim ring of FIG. 30A and a receptacle connector.
Figure 30C:
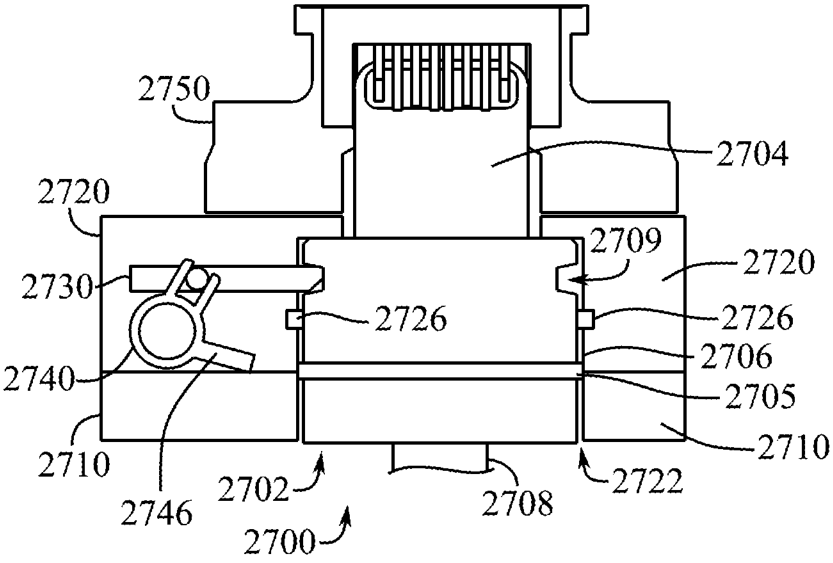
FIG. 30C shows a sectional view of the plug connector inserted in the trim ring and the receptacle connector of FIG. 30B.

FIGS. 30A through 30C illustrate a seal 2726 included on a trim ring 2720 and a seal 2705 included on a plug connector 2702 of a cable assembly 2700. The seal 2726 can provide sealing between an enclosure 2710 and the trim ring 2720 and between the trim ring 2720 and the plug connector 2702. The seal 2705 can provide sealing between the plug connector 2702 and the enclosure 2710. The plug assembly 2700 includes the plug connector 2702 coupled to a shielded cable 2708. The plug connector 2702 includes a plug 2704 and the boot 2706 coupled to the plug 2704 and the shielded cable 2708.

The plug connector 2702 can be received in a cavity 2722 of an enclosure 2710 and the trim ring 2720. The trim ring 2720 can be coupled to the enclosure 2710, and a receptacle connector 2750 can be coupled to the trim ring 2720. The trim ring 2620 can include a detent element 2730 and a lever arm 2740. The detent element 2730 can be configured to interface with openings 2709 in the boot 2706 to fasten the plug connector 2702 in the cavity 2722. The lever arm 2740 can be rotatable around a pivot. The lever arm 2740 can include a protrusion 2746 configured to interface with a tool in order to un-fasten the plug connector 2702 from the cavity 2722.

The seal 2705 can be coupled to the boot 2706 between the shielded cable 2708 and the openings 2709. In the example illustrated in FIG. 30B, the seal 2705 can be provided adjacent the enclosure 2710. Providing the seal 2705 in this position provides sealing between the boot 2706 and the enclosure 2710, which also seals the trim ring 2720 from an external environment. In the example illustrated in FIG. 30C, the seal 2705 can be provided adjacent the enclosure 2710 and the trim ring 2720. Providing the seal 2705 in this position can provide sealing between the boot 2706 and each of the enclosure 2710 and the trim ring 2720 and can also provide sealing between the enclosure 2710 and the trim ring 2720. Although the seal 2705 is illustrated as being between the seal 2726 and the shielded cable 2708, the seal 2705 can be positioned at any point along the boot 2706, such as between the seal 2726 and the plug 2704, between the seal 2726 and the openings 2709, between the openings 2704 and the plug 2704, or the like. Moreover, the seal 2705 can be provided in place of, or in addition to the seal 2726.

FIG. 30B shows a sectional view of the cable assembly 2700, the enclosure 2710, the trim ring 2720, and the receptacle connector 2750. As shown in FIG. 30B, the seal 2726 can be L-shaped in a cross-sectional view. The seal 2726 can be provided on the trim ring 2720, between the trim ring 2720 and the enclosure 2710. This provides sealing between the trim ring 2720 and the enclosure 2710. The seal 2726 is also provided between a body of the trim ring 2720 and the cavity 2722 of the trim ring 2720. This provides sealing between the trim ring 2720 and the boot 2706 of the plug connector 2702. Placing the seal 2726 in this configuration provides sealing between the trim ring 2720 and both the boot 2706 and the enclosure 2710. The seal 2726 can include an elastic material that can be stretched around a lip of the trim ring 2720 and can be secured to the trim ring 2720 by interference with the lip of the trim ring 2720.

FIG. 30C shows a sectional view of the cable assembly 2700, the enclosure 2710, the trim ring 2720, and the receptacle connector 2750. As shown in FIG. 30C, the seal 2726 can be rectangular in a cross-sectional view. Other shapes can be used for the seal 2726, such as rounded, triangular, or the like. The seal 2726 can be provided between the body of the trim ring 2720 and the boot 2706, between an outer surface of the trim ring 2720 facing the enclosure 2710 and an inner surface of the trim ring 2720 facing the receptacle connector 2750. The seal 2726 can provide sealing between the trim ring 2720 and the boot 2706.

The seal 2726 can act as a seal which prevents or limits ingress of contaminants (e.g., liquid, dust, lint, debris, or the like) into the trim ring 2720 and the receptacle connector 2750 through the cavity 2722, such as when the plug connector 2702 is inserted into the cavity 2722. The seal 2726 can provided sealing between the trim ring 2720 and the plug connector 2702 and between the trim ring 2720 and the enclosure 2710. The seal 2705 can act as a seal which prevents or limits ingress of contaminants (e.g., liquid, dust, lint, debris, or the like) into the trim ring 2720 and the receptacle connector 2750 through the cavity 2722, such as when the plug connector 2702 is inserted into the cavity 2722. The seal 2705 can provided sealing between the plug connector 2702 and the enclosure 2710, between the plug connector 2702 and both of the trim ring 2720 and the enclosure 2710, or the like.

Figure 31A:
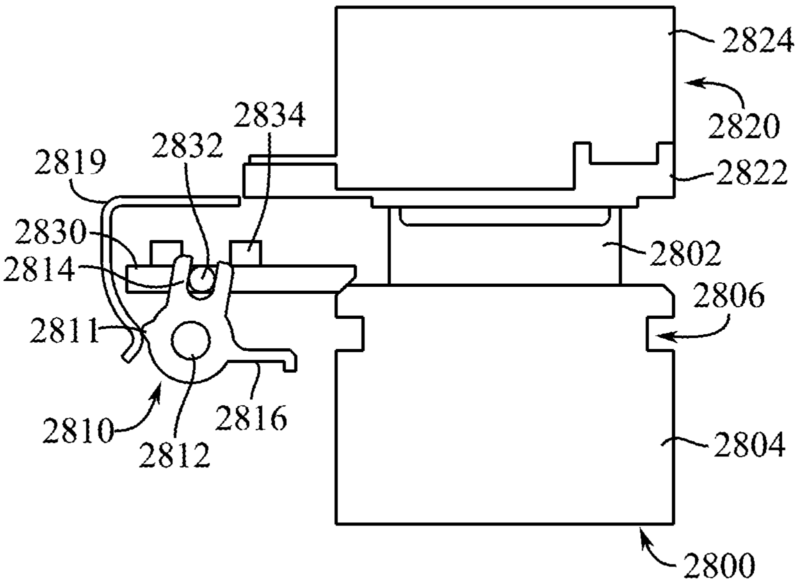
FIG. 31A shows a sectional view of a plug connector being inserted into a trim ring and a receptacle connector.
Figure 31B:
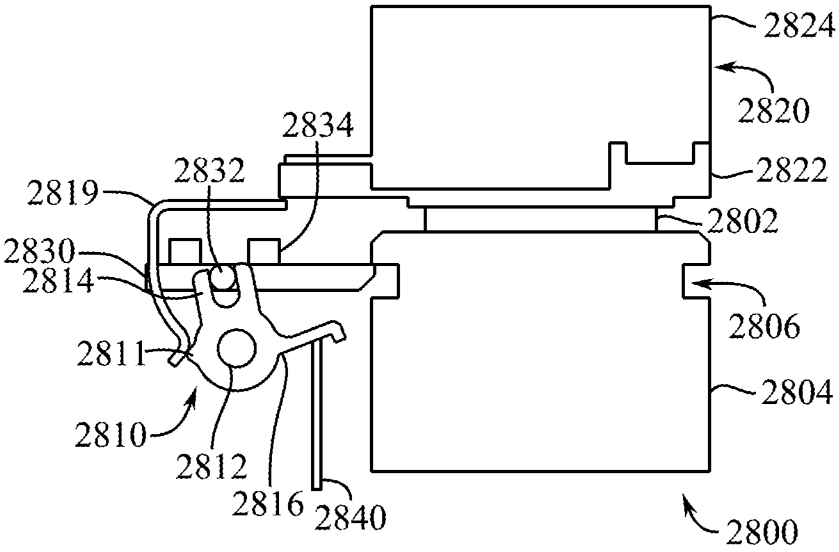
FIG. 31B shows a sectional view of the plug connector being un-latched from into the trim ring and the receptacle connector of FIG. 31A.

FIGS. 31A and 31B show sectional views of a plug connector 2800 inserted into a receptacle connector 2820 and fastened by a detent element 2830. The plug connector 2800 includes a boot 2804 and a plug 2802 coupled to the boot 2804. The boot includes recesses 2806 formed in side surfaces thereof. The detent element 2830 can interface with the recesses 2806 to retain the boot 2806 and the plug connector 2800 in a cavity of the receptacle connector 2820 and a trim ring.

The detent element 2830 includes a protrusion 2832 configured to interface with a lever arm 2810. The detent element 2830 and the lever arm 2810 can be included in a trim ring, as discussed in examples previously. The lever arm 2810 includes protrusions 2814 configured to interface with the protrusion 2832 of the detent element 2830. The lever arm 2810 can include a spring and can be configured to supply a spring force to the detent element 2830 through the protrusions 2814 and the protrusion 2832 to retain the detent element 2830 in an engaged configuration (illustrated in FIG. 31A). The lever arm 2810 can include a protrusion 2816 configured to interact with a tool 2840 in order to transition the lever arm 2810 and the detent element 2830 from the engaged configuration to an un-engaged configuration (illustrated in FIG. 31B). As such, the lever arm 2610 can be used to retain the detent element 2830 in an engaged configuration and transition the detent element 2830 to an un-engaged configuration. The detent element 2830 can also include fasteners 2834, which can couple the detent element 2830 to a body of a trim ring. The detent element 2830 can translate relative to the fasteners 2834 as the detent element 2830 moves from the engaged configuration to the un-engaged configuration.

The lever arm 2810 can include a protrusion 2811 configured to interact with a spring 2819. The spring 2819 can interact with the protrusion 2811 to resist movement of the lever arm 2810. In some examples, the spring 2819 can provide a desired feel to a user using the tool 2840 to un-latch the detent element 2830 and the lever arm 2810. For example, as illustrated in FIGS. 31A and 31B, the spring 2819 can move over the protrusion 2811 as the lever arm 2810 rotates from the engaged configuration (shown in FIG. 31A) to the un-engaged configuration (shown in FIG. 31B). This can provide a physical click through the tool 2840, which informs the user that the lever arm 2810 and the detent element 2830 are un-latched, and the plug connector 2800 can be removed from the trim ring and the receptacle connector 2820. Positions of the spring 2819 and the protrusion 2811, as well as lengths of the spring 2819, angles of the spring 2819, shapes of the protrusion 2811, and the like can be altered to alter the force required to rotate the lever arm 2810, as well as the feel to a user of moving the lever arm 2810.

In some examples, the receptacle connector 2820 can include an exterior portion 2824 and an interior portion 2822. For example, the exterior portion 2824 can at least partially encompass the interior portion 2822. In other words, the exterior portion 2824 can act as a sleeve or shell that at least partially surrounds the interior portion 2822. The exterior portion 2824 and interior portion 2822 can be interlocked or affixed to one another. In some examples, the receptacle connector 2820 can be formed from a singular or monolithic structure instead of the external portion 2824 and the internal portion 2822. The receptacle connector 2820 can form a slot capable of receiving and retaining the plug connector 2800.

Figure 32A:
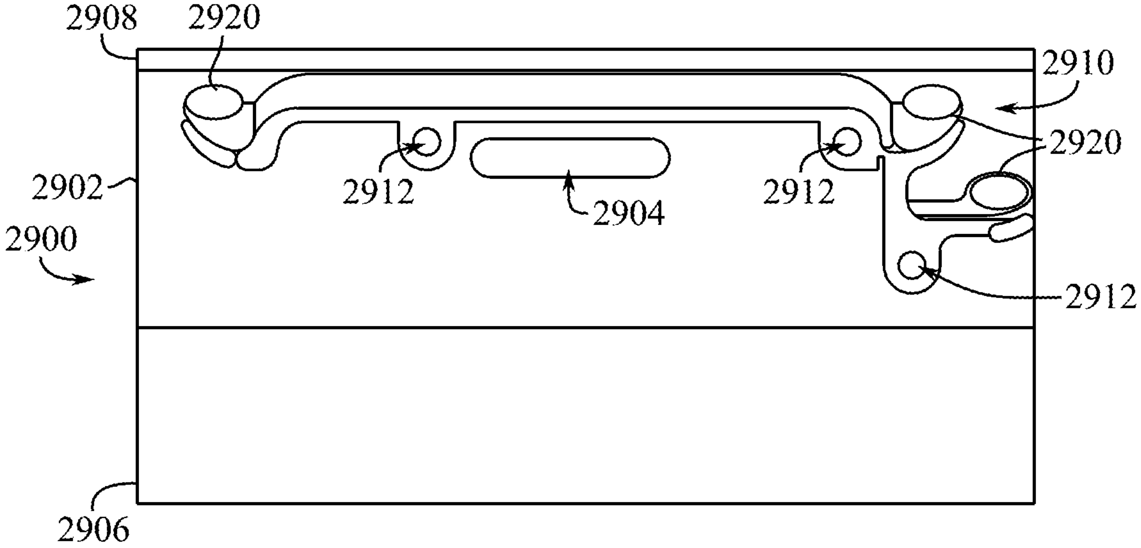
FIGS. 32A through 32C show perspective views of a trim ring and a receptacle connector being assembled in a housing.
Figure 32B:
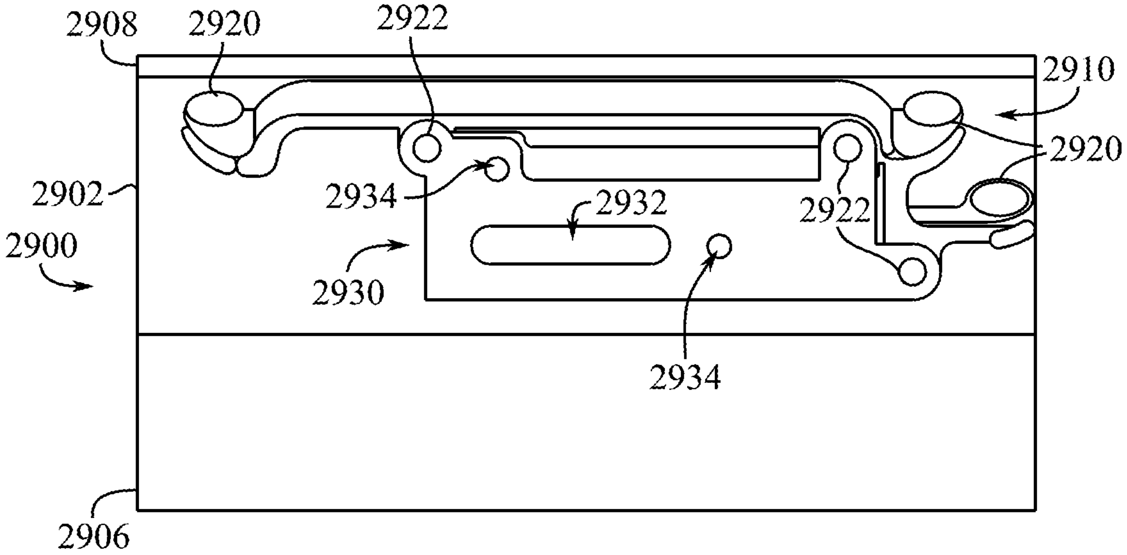
Figure 32C:
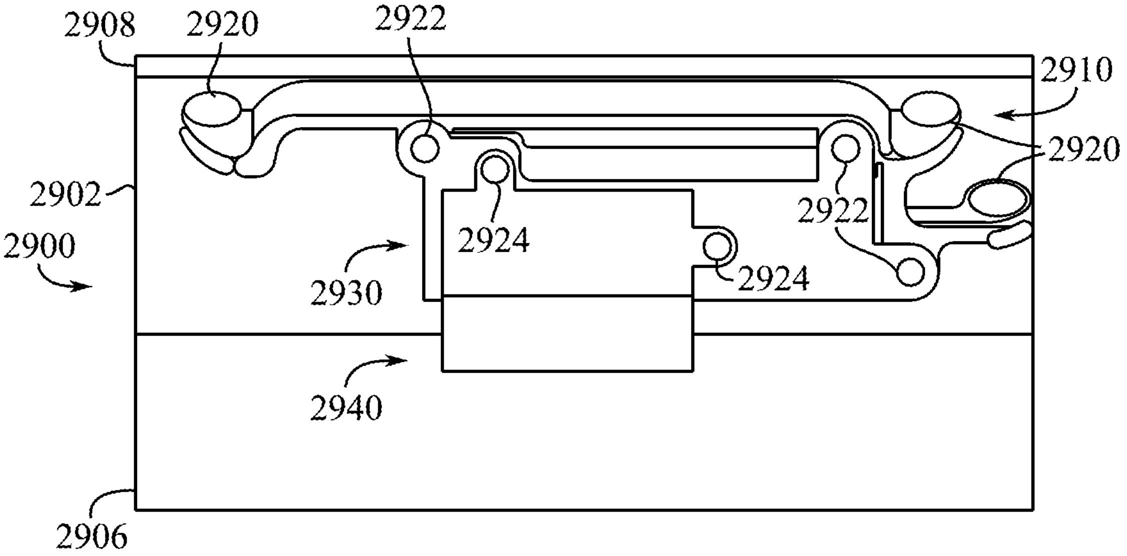

FIGS. 32A through 32C illustrate a method of assembling a trim ring 2930 and a plug connector 2940 in an enclosure 2900. In FIG. 32A, a frame 2910 is attached to the enclosure 2900. The enclosure can include a side surface 2902, an opening 2904 for receiving a plug connector, a bottom surface 2906, and a top surface 2908. The frame 2910 can be attached to structures of the bottom surface 2906 and the side surface 2902 through fasteners 2920. The fasteners 2920 can extend longitudinally in a direction from the top surface 2908 towards the bottom surface 2906 and can pull the frame 2910 down towards the bottom surface 2906. Although three fasteners 2920 are illustrated for attaching the frame 2910 to the enclosure 2900, any number of the fasteners 2920 can be included.

In FIG. 32B, the trim ring 2930 is attached to the frame 2910. The trim ring 2930 can be attached to the frame 2910 through fasteners 2922. The fasteners 2922 can extend into openings 2912 of the frame 2910, illustrated in FIG. 32A. The fasteners 2922 can extend longitudinally in a direction parallel to the bottom surface 2906, and can pull the trim ring 2930 towards the frame 2910 and the side surface 2902 of the enclosure 2900. A dummy trim ring can be inserted through the opening 2904 in the enclosure 2900 and into an opening 2932 in the trim ring 2930 in order to align the trim ring 2930 with the enclosure 2900. Although three fasteners 2922 are illustrated for attaching the trim ring 2930 to the frame 2910, any number of the fasteners 2922 can be included.

In FIG. 32C, the receptacle connector 2940 is attached to the trim ring 2930. The receptacle connector 2940 can be attached to the trim ring 2930 through fasteners 2924. The fasteners 2924 can extend into openings 2934 of the trim ring 2930, illustrated in FIG. 32A. The fasteners 2924 can extend longitudinally in a direction parallel to the bottom surface 2906 and can pull the receptacle connector 2940 towards the trim ring 2930, the frame 2910, and the side surface 2902 of the enclosure 2900. The dummy trim ring can be inserted through the opening 2904 in the enclosure 2900, the opening 2932 in the trim ring 2930, and into an opening in the receptacle connector 2940 in order to align the receptacle connector 2940 with the trim ring 2930 and the enclosure 2900. Although two fasteners 2924 are illustrated for attaching the receptacle connector 2940 to the trim ring 2930, any number of the fasteners 2924 can be included.

FIGS. 33A through 33F illustrate an example of a plug connector 3000 inserted into a receptacle connector 3030 and fastened in the receptacle connector 3030 by a lever arm 3010. The plug connector 3000 includes a boot 3002 and a plug 3004 coupled to the boot 3002. The boot 3002 includes recesses 3003.

The lever arm 3010 can be included in a trim ring coupled to the receptacle connector 3030. The lever arm 3010 is rotatable around a pivot 3012. The lever arm 3010 includes a protrusion 3014 configured to interact with the recesses 3003 of the boot 3002 to retain the plug connector 3000 in the trim ring and the receptacle connector 3030. The lever arm 3010 can be rotatable between an engaged configuration, with the protrusion 3014 disposed in a respective recess 3003, and an un-engaged configuration, with the protrusion 3014 retracted from the recess 3003.

The lever arm 3010 further includes a protrusion 3016. The protrusion 3016 can be configured to interact with a tool 3060 to transition the lever arm 3010 from the engaged configuration to the un-engaged configuration. The lever arm 3010 includes a protrusion 3018 configured to interact with a spring mechanism 3020. The spring mechanism 3020 can interact with the protrusion 3018 to retain the lever arm 3010 in the engaged configuration and can resist movement or forces of the lever arm 3010 transitioning to the un-engaged configuration.

The spring mechanism 3020 can include a central member 3022 extending into a spring 3024 and a stop 3026. The protrusion 3018 interacts with the central member 3022 to compress the spring 3024 into the stop 3026. This compression of the spring 3024 exerts a spring force on the protrusion 3018 through the central member 3022 to retain the lever arm 3010 in the engaged configuration, and to resist the lever arm 3010 from transitioning to the un-engaged configuration.

In some examples, the receptacle connector 3030 can include an exterior portion 3034 and an interior portion 3032. For example, the exterior portion 2824 can at least partially encompass the interior portion 3032. In other words, the exterior portion 3034 can act as a sleeve or shell that at least partially surrounds the interior portion 3032. The exterior portion 3034 and interior portion 3032 can be interlocked or affixed to one another. In some examples, the receptacle connector 3030 can be formed from a singular or monolithic structure instead of the external portion 3034 and the internal portion 3032. The receptacle connector 3030 can form a slot capable of receiving and retaining the plug connector 3000.

Figure 33A:
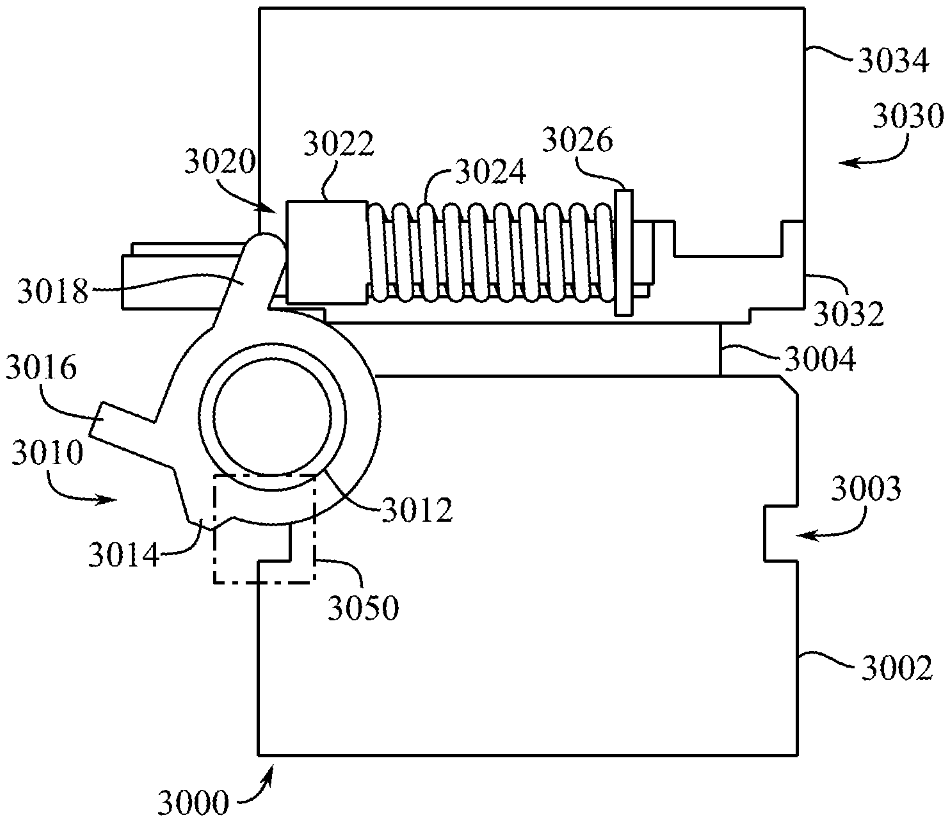
FIG. 33A shows a top-down view of a plug connector being inserted into a trim ring and a receptacle connector.
Figure 33B:
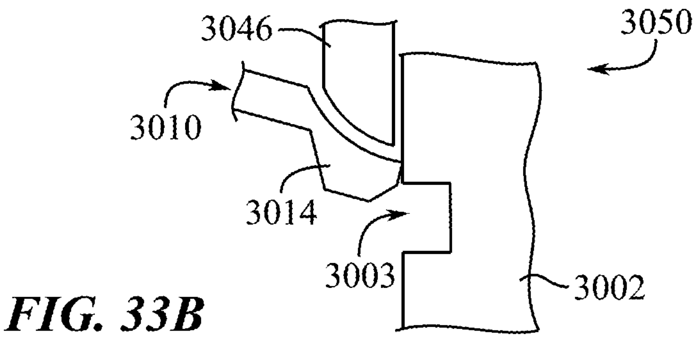
FIG. 33B shows a detail view of the trim ring and the plug connector of FIG. 33A prior to the trim ring latching with the receptacle connector.

FIG. 33B is a detailed view of a region 3050 of FIG. 33A. As illustrated in FIGS. 33A and 33B, as the plug connector 3000 is inserted into a trim ring and the receptacle connector 3030, the protrusion 3014 extends along a side surface of the boot 3002. Once the plug connector 3000 is fully inserted into the trim ring and the receptacle connector 3030, the protrusion 3014 can extend into the recess 3003 and can retain the plug connector 3000 in the trim ring and the receptacle connector 3030. The protrusion 3014 can extend through a body portion 3046 of the trim ring. The spring 3024 of the spring mechanism 3020 is in a compressed state and pushes the protrusion 3014 of the lever arm 3010 against the side surface of the boot 3002 through the interaction between the central member 3022 and the protrusion 3018. The lever arm 3010 is in the engaged configuration, such that the lever arm 3010 applies a force against the boot 3002 in a clockwise direction.

Figure 33C:
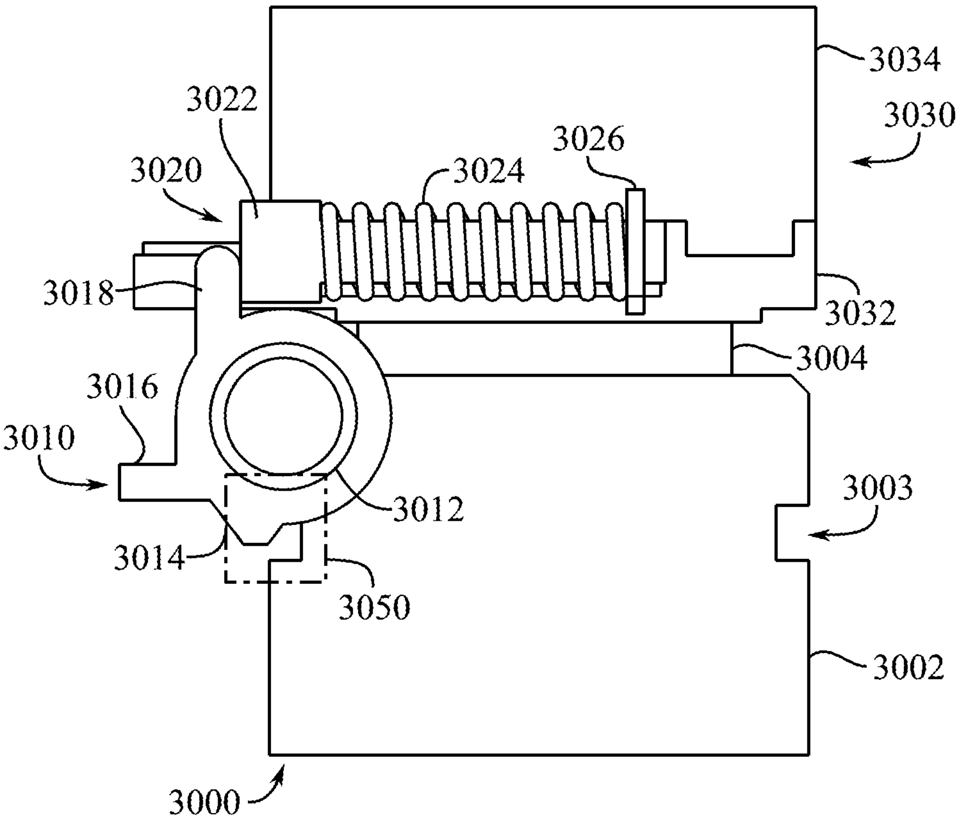
FIG. 33C shows a top-down view of the plug connector latched in the trim ring and the receptacle connector of FIG. 33A.
Figure 33D:
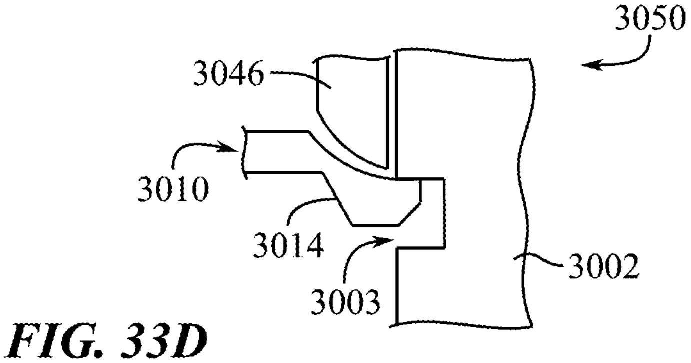
FIG. 33D shows a detail view of the trim ring and the plug connector of FIG. 33C with the plug connector latched in the trim ring.

FIGS. 33C and 33D illustrate the lever arm 3010 after the plug connector 3000 is fully inserted into the trim ring and the receptacle connector 3030, such that the protrusion 3014 extend into the recess 3003. Spring force from the spring 3024 of the spring mechanism 3020 through the central member 3022 and the protrusion 3018 causes the lever arm 3010 to rotate in a counterclockwise direction. The protrusion 3014 extends through the body portion 3046 of the trim ring into the recess 3003 of the boot 3002. This is the engaged configuration in which the protrusion 3014 secures and fastens the boot 3002 into the trim ring and the receptacle connector 3030. The spring 3024 of the spring mechanism 3020 is in a partially extended state and pushes the protrusion 3014 of the lever arm 3010 against a side surface of the boot 3002 adjacent the recess 3003 through the interaction between the central member 3022 and the protrusion 3018. The lever arm 3010 is in the engaged configuration, such that the lever arm 3010 applies a force against the boot 3002 in a clockwise direction.

Figure 33E:
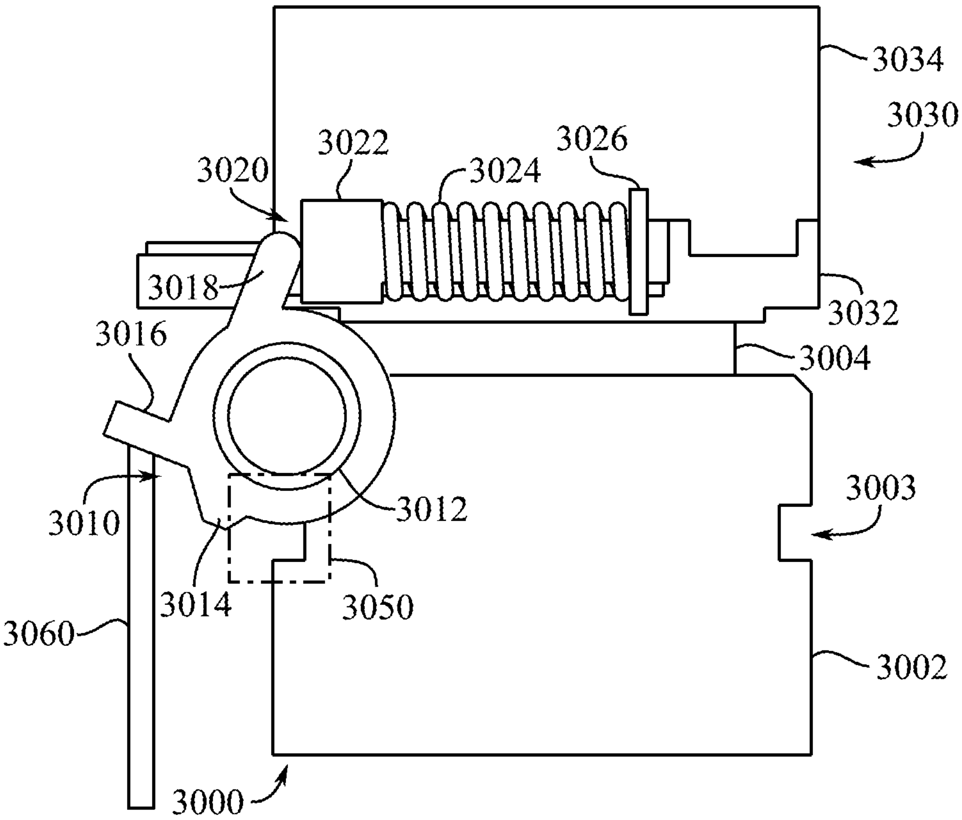
FIG. 33E shows a top-down view of the plug connector being un-latched from the trim ring and the receptacle connector of FIG. 33A.
Figure 33F:
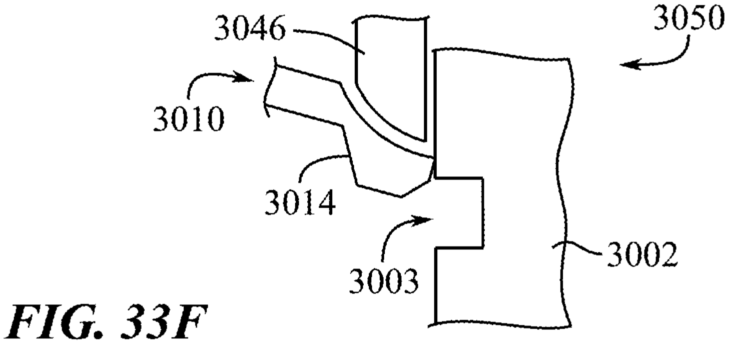
FIG. 33F shows a detail view of the trim ring and the plug connector of FIG. 33E with the plug connector un-latched from the trim ring.

FIGS. 33E and 33F illustrate the lever arm 3010 after the tool 3060 is used to actuate the lever arm 3010, transitioning the lever arm 3010 from the engaged configuration to the un-engaged configuration. Force from the tool 3060 overcomes a spring force of the spring 3024 of the spring mechanism 3020 and causes the lever arm 3010 to rotate in a clockwise direction. The protrusion 3014 retracts from the recess 3003 through the body portion 3046 of the trim ring such that the plug connector 3000 can be removed from the trim ring and the receptacle connector 3030. This is the un-engaged configuration in which the protrusion 3014 no longer secures and fastens the boot 3002 into the trim ring and the receptacle connector 3030. The spring 3024 of the spring mechanism 3020 is in a compressed state and resists the force supplied by the tool 3060. The lever arm 3010 is in the un-engaged configuration, such that the lever arm does not apply a force against the boot 3002.

The spring mechanism 3020 can be part of the trim ring, or part of the receptacle connector 3030 and fastened to the receptacle connector 3030. The lever arm 3010 and the spring mechanism 3020 can overlap portions of the plug connector 3000 and the receptacle 3030, which can enable the fastener of FIGS. 33A through 33F to be formed in a smaller package, providing more space within an enclosure for other components, or providing for a smaller enclosure.

Figure 34A:
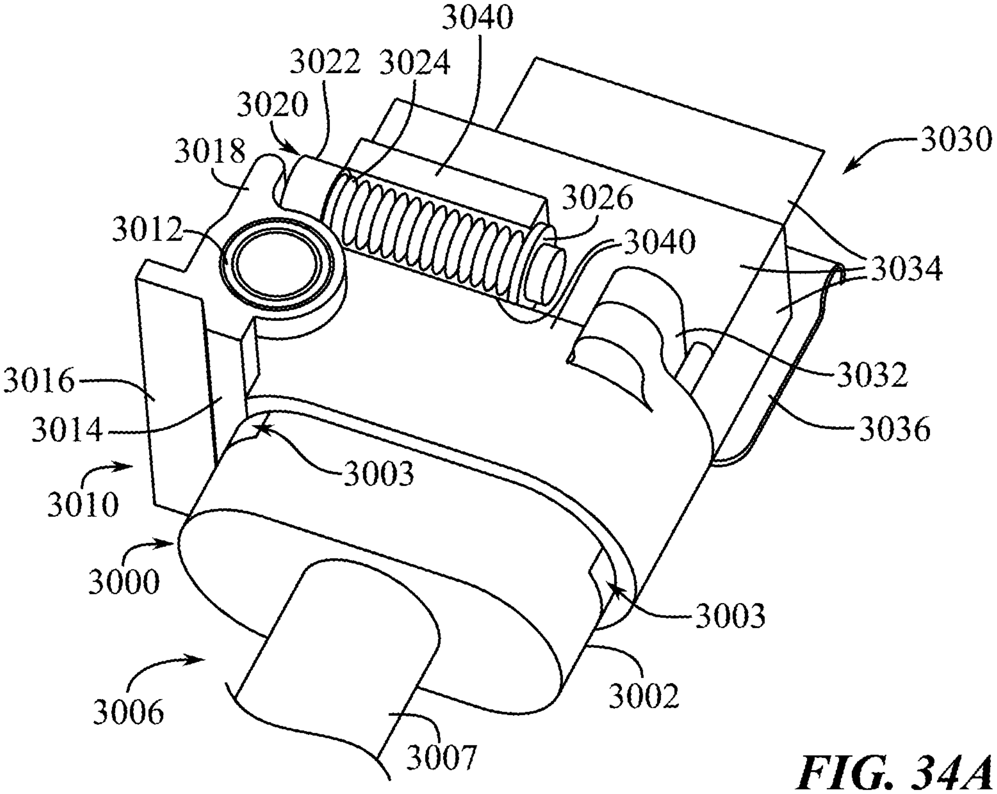
FIGS. 34A and 34B show perspective views of a plug connector inserted into a trim ring and a receptacle connector.
Figure 34B:
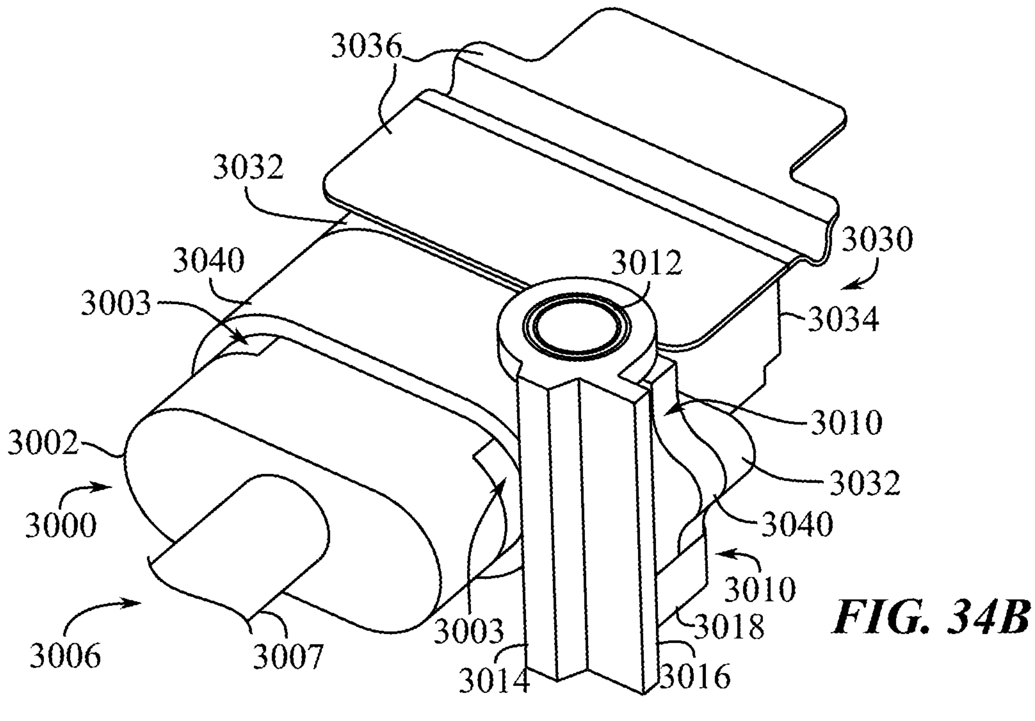

FIGS. 34A and 34B illustrate perspective views of a cable assembly 3006 inserted into a trim ring 3040 and a receptacle connector 3030. The cable assembly 3006 includes a shielded cable 3007 and a plug connector 3000. The plug connector 3002 includes a boot 3002. The boot includes recesses 3003 formed in the side surfaces thereof.

The trim ring 3040 includes a lever arm 3010 and a spring mechanism 3020. The lever arm 3010 is provided for fastening the plug connector 3030 in the trim ring 3040 and the receptacle connector 3030. The lever arm 3010 includes a protrusion 3014 configured to be inserted into a respective recess 3003 of the boot 3002 (such as by rotation around a pivot 3012) and to retain the plug connector 3002 within the trim ring 3040 and the receptacle connector 3030. The lever arm 3010 includes a protrusion 3016 configured to interact with a tool in order to transition the lever arm 3010 to an un-engaged configuration and to release the plug connector 3000 from the trim ring 3040 and the receptacle connector 3030. The lever arm 3010 includes a protrusion 3018 configured to interact with the spring mechanism 3020, to retain the lever arm in the engaged configuration, and to resist force supplied by the tool through the protrusion 3016.

The spring mechanism 3020 is provided for retaining the lever arm 3010 in an engaged configuration. The spring mechanism 3020 includes a central member 3022, a spring 3024, and a stop 3026. The central member 3022 is provided for interacting with the protrusion 3018 of the lever arm 3010. The spring 3024 is provided for providing a spring force to the central member 3022 to retain the lever arm 3010 in the engaged configuration through the protrusion 3018. The stop 3026 is provided for compressing the spring 3024, thereby supplying the spring force to the central member 3022.

As illustrated in FIGS. 34A and 34B, the lever arm 3010 can be disposed in a side surface of the trim ring 3040, and the spring mechanism 3020 can be disposed on a top surface of the trim ring 3040 and/or the receptacle connector 3030. The lever arm 3010 can include components extending through a portion of a sidewall of the trim ring 3040, which allows for the trim ring 3040 and the lever arm 3010 to take up less space in an enclosure. The spring mechanism 3020 can be disposed in different position to maximize space use within the enclosure.

In some examples, the receptacle connector 3030 can include an exterior portion 3034 and an interior portion 3032. For example, the exterior portion 2824 can at least partially encompass the interior portion 3032. In other words, the exterior portion 3034 can act as a sleeve or shell that at least partially surrounds the interior portion 3032. The exterior portion 3034 and interior portion 3032 can be interlocked or affixed to one another. In some examples, the receptacle connector 3030 can be formed from a singular or monolithic structure instead of the external portion 3034 and the internal portion 3032. The receptacle connector 3030 can form a slot capable of receiving and retaining the plug connector 3000. The receptacle connector 3030 can further include a printed circuit board (PCB) 3036. The PCB 3036 can be coupled to the plug of the plug connector 3000 through the interior portion 3032. The receptacle connector 3030 can be coupled to the trim ring 3040 through a portion of the interior portion 3032.

Figure 35A:
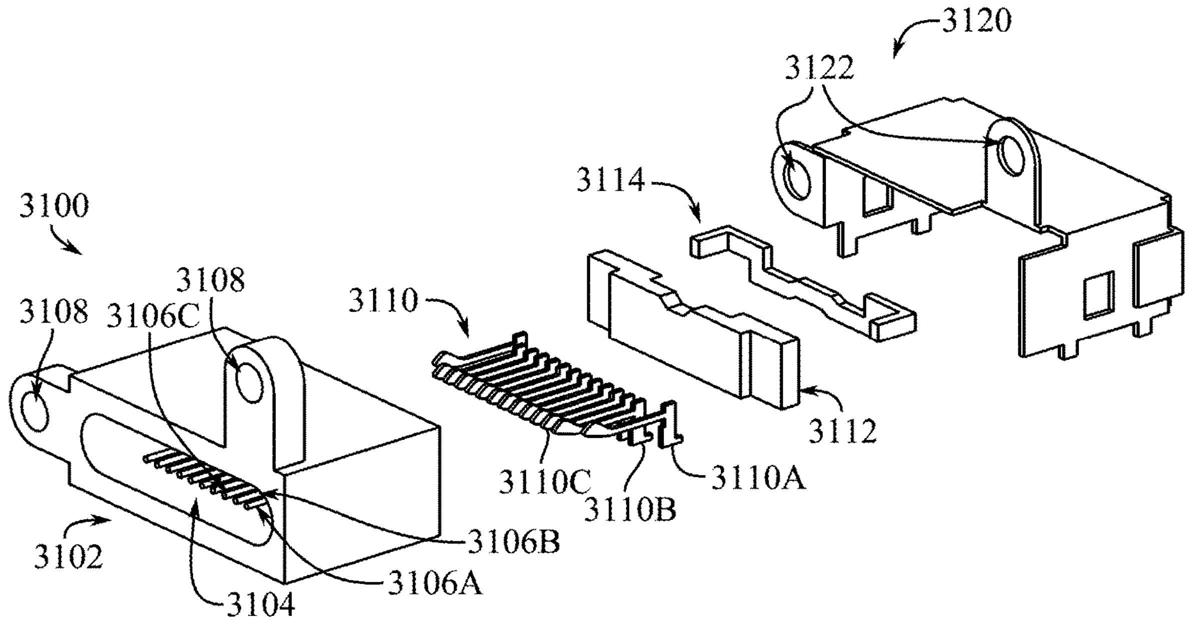
FIG. 35A shows an exploded view of a receptacle connector.
Figure 35B:
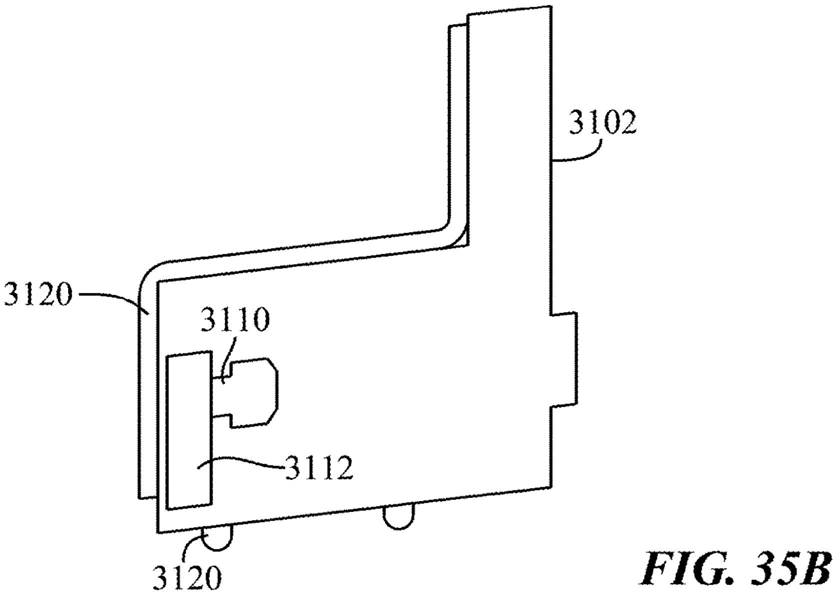
FIG. 35B shows a side sectional view of the receptacle connector of FIG. 35A.

FIGS. 35A and 35B illustrate an exploded view and a side sectional view of a receptacle connector 3100. The receptacle connector 3100 includes an interior portion 3102, electrical contacts 3110, a contact block 3112, an anchor 3114, and an exterior portion 3120. The interior portion 3102 includes an opening 3104 for receiving a plug of a plug connector, openings 3106A, 3106B, and 3106C for receiving the electrical contacts 3110 (e.g., the electrical contacts 3110A, 3110B, and 3110C, respectively), and openings 3108 for fastening the interior portion 3102 to a trim ring or the like.

The electrical contacts 3110 are provided in the openings 3106 of the interior portion 3102. The contact block 3112 can be used to isolate the electrical contacts 3110 from one another, and to aid in positioning the electrical contacts 3110 relative to the openings 3106 in the interior portion 3102. The electrical contacts 3110 can be stitched to the anchor 3114, which can be stitched to the interior portion 3102 to couple the electrical contacts 3110 to the interior portion 3102 of the receptacle connector 3100. In some examples, the electrical contacts 3110 can be stitched to the contact block 3112 and/or the anchor 3114.

The exterior portion 3120 can surround at least a portion of the interior portion 3102. The exterior portion can include openings 3122 for fastening the exterior portion 3120 to the trim ring or the like. The openings 3122 can also fasten the exterior portion 3120 to the interior portion 3102.

Figure 36A:
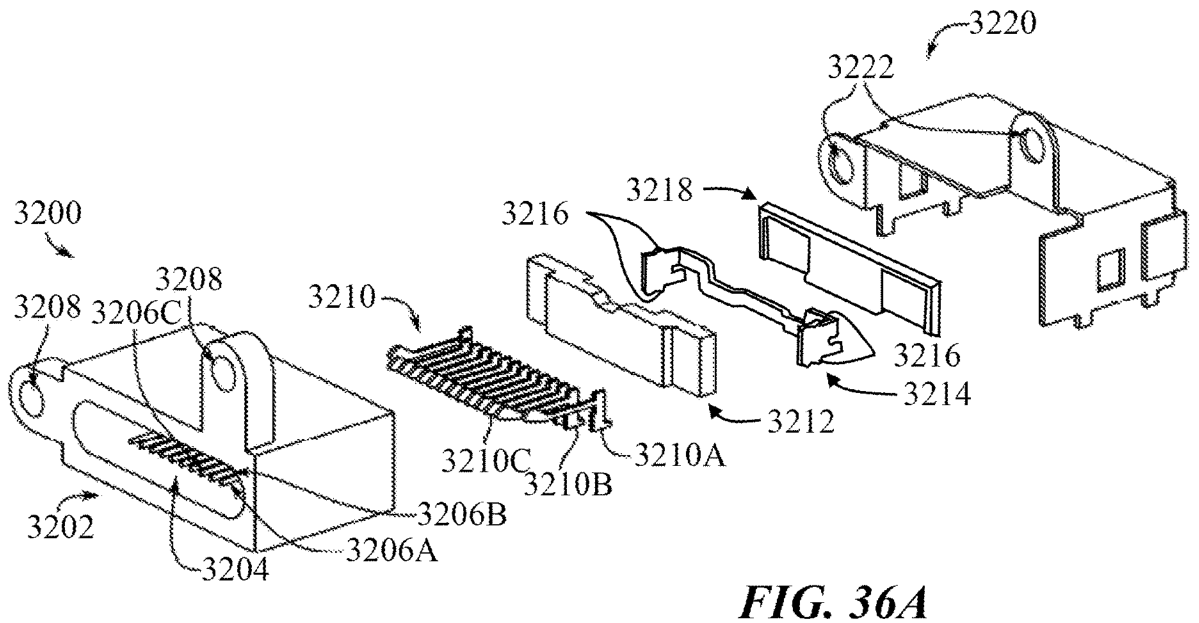
FIG. 36A shows an exploded view of a receptacle connector.

FIG. 36A illustrates an exploded view of a receptacle connector 3200. The receptacle connector 3200 includes an interior portion 3202, electrical contacts 3210, a contact block 3212, an anchor 3214, adhesive 3216 and an exterior portion 3220. The interior portion 3202 includes an opening 3204 for receiving a plug of a plug connector, openings 3206A, 3206B, and 3206C for receiving the electrical contacts 3210 (e.g., the electrical contacts 3210A, 3210B, and 3210C, respectively), and openings 3208 for fastening the interior portion 3202 to a trim ring or the like.

The interior portion 3202 can be molded (e.g., insert molded), machined, cast, stamped, or otherwise manufactured from a metal, polymer, ceramic, or combination thereof. For example, the interior portion 3202 can be insert molded from a plastic material and a metal material. The plastic material can provide insulation, such as between the electrical contacts 3210 when the electrical contacts 3210 are assembled in the interior portion 3202. The metal material can provide surfaces to which components of the receptacle connector 3200 can be welded. For example, the electrical contacts 3210, the anchor 3214, and/or the exterior portion 3220 can be welded to metal portions of the receptacle connector 3200. In some examples, the anchor 3214 can be welded to the interior portion 3202 from the side of the interior portion 3202 after the anchor 3214 is assembled in position in the interior portion 3202. After the electrical contacts 3210 and the anchor 3214 are assembled in the interior portion 3202, the exterior portion 3220 can be welded to the interior portion 3202. As such, the various components of the receptacle connector 3200 can be rigidly mounted and assembled together, which improves strength and durability of the receptacle connector 3200.

The electrical contacts 3210 are provided in the openings 3206 of the interior portion 3202. The contact block 3212 can be used to isolate the electrical contacts 3210 from one another, and to aid in positioning the electrical contacts 3210 relative to the openings 3206 in the interior portion 3202. The electrical contacts 3210 can be stitched to the anchor 3214, which can be stitched to the interior portion 3202 to couple the electrical contacts 3210 to the interior portion 3202 of the receptacle connector 3200. In some examples, the electrical contacts 3210 can be stitched to the contact block 3212 and/or the anchor 3214. In some examples, the electrical contacts 3210 can be welded to the interior portion 3202. In some examples, the electrical contacts 3210 can have tuning-fork shapes that contact a plug of a plug connector from opposite sides, which equalizes forces applied between the electrical contacts 3210 of the receptacle connector 3200 and electrical contacts on the plug of the plug connector. The electrical contacts 3210 can be barbed, and can be assembled directly to the interior portion 3202. In some examples, the electrical contacts 3210 can be stitched directly to the interior portion 3202, rather than or in addition to the contact block 3212.

The anchor 3214 can include barbs 3216 on a top surface and/or a bottom surface of the anchor 3214, as will be discussed in detail below with respect to FIGS. 36C and 36D. The anchor 3214 can have an increased thickness relative to the anchor 3114 discussed above with respect to the example of FIGS. 35A and 35B. Providing a greater thickness of the anchor 3214 can adjust a rotation point of the anchor 3214, and provide a shorter lever arm, which prevents rotation between the anchor 3214 and the interior and exterior portions 3202, 3220 of the receptacle connector 3200. Openings can be provided at corners of the anchor 3214 to allow the adhesive 3218 to fill into corners of the anchor 3214. Larger barbs 3216 can be provided on the anchor 3214 in order to improve the attachment between the anchor 3214 and the interior portion 3202.

The adhesive 3218 can be included between the exterior portion 3220 and each of the anchor 3214 and the contact block 3212. The adhesive 3218 can fill the area between the exterior portion 3220 and each of the anchor 3214 and the contact block 3212, and can reduce wiggle between the various components of the receptacle connector 3200. The adhesive 3218 can be applied between the exterior portion 3220 and the anchor 3214 and the contact block 3212 after components of the receptacle connector 3200 are reflowed. Various components of the receptacle connector 3200 can include openings or recesses in which the adhesive 3218 can flow to improve adhesion between the components of the receptacle connector 3200. For example, openings can be provided in the contact block 3212, the anchor 3214, and/or the exterior portion 3220, and the adhesive 3218 can flow into the openings. In some examples, adhesive can be provided between the receptacle connector 3200 and a flex, such as a flex to which the electrical contacts 3210 are coupled, which can improve a physical connection between the flex and the receptacle connector 3200.

The exterior portion 3220 can surround at least a portion of the interior portion 3202. The exterior portion can include openings 3222 for fastening the exterior portion 3220 to the trim ring or the like. The openings 3222 can also fasten the exterior portion 3220 to the interior portion 3202.

Figure 36B:
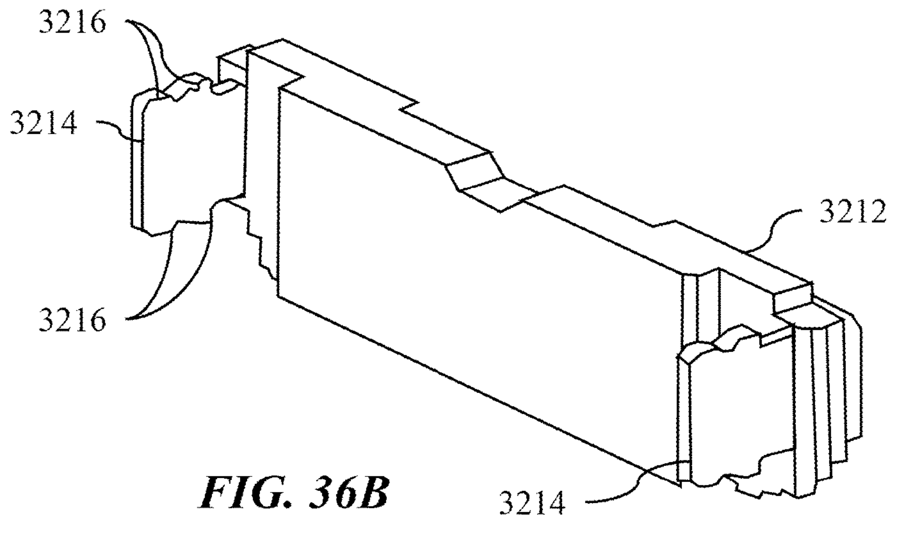
FIG. 36B shows a detailed view of a contact block and an anchor of the receptacle connector of FIG. 36A.

FIG. 36B illustrates a detailed view of a contact block 3212 and an anchor 3214 assembled in the contact block 3212. The anchor 3214 includes barbs 3216, which can interface with the interior portion 3202 when the receptacle connector 3200 is assembled. In some examples, one or more of the barbs 3216 can be or include anti-rotation supports, which prevent rotation of the anchor 3214 relative to the interior portion 3202. The contact block 3212 can include openings through which the anchor 3214 extends. The anchor 3214 can have a jogged shape, in order to prevent contact between the anchor 3214 and the electrical contacts 3210. The contact block 3212 and the anchor 3214 can include openings into which the adhesive 3218 can extend, such as openings at corners, in top and bottom surfaces, and the like.

Figure 36C:
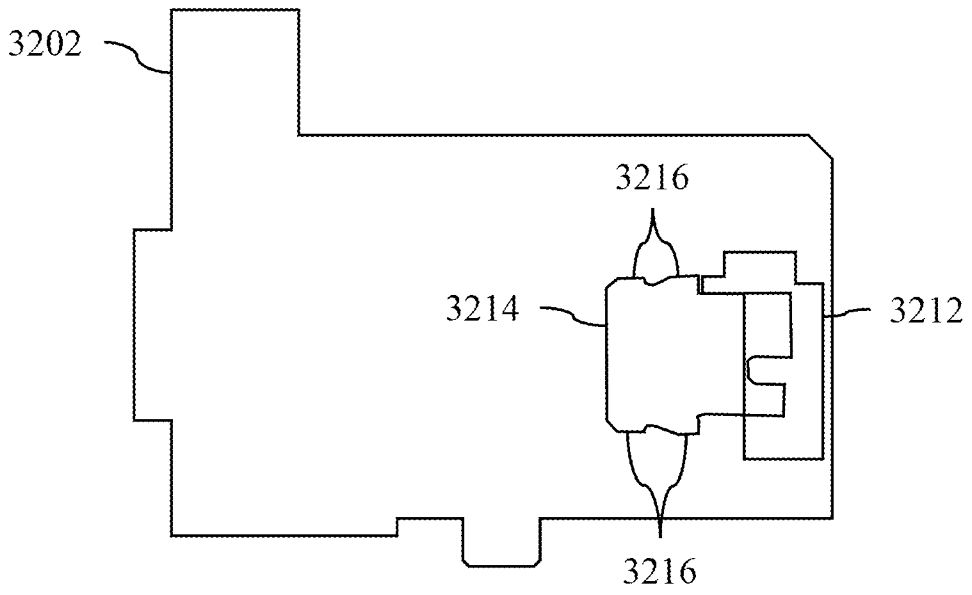
FIGS. 36C and 36D show cross-sectional views of the receptacle connector of FIG. 36A.
Figure 36D:
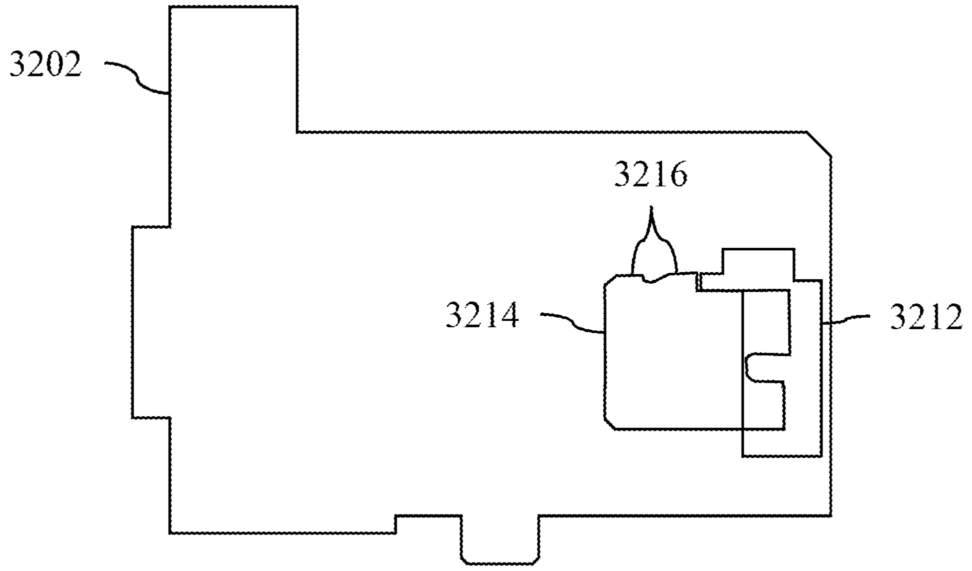

FIGS. 36C and 36D illustrate cross-sectional views of assembled receptacle connectors 3200. More specifically, FIGS. 36C and 36D illustrate the interior portion 3202, the contact block 3212, and the anchor 3214 of receptacle connectors 3200 in accordance with some examples. In the example of FIG. 36C, the anchor 3214 includes barbs 3216 on both a top surface and a bottom surface opposite the top surface. In the example of FIG. 36D, the anchor 3214 includes barbs 3216 on a top surface, and a bottom surface opposite the top surface is free from the barbs 3216. Providing the barbs 3216 on a single surface of the anchor 3214 can increase are of an opposite surface, which can help to resist rotation between the anchor 3214 and the interior portion 3202 of the receptacle connector 3200.

Figure 37:
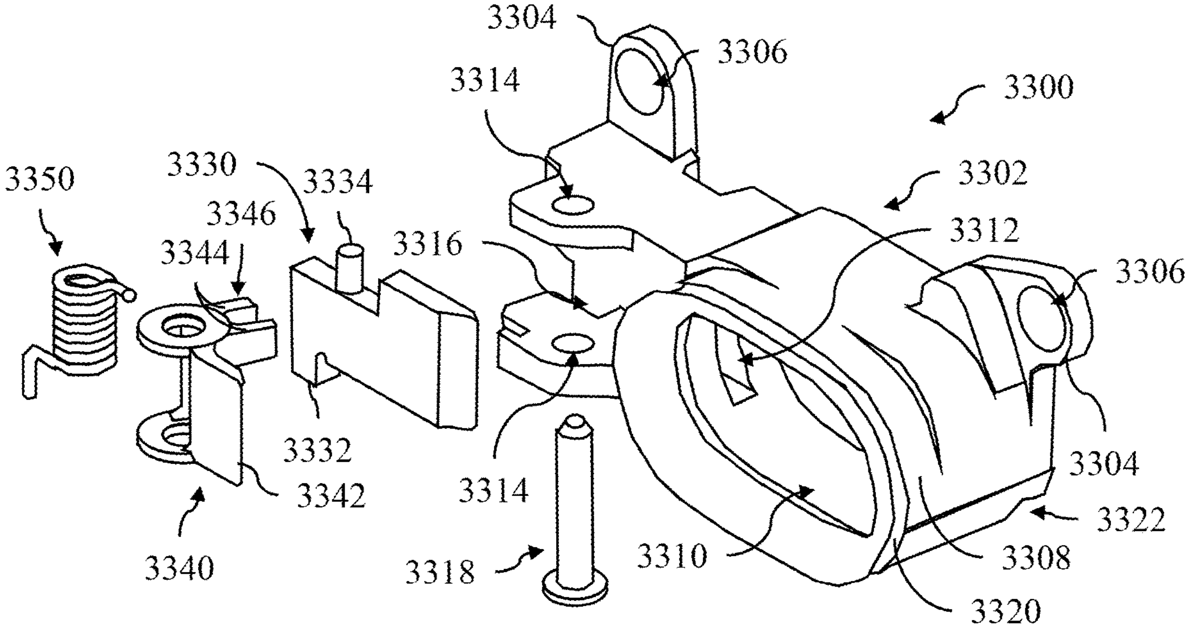
FIG. 37 shows an exploded view of a trim ring.

FIG. 37 illustrates an exploded view of a trim ring 3300. The trim ring 3300 includes a body portion 3302. The body portion 3302 includes tabs 3304 with openings 3306, which can be used to attach the trim ring to an enclosure of an electronic device, such as through a frame or directly to the enclosure. The body portion 3302 includes a snout or snorkel 3308 to which a seal 3320 is mounted. The body portion 3302 and the seal 3320 define a recess 3310 in which a plug connector can be inserted. For example, a boot of the plug connector can be retained in the recess 3310, and a plug of the plug connector can pass through the recess 3310 as the plug connector is inserted into the recess 3310. The body portion 3302 can further include openings (not separately illustrated) in a backside of the body portion 3302 to which a receptacle connector can be mounted.

The body portion 3302 can include an aperture 3312 and a recess 3316 in which a latch 3330 can be mounted. For example, the latch 3330 can extend through the aperture 3312 into the recess 3310 such that the latch 3330 can act as a detent to retain the plug connector (e.g., the boot of the plug connector) in the recess 3310. The latch 3330 can include a protrusion 3332 that can interface with the recess 3316 in order to maintain relative positions of the latch 3330 and the body portion 3302. The protrusion 3332, the recess 3316, and the aperture 3312 can define a movement path (e.g., a linear movement path) of the latch 3330 relative to the body portion 3302. In other words, the protrusion 3332 can slide along the recess 3316 as the latch 3330 moves through the aperture 3312 into or out of the recess 3310 in the body portion 3302. In the example illustrated in FIG. 37, the protrusion 3332 and the recess 3316 have rectangular shapes, and have shapes corresponding to one another. In some examples, the recess 3316 and the protrusion 3332 can have different shapes (e.g., cylindrical/circular or the like), and can define different movement paths of the latch 3330 relative to the body portion 3302 (e.g., curved movement paths or the like). The latch 3330 can slide relative to the body portion 3302 as the latch 3330 moves into or out of the recess 3310.

The body portion 3302 can include openings 3314 through which a pin 3318 can extend. The pin 3318 can extend through one of the openings 3314, through a first opening in a lever arm 3340, through a spring 3350 (e.g., through a center of the spring 3350), through a second opening in the lever arm 3340, and through the other of the openings 3314. In some examples, the pin 3318 can be welded, screwed, or otherwise fastened to the body portion 3302. The pin 3318 can be stationary relative to the body portion 3302, and the lever arm 3340 and at least a portion of the spring 3350 can rotate relative to the pin 3318. As such, the pin 3318 can define a rotational axis of the lever arm 3340. Welding the pin 3318 to the body portion 3302 can prevent the pin 3318 from deforming, pinching, or otherwise altering the shape of the body portion 3302. This can reduce any interference between the body portion 3302 and the lever arm 3340, and can ensure the lever arm 3340 can freely move relative to the pin 3318 and the body portion 3302.

The lever arm 3340 can include a protrusion 3342 and two protrusions 3344. The protrusion 3342 can interface with a tool in order to rotate the lever arm 3340 and transition the lever arm 3340 and the latch 3330 between an engaged and an un-engaged state. In the engaged state, a force from the spring 3350 is transferred from the spring 3350 to the lever arm 3340 and from the lever arm 3340 to the latch 3330 through the protrusions 3344 interfacing with a protrusion 3334 of the latch 3330. The force of the spring 3350 biases the latch 3330 through the aperture 3312 into the recess 3310 in the body portion 3302. When a plug connector is inserted into the recess, the plug connector can move the latch 3330 at least partially out of the recess 3310 as the latch 3330 contacts the plug connector, and the spring 3350 can move the latch 3330 into a recess in the plug connector once the plug connector is sufficiently inserted. Interference between the latch 3330 and the recess in the plug connector can retain the plug connector in the recess 3310. The plug connector can be removed from the recess 3310 by using the tool to transition the lever arm 3340 and the latch 3330 into the un-engaged state and move the latch 3330 at least partially out of the recess 3310.

The lever arm 3340 can include recesses 3346 at a top surface thereof (e.g., in top surfaces of the protrusions 3344), which can prevent binding or other interference between the lever arm 3340 and the body portion 3302. The recesses 3346 help the lever arm 3340 to move freely relative to the body portion 3302. In some examples, a lubricant can be provided between the lever arm 3340 and the pin 3318 to improve relative movement between the lever arm 3340 and the pin 3318. The body portion 3302 can include a recess 3322 illustrated at a bottom right corner of the body portion 3302. The recess 3322 can prevent the body portion 3302 of the trim ring 3300 from damaging components of an electronic device, such as in a drop event.

Various components of the trim ring 3300, such as the body portion 3302, the latch 3330, and 3340 can be formed by CNC, molding (such as injection molding, insert molding, metal injection molding (MIM), or the like), or the like. The body portion 3302, the latch 3330, and 3340 can be formed from aluminum, stainless steel, polymers, plastics, combinations thereof, or the like. In some examples, one or more of the body portion 3302, the latch 3330, and 3340 can be formed from stainless steel, such as through MIM, in order to provide the trim ring with components with improved hardness and durability. In some examples, one or more of the body portion 3302, the latch 3330, and 3340 can be formed from insert molded plastic including metals and plastics in order to reduce cost of the trim ring 3300.

Figure 38A:
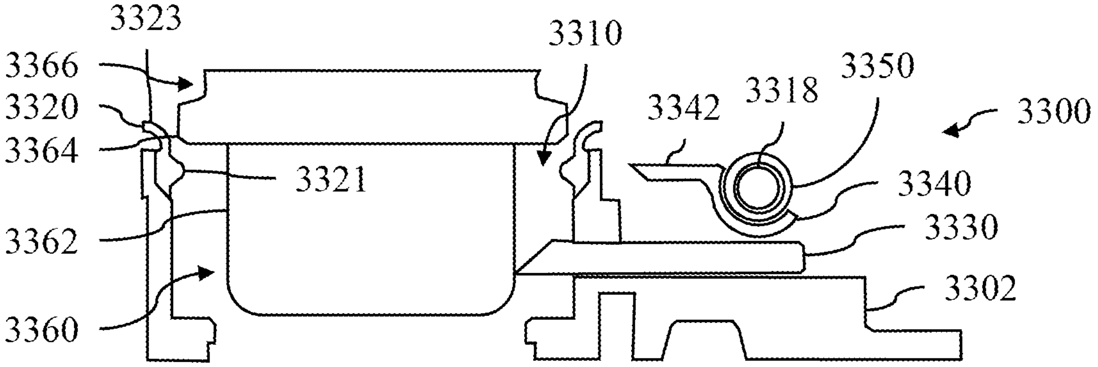
FIGS. 38A, 38B, 38C, and 38D show cross-sectional views of insertion and removal of a plug connector from a trim ring.

FIGS. 38A through 38D illustrate cross-sectional views of insertion (shown in FIGS. 38A through 38C) and removal (shown in FIG. 38D) of a plug connector 3360 from the trim ring 3300 of FIG. 37. As illustrated in FIG. 38A, the trim ring 3300 includes a body portion 3302; a lever arm 3340 coupled to a spring 3350, both of which at least partially encircle a pin 3318; a latch 3330; and a seal 3320. The body portion 3302 and the seal 3320 each at least partially define a recess 3310.

The plug connector 3360 includes a plug 3362 and a boot 3364. The plug 3362 can include multiple contacts, and can be any of the plugs disclosed herein. The boot 3364 can include recesses 3366 formed in opposite sides thereof. The boot 3364 can have inclined surfaces adjacent the recesses 3366 and adjacent the plug 3362, which can allow the latch 3330 to slide relative to the boot 3364.

The seal 3320 can include a radial portion 3321 and an axial portion 3323. The radial portion 3321 can provide radial sealing between the boot 3364 of the plug connector 3360 and the body portion 3302 of the trim ring 3300 (e.g., circumferential sealing or right-left sealing in the view of FIG. 38A between the boot 3364 and the body portion 3302). The axial portion 3323 can provide axial sealing between the boot 3364 of the plug connector 3360 and the body portion 3302 of the trim ring 3300 (e.g., sealing in the vertical direction in the view of FIG. 38A). By including both the radial portion 3321 and the axial portion 3323, sealing forces can be customized for the seal 3320 in the axial and radial directions, and insertion, removal, and sealing forces for the seal 3320 and the plug connector 3360 can be customized. As the plug connector 3360 is inserted into the recess 3310, the seal 3320 provides sealing between the boot 3364 and the boot 3364 of the plug connector 3360.

Figure 38B:
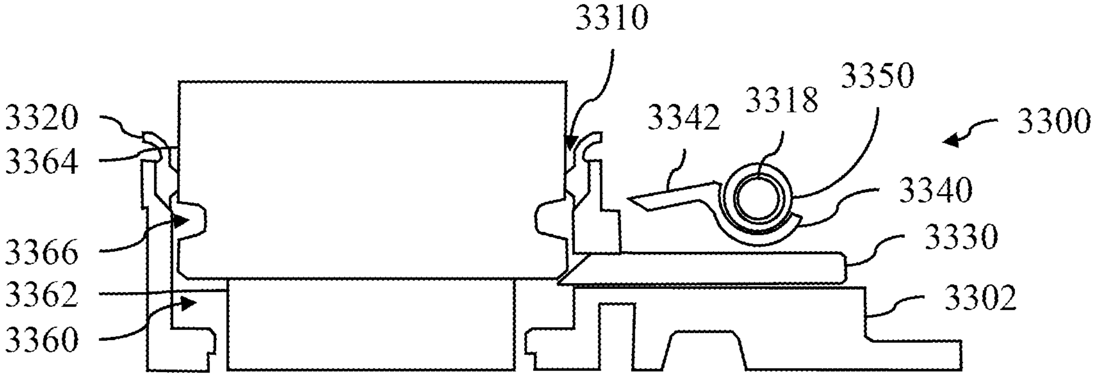
Figure 38C:
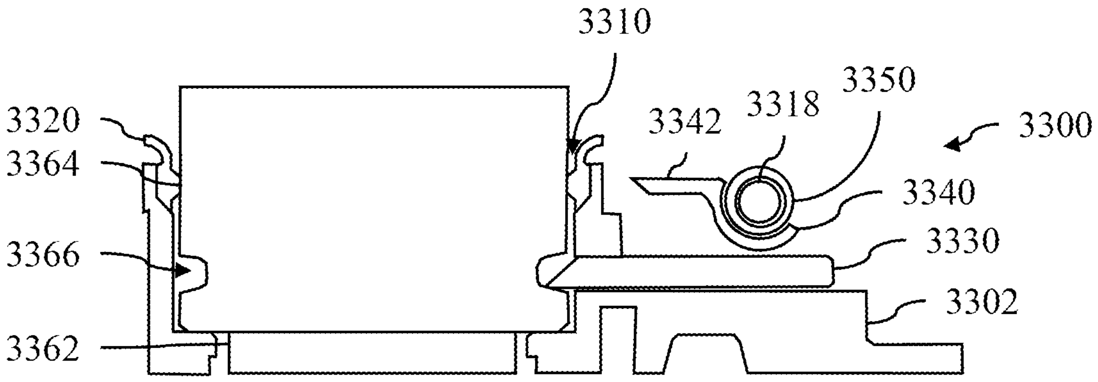
Figure 38D:
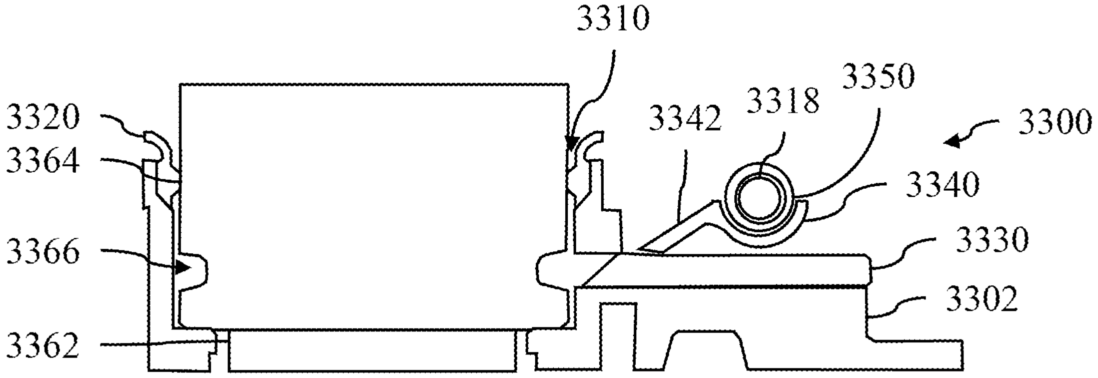

The spring 3350 can provide a rotational force to the lever arm 3340 to bias the latch 3330 into the recess 3310. The lever arm 3340 can be coupled to and can interface with the latch 3330 through protrusions 3344 of the lever arm 3340 and a protrusion 3334 of the latch 3330, illustrated and discussed above in reference to FIG. 37. As illustrated in FIG. 38A, before the plug connector 3360 is inserted into the recess 3310, the spring 3350 biases the latch 3330 in an initial position in the recess 3310 through the lever arm 3340. As illustrated in FIG. 38B, as the plug connector 3360 is inserted into the recess 3310, an inclined surface of the boot 3364 interacts with an inclined surface of the latch 3330 to slide the latch out of the recess 3310 through the aperture 3312 (illustrated in FIG. 37). The spring 3350 provides a force through the lever arm 3340 to the latch 3330 to resist the movement of the latch 3330 out of the recess 3310 through the aperture 3312. As illustrated in FIG. 38C, once the plug connector 3360 is inserted into the recess 3310 to a depth such that the latch 3330 is aligned with the recesses 3366 in the boot 3364, the spring 3350 causes the lever arm 3340 to slide the latch 3330 back through the aperture 3312 into the recess 3310 and into the recess 3366. The latch 3330 can include a flat surface opposite the inclined surface, which aids in retaining the latch 3330 in the recess 3366 and increases removal force of the plug connector 3360 (e.g., the force required to remove the plug connector 3360 from the trim ring 3300) relative to insertion force of the plug connector 3360 (e.g., the force required to insert the plug connector 3360 into the trim ring 3300). In FIG. 38D, a tool is used to rotate the lever arm 3340 into the un-engaged state with the protrusion 3342, sliding the latch 3330 through the aperture 3312 and out of the recesses 3366, 3310, such that the plug connector 3360 can be removed from the recess 3310 in the trim ring 3300.

Figure 39A:
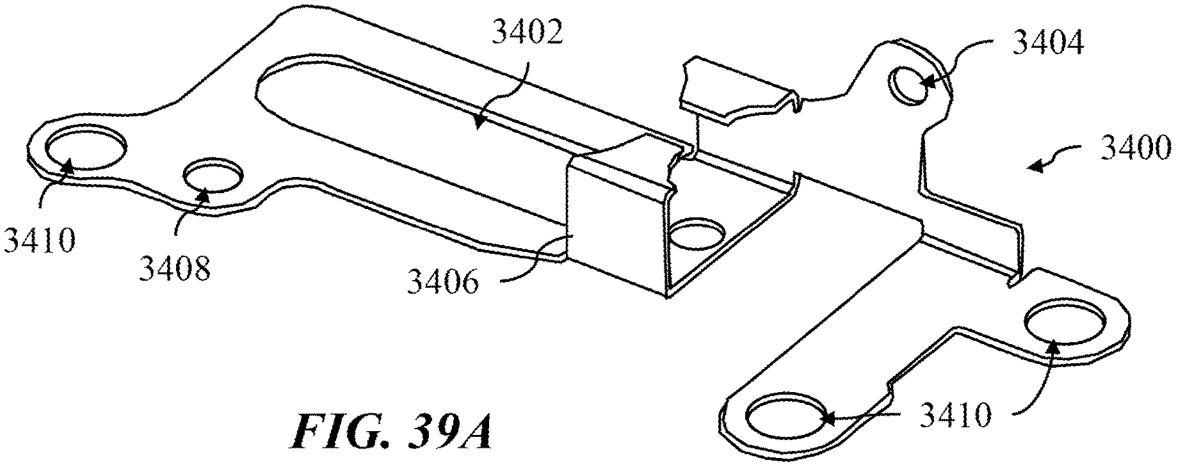
FIG. 39A shows a perspective view of a trim ring insert.
Figure 39B:
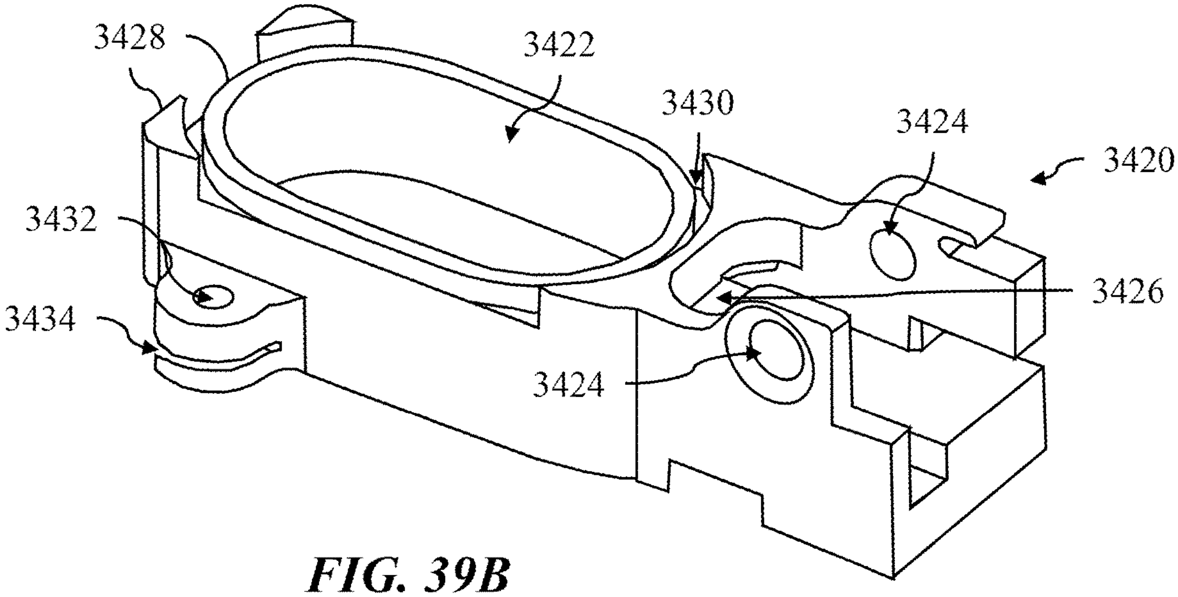
FIG. 39B shows a perspective view of an over-molded trim ring component.
Figure 39C:
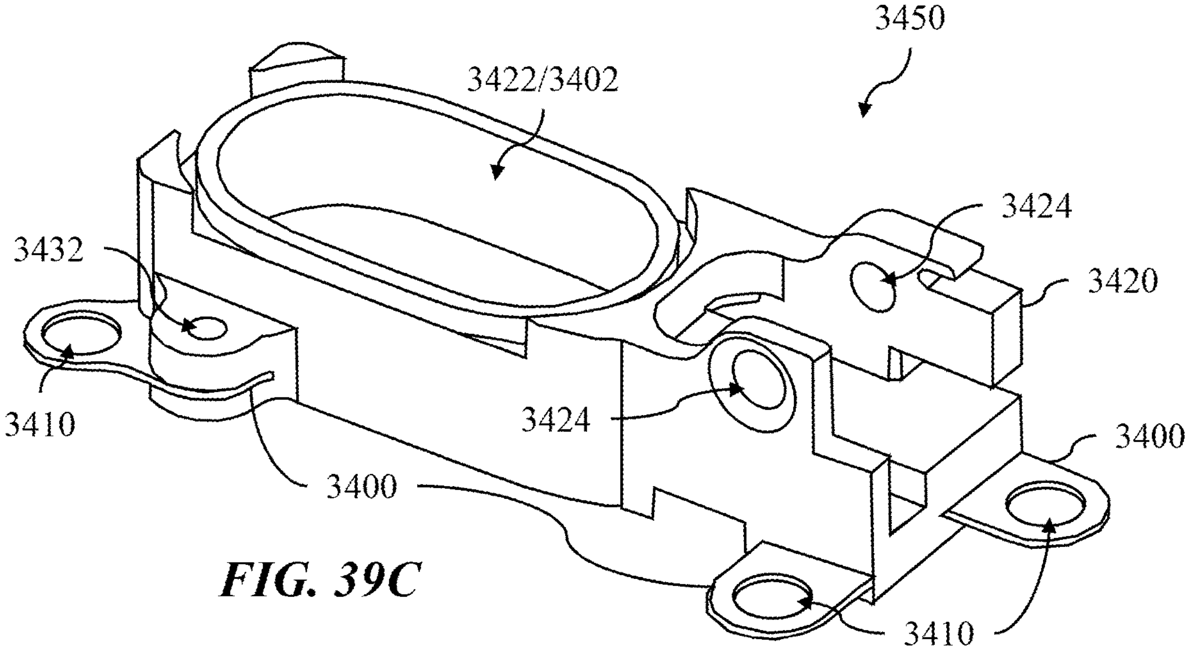
FIG. 39C shows a perspective view of a trim ring including the trim ring insert of FIG. 39A and the over-molded trim ring component of FIG. 39B.

FIGS. 39A through 39C illustrate perspective views of a trim ring 3450 (illustrated in FIG. 39C) that includes an insert 3400 and a body portion 3420. In some examples, the insert 3400 can be a metal material, such as sheet metal (e.g., steel or the like) and the body portion 3420 can be a polymer or plastic. In some examples, the body portion 3420 can include a glass filled plastic material. Forming the trim ring 3450 from an overmolded material can reduce cost of the materials used for the trim ring 3450 and can reduce the weight of the trim ring 3450. The trim ring 3450 can be formed by insert molding, overmolding, or the like. The trim ring 3450 can be the same as or similar to (including the same shapes as) any of the trim rings discussed above, such as the trim ring 2422 discussed with respect to FIGS. 27A and 27B, the trim ring 2520 discussed with respect to FIGS. 28A through 28F, the trim ring 2620 discussed with respect to FIGS. 29A through 29E, the trim ring 2720 discussed with respect to FIGS. 30A through 30C, the trim ring 2820 discussed with respect to FIGS. 31A and 31B, the trim ring 3030 discussed with respect to FIGS. 33A through 34B, or the trim ring 3300 discussed with respect to FIGS. 37 through 38D.

As illustrated in FIG. 39A, the insert 3400 can include an opening 3402, an opening 3404, supports 3406, an opening 3408, and openings 3410. As illustrated in FIG. 39B, the body portion 3420 can include an opening 3422, openings 3424, an aperture 3426, raised portions 3428, a recess 3430, an opening 3432, and a slot 3434. As illustrated in FIG. 39C, the body portion 3420 can be overmolded around the insert 3400 to form the trim ring 3450.

The opening 3402 and the opening 3422 can be aligned with one another and can define a recess in which a plug connector can be inserted and retained. The raised portions 3428 and the recess 3430 can be configured to retain a seal. For example, a seal can be inserted into the recess 3430, and can interface with the raised portions 3428 to retain the seal in a desired position relative to the body portion 3420. The seal can provide sealing between the plug connector and the trim ring 3450. The seal can be a closed loop, and can extend around an inner raised portion and be retained on the raised portion by an elastic force of the seal.

The opening 3404 can be aligned with the openings 3424, and can define openings in which a pin can be inserted and retained. The pin can be used to secure a lever arm and a spring and can define a rotational axis of the lever arm and the spring. The supports 3406 can be provided to strengthen the body portion 3420. In the example illustrated in FIGS. 39A through 39C, the body portion 3420 may have a weak point around the aperture 3426, and the supports 3406 can provided additional strength and support around the aperture 3426. The aperture 3426 can be provided extending into the opening 3422 in order to house and retain a latch. The latch can be used to secure the plug connector in the opening 3422 in the trim ring 3450.

The opening 3408 can be provided for a fastener to be inserted into, such as a fastener used to secure a receptacle connector to the trim ring 3450. Multiple openings 3408 can be provided, and weld nuts can be fastened, such as welded, to the insert 3400 in order to retain the fasteners used to secure the receptacle connector to the trim ring 3450. The opening 3408 can be aligned with the opening 3432, and the fastener can extend through the opening 3432 as well as the opening 3408. The slot 3434 can be defined when the body portion 3420 is overmolded around the support 3400, and the support 3400 can extend through the slot 3434. The openings 3410 can be provided for fasteners to be inserted into, such as fasteners used to secure the trim ring 3450 to a frame and/or an enclosure of an electronic device. Multiple openings 3410 can be provided, and weld nuts can be fastened, such as welded, to the insert 3400 in order to retain the fasteners used to secure the trim ring 3450 to the frame and/or the enclosure of the electronic device.

Figure 40A:
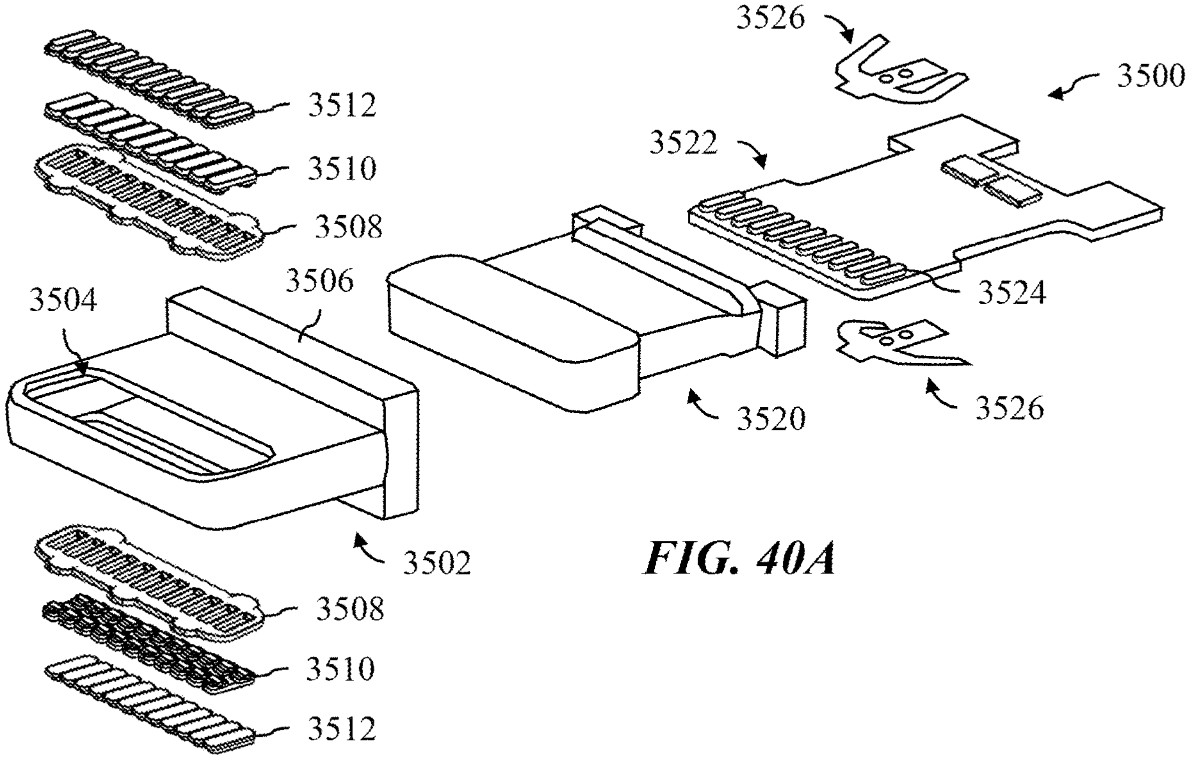
FIG. 40A shows an exploded view of a plug of a plug connector.
Figure 40B:
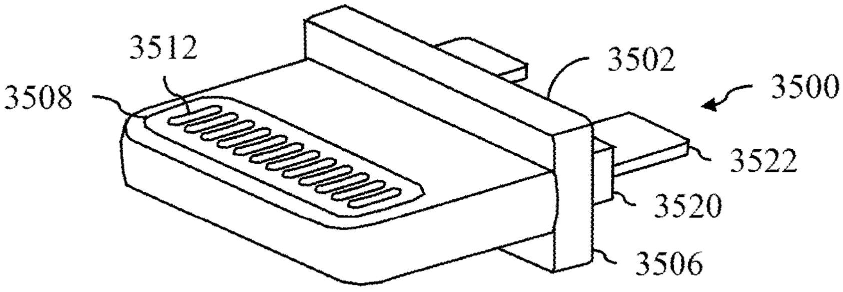
FIG. 40B shows a perspective view of the plug of FIG. 40A.

FIGS. 40A and 40B illustrate an exploded view and a perspective view, respectively, of a plug 3500 of a plug connector. The plug 3500 can include a ground ring 3502 an inner body portion 3520, and a printed circuit board (PCB) 3522. The ground ring 3502 can include openings 3504 and a flange 3506. Electrical contact structures can be provided in the openings 3504, and the electrical contact structures can include a contact block 3508 provided at each side of the ground ring 3502 (opposite one another), bottom contacts 3510 coupled to each contact block 3508, and top contacts 3512 coupled to each of the bottom contacts 3510. The contact blocks 3508 can be formed by injection molding, and can be plastic or polymer materials, such as LCP. The bottom contacts 3510 can be stamped, and can be formed from a copper alloy or the like. The top contacts 3512 can be stamped, and can be formed of a copper alloy material, such as a copper alloy including platinum and/or nickel plating, or the like. The ground ring 3502 can be formed of a material such as stainless steel (e.g., SUS 17-4PH stainless steel), and can be formed by MIM, CNC'ing, a combination thereof, or the like.

The inner body portion 3520 can be formed of a polymer or plastic material, and can be formed by injection molding or the like. In some examples, the inner body portion 3520 can be formed from a glass-filled nylon material or the like. Ground springs 3526 can be provided on opposite sides of the PCB 3522, and can provide grounding between the PCB 3522 and the ground ring 3502. The ground springs 3526 can be stamped, and can be formed from a copper alloy or the like. The PCB 3522 can include multiple contacts, which can correlate to the number of electrical contacts provided in the ground ring 3502. In the example illustrated in FIGS. 40A and 40B, 12 contacts are provided on each side of the ground ring 3502; however, any number of electrical contacts, such as a greater number or fewer contacts can be provided. The plug 3500 can be a double-sided, flippable plug, with the same contacts being provided on each side of the plug 3500.

In some examples, personal information data can be used by the present systems and methods to enhance the user experience. While the present examples can be performed without the use of personal information data, use of personal information data can be used to improve and personalize the experience for a user. If such personal information data is used, such use should comply with well-established privacy policies and/or privacy practices, including those practices that are generally recognized as meeting or exceeding industry or governmental requirements for maintaining personal information data private and secure. Furthermore, the personal information data should be managed and handled in a way to minimize risks of unintentional or unauthorized access or use.

The foregoing description, uses specific nomenclature to provide a thorough understanding of the described embodiments. However, the specific details are not necessary to practice the described examples. Thus, the foregoing descriptions are presented for purposes of illustration and description, and are not intended to be exhaustive or to limit the embodiments to the precise forms disclosed. Many modifications and variations are possible in view of the above teachings.

What is claimed is:

1. An electrical port for receiving a plug connector, the electrical port comprising:

a housing including an internal wall at least partially defining a cavity, the cavity configured to surround at least a portion of the plug connector;

a first electrical contact disposed at least partially within the cavity, the first electrical contact coupled to the housing at a first angle oblique to a vertical axis of the housing;

a second electrical contact disposed at least partially within the cavity, the second electrical contact coupled to the housing at a second angle oblique to the first angle and the vertical axis of the housing; and an engagement feature comprising:

a latch positioned to extend through an opening in a lateral portion of the internal wall of the housing when the latch is in an engaged configuration;

a spring configured to retain the latch in the engaged configuration; and a push block coupled to the spring and the latch, the push block configured to rotate the latch to an un-engaged configuration in response to a force from a tool.

2. The electrical port of claim 1, wherein:

the cavity is configured to receive a plug connector comprising a concave surface and a convex surface opposite the concave surface; and the first angle and the second angle are normal to at least one of the concave surface or the convex surface.

3. The electrical port of claim 1, further comprising:

a bumper coupled to the internal wall of the housing opposite an opening of the cavity;

wherein the bumper is configured to supply an ejection force to a plug connector inserted into the cavity.

4. The electrical port of claim 1, further comprising:

a seal coupled to the internal wall of the housing adjacent an opening of the cavity, the seal encircling at least a portion of the cavity;

wherein the seal is configured to supply an ejection force to a plug connector inserted into the cavity.

5. The electrical port of claim 1, wherein the latch is configured to interlock with a groove of the plug connector.

6. The electrical port of claim 5, wherein the latch and the groove taper at angles in a range from 0 degree to 10 degrees.

7. The electrical port of claim 1, wherein:

the cavity is configured to receive a plug connector comprising a concave surface, a convex surface opposite the concave surface, and a side surface extending between the concave surface and the convex surface; and the latch is configured to interlock with a groove of the plug connector in the side surface.

8. The electrical port of claim 1, wherein the cavity comprises a guide rail configured to interface with a groove of the plug connector.

9. A receptacle connector for a head-mountable display (HMD) comprising:

a cavity configured to receive a plug connector;

a latch extending at least partially into the cavity, the latch configured to transition between an engaged configuration and an un-engaged configuration, the latch configured to retain the plug connector in the cavity when the latch is in the engaged configuration;

a spring coupled to the latch and configured to retain the latch in the engaged configuration;

a lever arm coupled to the spring and configured to transition the latch to the un-engaged configuration in response to pressure from a tool; and a seal mounted on the lever arm.

10. The receptacle connector of claim 9, wherein the latch is configured to extend into a groove defined by a boot of the plug connector.

11. The receptacle connector of claim 10, wherein:

the latch is configured to extend into the groove defined in a lateral side surface of the plug connector; and the lateral side surface is adjacent to a longitudinal side surface of the plug connector.

12. The receptacle connector of claim 9, wherein the latch is configured to extend into a groove defined by a plug of the plug connector.

13. The receptacle connector of claim 12, wherein:

the latch is configured to extend into the groove defined in a lateral side surface of the plug connector; and the lateral side surface is adjacent to a longitudinal side surface of the plug connector.

14. The receptacle connector of claim 9, further comprising a seal encircling at least a portion of the cavity, the seal being configured to interface with a boot of the plug connector.

15. The receptacle connector of claim 9, further comprising a seal encircling at least a portion of the cavity, the seal being configured to interface with a plug of the plug connector, the seal being configured to supply an ejection force to the plug connector.

16. The receptacle connector of claim 9, further comprising a compressible bumper disposed between a back surface of the cavity and the plug connector.

17. The receptacle connector of claim 9, wherein:

the plug connector is disposed at a distal end of a support; and the tool is configured to interface with the support to align the tool with the lever arm.

18. The receptacle connector of claim 9, wherein the latch is coupled to the lever arm by a first lever arm protrusion and a second lever arm protrusion, the first lever arm protrusion and the second lever arm protrusion being disposed on opposite sides of a latch protrusion.

19. The receptacle connector of claim 9, further comprising a second spring configured to interact with a protrusion of the lever arm;

wherein the second spring is configured to move across the protrusion as the latch is transitioned from the engaged configuration to the un-engaged configuration and from the un-engaged configuration to the engaged configuration.

20. The receptacle connector of claim 9, wherein the cavity comprises a longitudinal side surface and a lateral side surface adjacent the longitudinal side surface, wherein the latch extends through the lateral side surface.

21. The receptacle connector of claim 9, wherein:

the latch comprises a first sloped surface configured to engage with a second sloped surface of the plug connector; and wherein the first sloped surface and the second sloped surface are disposed at angles oblique to an insertion direction of the plug connector.

22. The receptacle connector of claim 9, wherein the latch is configured to translate between the engaged configuration and the un-engaged configuration in a direction perpendicular to an insertion direction of the plug connector.

23. The receptacle connector of claim 9, wherein the latch is configured to rotate between the engaged configuration and the un-engaged configuration.

24. The receptacle connector of claim 9, wherein the lever arm comprises:

a first protrusion configured to engage the tool; and a second protrusion and a third protrusion configured to engage the latch;

wherein the spring and the lever arm at least partially encircle a pivot.

25. The receptacle connector of claim 9, further comprising a second latch extending at least partially into the cavity opposite the latch, the second latch configured to:

transition between an engaged configuration and an un-engaged configuration; and retain the plug connector in the cavity when the second latch is in the engaged configuration;

wherein the spring is coupled to the second latch and configured to retain the second latch in the engaged configuration; and wherein the lever arm is configured to transition the second latch to the un-engaged configuration in response to pressure from the tool.

26. The receptacle connector of claim 9, wherein the cavity is configured to form a seal with a first seal encircling at least a portion of a boot of the plug connector.

27. The receptacle connector of claim 9, wherein:

the latch is a first protrusion of the lever arm;

the lever arm comprises a second protrusion configured to interface with the tool; and the lever arm comprises a third protrusion coupled to the spring.

28. The receptacle connector of claim 9, wherein:

the cavity comprises a guide rail configured to be received by a guide channel of the plug connector;

the latch is configured to be received by a groove of the plug connector; and the guide channel and the groove each have longitudinal axes perpendicular thereto.

29. The receptacle connector of claim 9, wherein the pressure from the tool is configured to be supplied in a direction parallel to an insertion direction of the plug connector into the cavity.

30. A head-mountable display (HMD) comprising:

a display portion;

an electrical power source; and a cable assembly coupled to the display portion and the electrical power source, the cable assembly comprising:

a first receptacle connector;

a first plug connector disposed within a first cavity of the first receptacle connector;

a second receptacle connector; and a second plug connector disposed within a second cavity of the second receptacle connector, wherein:

the first plug connector is configured to be removed from the first receptacle connector by a pull force; and the second plug connector is configured to be removed from the second receptacle connector by a force of a tool applied to a lever arm of the second receptacle connector.

31. The HMD of claim 30, wherein the cable assembly further comprises:

a third receptacle connector; and a third plug connector disposed within a third cavity of the third receptacle connector;

wherein the third plug connector is configured to be removed from the third receptacle connector by a force of a second tool applied to a second lever arm of the third receptacle connector.

32. The HMD of claim 31, further comprising a support coupled to the display portion, wherein:

the first receptacle connector is disposed on a first housing of the support;

the second receptacle connector is disposed within a second housing of the display portion; and the third receptacle connector is disposed within a third housing of the electrical power source.

33. The HMD of claim 30, further comprising a support coupled to the display portion, wherein:

the first receptacle connector is disposed on a first housing of the support; and the second receptacle connector is disposed within a second housing of the electrical power source.

34. The HMD of claim 30, further comprising a support coupled to the display portion, wherein:

the first receptacle connector is disposed on a first housing of the support;

the second receptacle connector is disposed within a second housing of the display portion;

the second plug connector is disposed at an end of the support; and the second receptacle connector is configured to receive at least a portion of the support.

35. The HMD of claim 30, wherein the first plug connector is configured to be rotatably received in the first cavity of the first receptacle connector.

36. The HMD of claim 30, wherein:

the first receptacle connector is configured to receive the first plug connector when the first receptacle connector is in a first orientation relative to the first plug connector;

the first receptacle connector is configured to inhibit extraction of the first plug connector from the first cavity when the first receptacle connector is in a second orientation relative to the first plug connector; and the first receptacle connector is configured to permit rotation of the first plug connector from the first orientation to the second orientation.

37. The HMD of claim 36, wherein extracting the first plug connector from the first cavity when the first receptacle connector is in the first orientation requires less force than extracting the first plug connector from the first cavity when the first receptacle connector is in the second orientation.

38. The HMD of claim 30, wherein the first receptacle connector comprises:

a trim ring;

a base connected to the trim ring, the trim ring and the base defining the first cavity;

a raised portion disposed within the first cavity and extending from the base; and a seal between the base and the raised portion, wherein the seal encircles at least a portion of the raised portion, wherein the seal is configured to provide sealing between the first plug connector and the first receptacle connector.

39. The HMD of claim 30, further comprising a support coupled to the display portion;

wherein the first receptacle connector is disposed at a first end of the support;

wherein the second plug connector is disposed at a second end of the support opposite the first end; and wherein the first receptacle connector is electrically coupled to the second plug connector.

40. The HMD of claim 39, further comprising a band portion coupled to the first end of the support, the band portion being configured to at least partially encircle a head of a user.

41. The HMD of claim 39, wherein the tool is configured to interface with the support to align the tool with the display.

42. The HMD of claim 30, wherein:

the cable assembly further comprises a cable;

the first plug connector is disposed at a first end of the cable; and the second plug connector is disposed at a second end of the cable opposite the first end.

* * * * *